US012786348B1

(12) United States Patent
Pottorff et al.

(10) Patent No.: US 12,786,348 B1
(45) Date of Patent: Nov. 3, 2026

(54) DETECTING DUPLICATION IN VIDEO FRAME BLENDING

(71) Applicant: NVIDIA Corporation, Santa Clara, CA (US)

(72) Inventors: Robert Thomas Pottorff, Layton, UT (US); Zhekun Luo, Santa Clara, CA (US); Karan Sapra, San Jose, CA (US); Jarmo Rafael Lunden, Espoo (FI); Andrew J. Tao, Los Altos, CA (US); Bryan Christopher Catanzaro, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/949,138

(22) Filed: Sep. 20, 2022

(51) Int. Cl.

| | |
|---|---|
| ***H04N 7/01*** | (2006.01) |
| ***G06T 5/50*** | (2006.01) |
| ***H04N 19/132*** | (2014.01) |
| ***H04N 19/139*** | (2014.01) |

(52) U.S. Cl.
CPC ............ *H04N 7/0137* (2013.01); *G06T 5/50* (2013.01); *H04N 7/0127* (2013.01); *H04N 19/132* (2014.11); *H04N 19/139* (2014.11); *G06T 2207/20221* (2013.01)

(58) Field of Classification Search
CPC .. H04N 7/0137; H04N 19/132; H04N 19/139; H04N 7/0127; G06T 5/50; G06T 2207/20221
USPC .......................... 375/240.16; 348/663, 7.003
See application file for complete search history.

(56) References Cited

U.S. PATENT DOCUMENTS

| | | | | |
|---|---|---|---|---|
| 4,967,392 | A | 10/1990 | Werner et al. | |
| 5,057,921 | A | 10/1991 | Robert et al. | |
| 6,393,162 | B1 | 5/2002 | Higurashi | |
| 8,595,239 | B1 | 11/2013 | Yadav | |
| 8,934,534 | B2 | 1/2015 | Incesu et al. | |
| 9,357,161 | B1 | 5/2016 | Cheng et al. | |
| 10,127,644 | B2 | 11/2018 | Taggart et al. | |
| 10,409,518 | B1 | 9/2019 | Xie et al. | |
| 10,623,709 | B2 | 4/2020 | Schroers et al. | |
| 10,855,896 | B1 | 12/2020 | Li et al. | |
| 10,861,213 | B1 | 12/2020 | Holzer et al. | |
| 11,049,226 | B1 | 6/2021 | Robison et al. | |
| 11,893,668 | B2 | 2/2024 | Bishop | |
| 12,014,472 | B1 | 6/2024 | Mirhosseini | |
| 12,348,717 | B2 | 7/2025 | Li et al. | |
| 2006/0087592 | A1 * | 4/2006 | Gong ........................ | H04N 9/78 348/663 |
| 2007/0047653 | A1 | 3/2007 | Kim et al. | |
| 2007/0052704 | A1 | 3/2007 | Pedley et al. | |

(Continued)

OTHER PUBLICATIONS

Grossman et al. "Point Sample Rendering," Eurographics Workshop on Rendering Techniques, 1998, 14 pages.

(Continued)

*Primary Examiner* — Jayanti K Patel
*Assistant Examiner* — Richard B Carter
(74) *Attorney, Agent, or Firm* — Davis Wright Tremaine LLP

(57) ABSTRACT

Apparatuses, systems, and techniques to process image frames. In at least one embodiment, one or more circuits are to detect whether one or more objects within one or more images is likely to be duplicated in an image interpolated using the one or more images.

20 Claims, 76 Drawing Sheets

(56) References Cited

U.S. PATENT DOCUMENTS

| | | | |
|---|---|---|---|
| 2007/0229500 A1 | 10/2007 | Engel et al. | |
| 2008/0050023 A1 | 2/2008 | Feng et al. | |
| 2008/0063308 A1* | 3/2008 | Sato | H04N 19/85 375/E7.254 |
| 2008/0100598 A1 | 5/2008 | Juenger | |
| 2008/0239146 A1 | 10/2008 | Namioka | |
| 2009/0110075 A1 | 4/2009 | Chen et al. | |
| 2009/0213095 A1* | 8/2009 | Harada | G06F 3/042 382/103 |
| 2009/0274154 A1 | 11/2009 | Kopelman et al. | |
| 2009/0287901 A1 | 11/2009 | Abali et al. | |
| 2010/0142843 A1 | 6/2010 | Chen | |
| 2010/0265406 A1* | 10/2010 | Shishido | H04N 19/53 348/E5.062 |
| 2010/0302438 A1* | 12/2010 | Fujisawa | H04N 7/014 348/E7.003 |
| 2010/0303386 A1 | 12/2010 | Enderlein | |
| 2011/0043604 A1 | 2/2011 | Peleg et al. | |
| 2011/0142289 A1 | 6/2011 | Barenbrug et al. | |
| 2011/0170602 A1 | 7/2011 | Lee et al. | |
| 2011/0211124 A1 | 9/2011 | Petrides | |
| 2011/0243232 A1 | 10/2011 | Alshina et al. | |
| 2011/0268190 A1* | 11/2011 | Morphet | H04N 7/014 375/240.16 |
| 2011/0285813 A1 | 11/2011 | Girdzijauskas et al. | |
| 2011/0321040 A1 | 12/2011 | Sobel et al. | |
| 2012/0013624 A1 | 1/2012 | Fowler | |
| 2012/0050480 A1 | 3/2012 | Seshadri et al. | |
| 2012/0194642 A1 | 8/2012 | Lie et al. | |
| 2013/0069942 A1 | 3/2013 | Woo et al. | |
| 2013/0071032 A1 | 3/2013 | Nishino | |
| 2014/0118494 A1 | 5/2014 | Wu et al. | |
| 2014/0333669 A1 | 11/2014 | Stich | |
| 2015/0022447 A1 | 1/2015 | Hare et al. | |
| 2015/0078449 A1 | 3/2015 | Diggins | |
| 2015/0130805 A1 | 5/2015 | Baker et al. | |
| 2015/0261884 A1 | 9/2015 | Pang et al. | |
| 2015/0281727 A1 | 10/2015 | Park et al. | |
| 2015/0294479 A1 | 10/2015 | Kovacevic et al. | |
| 2016/0011788 A1 | 1/2016 | Tsuchiya et al. | |
| 2016/0042498 A1 | 2/2016 | Russell | |
| 2016/0301881 A1 | 10/2016 | Taggart et al. | |
| 2016/0309084 A1 | 10/2016 | Venkataraman et al. | |
| 2017/0191243 A1* | 7/2017 | Sharp | E02F 5/06 |
| 2017/0255577 A1 | 9/2017 | Maeda et al. | |
| 2017/0286004 A1 | 10/2017 | Hu et al. | |
| 2018/0012330 A1 | 1/2018 | Holzer et al. | |
| 2018/0060700 A1 | 3/2018 | Bleyer et al. | |
| 2018/0150935 A1 | 5/2018 | Tang | |
| 2018/0189930 A1 | 7/2018 | Dannels | |
| 2018/0205909 A1 | 7/2018 | Staranowicz et al. | |
| 2018/0218484 A1 | 8/2018 | Shen et al. | |
| 2018/0285110 A1 | 10/2018 | Ray et al. | |
| 2018/0288154 A1 | 10/2018 | Ghazaleh | |
| 2019/0113970 A1 | 4/2019 | Nijs et al. | |
| 2019/0304069 A1 | 10/2019 | Vogels et al. | |
| 2020/0012940 A1 | 1/2020 | Liu et al. | |
| 2020/0020067 A1 | 1/2020 | Liang et al. | |
| 2020/0053387 A1 | 2/2020 | Lee | |
| 2020/0184707 A1 | 6/2020 | Croxford et al. | |
| 2020/0193566 A1 | 6/2020 | Croxford | |
| 2020/0266822 A1 | 8/2020 | Tsuji et al. | |
| 2020/0267348 A1 | 8/2020 | Hu | |
| 2020/0363972 A1 | 11/2020 | Krasner et al. | |
| 2020/0372608 A1 | 11/2020 | Lee et al. | |
| 2020/0394752 A1 | 12/2020 | Liu et al. | |
| 2021/0049809 A1 | 2/2021 | Wahrenberg et al. | |
| 2021/0105442 A1 | 4/2021 | Shoa Hassani Lashdan et al. | |
| 2021/0279840 A1 | 9/2021 | Chi et al. | |
| 2021/0360190 A1 | 11/2021 | Yu | |
| 2022/0038653 A1 | 2/2022 | Reda et al. | |
| 2022/0038654 A1 | 2/2022 | Reda et al. | |
| 2022/0060619 A1 | 2/2022 | Pinhasov et al. | |
| 2022/0094962 A1 | 3/2022 | Choi et al. | |
| 2022/0147502 A1 | 5/2022 | Chu et al. | |
| 2022/0270360 A1* | 8/2022 | Mendlovic | G06V 40/40 |
| 2022/0385817 A1 | 12/2022 | Leu et al. | |
| 2022/0398705 A1 | 12/2022 | Martin Brualla et al. | |
| 2022/0400226 A1 | 12/2022 | Liang et al. | |
| 2022/0405987 A1 | 12/2022 | Pottorff et al. | |
| 2023/0065183 A1 | 3/2023 | Zirr et al. | |
| 2023/0089812 A1 | 3/2023 | Yang et al. | |
| 2023/0146005 A1 | 5/2023 | Chernigin et al. | |
| 2023/0146073 A1 | 5/2023 | Kozlov et al. | |
| 2023/0217001 A1 | 7/2023 | Holzer et al. | |
| 2023/0267666 A1 | 8/2023 | Minor | |
| 2023/0274489 A1 | 8/2023 | Zhang et al. | |
| 2023/0344962 A1 | 10/2023 | Tran et al. | |
| 2023/0368333 A1 | 11/2023 | McIntosh | |
| 2023/0412796 A1 | 12/2023 | Liu et al. | |
| 2024/0029196 A1 | 1/2024 | Barragán del Rey et al. | |
| 2024/0037713 A1 | 2/2024 | O'Neil et al. | |
| 2024/0244256 A1 | 7/2024 | Jung et al. | |
| 2024/0249381 A1 | 7/2024 | Schroers et al. | |

OTHER PUBLICATIONS

IEEE "IEEE Standard for Floating-Point Arithmetric", Microprocessor Standards Committee of the IEEE Computer Society, IEEE Std 754-2008, dated Jun. 12, 2008, 70 pages.

Marroquim et al., "Efficient Point-Based Rendering Using Image Reconstruction," Eurographics Symposium on Point-Based Graphics, 2007, 8 pages.

Ritschel et al., "Imperfect Shadow Maps for Efficient Computation of Indirect Illumination," ACM Transactions on Graphics, 2008, 8 pages.

U.S. Appl. No. 17/351,303, "Pixel Blending for Neural Network-Based Image Generation" filed Jun. 18, 2021.

Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.

Lee et al., "Beyond the Natural Motion: Exploring Discontinuity for Video Frame Interpolation," Feb. 15, 2022, 10 pages.

U.S. Appl. No. 17/949,099, filed Sep. 20, 2022.

U.S. Appl. No. 17/949,124, filed Sep. 20, 2022.

U.S. Appl. No. 17/949,156, filed Sep. 20, 2022.

U.S. Appl. No. 17/949,125, filed Sep. 20, 2022.

U.S. Appl. No. 17/949,153, filed Sep. 20, 2022.

U.S. Appl. No. 17/949,115, filed Sep. 20, 2022.

U.S. Appl. No. 17/949,166, filed Sep. 20, 2022.

U.S. Appl. No. 17/949,135, filed Sep. 20, 2022.

U.S. Appl. No. 17/948,138, filed Sep. 19, 2022.

U.S. Appl. No. 17/948,141, filed Sep. 19, 2022.

U.S. Appl. No. 18/106,963, filed Feb. 7, 2023.

U.S. Appl. No. 18/106,964, filed Feb. 7, 2023.

U.S. Appl. No. 18/106,966, filed Feb. 7, 2023.

U.S. Appl. No. 18/106,971, filed Feb. 7, 2023.

U.S. Appl. No. 18/106,974, filed Feb. 7, 2023.

Tran et al., "Video Frame Interpolation via Down-up Scale Generative Adversarial Networks," Computer Vision and Image Understanding, 2022, 8 pages.

Liu et al., "End-toEnd Learning Interpolation for Object Tracking in Low Frame-Rate Video," IET Image Processing, 2020, 7 pages.

Hu et al., "Capturing Small, Fast-Moving Objects: Frame Interpolation via Recurrent Motion Enhancement," IEEE Transactions on Circuits and Systems for Video Technology, 2021, 17 pages.

Chen et al., "PDWN: Pyramid Deformable Warping Network for Video Interpolation," IEEE Open Journal of Signal Processing, 2021, 12 pages.

Wu et al., "EaD: a Collision-free and High Performance Deduplication Scheme for FLash Storage Systems", 2020 IEEE 38th International Conference on Computer Deisgn (ICCD) Hartford, CT, USA 2020, 8 pages.

Zuo et al., "Improving the Performance and Endurance of Encrypted Non-Volatile Main Memory Through Deduplicating Writes", 2018 Annual IEEE/ACM International Symposium on Microarchitecture (MICRO) FUKOKA, 13 pages.

(56) References Cited

OTHER PUBLICATIONS

Zhang Y., et al., "On Protocol-Independent Data Redundancy Elimination", in IEEE Communications Surveys and Tutorials, vol. 16, No. 1, 18 pages.
U.S. Appl. No. 17/949,104, filed Sep. 20, 2022.

* cited by examiner

DETECTING DUPLICATION IN VIDEO FRAME BLENDING

CROSS-REFERENCE TO RELATED APPLICATIONS

This application incorporates by reference for all purposes the full disclosure of co-pending U.S. patent application Ser. No. 17/949,104, filed concurrently herewith, entitled "VIDEO FRAME CONSENSUS BLENDING", U.S. patent application Ser. No. 17/949,099, filed concurrently herewith, entitled "VIDEO FRAME MOTION ESTIMATION", U.S. patent application Ser. No. 17/949,124, filed concurrently herewith, entitled "EDGE-ENHANCED VIDEO FRAME BLENDING", U.S. patent application Ser. No. 17/949,156, filed concurrently herewith, entitled "ADAPTIVE VIDEO FRAME BLENDING", U.S. patent application Ser. No. 17/949,125, filed concurrently herewith, entitled "TECHNIQUES TO BLEND VIDEO FRAMES", U.S. patent application Ser. No. 17/949,153, filed concurrently herewith, entitled "VIDEO FRAME BLENDING", U.S. patent application Ser. No. 17/949,115, filed concurrently herewith, entitled "PARALLEL WRITING OF DEPTH AND PIXEL INFORMATION", U.S. patent application Ser. No. 17/949,166, filed concurrently herewith, entitled "GENERATING MOTION INFORMATION OF VIDEO FRAMES", and U.S. patent application Ser. No. 17/949,135, filed concurrently herewith, entitled "NON-LINEAR MOTION BLENDING IN VIDEO FRAMES".

FIELD

At least one embodiment pertains to processing resources used to execute one or more neural networks. For example, at least one embodiment pertains to processing resources used to interpolate video frames using one or more neural networks.

BACKGROUND

Achieving high quality video can use significant memory, time, or resources. The amount of memory, time, or resources (e.g., computing resources) can be improved. For example, high resolution video contains a large amount of information, the processing and storage of such can utilize significant computing, bandwidth, memory and other resources. Additionally, the content of the video can be complex, with multiple subjects of the video doing different things that can cause pixels of the video to change in ways that are not straight forward. In some contexts, enhancement or other processing of video should be done quickly in order for the processing of the video to be useful for a particular purpose, but the complexities of the video, combined with the amount of information contained in the video and limitations of computing resources make effective processing of the video difficult.

DETAILED DESCRIPTION

Figure 1:
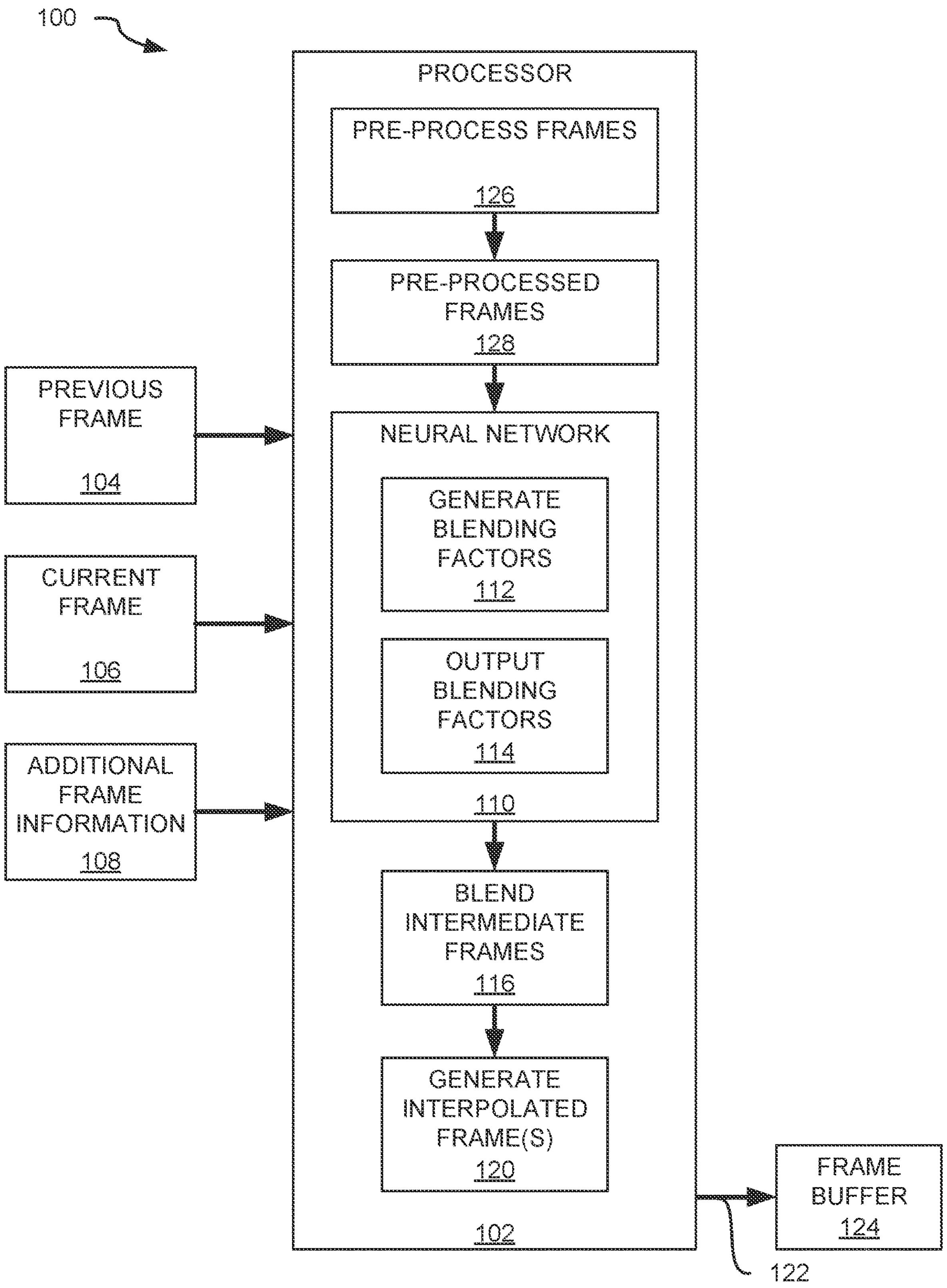
FIG. 1 illustrates an example diagram where blending factors for frame motion are generated using a neural network.

Techniques described and suggested herein relate to use of one or more neural networks to perform video processing operations including operations to increase a frame rate of a video. In at least one embodiment, a system (such as a processor performing a game engine) generates video frames corresponding to respective times in a video and framerate of the video is increased by the processor by using one or more neural networks to generate one or more video frames at times between the times of the frames generated by the video, such as by generating a frame between each pair of frames generated by said game engine. An example process to use one or more neural networks to generate frames is described below such as in connection with FIG. 3. Techniques described and suggested in connection with FIGS. 1-13 can be performed using one or more techniques described in Appendix A, which is filed herewith, which is part of the written disclosure, and which is incorporated by reference.

In at least one embodiment, a game engine (such as noted above and elsewhere herein) or other provider of video generates or otherwise provides video frames which include two successive frames (referred to respectively as a previous frame and a current frame, even though the words "previous" and "current" refer to frames between which one or more frames are to be generated where the words may not be accurate adjectives in some contexts). In at least one embodiment, said processor or another processor (such as processor 102 described below in FIG. 1) performs spatial upsampling (e.g., using a neural network technique such as described below or without a neural network) of previous frame and current frame to increase resolution of the previous and current frame (e.g., from 1080p to 4K or from 4K to 8K or otherwise) although, in some embodiments, upsampling is not applied. Upsampling can be referred to also as super sampling and upsampled frames can be referred to as super sampled frames.

In at least one embodiment, said processor or another processor generates, from upsampled current frame and from upsampled previous frame, a first plurality of frames and a second plurality of frames that have the same resolution as said upsampled previous and current frame and upsampled previous frame (e.g., 4K or 8K). In at least one embodiment. These frames of the first plurality of frames and second plurality of frames can be referred to as motion warped color frames (or high resolution (HR) motion warped color frames or otherwise) and these frames may have pixel values in an RGB or other color space. It should be noted that, despite this name of "motion warped," one or more of these motion warped color frames may lack any motion warping, such as described in the next paragraph.

In at least one embodiment, this first plurality of frames (of motion warped color frames) comprises: a first frame which is identical to or otherwise based on current frame which lacks any motion applied to current frame (where this first frame, if displayed, would resemble previous frame as objects in a corresponding displayed image would be in identical or similar locations); a second frame generated to represent movement of one or more pixels from current frame based on one or more motion vectors output from said game engine or otherwise obtained; and a third frame generated to represent movement of one or more pixels from current frame based on one or more motion vectors obtained in a different way than said second frame, such as optical flow motion vectors generated using optical flow analysis, which may utilize optical flow circuits or other optical flow hardware of said processor or another processor. In at least one embodiment, similarly, this first plurality of frames comprises: a first frame which is identical to or otherwise based on previous frame which lacks any motion applied to previous frame (where this first frame, if displayed, would resemble previous frame as objects in a corresponding displayed image would be in identical or similar locations); a second frame generated to represent movement of one or more pixels from previous frame based on one or more motion vectors output from said game engine or otherwise obtained; and a third frame generated to represent movement of one or more pixels from previous frame based on one or more motion vectors obtained in a different way than said second frame, such as optical flow motion vectors generated using optical flow analysis, which may utilize optical flow circuits of said processor or another processor. In at least one embodiment, said motion vectors (from game engine or optical flow analysis or otherwise) approximate motion from one of current frame or previous frame to a frame being generated (e.g., a frame between current frame and previous frame). Example pluralities of frames (referred to as intermediate frames) are further discussed below, such as in connection with FIGS. 1 and 2. In at least one embodiment, without loss of generality and for sake of convenience, use of "intermediate frames" (or variations, such as "intermediate frame) refers to any of: motion warped color frames, LR luma motion warped frames, blended intermediate frames, interpolated frames, and variations of these phrases and a particular type of frame to which use of "intermediate frames" applies will be clear from context.

In at least one embodiment, said processor or other processor downsamples the motion warped color frames and converts the downsampled motion warped frame to a YUV color space or, in at least one other embodiment, converts the motion warped color frames and converts the motion warped color frames and downsamples results of these converted motion warped color frames. In at least one embodiment, said processor or other processor performs conversion and downsampling and uses only a luma channel of the YUV color space to generate lower resolution (LR) luma motion warped frames, where an LR luma motion warped frame (e.g., an LR frame with only luma values from the YUV color space). In at least one embodiment, this or other processor performs said downsampling to match a resolution of frames output by said game engine or other video provider. In at least one embodiment, downsampled versions of current frame and previous frame utilize only a luma channel of said YUV color space. In at least one embodiment, these LR luma motion warped frames comprise a first plurality of frames comprising frames generated or otherwise obtained from current frame and a second plurality of frames comprising frames generated or otherwise obtained from previous frame, where each frame of these first and second pluralities of frames corresponds to a different type of motion warping of its respective current or previous frame (e.g., no motion warping, motion warping due to game engine or other provided motion vectors, and/or motion warping due to motion vectors of optical flow analysis, such as discussed above and otherwise herein).

In at least one embodiment, said processor or other processor inputs this plurality of LR luma motion warped frames (said first plurality of frames and second plurality of frames noted above) into a neural network (such as a neural network with a U-net architecture having a SoftMax layer, where this neural network is trained to generate blending factors) to generate a plurality of blending factors that indicate how to blend intermediate frames (e.g., said plurality of frames discussed above generated from current and previous frames). In at least one embodiment, blending factors output from said neural network (blending factors discussed in more detail below) are at a resolution equal to that of the LR luma motion warped frames and/or of output of a game engine or other video provider. In at least one embodiment, for example, blending factors have a resolution of 1080p and there is a separate blending factor for each pixel in a 1080p image, although compression or other techniques may result in a lack of a one-to-one correspondence of pixels to blending factors in some embodiments.

In at least one embodiment, said processor or other processor upsamples blending factors generated by said neural network to have a resolution that matches resolution of said motion warped color frames (which can be a same resolution as output by a spatial upsampling algorithm, such as noted below, such as 4K or 8K). In at least one embodiment, said processor or other processor performs upsampling of one or more arrays of blending factors by establishing a correspondence between pixel locations according to said upsampled resolution and blending factors, where the correspondence can apply a single blending factor to multiple pixels, such as a 4×4 or 9×9 grid of pixels, or more sophisticated upsampling techniques can be used, such as nearest neighbor interpolation, upsampling with non-maximum suppression, bilinear interpolation, interpolation using Gaussian reconstruction, upsampling with Gaussian or other filters, bicubic interpolation, and upsampling using one or more neural networks trained to upsample blending factors. In at least one embodiment, while an array of blending factors can have a same resolution as images to which blending factors are to be applied, other embodiments can have different resolutions of blending factor arrays and images to which blending factors are to be applied, such as when a correspondence between pixels and blending factors is otherwise established.

In at least one embodiment, these blending factors comprise information that, for each pixel location in a frame being generated, indicates how to combine (e.g., by a weighted sum of pixel values) pixel values at a same location in each of said motion warped color frames. In at least one embodiment, blending factors are organized into two arrays, where a first array includes blending factors that indicate how to blend corresponding pixels of motion warped color frames generated from or otherwise obtained from current frame and a second array includes blending factors includes blending factors that indicate how to blend corresponding pixels of motion warped color frames generated from or otherwise obtained from previous frame.

In at least one embodiment, first array comprises a plurality of three-dimensional or other dimensional vectors, where each component indicates a weight to be applied to a corresponding pixel value in a corresponding motion warped color frame generated or otherwise obtained from current frame. In at least one embodiment, for example, a vector of (0.25, 0.75, 0.0) corresponding to a pixel location in a frame being generated indicates a pixel value (e.g., luminance) of the pixel location is to be calculated as 0.25*p1+0.75*p2+0.0*p3, where p1 indicates a pixel value of a first motion warped color frame at a same pixel location, p2 indicates a pixel value of a second motion warped color frame at said same pixel location, and p3 indicates a pixel value of a third motion warped color frame at a said pixel location.

In at least one embodiment, second array comprises a plurality of three-dimensional or other dimensional vectors, where each component indicates a weight to be applied to a corresponding pixel value in a corresponding motion warped color frame generated or otherwise obtained from previous frame. In at least one embodiment, for example, a vector of (0.31, 0.41, 0.28) corresponding to a pixel location in a frame being generated indicates a pixel value (e.g., luminance) of the pixel location is to be calculated as 0.31*p1+0.41*p2+0.28*p3, where p1 indicates a pixel value of a first motion warped color frame at a same pixel location, p2 indicates a pixel value of a second motion warped color frame at said same pixel location, and p3 indicates a pixel value of a third motion warped color frame at a said pixel location. In at least one embodiment, pixel values of this example are RGB vectors comprising components indicating a value for red, a value for green, and a value for blue and addition is elementwise addition (e.g., where corresponding red values are added together, corresponding green values are added together, and corresponding blue values are added together. While examples show elements of each vector adding to 1.0 (e.g., due to said SoftMax layer in said neural network), elements are not necessarily normalized and may add to values different than 1 (e.g., greater or less than 1) in some embodiments.

In at least one embodiment, instead of two arrays of vectors, where each array correspond to a corresponding subset of motion warped color frames, a single array can include larger vectors, such as vectors where each component corresponds to a respective motion warped color frame and collectively, all of said motion warped color frames have a corresponding element in each vector. In at least an embodiment, for example in embodiments where six motion warped color frames are generated, an array may comprise 6-dimensional vectors and, continuing examples in preceding paragraphs, a vector may be (0.31, 0.41, 0.28, 0.25, 0.75, 0.0), where correspondences are as discussed above, or (0.155, 0.205, 0.14, 0.125, 0.375, 0.0), which has components that sum to one. In such an embodiments, operations discussed herein can be adapted accordingly. Blending factors are also discussed below, such as in connection with FIG. 1.

In at least one embodiment, said processor or other processor uses blending factors provided by said neural network to generate blended elementwise sum of motion warped color frames according to blending factors. In at least one embodiment, said processor or other processor combines pixels of a same location of corresponding motion warped color frames, such as described above. As an example, for each pixel at a pixel location, said processor or other processor uses blending factors corresponding to this pixel location to combine (e.g., add pixel values) pixel values of corresponding motion warped color frames at said pixel location, such as described above. In at least one embodiment, such as in an embodiment utilizing two arrays of vectors or utilizing a single array of vectors, such as described above, said processor or other processor generates two blended intermediate frames, one from motion warped color frames generated or otherwise obtained from current frame and another from motion warped color frames generated or otherwise obtained from previous frame. In at least one embodiment, said processor or other processor generates a single blended motion warped color frame, which may be a final output frame, which can be referred to as an interpolated frame.

In at least one embodiment, techniques of the present disclosure involve use of a neural network that classifies pixels in an image to be generated (e.g., a blended intermediate frame such as described elsewhere herein) as static or dynamic, where the terms static and dynamic refer to different motion types, such as described elsewhere herein. In at least one embodiment, such a neural network can generate inconsistent classifications, such as between an intermediate frame being generated and a source frame (e.g., current frame and/or previous frame). In at least one embodiment, each pixel of a plurality of pixels of a frame (e.g., intermediate frame and/or source frame) comprises two or more motion vectors, such as a motion vector caused by movement of an object within a video and another motion vector caused by movement of a camera associated with the video (e.g., a virtual camera used by a game engine or a physical camera that captured a video), where movement of a pixel can result from two or more types of motion vector. In at least one embodiment, said neural network generates blending factors (such as described elsewhere herein) where each blending factor corresponds to a respective pixel location such as described above and elsewhere herein. In at least one embodiment, two pixels are classified differently if corresponding blending factors do not match. In at least one embodiment, two blending factors match if they are equal, but otherwise do not match. In at least one embodiment, two blending factors match if one or more corresponding components of said blending factors (e.g., first component second component, and third component, etc.) are within a threshold of one another, such as 85% or some other number. In at least one embodiment, criteria are applied to blending factors to generate a classification of each blending factor (e.g., as corresponding to one type of motion). In at least one embodiment, two blending factors match if they satisfy one or more conditions defining a match.

In at least one embodiment, techniques described herein allow generation of said intermediate frame without one or more duplicated objects caused by such inconsistent classification. In at least one embodiment, said processor or other processor performs one or more operations to de-duplicate two or more motion types. In at least one embodiment, for each first pixel location of a plurality (e.g., all or fewer than all) of all pixel locations of an intermediate frame, a motion vector of a first type of motion (e.g., one of static or dynamic) is followed from said pixel location to a pixel location in said source frame, where following a motion vector to a pixel location comprises determining a pixel location to which said motion vector points according to said motion vector's direction and magnitude. In at least one embodiment, a motion vector is stored as an n-tuple in a grid (e.g., two-dimensional array), such as a pair, where each component of the n-tuple indicates a change from a corresponding component of said location of said intermediate frame, where a location in said grid indicates a pixel location from which said change is to apply. In at least one embodiment, for example, pixel location of said intermediate frame has coordinates (a, b), where a and b are integers, and a motion vector is stored at coordinates (a, b) in said grid to allow coordinates of said pixel location to not be stored separately. In at least one embodiment, continuing this example, a motion vector stored at coordinates (a, b) in said grid can comprise (x, y), where "x" is a value (e.g., integer, floating point value, or other value, such as described below) that indicates a change from "a" and where "y" is a value (such as noted above and elsewhere herein) that indicates a change from "b", so that said motion vector points to location (a+x, b+y) (or, alternatively, (a−x, b−y), depending on how the motion vector is represented) in said source frame. In at least one embodiment, other ways of representing motion vectors, which may or may not store coordinates of corresponding pixels, can be used, such as by storing magnitude and direction of a motion vector or otherwise.

In at least one embodiment, following said motion vector from said pixel location of said intermediate frame results in a determination of a pixel location in said source frame. In at least one embodiment, said processor or other processor follows said pixel location of said source frame back to said intermediate frame using a motion vector of another type than said first type, thereby determining a second pixel location of said intermediate frame which may be said first pixel location of said intermediate frame discussed above or which may be another pixel location in said intermediate frame that is different from said first pixel location. In at least one embodiment, said processor or other processor determines whether a classification of said first pixel location matches (e.g., is identical) to a classification of said second pixel location. In at least one embodiment, a blending mask (e.g., an array storing blending weights) or, generally blending weights, are used to determine classifications of said first pixel location and said second pixel location to be compared. In at least one embodiment, each set of blending weights of a corresponding pixel location classifies this corresponding pixel location as one of a plurality of motion types (e.g., dynamic or static).

In at least one embodiment, if classifications of said first pixel location and said second pixel location match, there is unlikely duplication of a pixel of an object at said first pixel location and blending occurs without compensating for a duplicated pixel at this first pixel location. In at least one embodiment, if classifications of said first pixel location and said second pixel location do not match, there is likely duplication of an object at said first pixel location because said first pixel location is sampling from pixels classified as undergoing different types of motion. In at least one embodiment, said processor or other processor rectifies one of said classifications, such as be reducing (e.g., to zero) a blending weight for said first pixel location for one type of motion so that only a single classification is used to generate a pixel of said first pixel location. In at least one embodiment, techniques to use motion information to detect whether at least a portion of one or more objects from a first video frame is to appear in one or more second frames multiple times and, generally, to detect whether one or more objects within one or more images is likely to be duplicated in an image interpolated using the one or more images are described below in connection with FIGS. 11-13.

In at least one embodiment, as noted above, said processor or other processor can generate two more blended intermediate frames and, in such an embodiment, said processor and other processor blends the two or more blended intermediate frames to generate an interpolated frame. In at least one embodiment, said processor or other processor does not use a neural network to perform blending of blended intermediate frames, but in some embodiments a neural network trained to blend intermediate frames can be used. In at least one embodiment, said processor or other processor performs blending by averaging corresponding pixel values from corresponding (e.g., same) pixel locations of each of the blended intermediate frames. In at least one embodiment, a result of blending blended intermediate frames is used as a final output frame (e.g., to be added to a display buffer or otherwise provided), although, in some embodiments, additional image processing may be performed before said result is used as final output.

In at least one embodiment, operations such as described above repeat with current frame becoming previous frame and a new current frame being obtained from a game engine or other video provider.

FIG. 1 illustrates an example diagram 100 where blending factors for frame motion are generated using a neural network, according to at least one embodiment. In at least one embodiment, a processor 102 executes or otherwise performs one or more instructions to use a neural network 110 to generate blending factors of frame motion, using systems and methods such as those described herein. In at least one embodiment, processor 102 uses neural network 110 to generate blending factors of frame motion that are used in frame interpolation, as described herein at least in connection with FIGS. 2 and 3. In at least one embodiment, processor 102 uses neural network 110 to generate blending factors used in frame motion to be used to perform deep-learning based frame interpolation (e.g., deep-learning frame generation (DLFG)), as described herein at least in connection with FIGS. 4 to 10. In at least one embodiment, inputs to the neural network 110 comprise one or more frames (e.g., a previous frame 104 and/or a current frame 106) and additional frame information including, but not limited to, depth information of pixels of previous frame 104 and/or current frame 106, motion information of pixels of previous frame 104 and/or current frame 106, camera location and/or orientation, and/or other such information such as that described herein at least in connection with FIGS. 1 and 2. In at least one embodiment, outputs from the neural network 110 blending factors of the one or more intermediate frames.

In at least one embodiment, processor 102 is a processor such as those described below. In at least one embodiment, for example, processor 102 is a central processing unit (CPU), a graphics processing unit (GPU), a parallel processing unit (PPU), a general purpose graphics processing unit (GPGPU), a compute cluster, and/or a combination of these and/or other such processors. In at least one embodiment, processor 102 is part of a computer system such as those described herein (e.g., such as those described herein at least in connection with FIGS. 18-21). In at least one embodiment, not illustrated in FIG. 1, one or more additional processors are used to execute or otherwise perform one or more instructions to use neural network 110 to generate blending factors used in frame motion, using systems and methods such as those described herein. In at least one embodiment, not illustrated in FIG. 1, processor 102 is one of a plurality of processors such as those described herein.

Figure 15:
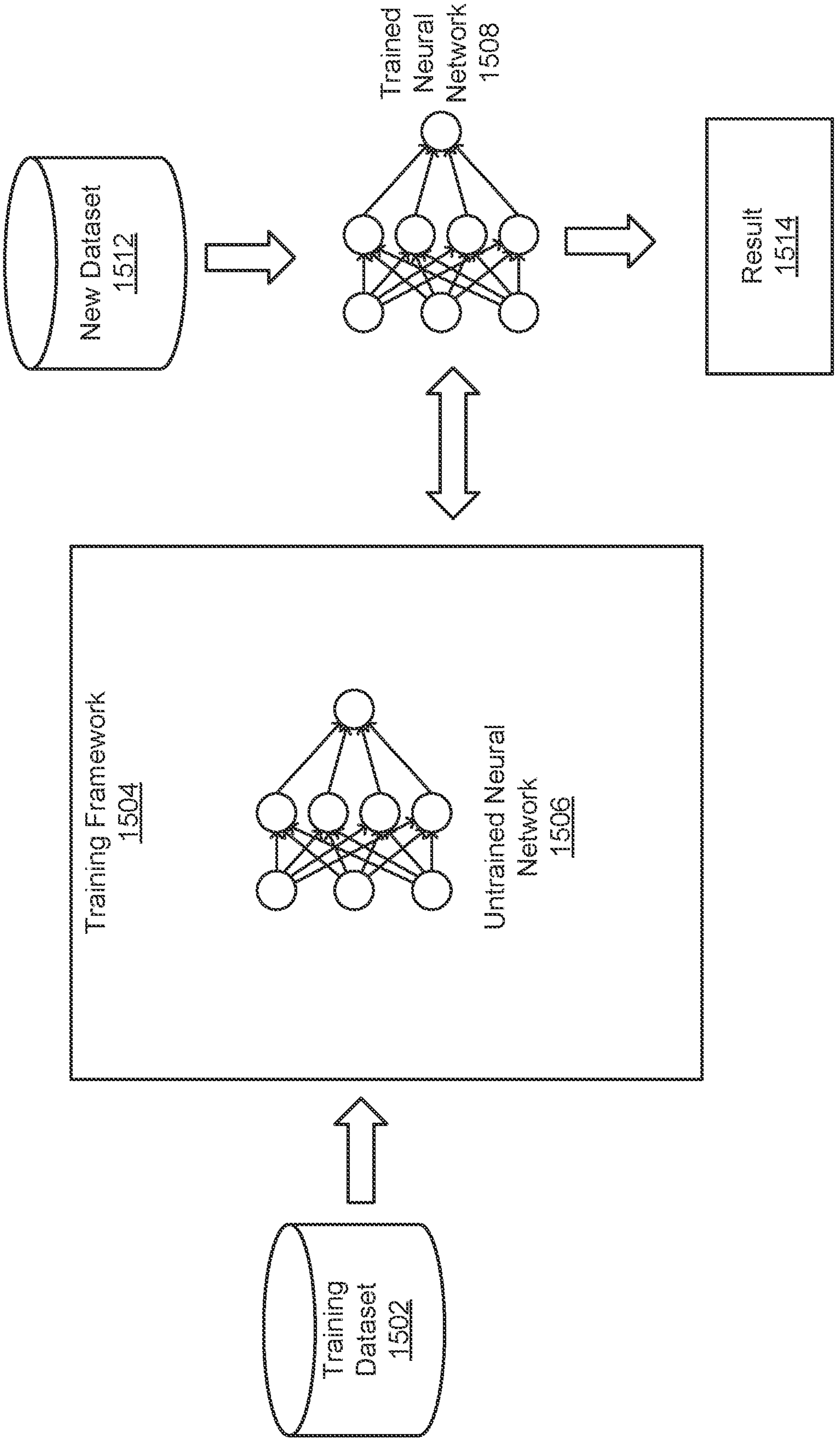
FIG. 15 illustrates training and deployment of a neural network, according to at least one embodiment.

In at least one embodiment, neural network 110 is a neural network such as those described herein at least in connection with FIG. 15. In at least one embodiment, neural network 110 is referred to as a neural model. In at least one embodiment, neural network 110 is referred to as a learning model. In at least one embodiment, neural network 110 is referred to as an inferencing model. In at least one embodiment, neural network 110 is one of a plurality of neural networks such as those described herein. In at least one embodiment, neural network is a neural network such as neural network 212, described herein at least in connection with FIG. 2.

Figure 2:
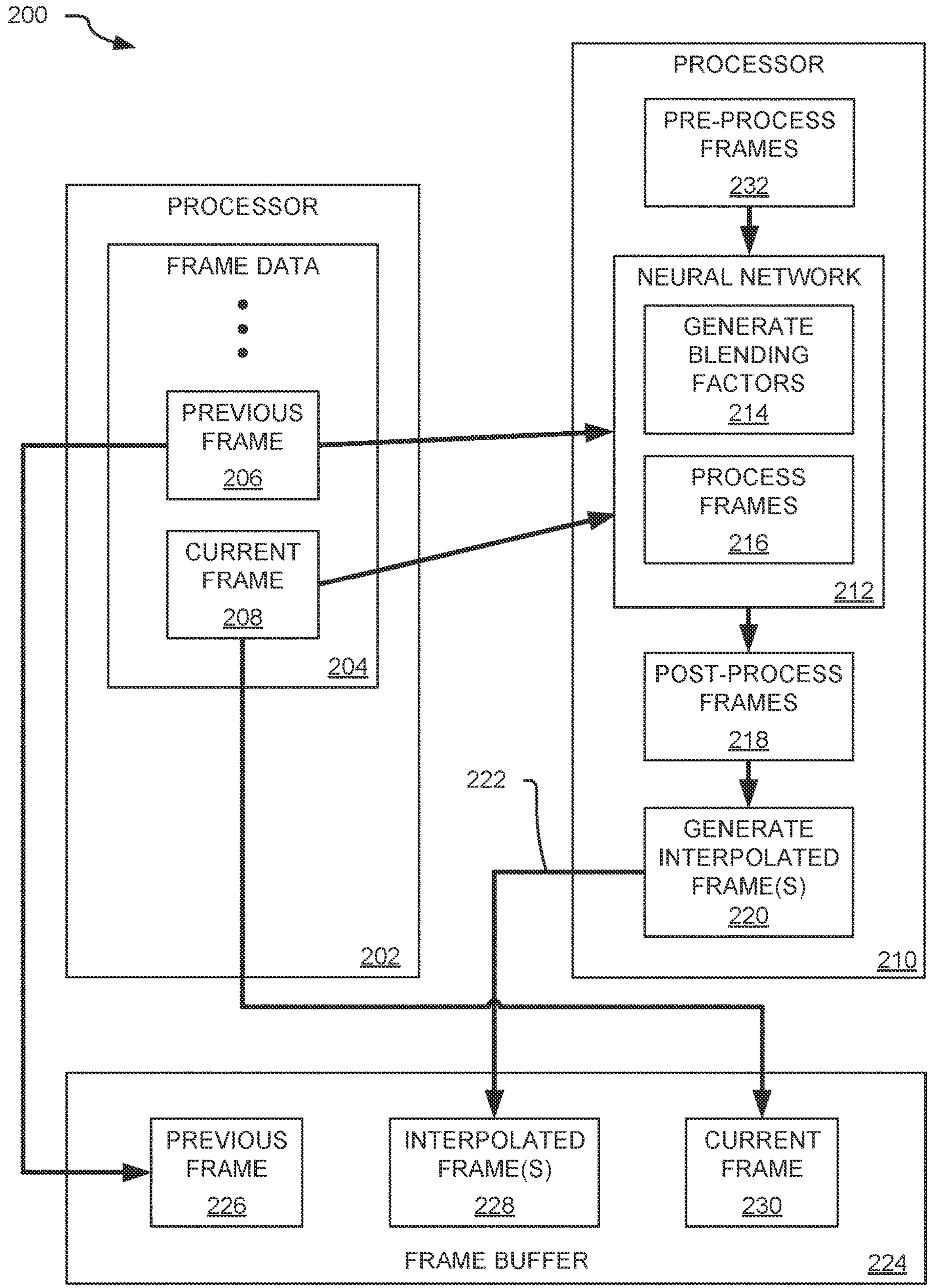
FIG. 2 illustrates an example diagram where a neural network generates interpolated video frames, according to at least one embodiment.

In at least one embodiment, not illustrated in FIG. 1, training data is used to train an untrained neural network to generate trained neural network, using systems and methods such as those described herein (e.g., as described herein at least in connection with neural network 212, described herein at least in connection with FIG. 2). In at least one embodiment, an untrained neural network is a neural network which has been partially trained, and for which additional training is to occur. In at least one embodiment, training data is a training dataset such as training dataset 1502, described herein at least in connection with FIG. 15. In at least one embodiment, an untrained neural network is an untrained neural network such as untrained neural network 1506, also as described herein at least in connection with FIG. 15. In at least one embodiment, a trained neural network is a trained neural network such as trained neural network 1508, also as described herein at least in connection with FIG. 15. In at least one embodiment, a neural network such as those described herein is trained using supervised learning, using strong supervised learning, using weak supervised learning, by generating randomly altered variations of input data.

In at least one embodiment, not illustrated in FIG. 1, a neural network such as those described herein is generated using one or more neural network parameters. In at least one embodiment, neural network parameters are parameters that are used to determine structure and performance characteristics of a neural network. In at least one embodiment, neural network parameters include weights, and/or other parameters such as learning rates of a neural network, local iterations of a neural network, aggregation weights of a neural network, a number of neurons of a neural network, etc.

In at least one embodiment, processor 102 receives a previous frame 104 (which can also be referred to as a history frame, or a historical frame, or in other ways), a current frame 106, and additional frame information 108. While the word "frame" is used, other terms can be used, such as video frame, game frame, image frame, image, picture, frame data, image data, and the like. In at least one embodiment, previous frame 104 is a previous frame of a set of frames of video and/or image data. In at least one embodiment, for example, previous frame 104 is a most recent previous frame rendered by a graphics processing unit (GPU), a multimedia device, a game console, a video capture device, a camera of an autonomous vehicle, a broadcast television device, and/or other such device. In at least one embodiment, previous frame 104 is a most recent previous frame (e.g., before a current frame) rendered using a graphics engine, a game engine, a multimedia engine, and/or other such rendering engine. In at least one embodiment, previous frame 104 is a most recent previous frame is simulated by a neural network and/or some other such artificial intelligence and/or deep-learning based system. In at least one embodiment, previous frame 104 is not a most recent previous frame, but is an older frame. In at least one embodiment, not illustrated in FIG. 1, previous frame 104 includes a plurality of previous frames. In at least one embodiment, previous frame 104 has been displayed or rendered to a display device such as those described herein (e.g., to a screen or monitor of a computing device). In at least one embodiment, previous frame 104 has not been displayed or rendered to a display device such as those described herein. In at least one embodiment, not illustrated in FIG. 1, previous frame 104 includes a combination of one or more types of data including, but not limited to, visual data (e.g., pixels), non-visual data (e.g., sound), physics data (e.g., motions and/or forces of objects of current frame 106), haptics data (e.g., force feedback from objects of previous frame 104), and/or other such data. In at least one embodiment, not illustrated in FIG. 1, previous frame 104 is generated by one or more neural networks that are different from neural network 110.

In at least one embodiment, current frame 106 is a current frame of a set of frames of video and/or image data. In at least one embodiment, for example, current frame 106 is a most recent current frame rendered by a graphics processing unit (GPU), a multimedia device, a game console, a video capture device, a camera of an autonomous vehicle, a broadcast television device, and/or other such device. In at least one embodiment, previous frame 104 and current frame 106 are successively rendered frames by a system (e.g., game engine), such as described below. In at least one embodiment, current frame 106 is a most recent current frame rendered using a graphics engine, a game engine, a multimedia engine, and/or other such rendering engine. In at least one embodiment, current frame 106 is a most recent current frame is generated or simulated by a neural network and/or some other such artificial intelligence and/or deep-learning based system. In at least one embodiment, current frame 106 is not a most recent current frame, but is an older frame. In at least one embodiment, not illustrated in FIG. 1, current frame 106 includes a plurality of current frames. In at least one embodiment, current frame 106 has been displayed or rendered to a display device such as those described herein (e.g., to a screen or monitor of a computing device). In at least one embodiment, current frame 106 has not been displayed or rendered to a display device such as those described herein. In at least one embodiment, not illustrated in FIG. 1, current frame 106 includes a combination of one or more types of data including, but not limited to, visual data (e.g., pixels), non-visual data (e.g., sound), physics data (e.g., motions and/or forces of objects of physical frame 106), haptics data (e.g., force feedback from objects of current frame 106), and/or other such data. In at least one embodiment, not illustrated in FIG. 1, current frame 106 is generated by one or more neural networks that are different from neural network 110.

In at least one embodiment, previous frame 104 is from a time (e.g., in a video stream) that is before current frame 106 (e.g., from an earlier time). In at least one embodiment, previous frame 104 is from a time (e.g., in a video stream) that is after current frame 106 (e.g., from an later time). In at least one embodiment, previous frame 104 is from a time (e.g., in a video stream) that is identical to current frame 106. In at least one embodiment, previous frame 104 and current frame come from a single shared device such as those described herein. In at least one embodiment, previous frame 104 is from a first device such as those described herein and current frame 106 is from a second device such as those described herein. In at least one embodiment, previous frame 104 and current frame 106 include identical types of content (e.g., are both from a game engine). In at least one embodiment, previous frame 104 and current frame 106 include one or more different types of content (e.g., previous frame 104 is from a game engine and current frame 106 is from an autonomous vehicle). As used herein, previous frame 104 is also referred to a first frame and current frame 106 is also referred to as a second frame.

In at least one embodiment, additional frame information 108 is additional data associated with previous frame 104 and/or current frame 106. In at least one embodiment, additional frame information 108 includes color data (e.g., color of objects and/or pixels of a frame), depth data (e.g., depth of objects and/or pixels of a frame), motion data (e.g., motion of objects and/or pixels of a frame), shadow motion data (e.g., motion of shadows of objects and/or pixels of a frame), camera data (e.g., position and/or orientation of one or more cameras used to generate a frame), normal data (e.g., location and/or orientation of surface normals of objects and/or pixels of a frame), lighting data (e.g., position, orientation, and/or color of one or more lighting sources of a frame), reflection data (e.g., lighting reflections from a surface of an object of a frame), caustic data (e.g., lighting reflections from a diffuse surface of an object of a frame), albedo data (e.g., underlying color of objects and/or pixels of a frame), and/or other such information. In at least one embodiment, one or more elements of additional frame information 108 are included as part of previous frame 104 and/or previous frame 106.

In at least one embodiment, processor 102 receives previous frame 104, current frame 106, and/or additional frame information 108. In at least one embodiment, previous frame 104 and/or current frame 106 are generated by spatial upsampling (e.g. by spatial super sampling such as, for example, DLSS, XeSS (or X$^e$SS) from Intel®, FidelityFX™ Super Resolution from AMD®, etc.). In at least one embodiment, not illustrated in FIG. 1, processor stores previous frame 104 and/or some or all of additional frame information 108 from one or more previous iterations of systems and methods such as those described herein to use a neural network such as neural network 110 to generate blending factors of frame motion that are used in frame interpolation, as described herein at least in connection with FIGS. 2 and 3. In at least one embodiment, not illustrated in FIG. 1, processor stores previous frame 104 and/or some or all of additional frame information 108 from one or more previous iterations of systems and methods such as those described herein to use a neural network such as neural network 110 to generate blending factors of frame motion that are used in DLFG, as described herein at least in connection with FIGS. 4 to 10. In at least one embodiment, previous frame 104 and/or current frame 106 are received from a deep-learning super sampling neural network such as those described herein at least in connection with FIG. 56 to FIG. 60. In at least one embodiment, spatial upsampling occurs before DLFG (e.g., DLFG uses upsampled frames). In at least one embodiment, spatial upsampling occurs after DLFG (e.g., upsampling uses interpolated frames from DLFG). In at least one embodiment, spatial upsampling and DLFG occur partially and/or fully concurrently. In at least one embodiment, a determination of whether spatial upsampling occurs before DLFG or whether spatial upsampling occurs after DLFG is based, at least in part, on content of previous frame 104 and/or current frame 106.

In at least one embodiment, processor 102 pre-processes frames 126 to generate one or more pre-processed frames (e.g., performs conversion and downsampling and uses only a luma channel of the YUV color space to generate lower resolution (LR) luma motion warped frames) as described above. In at least one embodiment, pre-processed frames 128 (e.g., converted and downsampled frames) are provided as input to neural network 110, and neural network uses pre-processed frames to generate blending factors 112 and output blending factors 114, as described herein. In at least one embodiment, neural network 110 uses pre-processed frames 128 to generate one or more blending factors 112, using techniques, systems, and methods such as those described herein.

In at least one embodiment, neural network 110 outputs blending factors 114 based at least in part on one or more blending models, as described herein. In at least one embodiment, neural network 110 outputs blending factors 114 based on a blending model. In at least one embodiment, neural network 110 outputs one or more blending factors 114 for each corresponding pixel of previous frame 104 and/or current frame 106. In at least one embodiment, neural network 110 outputs one or more blending factors 114 for each corresponding pixel of one or more pre-processed frames 128 (e.g., input frames to neural network 110). In at least one embodiment, for example, neural network 110 outputs six blending factors 114 for each corresponding pixel of pre-processed frames 128. In at least one embodiment, for example, neural network 110 outputs two sets of three blending factors 114 for each corresponding pixel of pre-processed frames 128, as described herein.

In at least one embodiment, neural network 110 generates one or more blending factors 112 and outputs blending factors 114 based, at least in part, on previous frame 104 and current frame 106 using systems and methods such as those described herein. In at least one embodiment, for example, if previous frame 104 is at a 10.0 second mark and current frame 106 is at a 10.1 second mark, neural network 110 generates one or more blending factors 112 and outputs blending factors 114 that are used to generate one or more intermediate frames at a 10.05 second mark (e.g., halfway between previous frame 104 and current frame 106). In at least one embodiment, and as described herein, neural network 110 generates one or more blending factors 112 and outputs blending factors 114 that are used to generate one or more intermediate frames at a plurality of times between previous frame 104 and current frame 106 (e.g., at 10.01 seconds, at 10.02 seconds, etc.). In at least one embodiment, neural network 110 causes one or more intermediate frames to be generated and/or generates one or more blending factors 112 by projecting elements of current frame 106 to one or more intermediate frames (e.g., motion, depth, color, and or other elements such as those described herein), by projecting elements of previous frame 104 to one or more intermediate frames (e.g., motion, depth, color, and or other elements such as those described herein), and blending said elements using systems and methods such as those described herein.

In at least one embodiment, neural network 110 generates one or more blending factors 112 based, at least in part, on one or more motion types such as those described herein (e.g., due to motion vectors, due to optical flow, due to camera motion, static motion, etc.). In at least one embodiment, neural network 110 generates one or more blending factors 112 based, at least in part, on motion information of pixels and/or objects of previous frame 104 and/or current frame 106. In at least one embodiment, for example, neural network 110 generates one or more blending factors 112 based, at least in part, on a set of motion vectors corresponding to pixels of previous frame 104, current frame 106, and/or a combination of previous frame 104 and current frame 106. In at least one embodiment, neural network 110 generates one or more blending factors 112 using systems and methods such as those described herein at least in connection with FIGS. 2 and 3. In at least one embodiment, neural network 110 generates one or more blending factors 112 using systems and methods such as those described herein at least in connection with FIGS. 4 to 14. In at least one embodiment, not illustrated in FIG. 1, a neural network to generate one or more blending factors 112 may be different than neural network 110 so that, for example, neural network 110 receives one or more blending factors that are generated by one or more other neural networks, not illustrated in FIG. 1.

In at least one embodiment, not illustrated in FIG. 1, additional frame information 108 includes confidence information of data in previous frame 104, current frame 106, and/or additional frame information 108. In at least one embodiment, for example, additional frame information 108 includes one or more confidence metrics of motion of objects in current frame 106 so that, for example, motion vectors received for current frame 106 are considered perfectly reliable (e.g., with a highest confidence), are considered very reliable (e.g., with a high confidence), are considered less reliable (e.g., with a lower confidence), or are considered unusable (e.g., with no confidence).

In at least one embodiment, not illustrated in FIG. 1, neural network 110 causes confidence information to be generated when neural network 110 generates one or more blending factors 112. In at least one embodiment, confidence information generated by neural network 110 is based, at least in part, on confidence information included in additional frame information 108, as described herein. In at least one embodiment, neural network 110 alters confidence information included in additional frame information 108 based, at least in part, on generating one or more blending factors 112. In at least one embodiment, neural network 110 causes confidence information to be generated using systems and methods such as those described herein at least in connection with FIGS. 2 and 3. In at least one embodiment, neural network 110 causes confidence information to be generated using systems and methods such as those described herein.

In at least one embodiment, not illustrated in FIG. 1, neural network 110 causes one or more additional frames to be generated using systems and methods such as those described herein. In at least one embodiment, one or more additional frames are generated based, at least in part, on additional frame information 108 such as that as described herein. In at least one embodiment, for example, one or more additional frames include color data, depth data, motion data, shadow motion data, normal data, lighting data, reflection data, caustic data, albedo data, and/or other such data. In at least one embodiment, one or more additional frames are used in addition to additional frame information 108. In at least one embodiment, one or more additional frames are used in replacement of additional frame information 108. In at least one embodiment, one or more additional frames can enhance additional frame information 108 (e.g., by providing filters, blending factors, scalars, and/or additional frame information).

In at least one embodiment, neural network 110 generates one or more additional frames to enhance one or more intermediate frames. In at least one embodiment, one or more additional frames to enhance one or more intermediate frames are residual frames. In at least one embodiment, for example, an additional frame include one or more pixels that enhance a result of blending (e.g., either motion blending, visual blending, or a combination of these and/or other blending types such as those described herein). In such an example, pixels of an additional frame can be white (e.g., to brighten a visual blending result), can be black (e.g., to darken a visual blending result), can be grey (e.g., to normalize a blending result), can include filters (e.g., an edge enhancement filter and/or other such filter), or can include other such information. In such an example, pixels of an additional frame also include scalar values to enhance, de-enhance, normalize, and/or filter one or more motion results, as described herein. In at least one embodiment, one or more additional frames include frame data to replace some or all data of one or more intermediate frames. In at least one embodiment, for example, some or all of one or more intermediate frames includes corrupted data and, in such an example, one of one or more additional frames can include full and/or partial replacement data generated by neural network 110 as a result of detecting such corrupted data. In at least one embodiment, not illustrated in FIG. 1, a neural network to cause one or more additional frames is different than neural network 110 so that, for example, neural network 110 receives one or more additional frames that are generated by one or more other neural networks.

In at least one embodiment, neural network 110 causes one or more blending factors 112 to be determined are used to blend frames, using systems and methods such as those described herein. In at least one embodiment, blending factors are used to generate two or more intermediate frames (e.g., one frame from previous frame 104 and one frame from current frame 106). In at least one embodiment, processor blends intermediate frames 116, as described above. In at least one embodiment, neural network 110 uses blending factors to blend intermediate frames 116. In at least one embodiment, processor 102 uses blending factors to blend intermediate frames 116, using techniques, systems, and methods such as those described herein.

In at least one embodiment, an intermediate frame comprises data that, for each pixel in a frame (e.g., said current frame or said previous frame) indicates motion from that frame to a to-be-generated interpolated frame, where the motion is determined according in a way corresponding to said intermediate frame and where each of multiple intermediate frames has this information for each pixel according to a different way of determining the motion. In at least one embodiment, an intermediate frame lacks sufficient information to be rendered as an image, although in some embodiments, intermediate frames can be images. In at last one embodiment, an intermediate frame comprises information to indicate, for each pixel of said intermediate frame, motion from a previous frame to a location in time halfway between said previous frame and a current frame. In at least one embodiment, different ways of determining motion comprise: using motion vectors from a game engine or other source (which may indicate motion of some pixels, but not of other pixels); using motion calculated using standard geometrical techniques based on a change in camera position from a previous frame to a current frame, which may also use depth of pixels which can be provided from said game engine or other source; motion calculated based on an optical flow analysis, and/or motion calculated in other ways. In at least one embodiment, a blending factor indicates a weighted sum of motions of a pixel, where motions to be summed from each of multiple types of motion from multiple respective intermediate frames.

In at least one embodiment, intermediate frames comprise a first set of one or more frames generated based on motion from a previous frame to a current frame (forward motion) and a second set of one or more frames generated based on motion from a current frame to a previous frame (backward motion). In at least one embodiment, a temporal distance between an interpolated frame and a previous frame or a current frame is used to calculate motion for each intermediate frame. In at least one embodiment and as an example, if there is to be one interpolated frame between a previous frame and a current frame, motion of an intermediate frame is to be half of motion calculated between said current frame and said previous frame (whether forward or backward, depending on the intermediate frame being generated). In at least one embodiment and as an example, if there are to be two interpolated frames between a previous frame and a current frame, a first interpolated frame of a type of motion can be generated based on one third a temporal distance from said previous frame to said current frame and another interpolated frame can be generated based on two thirds a temporal distance from said previous frame to said current frame. Generally, if there are to be N (a positive integer) number of interpolated frames between a previous frame and a current frame, intermediate frames can be generated for temporal locations at 1/(N+1) a temporal distance between a previous frame and a current frame, 2/(N+1) of said temporal distance, 3/(N+1) of said temporal distance, . . . , N/(N+1) of said temporal distance.

In at least one embodiment, for example, a first intermediate frame includes motion of objects from previous frame 104 to an intermediate frame (e.g., halfway along motion vectors of dynamic object that moves from previous frame 104 to current frame 106), where such motion can be from motion vectors provided from a game engine or other source. In at least one embodiment, a second intermediate frame includes motion of static objects (e.g., objects that do not move due to motion vectors but move from previous frame 104 to current frame 106 under, for example, camera motion), where such motion (which can be referred to as optical motion) can be calculated using depth and camera locations. In at least one embodiment, a third intermediate frame includes motion of static objects (e.g., objects that do not move at all such as, for example, some user interface elements). In at least one embodiment, a fourth intermediate frame includes data from one or more additional frames such as those described herein. In at least one embodiment and in such an example, neural network 110 uses one or more blending factors to blend frames by blending, for example, 25% of motion from a first intermediate frame, 25% of motion from a second intermediate frame, 25% of motion from a third intermediate frame, and 25% of motion from a fourth intermediate frame. In at least one embodiment, a blending factor of a pixel more heavily favors one type of motion, such as motion from a motion vector produced by a game engine. In at least one embodiment, different pixels have different blending factors, which can be due to the fact that movement of a pixel from frame to frame can depend on a lot of different factors, such as lateral movement of objects within a scene of a video, rotational movement of objects within a scene of a video, camera motion of a virtual camera, and the like.

In at least one embodiment and in such an example, neural network 110 can also use one or more blending factors to blend frames by blending, for example, 100% of motion from a first intermediate frame, 0% of motion from a second intermediate frame, 0% of motion from a third intermediate frame, and 0% of motion from a fourth intermediate frame. In at least one embodiment, neural network 110 uses one or more blending factors to blend frames by de-emphasizing blending from one or more intermediate frames by, for example, using one or more negative blending factors. In at least one embodiment, neural network 110 uses one or more blending factors to blend frames that include one or more additional frames.

In at least one embodiment, for example, neural network 110 uses one or more blending factors to blend frames by first generating one or more intermediate frames representing motion of objects from current frame 106 (e.g., backward in time) and then by blending one or more intermediate frames representing motion of objects from current frame 106 using one or more blending factors. In at least one embodiment, for example, a first intermediate frame includes motion of objects from current frame 106 to an intermediate frame (e.g., halfway along motion vectors of dynamic object that moves from current frame 106 to previous frame 104), a second intermediate frame includes optical motion of static objects (e.g., objects that do not move due to motion vectors but move from current frame 106 to previous frame 104 under, for example, camera motion), a third intermediate frame that includes static objects (e.g., objects that do not move at all such as, for example, user interface elements), and a fourth additional frame such as those described herein. In at least one embodiment and in such an example, neural network 110 uses one or more blending factors to blend frames as described above in connection with motion from previous frame 104 to an intermediate frame.

In at least one embodiment, one or more blending factors to blend frames are linear combinations as described above (e.g., 25% of motion from a first intermediate frame, 25% of motion from a second intermediate frame, 25% of motion from a third intermediate frame, and 25% of motion from a fourth intermediate frame). In at least one embodiment, one or more blending factors to blend frames are non-linear combinations (e.g., 50% of a combination (or multiplication) of motion from a first intermediate frame and motion of from a second intermediate frame, plus 50% of motion from a third intermediate frame).

In at least one embodiment, not illustrated in FIG. 1, neural network causes one or more quality masks to be generated in addition to one or more blending factors. In at least one embodiment, quality masks are based, at least in part, on confidence metrics such as those described herein. In at least one embodiment, quality masks are included in a calculation of blending metrics so that, for example, a blending factor that is based on data of low confidence can be decreased and a blending factor that is based on data of high confidence can be increased.

In at least one embodiment, processor 102 causes one or more interpolated frames 120 to be generated using systems and methods such as those described herein. In at least one embodiment, processor 102 receives one or more blended frames (e.g., frames generated by blending data from one or more intermediate frames and/or one or more additional frames 114, using blending factors) from neural network 110. In at least one embodiment, processor 102 causes one or more interpolated frames 120 to be generated by blending a first blended frame generated by motion from previous frame 104 to one or more intermediate frames with a second blended frame generated by motion from a current frame 106 to one or more intermediate frames, as described herein. In at least one embodiment, not illustrated in FIG. 1, processor 102 causes one or more interpolated frames 120 to be generated by combining blended frames from neural network 110 with one or more other frames that are received from one or more other sources such as those described herein (e.g., a GPU, a multimedia device, a game console, a video capture device, a camera of an autonomous vehicle, a broadcast television device, and/or other such device, and/or from a graphics engine, a game engine, a multimedia engine, and/or other such rendering engine, and/or from a neural network, etc.).

In at least one embodiment, processor 102 uses neural network 110 to cause one or more interpolated frames 120 to be generated. In at least one embodiment, processor 102 uses one or more other neural networks, not illustrated in FIG. 1, to cause one or more interpolated frames 120 to be generated. In at least one embodiment, interpolated frames 120 are provided 122 to a frame buffer 124 such as those described herein at least in connection with FIG. 27A to 27D to be displayed using systems and methods such as those described herein.

In at least one embodiment, processor 102 comprises one or more circuits to perform operations described herein, such as one or more circuits to detect whether one or more objects within one or more images is likely to be duplicated in an image interpolated using the one or more images. In at least one embodiment, processor 102 comprises one or more circuits to perform operations described herein, such as one or more circuits to use a neural network to detect whether one or more objects within one or more images is likely to be duplicated in an image interpolated using the one or more images. In at least one embodiment, not illustrated in FIG. 1, a machine-readable medium has stored thereon a set of instructions which, if performed by one or more processors such as processor 102, are to perform operations described herein at least in connection with FIGS. 1-14, such as operations to detect whether one or more objects within one or more images is likely to be duplicated in an image interpolated using the one or more images.

In at least one embodiment, using systems and methods such as those described herein, processor 102 comprises one or more circuits to generate one or more motion candidates. In at least one embodiment, using systems and methods such as those described herein, processor 102 comprises one or more circuits to generate one or more motion candidates as intermediate frames. In at least one embodiment, using systems and methods such as those described herein, processor 102 comprises one or more circuits to generate one or more motion candidates from one or more motion types (e.g., object motion, shadow motion, camera motion, optical flow, static objects, etc.). In at least one embodiment, using systems and methods such as those described herein, processor 102 comprises one or more circuits to generate one or more motion candidates from a plurality of object motion types (e.g., object motion, shadow motion, camera motion, optical flow, static objects, etc.). In at least one embodiment, using systems and methods such as those described herein, processor 102 comprises one or more circuits to generate one or more motion candidates from a plurality of camera motion types. In at least one embodiment, using systems and methods such as those described herein, processor 102 comprises one or more circuits to generate one or more motion candidates from a plurality of optical flow types (e.g., camera motion, particle motion, lighting motion, shadow motion, dynamic surface types, changing UI elements, etc.). In at least one embodiment, using systems and methods such as those described herein, processor 102 comprises one or more circuits to generate one or more motion candidates from a plurality of static motion types (e.g., changing UI elements, moving UI elements, a change of an object from dynamic to static, a change of an object from static to dynamic, etc.). In at least one embodiment, using systems and methods such as those described herein, processor 102 comprises one or more circuits to generate one or more blending factors of motions. In at least one embodiment, using systems and methods such as those described herein, processor 102 comprises one or more circuits to generate confidence information associated with input data such as previous frame 104, current frame 106, and/or additional frame information 108. In at least one embodiment, using systems and methods such as those described herein, processor 102 comprises one or more circuits to generate confidence information (e.g., confidence metrics or quality masks) of one or more blending factors. In at least one embodiment, using systems and methods such as those described herein, processor 102 comprises one or more circuits to pre-process one or more of previous frame 104, current frame 106, and/or additional frame information 108. In at least one embodiment, using systems and methods such as those described herein, processor 102 comprises one or more circuits to post-process one or more of intermediate frames, additional frames, blending factors, blended frames, and/or interpolated frames.

FIG. 2 illustrates an example diagram 200 where a neural network generates interpolated video frames, according to at least one embodiment. In at least one embodiment, a processor 202 generates frame data 204 including, but not limited to, previous frame 206 and current frame 208. In at least one embodiment, previous frame 206 and/or current frame 208 are generated by spatial upsampling (e.g. by spatial super sampling such as, for example, DLSS, XeSS (or X$^e$SS) from Intel®, FidelityFX™ Super Resolution from AMD®, etc.). In at least one embodiment, processor 202 is a processor such as processor 102, described herein at least in connection with FIG. 1. In at least one embodiment, processor 202 is an additional processor (e.g., not illustrated in FIG. 1), as described herein at least in connection with FIG. 1. In at least one embodiment, previous frame 206 is a previous frame such as previous frame 104, as described herein at least in connection with FIG. 1. In at least one embodiment, current frame 208 is a current frame such as current frame 106, as described herein at least in connection with FIG. 1. In at least one embodiment, not illustrated in FIG. 2, processor 202 generates additional frame information that is additional frame information such as additional frame information 108, as described herein at least in connection with FIG. 1.

In at least one embodiment, a processor 210 receives previous frame 206 and/or current frame 208 and uses previous frame 206 and/or current frame 208 pre-processes frames 232 to generate one or more intermediate frames, as described above. In at least one embodiment, processor 210 uses a neural network 212 to generate one or more blending factors 214 and/or to process frames 216, using systems and methods such as those described herein. In at least one embodiment, processor 210 is a processor such as processor 102, as described herein at least in connection with FIG. 1. In at least one embodiment, processor 210 and processor 202 are separate processors. In at least one embodiment, processor 210 and processor 202 are one processor. In at least one embodiment, neural network 212 is a neural network such as neural network 110, as described herein at least in connection with FIG. 1. In at least one embodiment, neural network 212 generates one or more blending factors 214 using systems and methods such as those described herein at least in connection with FIG. 1. In at least one embodiment, not illustrated in FIG. 2, neural network 212 generates one or more additional frames using systems and methods such as those described herein at least in connection with FIG. 1.

In at least one embodiment, neural network 212 is a neural network with training and inference architecture, as described herein. In at least one embodiment, a training framework trains an untrained neural network using training data to synthesize, categorize, identify, or otherwise infer output data from input data. In at least one embodiment, input data to neural network 212 includes frame data, motion data, depth data, camera data, confidence metrics, quality masks, and other such data. In at least one embodiment, output data from neural network 212 includes intermediate frames, additional frames, residual frames (e.g., frames with additional data to, for example, emphasize or de-emphasize pixels of output frames), blending factors, confidence metrics, quality masks, and/or other such data.

In at least one embodiment, training data is input into a training framework to train an untrained neural network to synthesize or otherwise generate output data such as that described herein from input data such as that described herein. In at least one embodiment, training data is data comprising information usable to train an untrained neural network using a training framework. In at least one embodiment, training data includes supervision or other information used to facilitate training by a training framework. In at least one embodiment, supervision or other information to facilitate training includes data that identifies features of training data to improve training of an untrained neural network by a training framework.

In at least one embodiment, a task identifier is input into a training framework to facilitate training an untrained neural network to synthesize or otherwise generate output data from input data using a subset of a set of neurons of a neural network such as neural network 212. In at least one embodiment, a task identifier is a vector. In at least one embodiment, a task identifier is a set of data values usable to determine a subset of a set of neurons of an untrained neural network to be trained using a training framework. In at least one embodiment, a task identifier is a one-hot vector identifying or indicating a task and/or an identifier usable to indicate a task. In at least one embodiment, a task identifier is any data used by a training framework to determine one or more portions of an untrained neural network to be trained. In at least one embodiment, a task identifier is usable to identify or indicate one or more groups of training data.

In at least one embodiment, a training framework is data and software instructions that, when executed, update weight and other values in an untrained neural network in order to perform inferencing. In at least one embodiment, a training framework uses a generative adversarial network (GAN) to train an untrained neural network. In at least one embodiment, a training framework uses any other training architecture or techniques to facilitate training an untrained neural network. In at least one embodiment, a training framework determines loss values that are backpropagated in an untrained neural network in order to train said untrained neural network.

In at least one embodiment, an untrained neural network is data values and/or software instructions that, when executed, perform compute one or more data values usable to perform neural network operations, such as inferencing including classification, object identification, and/or other neural network operations described herein. In at least one embodiment, a training framework trains an untrained neural network to perform a function $h_\theta(\bullet)$ that takes M inputs $$X, \{x_i\}_{i=1}^{M}$$

and infers or otherwise computes N outputs Y, $$\{y_i\}_{i=1}^{N}.$$

In at least one embodiment, a training framework trains an untrained neural network to make a decision or inference about each item of input data used in training. In at least one embodiment, a decision or inference comprises inferencing such as determining a set of probabilities that an input data item has a characteristic or feature.

In at least one embodiment, an untrained neural network comprises one or more layers to facilitate training or inferencing using training data and/or input data. In at least one embodiment, an untrained neural network comprises one or more up-sampling layers to generate output data during training with greater dimensions than training data. In at least one embodiment, a training framework trains one or more layers in an untrained neural network to perform function $h_\theta(\bullet)$.

In at least one embodiment, an untrained neural network is a neural coding network comprising various untrained layers, such as convolutional layers, as described herein. In at least one embodiment, an untrained neural network comprises one or more individual neural networks to perform different operations, such as various neural network operations further described herein. In at least one embodiment, an untrained neural network is any type of neural network that is trained by a training framework to determine an output data set based on an input data set.

In at least one embodiment, neural network 212 is a trained neural network that includes data values and/or software instructions that, when executed, infer a set of output data from input data using one or more data values computed during neural network training, as described herein. In at least one embodiment, a trained neural network performs a function $h_\theta(\bullet)$, as described above, to generate output data from input data. In at least one embodiment, a trained neural network comprises one or more neural network layers to perform up-sampling to increase data size, such as dimensions, of output data in comparison to input data. In at least one embodiment, a trained neural network is a neural coding network. In at least one embodiment, a trained neural network is a neural coding network comprising convolutional layers. In at least one embodiment, a trained neural network is a convolutional neural network. In at least one embodiment, a trained neural network is any type of neural network such as those further described herein.

In at least one embodiment, input data is data comprising one or more dimensions of data. In at least one embodiment, input data includes one or more two-dimensional images comprising a width and a height (e.g., a frame such as previous frame 206 and/or current frame 208). In at least one embodiment, input data is a three-dimensional image comprising a width, a height, and a depth (e.g., a 3D frame). In at least one embodiment, input data is a four-dimensional (or higher dimensional) image comprising a width, a height, a depth, and one or more additional layers. In at least one embodiment, input data includes additional types of input data such as types described herein, used in inferencing by a trained neural network. In at least one embodiment, input data comprises pixel data values. In at least one embodiment, input data comprises pixel depth values. In at least one embodiment, input data comprises pixel motion values. In at least one embodiment, input data comprises object motion values. In at least one embodiment, pixels are locations within image data, and image data for each pixel comprises color information associated with that pixel. In at least one embodiment, input data is image data comprising one or more layers, where each layer contains at least two-dimensional image data.

In at least one embodiment, output data such as that described herein is data comprising a single dimension or at least two dimensions of data values. In at least one embodiment, output data is a one or more two-dimensional images comprising a width and a height. In at least one embodiment, output data is a three-dimensional image comprising a width, a height, and a depth. In at least one embodiment, output data is image data of width (N*Z) and height (M*Z), where Z is an integer scaling factor or numerical value that indicates a size increase or decrease as a product of an original width dimension N and original height dimension M. In at least one embodiment, an output data is generated based, at least in part, on input data by a trained neural network using techniques further described herein. In at least one embodiment, output data has greater dimensions than input data. In at least one embodiment, output data comprises one or more two-dimensional layers comprising image data.

In at least one embodiment, output data comprises a single dimension. In at least one embodiment, output data comprises a single data value. In at least one embodiment, output data comprises one or more types of information about input data. In at least one embodiment, output data includes one or more intermediate frames. In at least one embodiment, output data includes one or more blending factors. In at least one embodiment, one or more types of information about input data are data values indicating one or more features of input data. In at least one embodiment, one or more types of information about input data are data values indicating one or more classifications of input data (e.g., motion classifications). In at least one embodiment, one or more types of information about input data include image information such as classification and/or features of input data. In at least one embodiment, image information and/or other information generated as output data by a trained neural network is data having multiple dimensions as described herein. In at least one embodiment, image information and/or other information generated as output data by a trained neural network is single-dimension data.

In at least one embodiment, a trained neural network generates output data based on a subset of a set of neurons of said trained neural network. In at least one embodiment, a subset of a set of neurons of a trained neural network is calculated by said trained neural network based on features of input data, as described herein. In at least one embodiment, a trained neural network is trained by a training framework to use a subset of a set of neurons in inferring or otherwise generating output data based on one or more identifiers during training.

In at least one embodiment, neural network 212 causes one or more frames to be processed 216, using systems and methods such as those described herein. In at least one embodiment, neural network 212 causes one or more frames to be processed 216 by generating blending factors 214 of frame motion that are used in frame interpolation as described herein at least in connection with FIG. 1. In at least one embodiment, neural network 212 causes one or more frames to be processed 216 using systems and methods described herein at least in connection with FIGS. 4 to 14. In at least one embodiment, one or more intermediate frames are generated as a result of neural network 212 causing one or more frames to be processed 216, using systems and methods such as those described herein. In at least one embodiment, one or more blending factors 214 are generated as a result of neural network 212 causing one or more frames to be processed 216, using systems and methods such as those described herein.

In at least one embodiment, processor 210 executes or otherwise performs one or more instructions to post-process frames 218 (e.g., to blend additional information into frames, upsample frames, downsample frames, filter frame elements, add residual data to frames, etc.) using systems and methods such as those described herein.

In at least one embodiment, processor 210 executes or otherwise performs one or more instructions to generate one or more interpolated frames 220, as described herein. In at least one embodiment, processor 210 executes or otherwise performs one or more instructions to generate one or more interpolated frames 220 using systems and methods such as those described in connection with causing one or more interpolated frames 120 to be generated, as described herein at least in connection with FIG. 1. In at least one embodiment, processor 210 provides 222 one or more interpolated frames 228 to a frame buffer 224, which is a frame buffer such as frame buffer 124, as described herein at least in connection with FIG. 1.

In at least one embodiment, frame buffer 224 has previously rendered previous frame 226 (e.g., previous frame 206). In at least one embodiment, not illustrated in FIG. 2, previous frame 226 was previously processed using systems and methods such as those described herein so that, for example, previous frame 226 was a current frame in an earlier iteration of inferencing blending factors of frame motion that are used in frame interpolation. In at least one embodiment, frame buffer 224 does not render previous frame 226 before processor 210 provides 222 one or more interpolated frames 228 to frame buffer 224. In at least one embodiment, frame buffer receives one or more interpolated frames 228 and renders them, using systems and methods such as those described herein. In at least one embodiment, frame buffer 224 then renders current frame 230 (e.g., current frame 208) after rendering one or more interpolated frames 228. In at least one embodiment, frame buffer 224 does not render current frame 230 before a next set of one or more interpolated frames 228 (e.g., interpolated frames from a subsequent iteration of inferencing blending factors of frame motion that are used in frame interpolation 228) is received.

Figure 3:
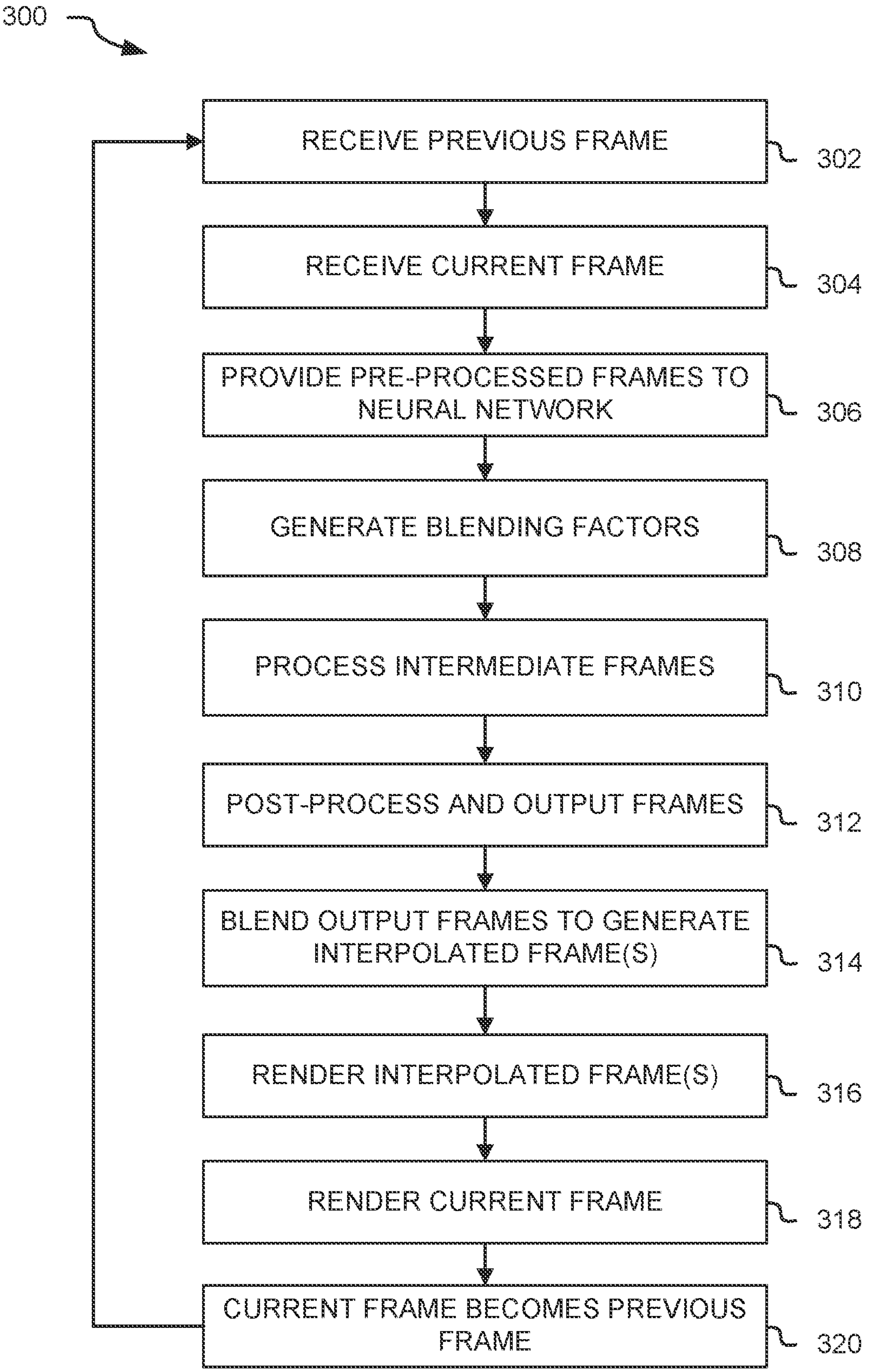
FIG. 3 illustrates an example process for generating interpolated video frames, according to at least one embodiment.

FIG. 3 illustrates an example process 300 for generating interpolated video frames, according to at least one embodiment. In at least one embodiment, a processor such as processor 202 described herein at least in connection with FIG. 2 causes one or more instructions to be executed to perform example process 300. In at least one embodiment, a processor such as processor 210 described herein at least in connection with FIG. 2 uses a neural network such as neural network 212, described herein at least in connection with FIG. 2, to cause example process 300 to be performed.

In at least one embodiment, at step 302 of example process 300, a previous frame is received. In at least one embodiment, at step 302, a previous frame received is a previous frame such as previous frame 206, described herein at least in connection with FIG. 2. In at least one embodiment, at step 302, a previous frame is received from a processor such as processor 202, as described herein at least in connection with FIG. 2. In at least one embodiment, a previous frame received is a previous frame that is generated by spatial upsampling (e.g. by spatial super sampling such as, for example, DLSS, XeSS (or $X^e$SS) from Intel®, FidelityFX™ Super Resolution from AMD®, etc.). In at least one embodiment, a previous frame that is received at step 302 is a current frame from a previous iteration of example process 300. In at least one embodiment, no previous frame is received at step 302 when, for example, it is a first iteration of example process 300. In at least one embodiment, after step 302, example process 300 continues at step 304.

In at least one embodiment, at step 304 of example process 300, a current frame is received. In at least one embodiment, at step 304, a current frame received is a current frame such as current frame 208, described herein at least in connection with FIG. 2. In at least one embodiment, a current frame received is a current frame that is generated by spatial upsampling (e.g. by spatial super sampling such as, for example, DLSS, XeSS (or $X^e$SS) from Intel®, FidelityFX™ Super Resolution from AMD®, etc.). In at least one embodiment, at step 304, a current frame is received from a processor such as processor 202, as described herein at least in connection with FIG. 2. In at least one embodiment, after step 304, example process 300 continues at step 306. In at least one embodiment, a current frame (e.g., received at step 304) and a previous frame (e.g., received at step 302) are frames generated by a game engine or other system, as described above. In at least one embodiment, a current frame and a previous frame are received in order (e.g., previous frame followed by current frame), in an opposite order (e.g., a current frame followed by a previous frame), partially concurrently (e.g., at a partially overlapping time), or fully concurrently.

In at least one embodiment, at step 306 of example process 300, pre-processed frames are provided to a neural network such as neural network 212, described herein at least in connection with FIG. 2. In at least one embodiment, at step 306, pre-processed frames provided to a neural network include pre-processed frames are generated (e.g., pre-processed) from a previous frame (e.g., received at step 302) and a current frame (e.g., received at step 304), as described herein. In at least one embodiment, at step 306, pre-processed frames provided to a neural network include frames based, at least in part, on one or more additional frames such as those described herein (e.g., one or more frames preceding said previous frame, including a frame immediately preceding said previous frame). In at least one embodiment, pre-processed frames provided to a neural network such as neural network 212 comprise a sequence of N sequential frames (where N is a positive integer) and, in at least one embodiment, said sequence of sequential frames comprises one or more interpolated frames and one or more non-interpolated frames. In at least one embodiment, not illustrated in FIG. 3, additional frame information such as that described herein (e.g., motion data, depth data, camera data, confidence metrics and/or quality masks, or other such information), is provided to a neural network at step 306. In at least one embodiment, after step 306, example process 300 continues at step 308.

In at least one embodiment, at step 308 of example process 300, one or more blending factors (or blending weights) are generated by a neural network using systems and methods such as those described herein. In at least one embodiment, at step 308, one or more intermediate frames are also generated. In at least one embodiment, at step 308, one or more intermediate frames are generated based, at least in part, on said one or more blending factors, using systems and methods such as those described herein. In at least one embodiment, at step 308, one or more blending factors are generated using a neural network such as neural network 212, described herein at least in connection with FIG. 2. In at least one embodiment, after step 308, example process 300 continues at step 310.

In at least one embodiment, at step 310 of example process 300, one or more intermediate frames (e.g., one or more intermediate frames generated at step 308) are processed by a neural network using systems and methods such as those described herein. In at least one embodiment, at step 310, one or more intermediate frames are processed using inpainting (e.g., identifying and estimating missing data), downsampling (e.g., generating a multi-resolution representation of data in the one or more intermediate frames), filtering (e.g., to enhance one or more elements of intermediate frames, or other such operations such as those described herein. In at least one embodiment, at step 310, one or more intermediate frames are processed using a neural network such as neural network 212, described herein at least in connection with FIG. 2. In at least one embodiment, after step 310, example process 300 continues at step 312.

In at least one embodiment, at step 312 of example process 300, one or more intermediate frames (e.g., one or more intermediate frames generated at step 308 and/or one or more intermediate frames processed at step 310) are post-processed using systems and methods such as those described herein. In at least one embodiment, at step 310, one or more intermediate frames are processed using inpainting (e.g., identifying and estimating missing data), downsampling (e.g., generating a multi-resolution representation of data in the one or more intermediate frames), filtering (e.g., to enhance one or more elements of intermediate frames, or other such operations such as those described. In at least one embodiment, at step 312, one or more intermediate frames are post-processed using a neural network such as neural network 212, described herein at least in connection with FIG. 2. In at least one embodiment, at step 312, one or more intermediate frames are post-processed using a processor such as processor 210, described herein at least in connection with FIG. 2. In at least one embodiment, at step 312, one or more intermediate frames are provided as frames that are blended (e.g., at step 314, as described below). In at least one embodiment, after step 312, example process 300 continues at step 314.

In at least one embodiment, at step 314 of example process 300, one or more intermediate frames are blended to generate one or more interpolated frames using systems and methods such as those described herein at least in connection with FIG. 2. In at least one embodiment, at step 314, one or more interpolated frames are generated by, for example, blending contents of one or more post-processed frames (e.g., frames post-processed at step 312). In at least one embodiment, for example, if there are two frames generated at step 312, at step 314, an interpolated frame is generated by combining pixels from a first frame generated at step 312 with pixels of a second frame generated at step 312 (e.g., pixels of an interpolated frame will be generated by blending colors and/or other information from frames generated at step 312). In at least one embodiment, not illustrated in FIG. 3, an interpolated frame is generated based, at least in part, on one or more blending weights such as those described herein. In at least one embodiment, after step 314, example process 300 continues at step 316.

In at least one embodiment, at step 316 of example process 300, one or more interpolated frames are rendered using systems and methods such as those described herein at least in connection with FIG. 2. In at least one embodiment, at step 316, one or more interpolated frames are provided to a frame buffer such as frame buffer 224, described herein at least in connection with FIG. 2. In at least one embodiment, before step 316, a previous frame (e.g., a previous frame received at step 302) is rendered before one or more interpolated frames are rendered. In at least one embodiment, a previous frame (e.g., a previous frame received at step 302) is rendered after one or more interpolated frames is generated (e.g., in step 314) and before one or more interpolated frames is rendered in step 316. In at least one embodiment, after step 316, example process 300 continues at step 318.

In at least one embodiment, at step 318 of example process 300, a current frame is rendered (e.g., a current frame received at step 304) using systems and methods such as those described herein. In at least one embodiment, at step 318, a current frame is not rendered until one or more interpolated frames are generated in a subsequent iteration of example process 300 (e.g., at step 308). In at least one embodiment, after step 318, example process 300 continues at step 320.

In at least one embodiment, at step 320 of example process 300, a current frame (e.g., a current frame received at step 304) becomes a previous frame in preparation of a subsequent iteration of example process 300. In at least one embodiment, after step 320, example process 300 continues at step 302 to receive additional frame data and perform a next iteration of example process 300. In at least one embodiment, after step 320, example process 300 terminates when, for example, there are no more frames to process.

In at least one embodiment, operations of example process 300 are performed in a different order than is illustrated in FIG. 3. In at least one embodiment, operations of example process 300 are performed simultaneously or in parallel so that, for example, step 302 and step 304 are performed simultaneously or a plurality of intermediate frames are generated simultaneously at step 312. In at least one embodiment, operations of example process 300 are performed by a plurality of threads executing on one or more processors such as those described herein using systems and methods such as those described herein.

Figure 4:
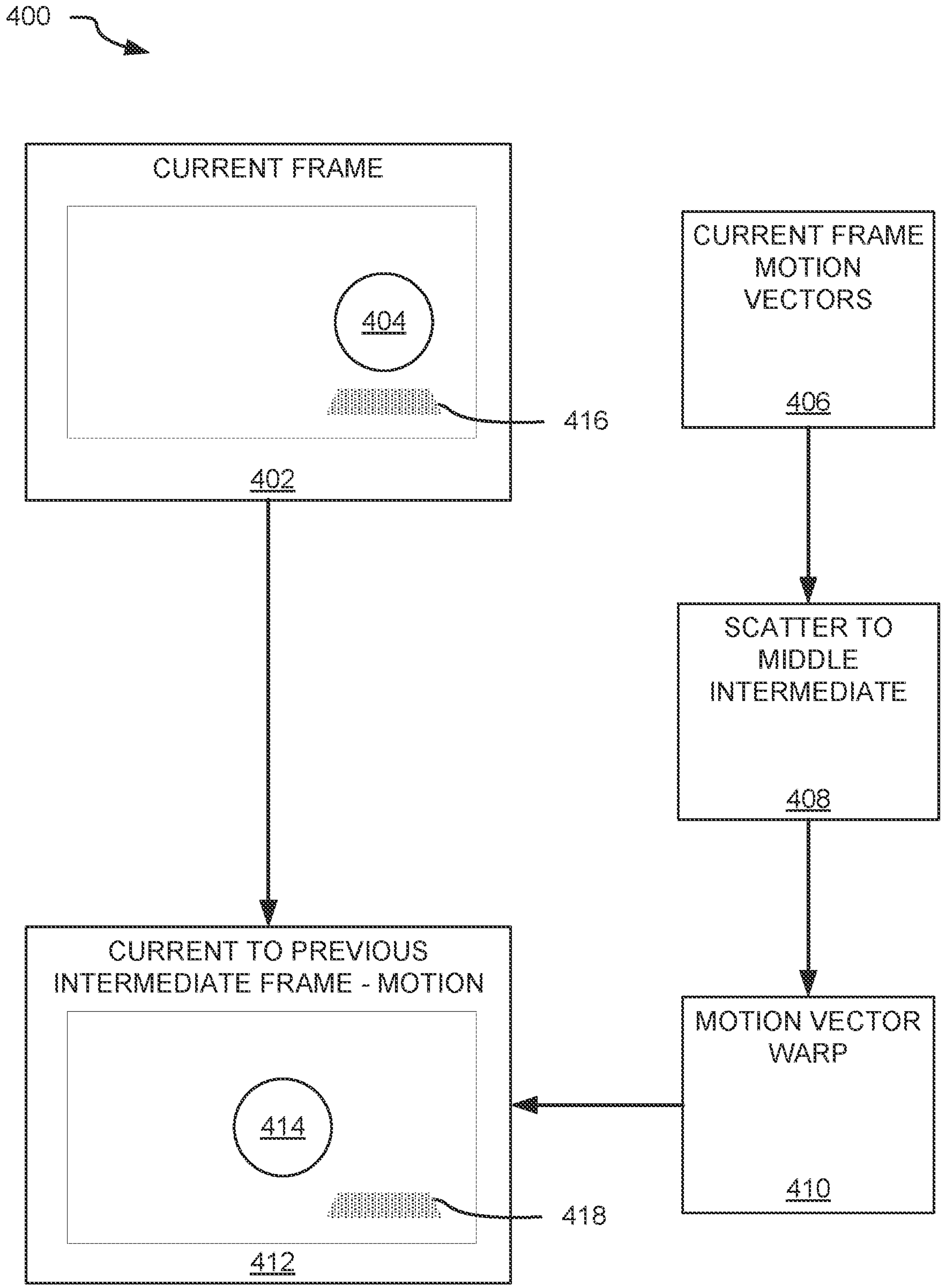
FIG. 4 illustrates an example diagram where motion vectors are used to generate an interpolated frame, according to at least one embodiment.

FIG. 4 illustrates an example diagram 400 where motion vectors are used to generate an interpolated frame, according to at least one embodiment. In at least one embodiment, a current frame 402 comprises a dynamic object 404 and a shadow 416 of dynamic object 404. In at least one embodiment, objects such as dynamic object 404 are three-dimensional (3D) objects rendered using systems and methods such as those described herein. In at least one embodiment, objects such as dynamic object 404 are two-dimensional (2D) objects rendered using systems and methods such as those described herein. In at least one embodiment, objects such as dynamic object 404 comprise pixels (e.g., a 2D representation) of a 3D object. In at least one embodiment, not illustrated in FIG. 4, objects such as dynamic object 404 are four-dimensional (or higher) objects. In at least one embodiment, objects such as dynamic object 404 are one-dimensional (1D) or lower dimensional objects. In at least one embodiment, objects such as dynamic object 404 are rendered as 3D objects (e.g., using immersive techniques such as virtual reality or augmented reality), or a higher dimensional object. In at least one embodiment, objects such as dynamic object 404 are rendered as 1D (or lower) objects. In at least one embodiment, shadow 416 of dynamic object 404 is generated by one or more light sources (not illustrated in FIG. 4) and cast onto one or more other objects of current frame 402 (e.g., background, other objects, etc.). In at least one embodiment, current frame 402 is received from a deep-learning super sampling neural network such as those described herein at least in connection with FIG. 56 to FIG. 60.

In at least one embodiment, objects such as dynamic object 404 are rendered as four-dimensional (4D) or higher objects (e.g., 3D video displayed over time). In at least one embodiment, systems, methods, and techniques such as those described herein at least in connection with FIGS. 4 to 10 are used to generate interpolated frames of 3D video (e.g., frames generated by a 3D immersive environment such as a virtual reality (VR) game or simulation and that are displayed using a VR headset or some other such display device).

In at least one embodiment, one or more current frame motion vectors 406 describe motion of objects such as dynamic object 404. In at least one embodiment, current frame motion vectors 406 describe forward motion (e.g., motion from a previous frame) of dynamic objects such as dynamic object 404, as described herein. In at least one embodiment, for example, current frame motion vectors 406 describe motion of objects such as dynamic object 404 from previous frame 502 (e.g., dynamic object 504), as described herein at least in connection with FIG. 5. In at least one embodiment, current frame motion vectors 406 describe reverse motion (e.g., motion to a previous frame) of dynamic objects such as dynamic object 404, as described herein. In at least one embodiment, current frame motion vectors 406 are provided by a game engine, or a graphics engine, or a multimedia engine, such as those described herein. In at least one embodiment, current frame motion vectors 406 are provided from some other source (e.g., generated by a neural network such as those described herein). In at least one embodiment, a location of dynamic object 404 in current frame 402 (e.g., before application of current frame motion vectors 406) is an endpoint of motion associated with dynamic object 404.

In at least one embodiment, not illustrated in FIG. 4, one or more confidence metrics or quality masks of current frame motion vectors 406 are provided using systems and methods such as those described herein. In at least one embodiment, for example, a quality mask can provide an indication that current frame motion vectors 406 are reliable, or unreliable, or have other such qualities. In at least one embodiment, one or more confidence metrics or quality masks are provided for every motion vector of current frame motion vectors 406. In at least one embodiment, one or more confidence metrics or quality masks are provided for a subset of motion vectors of current frame motion vectors 406. In at least one embodiment, one or more confidence metrics or quality masks are provided for motion associated with one or more pixels of current frame 402. In at least one embodiment, a single confidence metric or quality mask is provided for current frame motion vectors 406.

In at least one embodiment, current frame motion vectors 406 are scattered to a middle intermediate frame 408. In at least one embodiment, for example, if current frame motion vectors 406 describe motion of an object from a previous frame (e.g., from a previous frame to current frame 402), current frame motion vectors 406 point from a position of an object (e.g., dynamic object 404, described below) back to a position of dynamic object 404 in a previous frame such as those described herein. In at least one embodiment, for example, a motion with value (200.0 f, 0.0 f, 0.0 f) (e.g., a motion from left to right) is represented by a current frame motion vector with value (−200.0 f, 0.0 f, 0.0 f) (e.g., pointing back to where a dynamic object was in a previous frame). In at least one embodiment, a current frame motion vector with value (−200.0 f, 0.0 f, 0.0 f) is scattered to a middle intermediate frame 408 with a scattered motion vector with value (−100.0 f, 0.0 f, 0.0 f). In at least one embodiment, current frame motion vectors 406 are 3D motion vectors. In at least one embodiment, current frame motion vectors 406 are 2D (or other dimensional) motion vectors. In at least one embodiment, a 3D (or higher) motion vector may be converted to a 2D or 1D motion vector by setting one or more vector components to zero. In at least one embodiment, for example, a 3D motion vector of (200.0 f, 100.0 f, −200.0 f) can be converted to a 2D motion vector by setting a component to zero, yielding (200.0 f, 100.0 f, 0.0 f) or (200.0 f, 100.0 f). In at least one embodiment, for example, a 3D motion vector of (200.0 f, 100.0 f, −200.0 f) can be converted to a 1D motion vector by setting two components to zero, yielding (200.0 f, 0.0 f, 0.0 f), (200.0 f, 0.0 f), or (200.0 f).

In at least one embodiment, a scattered motion vector is used to motion vector warp 410 dynamic object 404 to a current to previous intermediate frame 412 based on motion. In at least one embodiment, a motion vector warp 410 of a dynamic object to an intermediate frame such as current to previous intermediate frame 412 based on motion, transforms dynamic object 404 to a position in current to previous intermediate frame 412 based on motion, by applying one or more motion vectors to dynamic object 404. In at least one embodiment, a motion vector warp 410 of a dynamic object to an intermediate frame such as current to previous intermediate frame 412 based on motion, transforms dynamic object 404 to a position in current to previous intermediate frame 412 based on motion, by applying a scaled motion vector. In at least one embodiment, for example, if a motion vector of current frame motion vectors 406 is a motion vector of (−200.0 f, 0.0 f, 0.0 f), a motion vector warp 410 of dynamic object 404 translates dynamic object 404 one-half of motion vector (−200.0 f, 0.0 f, 0.0 f) (e.g., vector (−100.0 f, 0.0 f, 0.0 f)) to a position represented by object 414 in current to previous intermediate frame 412 (e.g., halfway between a position in a previous frame 502 and a position in current frame 402). In at least one embodiment, a shadow 416 is not transformed by current frame motion vectors 406 as shadow 416 is not a dynamic object and, accordingly, shadow 416 is unmoved in current to previous intermediate frame 412 (e.g., is at shadow 418). In at least one embodiment, not illustrated in FIG. 4, shadow motion vectors are provided by, for example, a game engine so that shadow 416 can be treated as a dynamic object and moved with dynamic object 404. In at least one embodiment, processes illustrated by example diagram 400 continue at example diagram 500 described herein at least in connection with FIG. 5.

Figure 5:
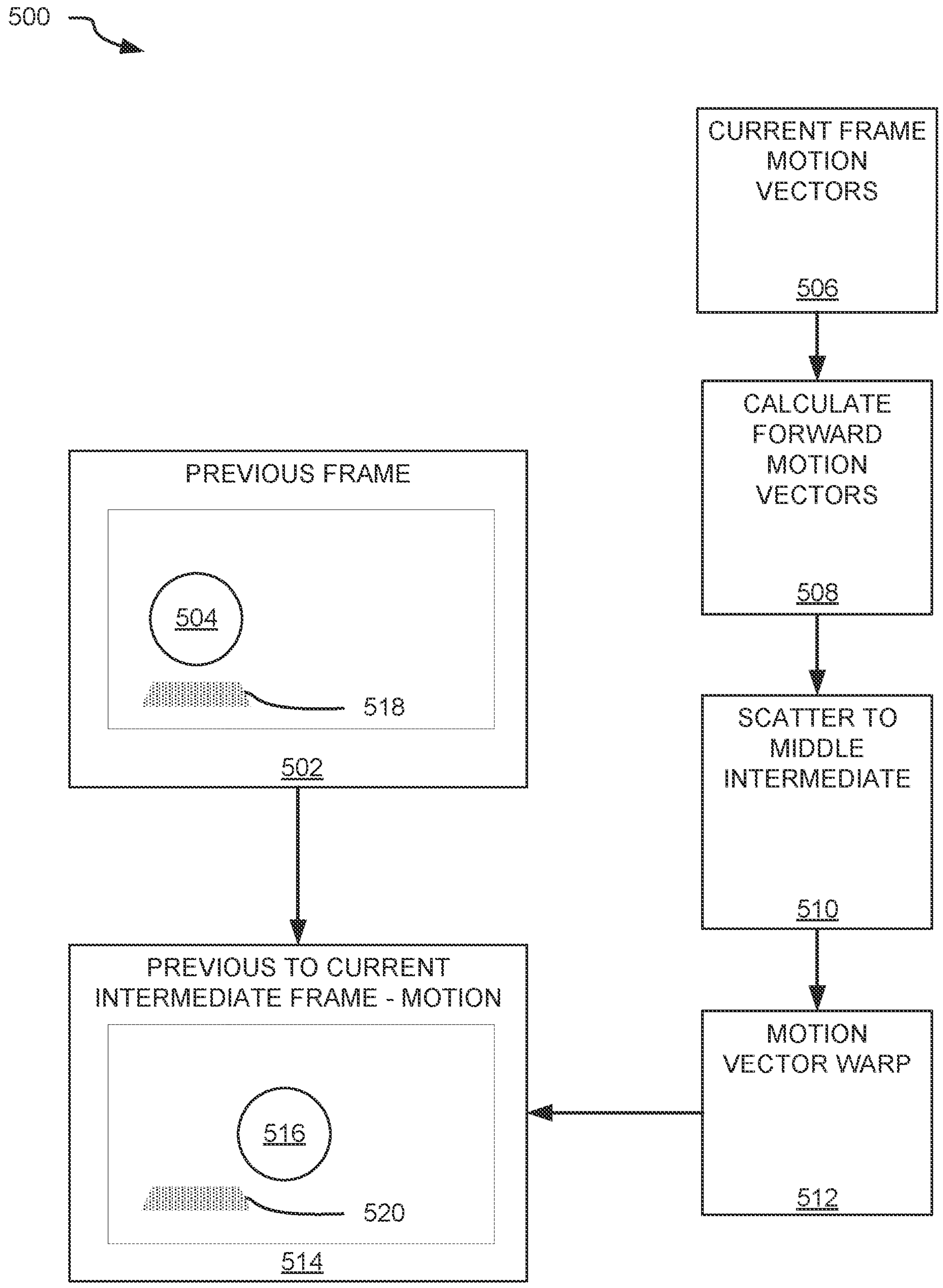
FIG. 5 illustrates an example diagram where forward motion vectors are calculated, according to at least one embodiment.

FIG. 5 illustrates an example diagram 500 where forward motion vectors are calculated, according to at least one embodiment. In at least one embodiment, a previous frame 502 comprises a dynamic object 504 and a shadow 518 of dynamic object 504. In at least one embodiment, objects such as dynamic object 504 are objects such as those described herein at least in connection with FIG. 4. In at least one embodiment, shadow 518 of dynamic object 504 is generated by one or more light sources (not illustrated in FIG. 5) and cast onto one or more other objects of current frame 502 (e.g., background, other objects, etc.), as described herein. In at least one embodiment, current frame 502 is received from a deep-learning super sampling neural network such as those described herein at least in connection with FIG. 56 to FIG. 60.

In at least one embodiment, current frame motion vectors 506 (e.g., current frame motion vectors 406, described herein at least in connection with FIG. 4) are received. In at least one embodiment, forward motion vectors 508 are calculated, using systems and methods such as those described herein. In at least one embodiment, forward motion vectors 508 are calculated based on one or more current frame motion vectors 506. In at least one embodiment, for example, a motion vector describes motion (e.g., from a current frame such as current frame 402 back to previous frame 502), as described herein. In at least one embodiment, such vectors are inverted to that, for example, a motion vector of (−200.0 f, 0.0 f, 0.0 f) can be inverted to calculate a forward motion vector 508 of (200.0 f, 0.0 f, 0.0 f) as described herein. In at least one embodiment, a forward motion vector 508 with value (200.0 f, 0.0 f, 0.0 f) is scattered to a middle intermediate frame 510 with a scattered motion vector with value (100.0 f, 0.0 f, 0.0 f). In at least one embodiment, forward motion vectors 508 are 3D motion vectors. In at least one embodiment, forward motion vectors 508 are 2D (or other dimensional) motion vectors. In at least one embodiment, a 3D (or higher) motion vector may be converted to a 2D or 1D motion vector by setting one or more vector components to zero. In at least one embodiment, for example, a motion vector of (200.0 f, 100.0 f, −200.0 f) can be converted to a 2D motion vector by setting a component to zero, yielding (200.0 f, 100.0 f, 0.0 f) or (200.0 f, 100.0 f). In at least one embodiment, for example, a 3D motion vector of (200.0 f, 100.0 f, −200.0 f) can be converted to a 1D motion vector by setting two components to zero, yielding (200.0 f, 0.0 f, 0.0 f), (200.0 f, 0.0 f), or (200.0 f).

In at least one embodiment, a scattered forward motion vector is used to motion vector warp 512 dynamic object 504 to a previous to current intermediate frame 514 based on motion. In at least one embodiment, a motion vector warp 512 of a dynamic object to an intermediate frame such as previous to current intermediate frame 514 based on motion, transforms dynamic object 504 to a position in previous to current intermediate frame 514 based on motion, by applying one or more motion vectors to dynamic object 504. In at least one embodiment, a motion vector warp 512 of a dynamic object to an intermediate frame such as previous to current intermediate frame 514 based on motion, transforms dynamic object 504 to a position in previous to current intermediate frame 514 based on motion, by applying a scaled motion vector. In at least one embodiment, for example, if a motion vector is a forward motion vector of (200.0 f, 0.0 f, 0.0 f), a motion vector warp 512 of dynamic object 504 translates dynamic object 504 one-half of forward motion vector (200.0 f, 0.0 f, 0.0 f) (e.g., vector (100.0 f, 0.0 f, 0.0 f)) to a position represented by object 516 in previous to current intermediate frame 514 (e.g., halfway between a position in previous frame 502 and a position in current frame 402). In at least one embodiment, shadow 518 is not transformed by forward motion vectors as shadow 518 is not a dynamic object and, accordingly, shadow 518 is unmoved in previous to current intermediate frame 514 (e.g., is at shadow 520). In at least one embodiment, not illustrated in FIG. 5, shadow motion vectors are provided by, for example, a game engine so that shadow 518 can be treated as a dynamic object and moved with dynamic object 504. In at least one embodiment, processes illustrated by example diagram 500 continue at example diagram 600 described herein at least in connection with FIG. 6.

Figure 6:
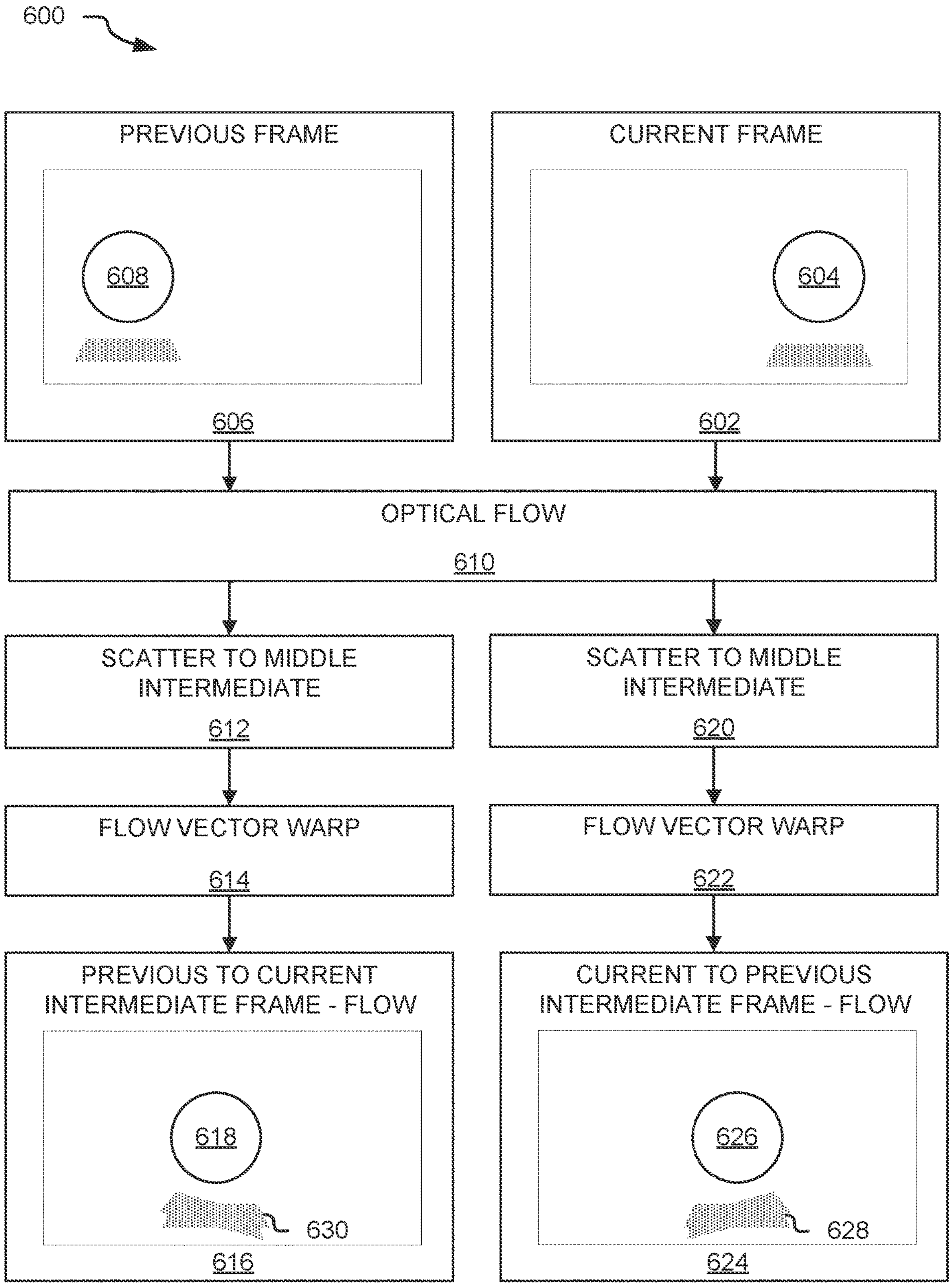
FIG. 6 illustrates an example diagram where optical flow analysis is used to generate intermediate frames, according to at least one embodiment.

FIG. 6 illustrates an example diagram 600 where optical flow analysis is used to generate intermediate frames, according to at least one embodiment. In at least one embodiment, a current frame 602 (which is a current frame such as current frame 402, described herein at least in connection with FIG. 4) and a previous frame 606 (which is a previous frame such as previous frame 502, described herein at least in connection with FIG. 5) are used as input to optical flow 610. In at least one embodiment, current frame 602 includes a dynamic object 604 (and a shadow) as described herein at least in connection with FIG. 4 and previous frame 606 includes a dynamic object 608 (and a shadow) as described herein at least in connection with FIG. 5. In at least one embodiment, optical flow 610 moves contents of previous frame 606 to previous to current intermediate frame 616 based on flow. In at least one embodiment, optical flow 610 moves contents of current frame 602 to current to previous intermediate frame 624 based on flow.

In at least one embodiment, optical flow 610 generates motion vectors representing apparent motion of objects (e.g., dynamic and static objects) in a scene based, at least in part, on relative motion between a viewpoint (e.g., a camera) and objects in a scene. In at least one embodiment, for example, if a camera is moving from left to right, static objects in a scene will appear to move from right to left while dynamic objects will have camera motion added to their dynamic motion. In at least one embodiment, optical flow such as optical flow 610 is estimated based on one or more correspondences between objects in, for example, a current frame and a previous frame. In at least one embodiment, optical flow such as optical flow 610 includes one or more confidence metrics or quality masks of optical flow motion vectors, as described herein.

In at least one embodiment, as illustrated in example diagram 600, optical flow 610 moves contents of previous frame 606 to previous to current intermediate frame 616 based on flow so that dynamic object 608 moves to a position indicated by object 618 and a shadow of dynamic object 608 moves to a position indicated by shadow objects 630. In at least one embodiment, as illustrated in FIG. 6, optical flow 610 has moved a shadow of dynamic object 608 to a plurality of positions (e.g., as indicated by a plurality of objects of shadow objects 630) due to uncertainty in optical flow 610. In at least one embodiment, one or more flow vectors such as those described herein are used to scatter to middle intermediate 612 elements of previous frame 606, and flow vector warp 614 is used to generate previous to current intermediate frame 616 based on flow, using techniques, systems, and methods such as those described herein.

In at least one embodiment, as illustrated in example diagram 600, optical flow 610 moves contents of current frame 602 to current to previous intermediate frame 624 based on flow so that dynamic object 604 moves to a position indicated by object 626 and a shadow of dynamic object 604 moves to a position indicated by shadow objects 628. In at least one embodiment, as illustrated in FIG. 6, optical flow 610 has moved a shadow of dynamic object 604 to a plurality of positions (e.g., as indicated by a plurality of objects of shadow objects 628) due to uncertainty in optical flow 610. In at least one embodiment, one or more flow vectors such as those described herein are used to scatter to middle intermediate 620 elements of current frame 602, and flow vector warp 622 is used to current to previous intermediate frame 624 based on flow, using techniques, systems, and methods such as those described herein. In at least one embodiment, processes illustrated by example diagram 600 continue at example diagram 700 described herein at least in connection with FIG. 7.

Figure 7:
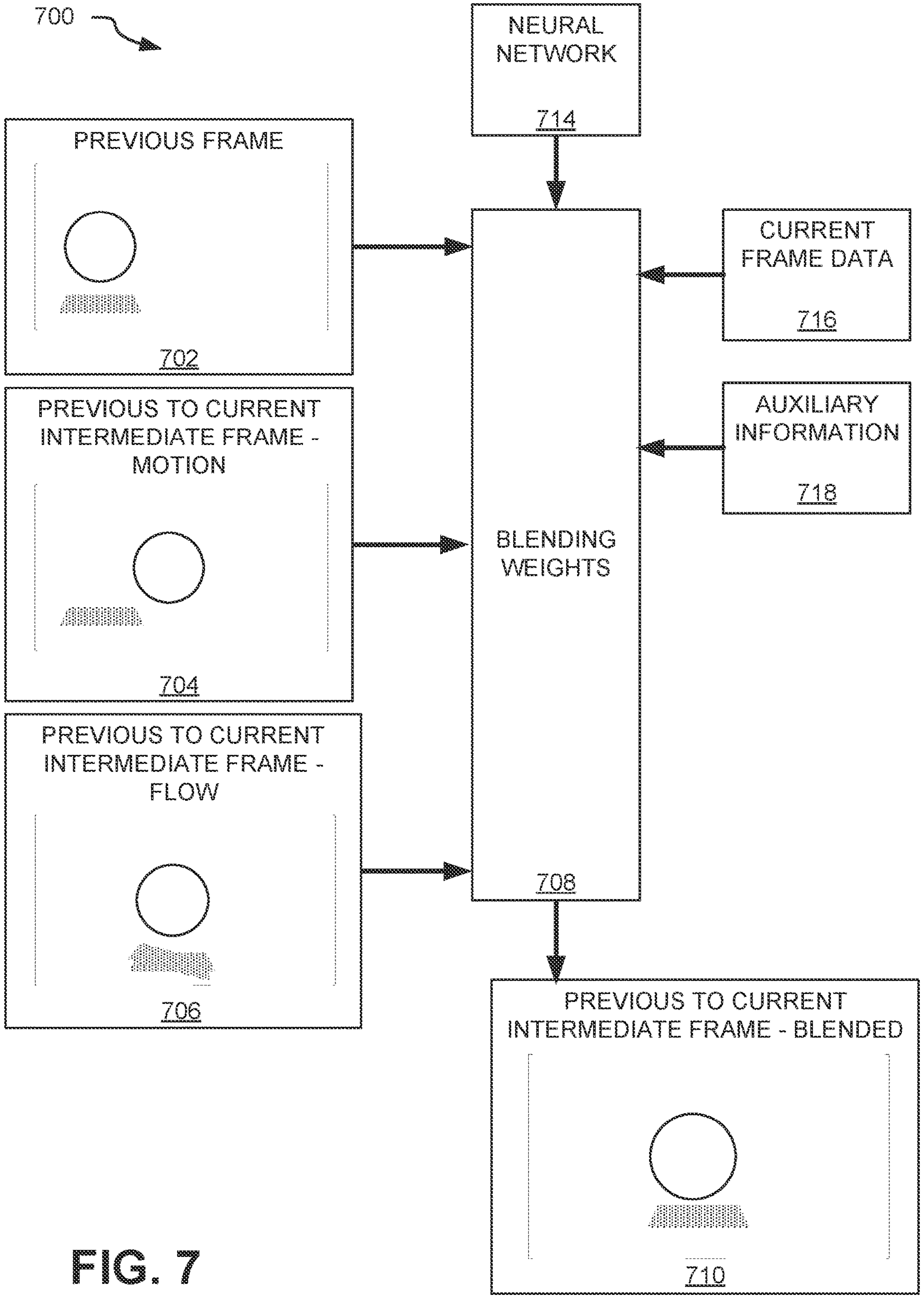
FIG. 7 illustrates an example diagram where forward motion candidates are blended, according to at least one embodiment.

FIG. 7 illustrates an example diagram 700 where forward motion candidates are blended, according to at least one embodiment. In at least one embodiment, a previous frame 702 (e.g., previous frame 502), a previous to current intermediate frame 704 based on motion (e.g., previous to current intermediate frame 514), and a previous to current intermediate frame 706 based on flow (e.g., previous to current intermediate frame 616) are blended using blending weights 708, using systems and methods such as those described herein. In at least one embodiment, blending weights 708 are generated by a neural network 714 (e.g., neural network 110 and/or neural network 212, as described herein at least in connection with FIGS. 1 and 2).

In at least one embodiment, a blended previous to current intermediate frame 710 is generated as a result of previous frame 702, previous to current intermediate frame 706 based on motion, and previous to current intermediate frame 704 based on flow being blended using blending weights 708. In at least one embodiment, when previous frame 702, previous to current intermediate frame 704 based on motion, and previous to current intermediate frame 706 based on flow are blended using blending weights 708, current frame data 716 (e.g., current frame 402, current to previous intermediate frame 412 based on motion, and current to previous intermediate frame 624 based on flow) are also blended using blending weights 708 to generate blended previous to current intermediate frame 710. In at least one embodiment, when previous frame 702, previous to current intermediate frame 704 based on motion, and previous to current intermediate frame 706 based on flow, are blended using blending weights 708, auxiliary information 718 is also blended using blending weights 708 to generate blended previous to current intermediate frame 710. In at least one embodiment, auxiliary information includes, for example, quality masks, indications as to whether motion vectors and/or flow vectors generate duplicate objects, and/or whether any additional deocclusion occurs when generating blended previous to current intermediate frame 710, depth, motion, occlusion masks, etc. In at least one embodiment, processes illustrated by example diagram 700 continue at example diagram 800 described herein at least in connection with FIG. 8.

Figure 8:
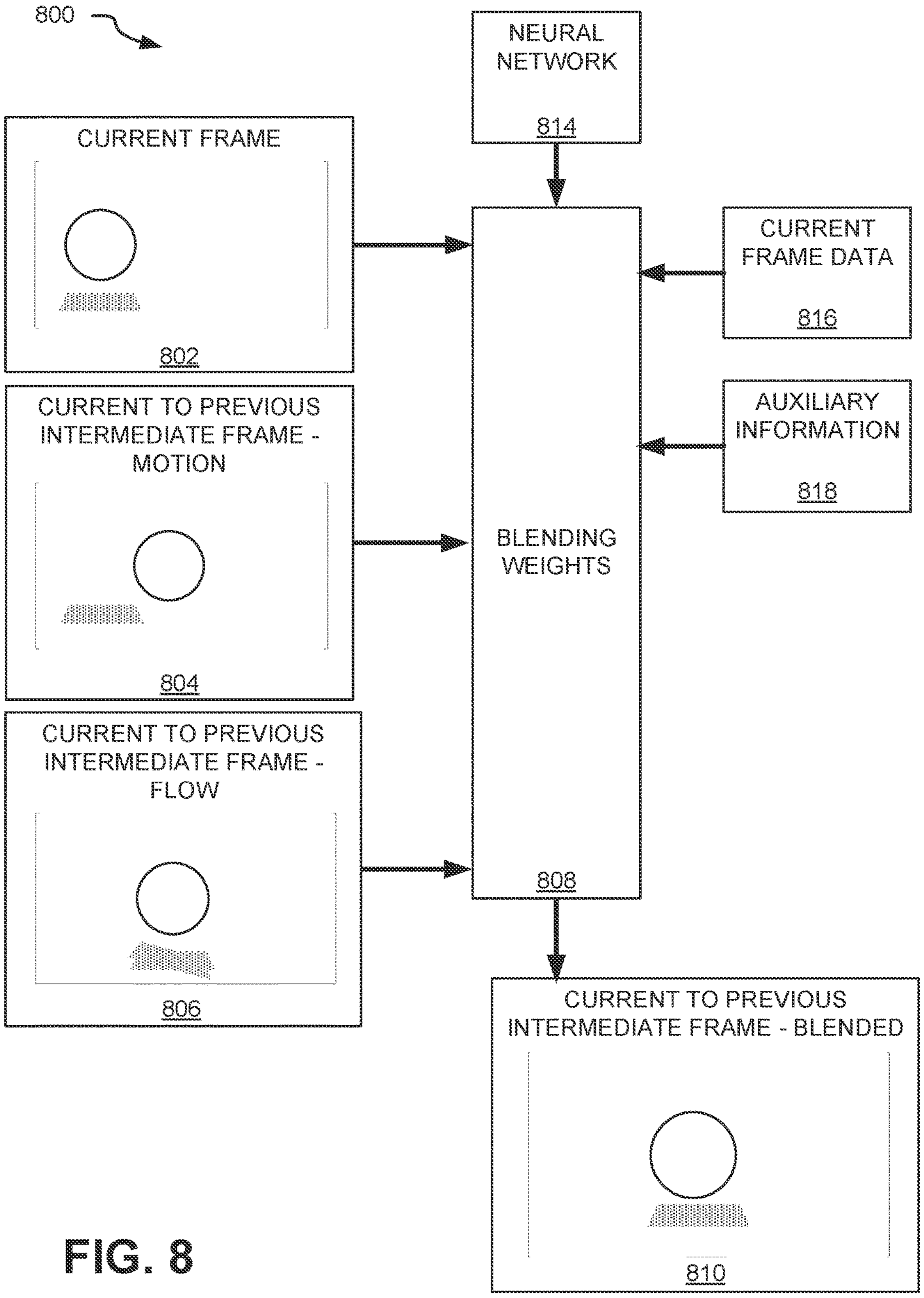
FIG. 8 illustrates an example diagram where reverse motion candidates are blended, according to at least one embodiment.

FIG. 8 illustrates an example diagram 800 where reverse motion candidates are blended, according to at least one embodiment. In at least one embodiment, a current frame 802 (e.g., current frame 402), a current to previous intermediate frame 806 based on motion (e.g., current to previous intermediate frame 412), and a current to previous intermediate frame 804 based on flow (e.g., current to previous intermediate frame 624) are blended using blending weights 808, using systems and methods such as those described herein. In at least one embodiment, blending weights 808 are generated by a neural network 814 (e.g., neural network 110 and/or neural network 212, as described herein at least in connection with FIGS. 1 and 2).

In at least one embodiment, a blended current to previous intermediate frame 810 is generated as a result of current frame 802, current to previous intermediate frame 804 based on motion, and current to previous intermediate frame 806 based on flow being blended using blending weights 808. In at least one embodiment, when current frame 802, current to previous intermediate frame 804 based on motion, and current to previous intermediate frame 806 based on flow, are blended using blending weights 808, current frame data 816 (e.g., previous frame 502, previous to current intermediate frame 514 based on motion, and previous to current intermediate frame 616 based on flow) are also blended using blending weights 808 to generate blended current to previous intermediate frame 810. In at least one embodiment, when current frame 802, current to previous intermediate frame 804 based on motion, and current to previous intermediate frame 806 based on flow, are blended using blending weights 808, auxiliary information 818 such as that described above is also blended using blending weights 808 to generate blended previous to current intermediate frame 810. In at least one embodiment, processes illustrated by example diagram 800 continue at example diagram 900 described herein at least in connection with FIG. 9.

Figure 9:
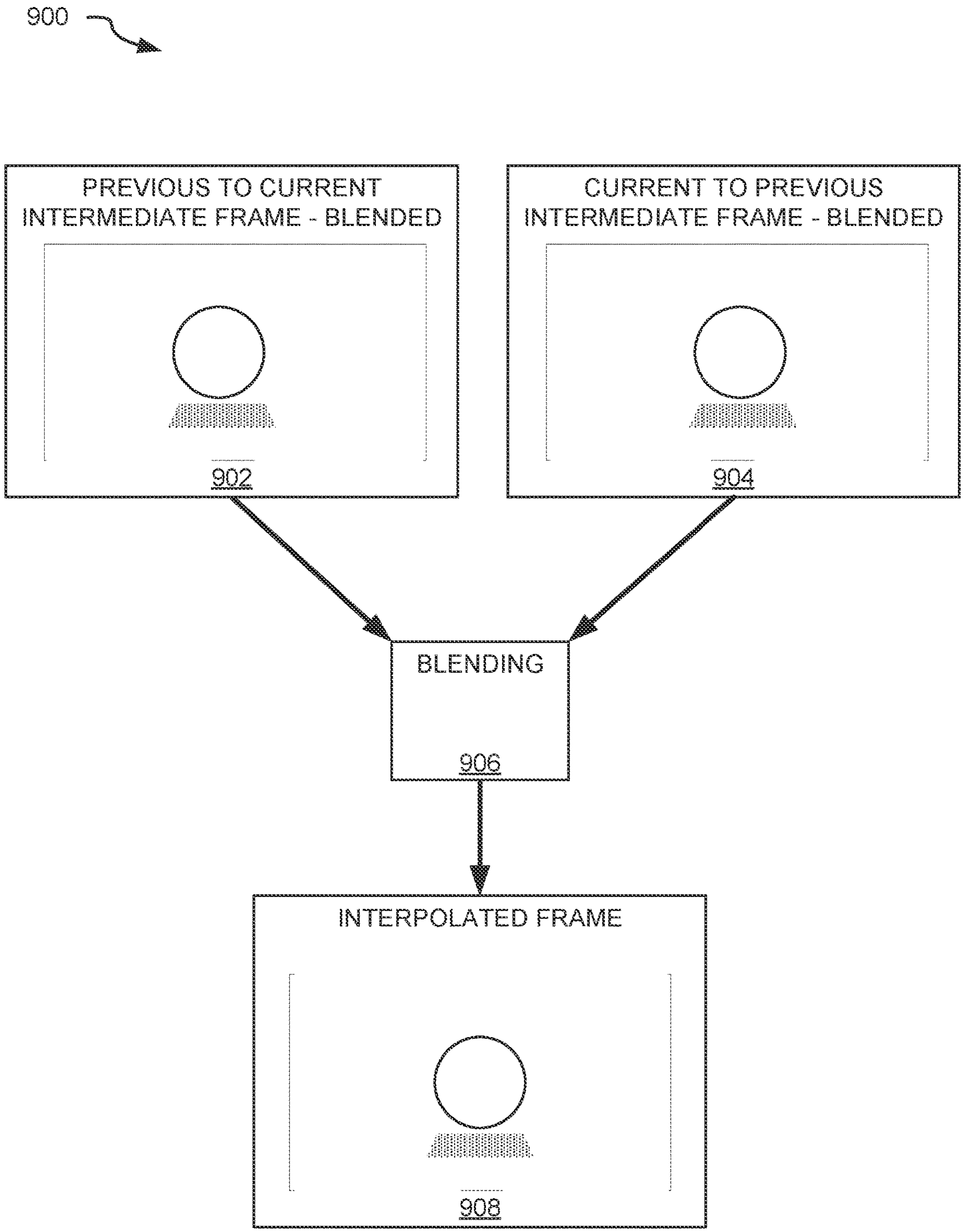
FIG. 9 illustrates an example diagram where an interpolated frame is generated, according to at least one embodiment.

FIG. 9 illustrates an example diagram 900 where an interpolated frame is generated, according to at least one embodiment. In at least one embodiment, a blended previous to current intermediate frame 902 (e.g., blended previous to current intermediate frame 710) and a blended current to previous intermediate frame 904 (e.g., blended current to previous intermediate frame 810) are blended 906 using systems and methods such as those described herein at least in connection with FIGS. 2 and 3 to generate one or more interpolated frames 908 (e.g., to generate one or more interpolated frames 220, described herein at least in connection with FIG. 2). In at least one embodiment, generating one or more interpolated frames 908 is generating interpolated frame 120, described herein at least in connection with FIG. 1. In at least one embodiment, generating one or more interpolated frames 908 includes post-processing frames 218 and/or generate interpolated frame(s) 220, described herein at least in connection with FIG. 2.

Figure 10:
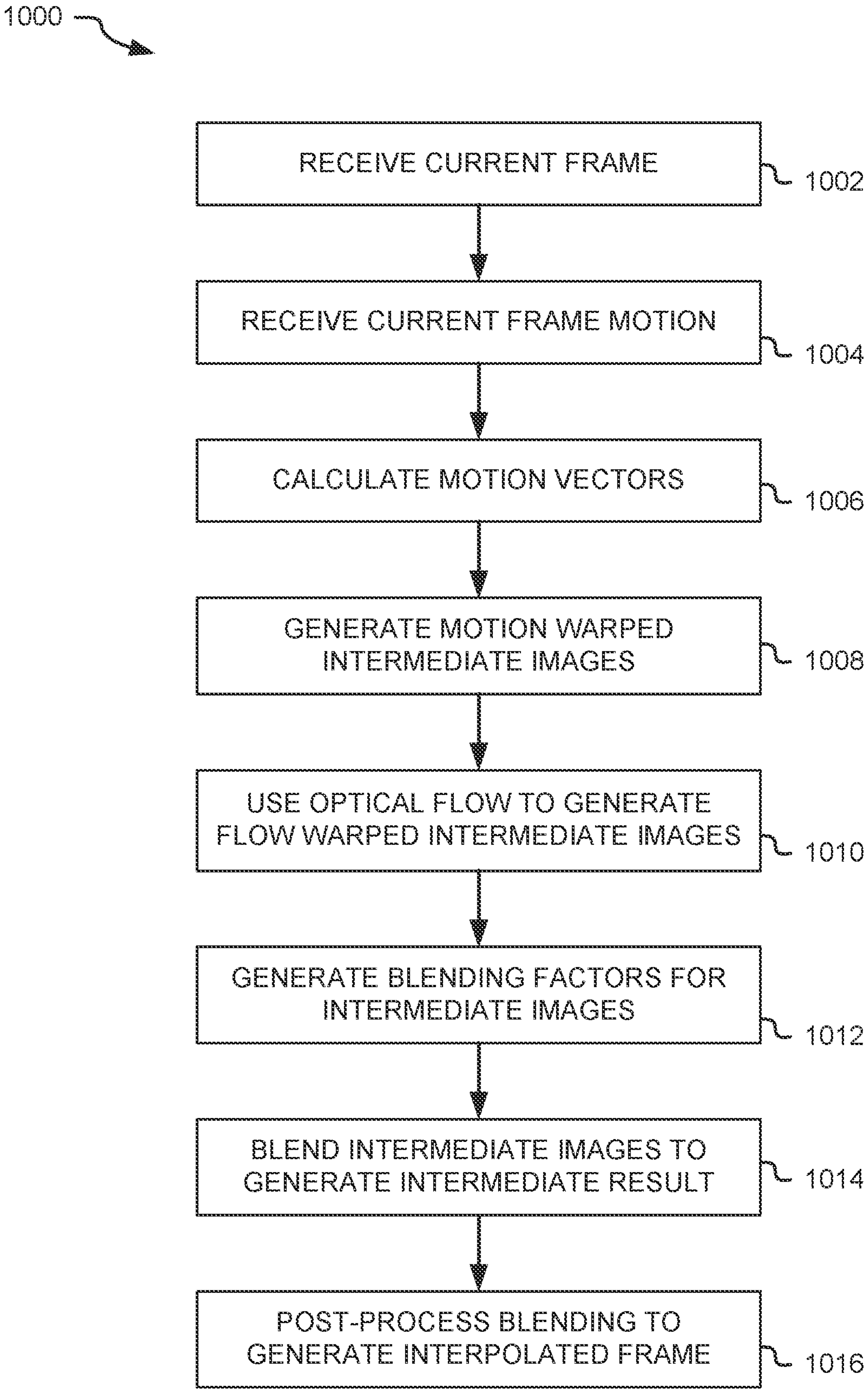
FIG. 10 illustrates an example process for generating an interpolated frame using a neural network, according to at least one embodiment.

FIG. 10 illustrates an example process 1000 for generating an interpolated frame using a neural network, according to at least one embodiment. In at least one embodiment, a processor such as processor 202 described herein at least in connection with FIG. 2 causes one or more instructions to be executed to perform example process 1000. In at least one embodiment, a processor such as processor 210 described herein at least in connection with FIG. 2 uses a neural network such as neural network 212, described herein at least in connection with FIG. 2, to cause example process 1000 to be performed. In at least one embodiment, example process 1000 illustrates processes, systems, and methods, described herein at least in connection with FIGS. 4 to 9.

In at least one embodiment, at step 1002 of example process 1000, a current frame (e.g., current frame 208, described herein at least in connection with FIG. 2) is received. In at least one embodiment, not illustrated in FIG. 10, at step 1002, a previous frame is also received (e.g., previous frame 206, described herein at least in connection with FIG. 2). In at least one embodiment, after step 1002, example process 1000 continues at step 1004.

In at least one embodiment, at step 1004 of example process 1000, current frame motion is received. In at least one embodiment, at step 1004, current frame motion includes motion vectors of dynamic objects and/or optical flow vectors of static objects, as described herein. In at least one embodiment, not illustrated in FIG. 10, one more confidence metrics and/or quality masks of received current frame motion are also received. In at least one embodiment, after step 1004, example process 1000 continues at step 1006.

In at least one embodiment, at step 1006 of example process 1000, other motion vectors are calculated from current frame motion, as described herein. In at least one embodiment, at step 1006, for example, forward motion vectors can be calculated from reverse motion vectors, reverse motion vectors can be calculated from forward motion vectors, or optical flow vectors can be calculated using depth, camera position, and/or other such data. In at least one embodiment, after step 1006, example process 1000 continues at step 1008.

In at least one embodiment, at step 1008 of example process 1000, one or more motion warped intermediate images are generated using systems and methods such as those described herein. In at least one embodiment, at step 1008, one or more motion warped intermediate images are generated based on, for example, forward motion vectors, reverse motion vectors, or other such motion vectors. In at least one embodiment, after step 1008, example process 1000 continues at step 1010.

In at least one embodiment, at step 1010 of example process 1000, one or more flow warped intermediate images are generated using systems and methods such as those described herein. In at least one embodiment, at step 1010, one or more flow warped intermediate images are generated based on, for example, forward optical flow vectors, reverse optical flow vectors, or other such flow vectors. In at least one embodiment, after step 1010, example process 1000 continues at step 1012.

In at least one embodiment, at step 1012 of example process 1000, one or more blended factors are generated to blend intermediate images, using systems and methods such as those described herein. In at least one embodiment, at step 1012, one or more blended intermediate images are generated using blending factors (or blending weights) generated by a neural network such as neural network 212, described herein at least in connection with FIG. 2. In at least one embodiment, after step 1012, example process 1000 continues at step 1014.

In at least one embodiment, at step 1014 of example process 1000, one or more intermediate images (e.g., generated using blending factors at step 1012) are blended together to generate an intermediate result such as, for example, blended previous to current intermediate frame 902 or blended current to previous intermediate frame 904, as described herein at least in connection with FIG. 9. In at least one embodiment, after step 1014, example process 1000 continues at step 1016.

In at least one embodiment, at step 1016 of example process 1000, one or more blended intermediate images (e.g., generated at step 1014) are blended to generate one or more interpolated frames (e.g., as described herein at least in connection with FIG. 2), using systems and methods such as those described herein. In at least one embodiment, after step 1016, example process 1000 continues at step 1002 to receive another current frame (e.g., in a next iteration of example process 1000). In at least one embodiment, after step 1016, example process 1000 terminates (e.g., when there are no more frames to process).

In at least one embodiment, operations of example process 1000 are performed in a different order than is illustrated in FIG. 10. In at least one embodiment, operations of example process 1000 are performed simultaneously or in parallel so that, for example, step 1002 and step 1004 are performed simultaneously or a plurality of motion warped intermediate images are generated simultaneously at step 1008. In at least one embodiment, operations of example process 1000 are performed by a plurality of threads executing on one or more processors such as those described herein using systems and methods such as those described herein.

Figure 11:
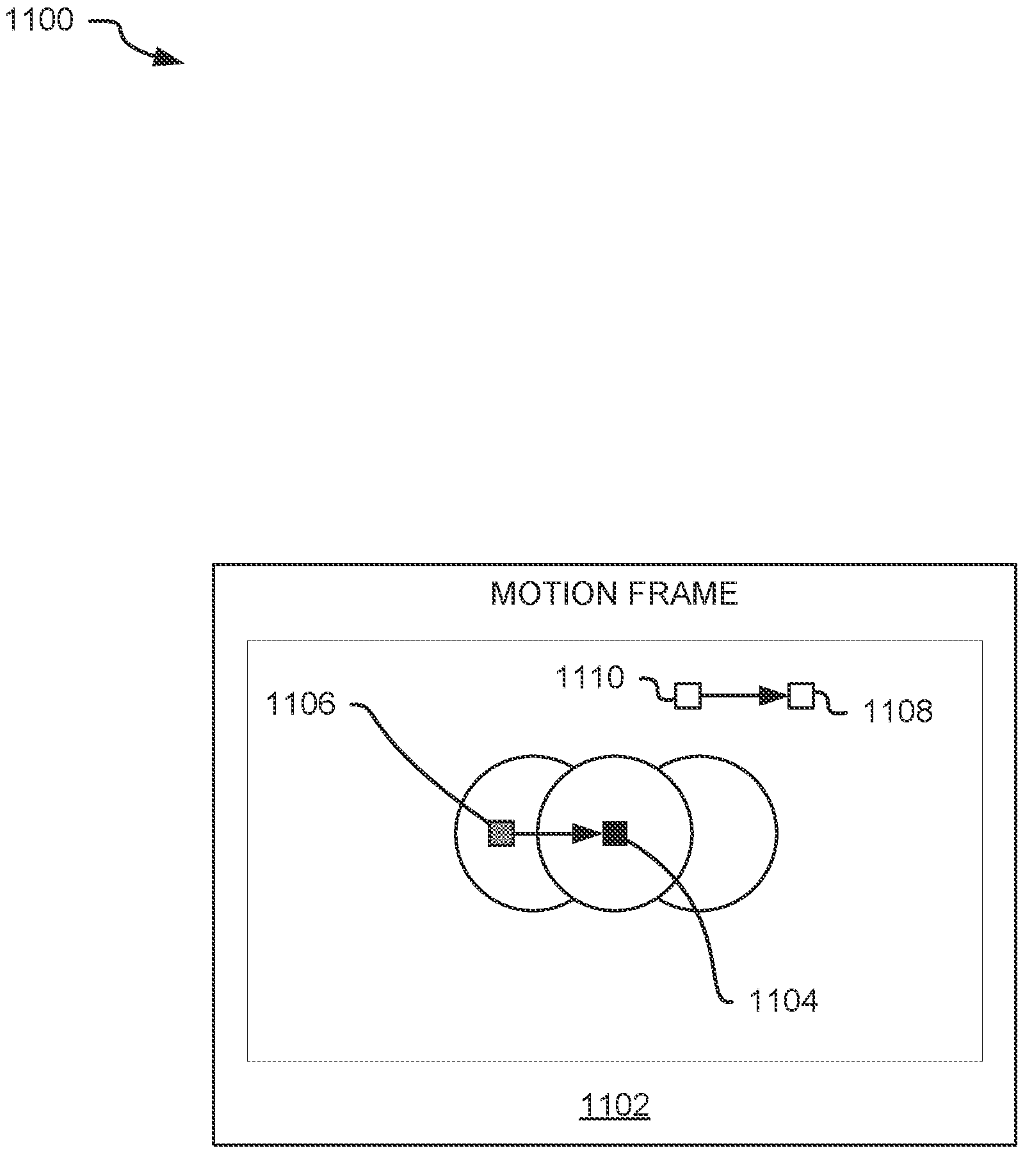
FIG. 11 illustrates an example diagram where duplicated motion is detected, according to at least one embodiment.

FIG. 11 illustrates an example diagram 1100 where duplicated motion is detected, according to at least one embodiment. In at least one embodiment, a motion frame 1102 (e.g., a motion warped color frame, a LR luma motion warped frame, a blended intermediate frame) includes a pixel 1106. In at least one embodiment, under motion such as that described herein in connection with FIGS. 4-10, it is determined whether pixel 1106 is sampling from a pixel that will show up in a final blended frame (e.g., an interpolated frame). In at least one embodiment, it is determined that pixel 1106 is sampling from a pixel that will show up in a final blended frame, because pixel 1104 is generated using static motion (e.g., optical flow, as described herein at least in connection with FIGS. 4-10) and pixel 1106 is generated using motion vector warping (e.g., optical flow, also as described herein at least in connection with FIGS. 4-10). In at least one embodiment, therefore, motion of these pixels (e.g., pixel 1106 and pixel 1104) is duplicating motion and that at least one motion here is to be removed by, for example, not blending said motion and/or by eliminating a blending factor associated with said motion.

In at least one embodiment, under motion such as that described herein in connection with FIGS. 4-10, it is determined whether pixel 1110 is sampling from a pixel such as pixel 1108, that will show up in a final blended frame (e.g., an interpolated frame). In at least one embodiment, it is determined that pixel 1110 is not sampling from a pixel that will show up in a final blended frame, because pixel 1110 and pixel 1108 are generated using motion vector warping, as described herein at least in connection with FIGS. 4-10. In at least one embodiment, motion of these pixels (e.g., pixel 1110 and pixel 1108) is not duplicating motion.

Figure 12:
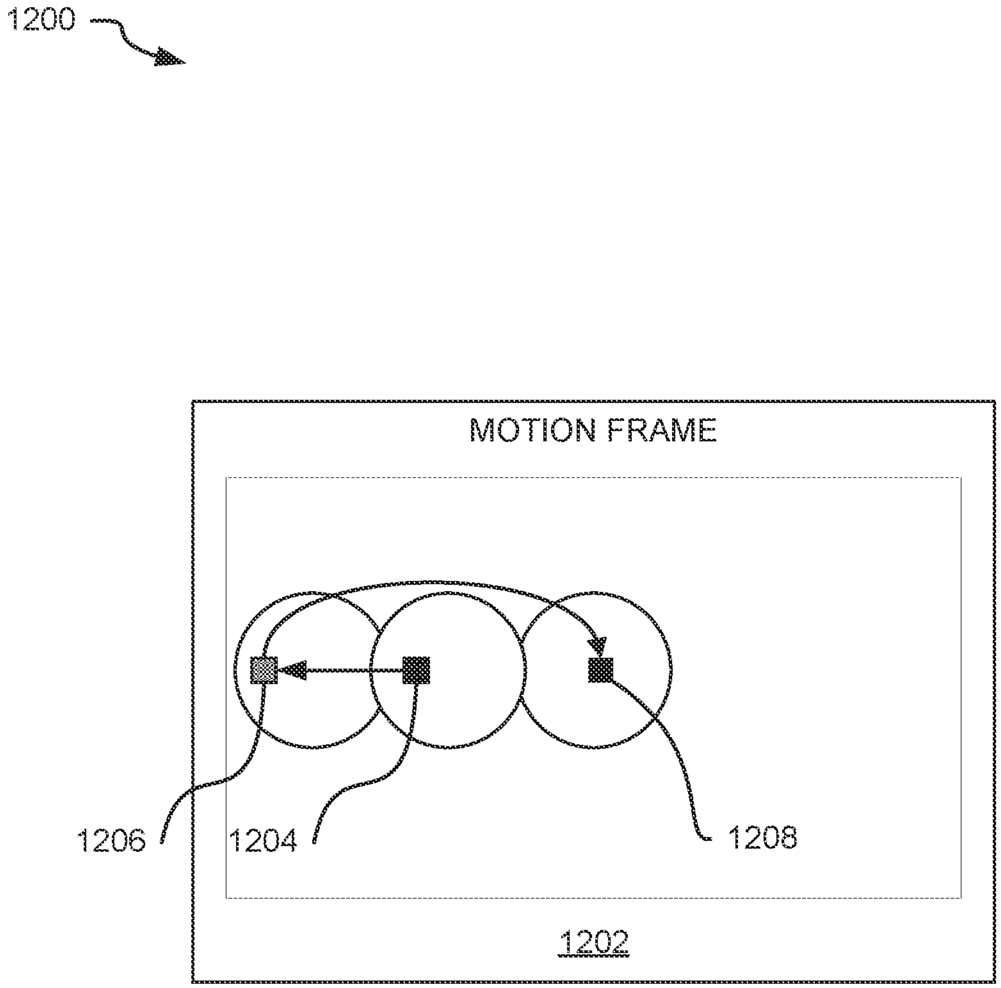
FIG. 12 illustrates an example diagram where duplicated motion is detected, according to at least one embodiment.

FIG. 12 illustrates an example diagram 1200 where duplicated motion is detected, according to at least one embodiment. In at least one embodiment, a motion frame 1202 (e.g., a motion warped color frame, a LR luma motion warped frame, a blended intermediate frame) includes a pixel 1204. In at least one embodiment, under motion such as that described herein in connection with FIGS. 4-10, it is determined whether pixel 1204 is sampling from a pixel that will show up in a final blended frame (e.g., an interpolated frame). In at least one embodiment, it is determined that pixel 1204 is sampling from a pixel that will show up in a final blended frame, because pixel 1206 is moved by flow such as that described herein to pixel location 1208 and blending weights of pixel 1208 (e.g., blending factors) show motion. In at least one embodiment, therefore, motion of these pixels (e.g., pixel 1204 and pixel 1206) is duplicating motion and that at least one motion here is to be removed by, for example, not blending said motion and/or by eliminating a blending factor associated with said motion.

Figure 13:
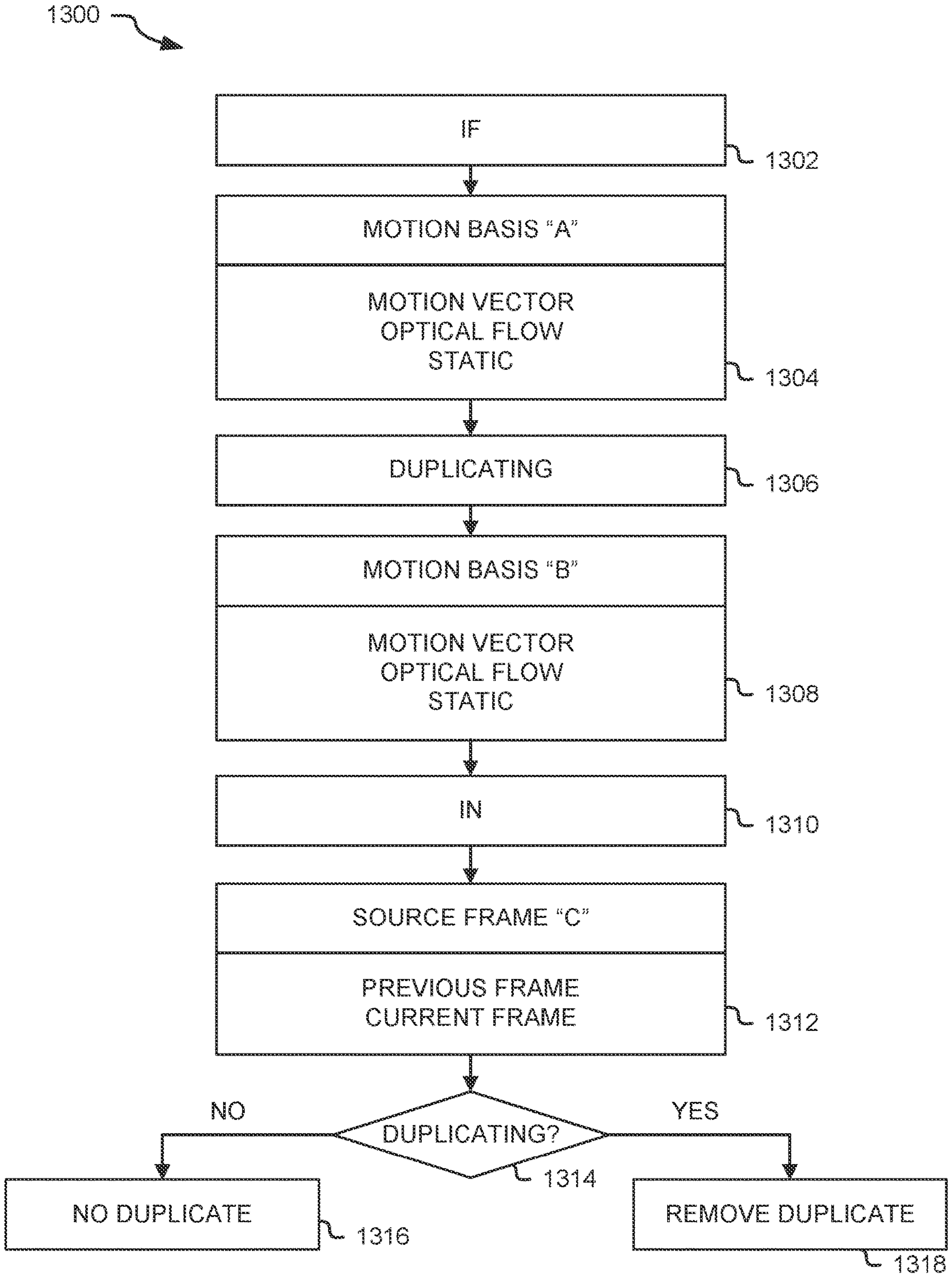
FIG. 13 illustrates an example process for detecting duplicate motion, according to at least one embodiment.

FIG. 13 illustrates an example process 1300 for detecting duplicate motion, according to at least one embodiment. In at least one embodiment, example process shows eighteen possible duplicated motions where it is determined if (box 1302) motion basis "A" (box 1304, which is a motion vector, optical flow, or static motion, as described herein) is duplicating (box 1306) motion basis "B" (box 1308, which is a motion vector, optical flow, or static motion, as described herein) in (box 1310) in source frame "C" (box 1312, which is previous frame or current frame). In at least one embodiment, for example, it is determined if (box 1302) a motion basis "A" of motion vector (box 1304) is duplicating (box 1306) motion basis "B" of a motion vector in (box 1310) source frame "C" of a current frame (box 1312). In at least one embodiment, there are three options for motion basis "A" (box 1304), three options for motion basis "B" (box 1308), and two options for source frame "C" (box 1312), resulting in eighteen possible duplications.

In at least one embodiment, at step 1314 of example process 1300 it is determined whether there is duplicate motion (e.g., as a result of box 1302 to box 1312). In at least one embodiment, at step 1314, if it is determined that there is not duplicate motion ("NO" branch), example process 1300 continues at step 1316. In at least one embodiment, at step 1314, if it is determined that there is duplicate motion ("YES" branch), example process 1300 continues at step 1318.

In at least one embodiment, at step 1316 of example process 1300, there is no duplicate motion and example process 1300 terminates.

In at least one embodiment, at step 1318 of example process 1300, there is a duplicate motion and one or more duplicate motions are removed from blending, as described herein. In at least one embodiment, after step 1318, example process 1300 terminates.

Inference and Training Logic

Figure 14A:
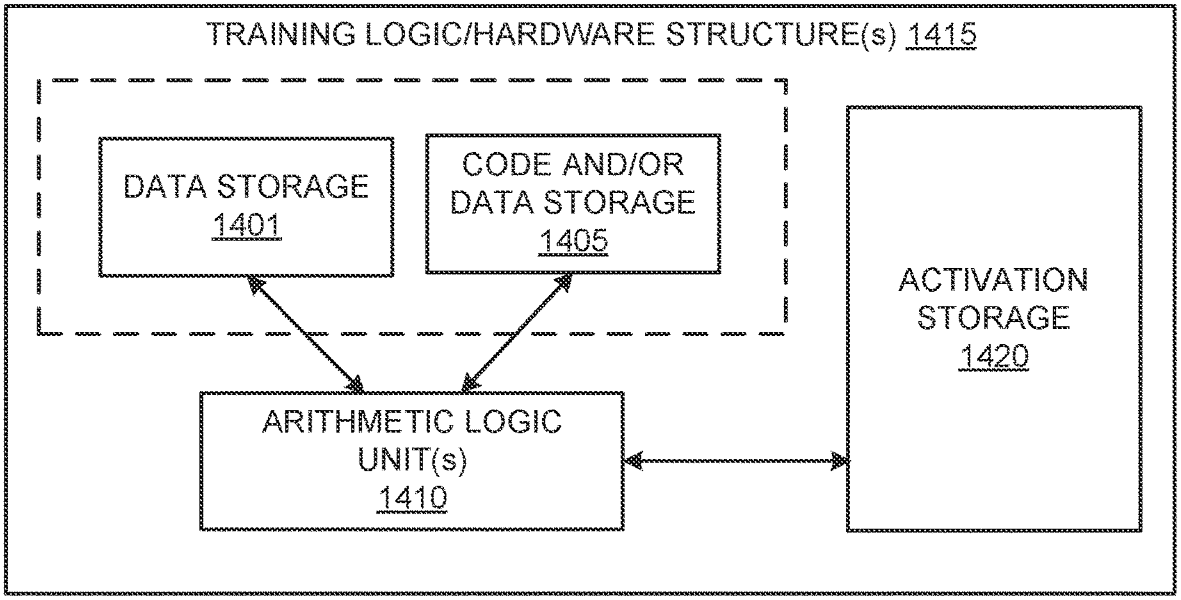
FIG. 14A illustrates inference and/or training logic, according to at least one embodiment.

FIG. 14A illustrates inference and/or training logic 1415 used to perform inferencing and/or training operations associated with one or more embodiments. Details regarding inference and/or training logic 1415 are provided below in conjunction with FIGS. 14A and/or 14B.

In at least one embodiment, inference and/or training logic 1415 may include, without limitation, code and/or data storage 1401 to store forward and/or output weight and/or input/output data, and/or other parameters to configure neurons or layers of a neural network trained and/or used for inferencing in aspects of one or more embodiments. In at least one embodiment, training logic 1415 may include, or be coupled to code and/or data storage 1401 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which such code corresponds. In at least one embodiment, code and/or data storage 1401 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1401 may be included with other on-chip or off-chip data storage, including a processor's L1, L2, or L3 cache or system memory.

In at least one embodiment, any portion of code and/or data storage 1401 may be internal or external to one or more processors or other hardware logic devices or circuits. In at least one embodiment, code and/or code and/or data storage 1401 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 1401 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1415 may include, without limitation, a code and/or data storage 1405 to store backward and/or output weight and/or input/output data corresponding to neurons or layers of a neural network trained and/or used for inferencing in aspects of one or more embodiments. In at least one embodiment, code and/or data storage 1405 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1415 may include, or be coupled to code and/or data storage 1405 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 1405 may be included with other on-chip or off-chip data storage, including a processor's L1, L2, or L3 cache or system memory. In at least one embodiment, any portion of code and/or data storage 1405 may be internal or external to one or more processors or other hardware logic devices or circuits. In at least one embodiment, code and/or data storage 1405 may be cache memory, DRAM, SRAM, non-volatile memory (e.g., flash memory), or other storage. In at least one embodiment, a choice of whether code and/or data storage 1405 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1401 and code and/or data storage 1405 may be separate storage structures. In at least one embodiment, code and/or data storage 1401 and code and/or data storage 1405 may be a combined storage structure. In at least one embodiment, code and/or data storage 1401 and code and/or data storage 1405 may be partially combined and partially separate. In at least one embodiment, any portion of code and/or data storage 1401 and code and/or data storage 1405 may be included with other on-chip or off-chip data storage, including a processor's L1, L2, or L3 cache or system memory.

In at least one embodiment, inference and/or training logic 1415 may include, without limitation, one or more arithmetic logic unit(s) ("ALU(s)") 1410, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1420 that are functions of input/output and/or weight parameter data stored in code and/or data storage 1401 and/or code and/or data storage 1405. In at least one embodiment, activations stored in activation storage 1420 are generated according to linear algebraic and or matrix-based mathematics performed by ALU(s) 1410 in response to performing instructions or other code, wherein weight values stored in code and/or data storage 1405 and/or data storage 1401 are used as operands along with other values, such as bias values, gradient information, momentum values, or other parameters or hyperparameters, any or all of which may be stored in code and/or data storage 1405 or code and/or data storage 1401 or another storage on or off-chip.

In at least one embodiment, ALU(s) 1410 are included within one or more processors or other hardware logic devices or circuits, whereas in another embodiment, ALU(s) 1410 may be external to a processor or other hardware logic device or circuit that uses them (e.g., a co-processor). In at least one embodiment, ALUs 1410 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 1401, code and/or data storage 1405, and activation storage 1420 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 1420 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1420 may be cache memory, DRAM, SRAM, non-volatile memory (e.g., flash memory), or other storage. In at least one embodiment, activation storage 1420 may be completely or partially within or external to one or more processors or other logical circuits. In at least one embodiment, a choice of whether activation storage 1420 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1415 illustrated in FIG. 14A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 1415 illustrated in FIG. 14A may be used in conjunction with central processing unit ("CPU") hardware, graphics processing unit ("GPU") hardware or other hardware, such as field programmable gate arrays ("FPGAs").

In at least one embodiment, at least one component shown or described with respect to FIG. 14A is used to perform techniques and/or functions described in connection with FIGS. 1-13. In at least one embodiment, at least one component shown or described with respect to FIG. 14A is used to perform operations described herein, such as to detect whether one or more objects within one or more images is likely to be duplicated in an image interpolated using the one or more images. In at least one embodiment, inference and/or training logic 1415 is used to perform operations described herein, such as to detect whether one or more objects within one or more images is likely to be duplicated in an image interpolated using the one or more images. In at least one embodiment, at least one component shown or described with respect to FIG. 14A is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein. In at least one embodiment, inference and/or training logic 1415 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 14B:
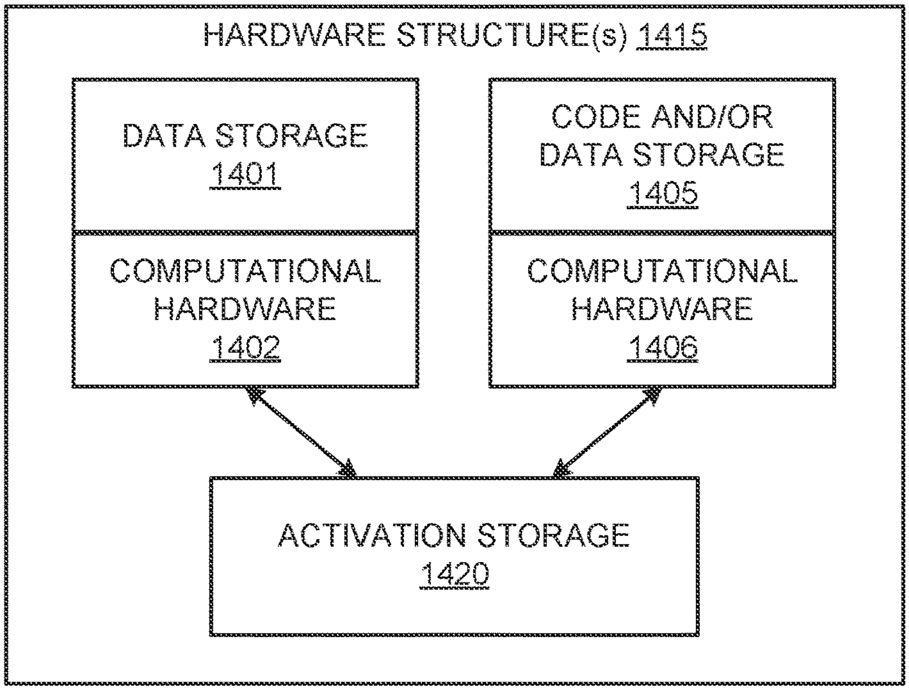
FIG. 14B illustrates inference and/or training logic, according to at least one embodiment.

FIG. 14B illustrates inference and/or training logic 1415, according to at least one embodiment. In at least one embodiment, inference and/or training logic 1415 may include, without limitation, hardware logic in which computational resources are dedicated or otherwise exclusively used in conjunction with weight values or other information corresponding to one or more layers of neurons within a neural network. In at least one embodiment, inference and/or training logic 1415 illustrated in FIG. 14B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 1415 illustrated in FIG. 14B may be used in conjunction with central processing unit (CPU) hardware, graphics processing unit (GPU) hardware or other hardware, such as field programmable gate arrays (FPGAs). In at least one embodiment, inference and/or training logic 1415 includes, without limitation, code and/or data storage 1401 and code and/or data storage 1405, which may be used to store code (e.g., graph code), weight values and/or other information, including bias values, gradient information, momentum values, and/or other parameter or hyperparameter information. In at least one embodiment illustrated in FIG. 14B, each of code and/or data storage 1401 and code and/or data storage 1405 is associated with a dedicated computational resource, such as computational hardware 1402 and computational hardware 1406, respectively. In at least one embodiment, each of computational hardware 1402 and computational hardware 1406 comprises one or more ALUs that perform mathematical functions, such as linear algebraic functions, only on information stored in code and/or data storage 1401 and code and/or data storage 1405, respectively, result of which is stored in activation storage 1420.

In at least one embodiment, each of code and/or data storage 1401 and 1405 and corresponding computational hardware 1402 and 1406, respectively, correspond to different layers of a neural network, such that resulting activation from one storage/computational pair 1401/1402 of code and/or data storage 1401 and computational hardware 1402 is provided as an input to a next storage/computational pair 1405/1406 of code and/or data storage 1405 and computational hardware 1406, in order to mirror a conceptual organization of a neural network. In at least one embodiment, each of storage/computational pairs 1401/1402 and 1405/1406 may correspond to more than one neural network layer. In at least one embodiment, additional storage/computation pairs (not shown) subsequent to or in parallel with storage/computation pairs 1401/1402 and 1405/1406 may be included in inference and/or training logic 1415.

In at least one embodiment, at least one component shown or described with respect to FIG. 14B is used to perform techniques and/or functions described in connection with FIGS. 1-13. In at least one embodiment, at least one component shown or described with respect to FIG. 14B is used to perform operations described herein, such as to detect whether one or more objects within one or more images is likely to be duplicated in an image interpolated using the one or more images. In at least one embodiment, at least one component shown or described with respect to FIG. 14B is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Neural Network Training and Deployment

FIG. 15 illustrates training and deployment of a deep neural network, according to at least one embodiment. In at least one embodiment, untrained neural network 1506 is trained using a training dataset 1502. In at least one embodiment, training framework 1504 is a PyTorch framework, whereas in other embodiments, training framework 1504 is a TensorFlow, Boost, Caffe, Microsoft Cognitive Toolkit/CNTK, MXNet, Chainer, Keras, Deeplearning4j, or other training framework. In at least one embodiment, training framework 1504 trains an untrained neural network 1506 and enables it to be trained using processing resources described herein to generate a trained neural network 1508. In at least one embodiment, weights may be chosen randomly or by pre-training using a deep belief network. In at least one embodiment, training may be performed in either a supervised, partially supervised, or unsupervised manner.

In at least one embodiment, untrained neural network 1506 is trained using supervised learning, wherein training dataset 1502 includes an input paired with a desired output for an input, or where training dataset 1502 includes input having a known output and an output of neural network 1506 is manually graded. In at least one embodiment, untrained neural network 1506 is trained in a supervised manner and processes inputs from training dataset 1502 and compares resulting outputs against a set of expected or desired outputs. In at least one embodiment, errors are then propagated back through untrained neural network 1506. In at least one embodiment, training framework 1504 adjusts weights that control untrained neural network 1506. In at least one embodiment, training framework 1504 includes tools to monitor how well untrained neural network 1506 is converging towards a model, such as trained neural network 1508, suitable to generating correct answers, such as in result 1514, based on input data such as a new dataset 1512. In at least one embodiment, training framework 1504 trains untrained neural network 1506 repeatedly while adjust weights to refine an output of untrained neural network 1506 using a loss function and adjustment algorithm, such as stochastic gradient descent. In at least one embodiment, training framework 1504 trains untrained neural network 1506 until untrained neural network 1506 achieves a desired accuracy. In at least one embodiment, trained neural network 1508 can then be deployed to implement any number of machine learning operations.

In at least one embodiment, untrained neural network 1506 is trained using unsupervised learning, wherein untrained neural network 1506 attempts to train itself using unlabeled data. In at least one embodiment, unsupervised learning training dataset 1502 will include input data without any associated output data or "ground truth" data. In at least one embodiment, untrained neural network 1506 can learn groupings within training dataset 1502 and can determine how individual inputs are related to untrained dataset 1502. In at least one embodiment, unsupervised training can be used to generate a self-organizing map in trained neural network 1508 capable of performing operations useful in reducing dimensionality of new dataset 1512. In at least one embodiment, unsupervised training can also be used to perform anomaly detection, which allows identification of data points in new dataset 1512 that deviate from normal patterns of new dataset 1512.

In at least one embodiment, semi-supervised learning may be used, which is a technique in which in training dataset 1502 includes a mix of labeled and unlabeled data. In at least one embodiment, training framework 1504 may be used to perform incremental learning, such as through transferred learning techniques. In at least one embodiment, incremental learning enables trained neural network 1508 to adapt to new dataset 1512 without forgetting knowledge instilled within trained neural network 1508 during initial training.

In at least one embodiment, at least one component shown or described with respect to FIG. 15 is used to perform techniques and/or functions described in connection with FIGS. 1-13. In at least one embodiment, at least one component shown or described with respect to FIG. 15 is used to perform operations described herein, such as to detect whether one or more objects within one or more images is likely to be duplicated in an image interpolated using the one or more images. In at least one embodiment, at least one component shown or described with respect to FIG. 15 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Data Center

Figure 16:
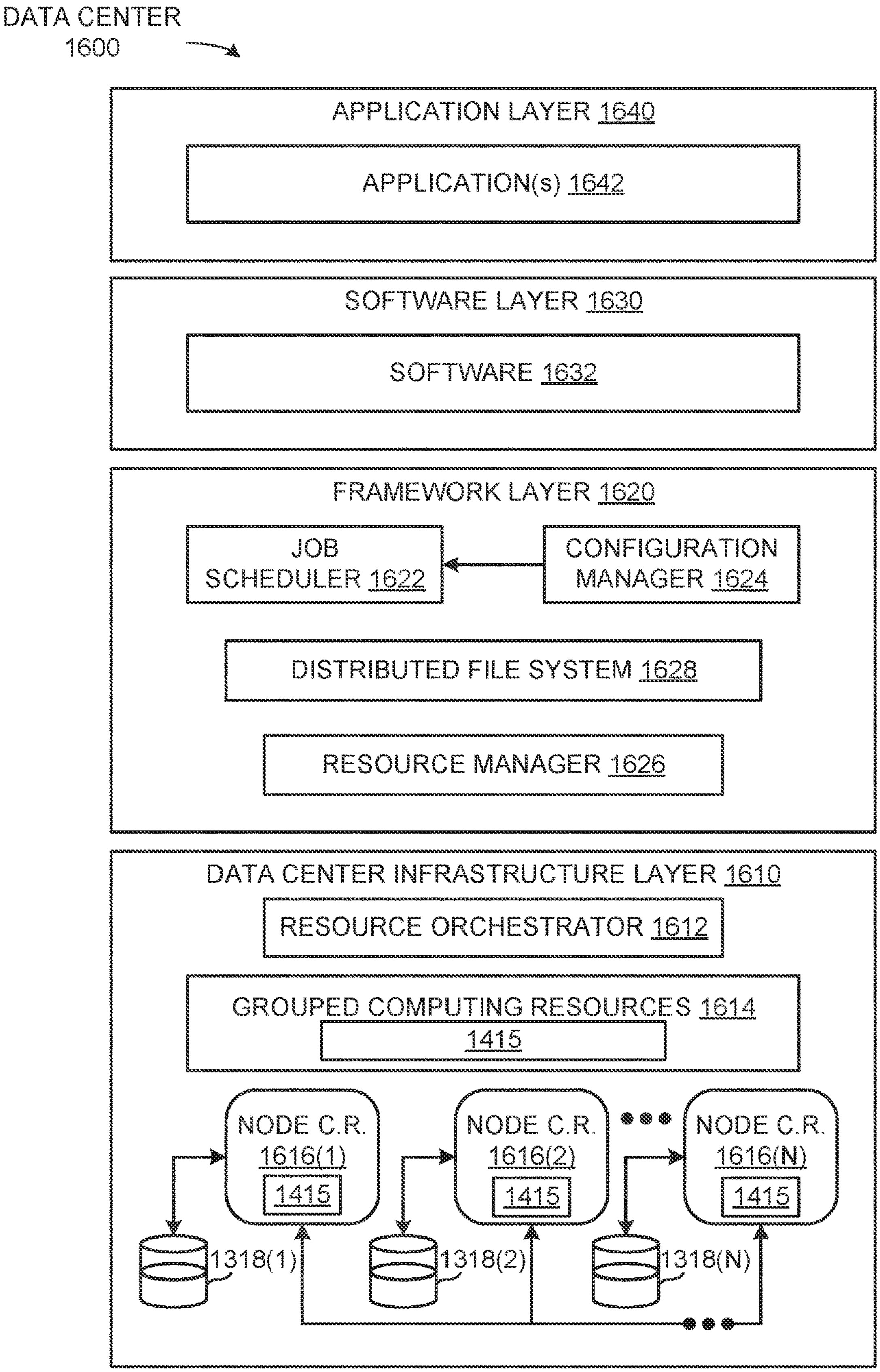
FIG. 16 illustrates an example data center system, according to at least one embodiment.

FIG. 16 illustrates an example data center 1600, in which at least one embodiment may be used. In at least one embodiment, data center 1600 includes a data center infrastructure layer 1610, a framework layer 1620, a software layer 1630 and an application layer 1640.

In at least one embodiment, as shown in FIG. 16, data center infrastructure layer 1610 may include a resource orchestrator 1612, grouped computing resources 1614, and node computing resources ("node C.R.s") 1616(1)-1616(N), where "N" represents a positive integer (which may be a different integer "N" than used in other figures). In at least one embodiment, node C.R.s 1616(1)-1616(N) may include, but are not limited to, any number of central processing units ("CPUs") or other processors (including accelerators, field programmable gate arrays (FPGAs), graphics processors, etc.), memory storage devices 1618(1)-1618(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 1616(1)-1616(N) may be a server having one or more of above-mentioned computing resources.

In at least one embodiment, grouped computing resources 1614 may include separate groupings of node C.R.s housed within one or more racks (not shown), or many racks housed in data centers at various geographical locations (also not shown). In at least one embodiment, separate groupings of node C.R.s within grouped computing resources 1614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1612 may configure or otherwise control one or more node C.R.s 1616(1)-1616(N) and/or grouped computing resources 1614. In at least one embodiment, resource orchestrator 1612 may include a software design infrastructure ("SDI") management entity for data center 1600. In at least one embodiment, resource orchestrator 1412 may include hardware, software or some combination thereof.

In at least one embodiment, as shown in FIG. 16, framework layer 1620 includes a job scheduler 1622, a configuration manager 1624, a resource manager 1626 and a distributed file system 1628. In at least one embodiment, framework layer 1620 may include a framework to support software 1632 of software layer 1630 and/or one or more application(s) 1642 of application layer 1640. In at least one embodiment, software 1632 or application(s) 1642 may respectively include web-based service software or applications, such as those provided by Amazon Web Services, Google Cloud and Microsoft Azure. In at least one embodiment, framework layer 1620 may be, but is not limited to, a type of free and open-source software web application framework such as Apache Spark™ (hereinafter "Spark") that may utilize distributed file system 1628 for large-scale data processing (e.g., "big data"). In at least one embodiment, job scheduler 1622 may include a Spark driver to facilitate scheduling of workloads supported by various layers of data center 1600. In at least one embodiment, configuration manager 1624 may be capable of configuring different layers such as software layer 1630 and framework layer 1620 including Spark and distributed file system 1628 for supporting large-scale data processing. In at least one embodiment, resource manager 1626 may be capable of managing clustered or grouped computing resources mapped to or allocated for support of distributed file system 1628 and job scheduler 1622. In at least one embodiment, clustered or grouped computing resources may include grouped computing resources 1614 at data center infrastructure layer 1610. In at least one embodiment, resource manager 1626 may coordinate with resource orchestrator 1612 to manage these mapped or allocated computing resources.

In at least one embodiment, software 1632 included in software layer 1630 may include software used by at least portions of node C.R.s 1616(1)-1616(N), grouped computing resources 1614, and/or distributed file system 1628 of framework layer 1620. In at least one embodiment, one or more types of software may include, but are not limited to, Internet web page search software, e-mail virus scan software, database software, and streaming video content software.

In at least one embodiment, application(s) 1642 included in application layer 1640 may include one or more types of applications used by at least portions of node C.R.s 1616 (1)-1616(N), grouped computing resources 1614, and/or distributed file system 1628 of framework layer 1620. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1624, resource manager 1626, and resource orchestrator 1612 may implement any number and type of self-modifying actions based on any amount and type of data acquired in any technically feasible fashion. In at least one embodiment, self-modifying actions may relieve a data center operator of data center 1600 from making possibly bad configuration decisions and possibly avoiding underutilized and/or poor performing portions of a data center.

In at least one embodiment, data center 1600 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1600. In at least one embodiment, trained machine learning models corresponding to one or more neural networks may be used to infer or predict information using resources described above with respect to data center 1600 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in system FIG. 16 for inferencing or predicting operations based, at least in part, on weight parameters calculated using network use cases described herein.

In at least one embodiment, at least one component shown or described with respect to FIG. 16 is used to perform techniques and/or functions described in connection with FIGS. 1-13. In at least one embodiment, at least one component shown or described with respect to FIG. 16 is used to perform operations described herein, such as to detect whether one or more objects within one or more images is likely to be duplicated in an image interpolated using the one or more images. In at least one embodiment, at least one component shown or described with respect to FIG. 16 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Supercomputing

The following figures set forth, without limitation, exemplary supercomputer-based systems that can be used to implement at least one embodiment.

In at least one embodiment, a supercomputer may refer to a hardware system exhibiting substantial parallelism and comprising at least one chip, where chips in a system are interconnected by a network and are placed in hierarchically organized enclosures. In at least one embodiment, a large hardware system filling a machine room, with several racks, each containing several boards/rack modules, each containing several chips, all interconnected by a scalable network, is one particular example of a supercomputer. In at least one embodiment, a single rack of such a large hardware system is another example of a supercomputer. In at least one embodiment, a single chip exhibiting substantial parallelism and containing several hardware components can equally be considered to be a supercomputer, since as feature sizes may decrease, an amount of hardware that can be incorporated in a single chip may also increase.

Figure 17A:
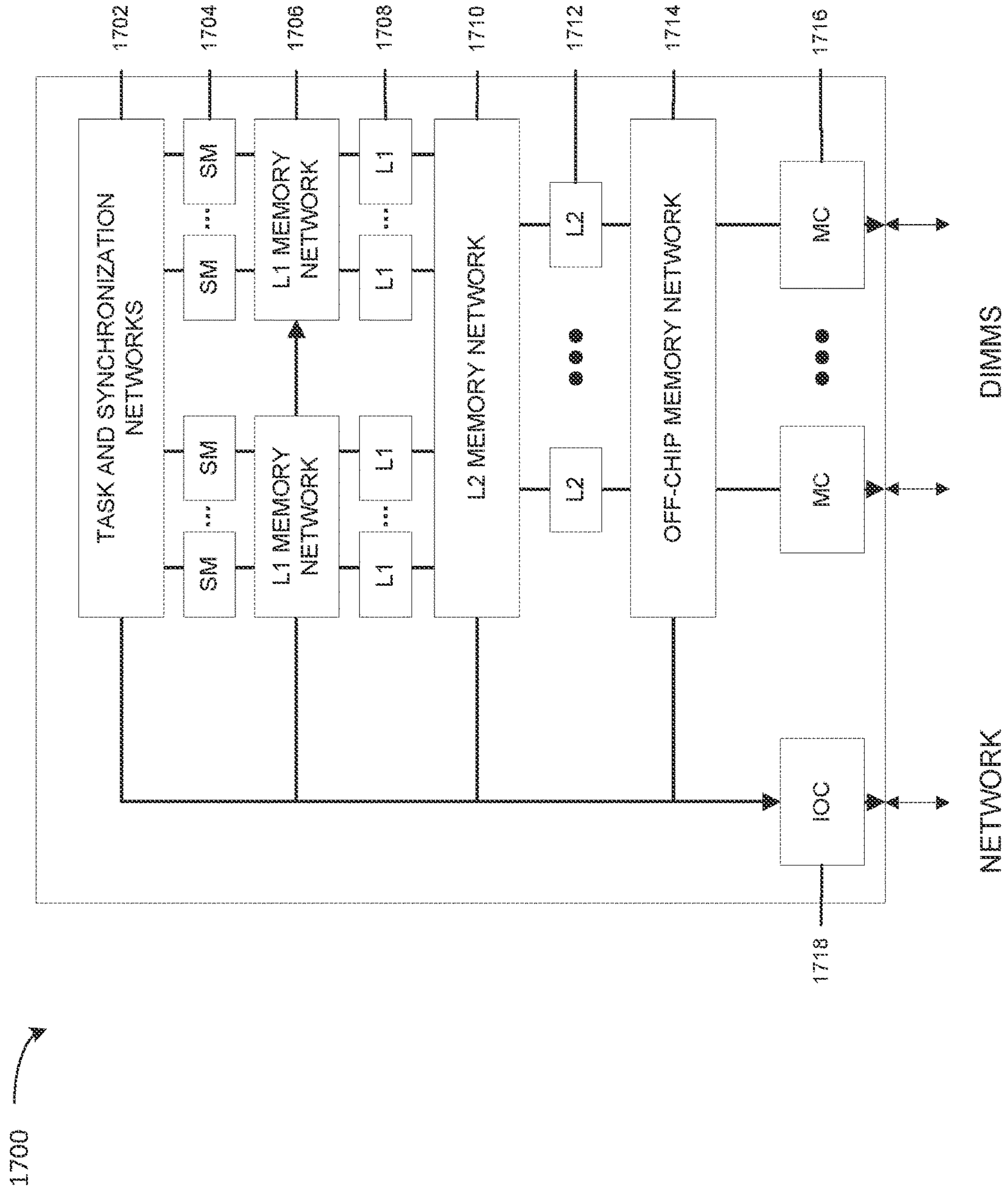
FIG. 17A illustrates a supercomputer at a chip level, in accordance with at least one embodiment.

FIG. 17A illustrates a supercomputer at a chip level, in accordance with at least one embodiment. In at least one embodiment, inside an FPGA or ASIC chip, main computation is performed within finite state machines (1704) called thread units. In at least one embodiment, task and synchronization networks (1702) connect finite state machines and are used to dispatch threads and execute operations in correct order. In at least one embodiment, a multi-level partitioned on-chip cache hierarchy (1708, 1712) is accessed using memory networks (1706, 1710). In at least one embodiment, off-chip memory is accessed using memory controllers (1716) and an off-chip memory network (1714). In at least one embodiment, I/O controller (1718) is used for cross-chip communication when a design does not fit in a single logic chip.

Figure 17B:
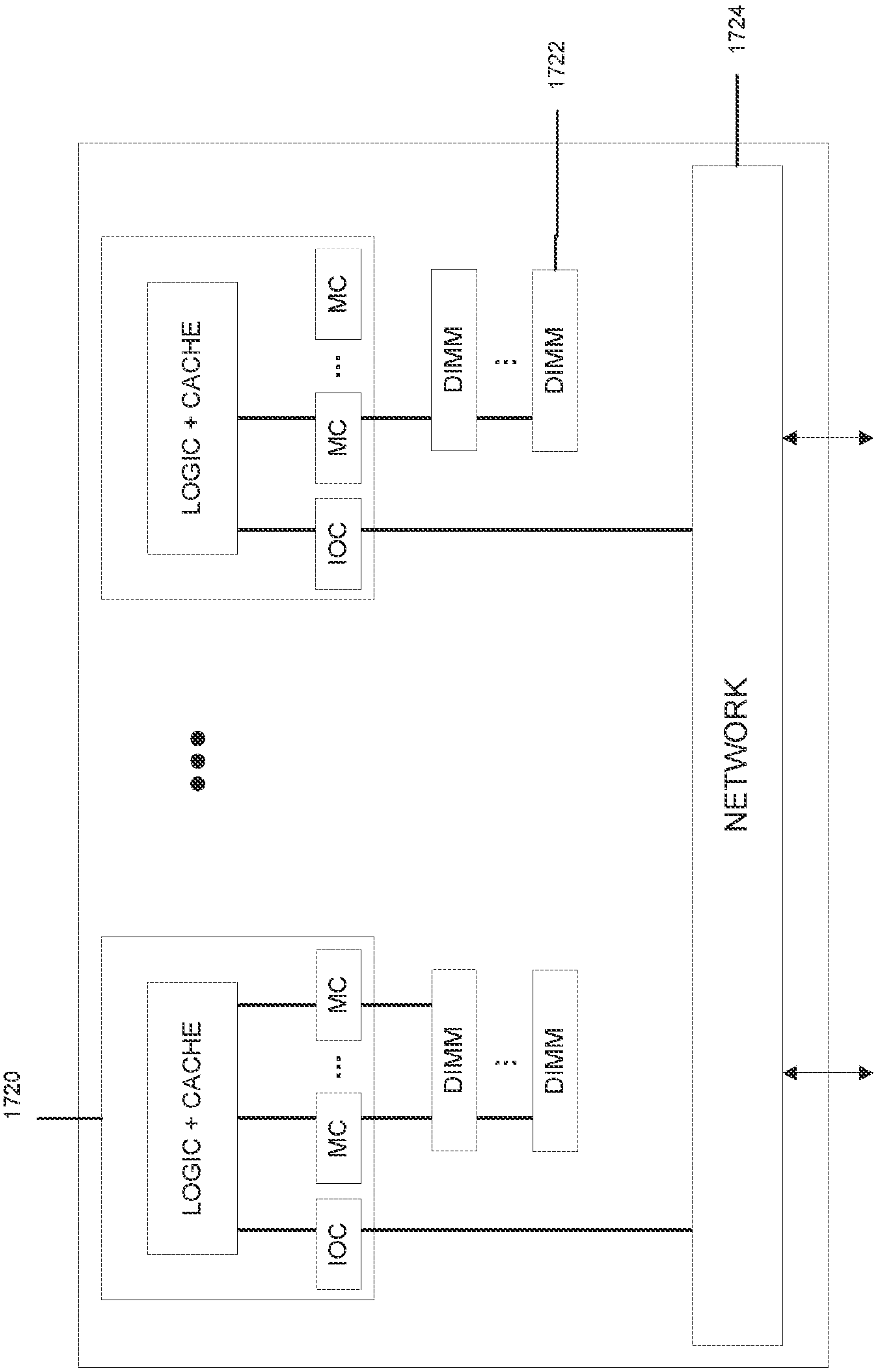
FIG. 17B illustrates a supercomputer at a rack module level, in accordance with at least one embodiment.

FIG. 17B illustrates a supercomputer at a rock module level, in accordance with at least one embodiment. In at least one embodiment, within a rack module, there are multiple FPGA or ASIC chips (1720) that are connected to one or more DRAM units (1722) which constitute main accelerator memory. In at least one embodiment, each FPGA/ASIC chip is connected to its neighbor FPGA/ASIC chip using wide busses on a board, with differential high speed signaling (1724). In at least one embodiment, each FPGA/ASIC chip is also connected to at least one high-speed serial communication cable.

Figure 17C:
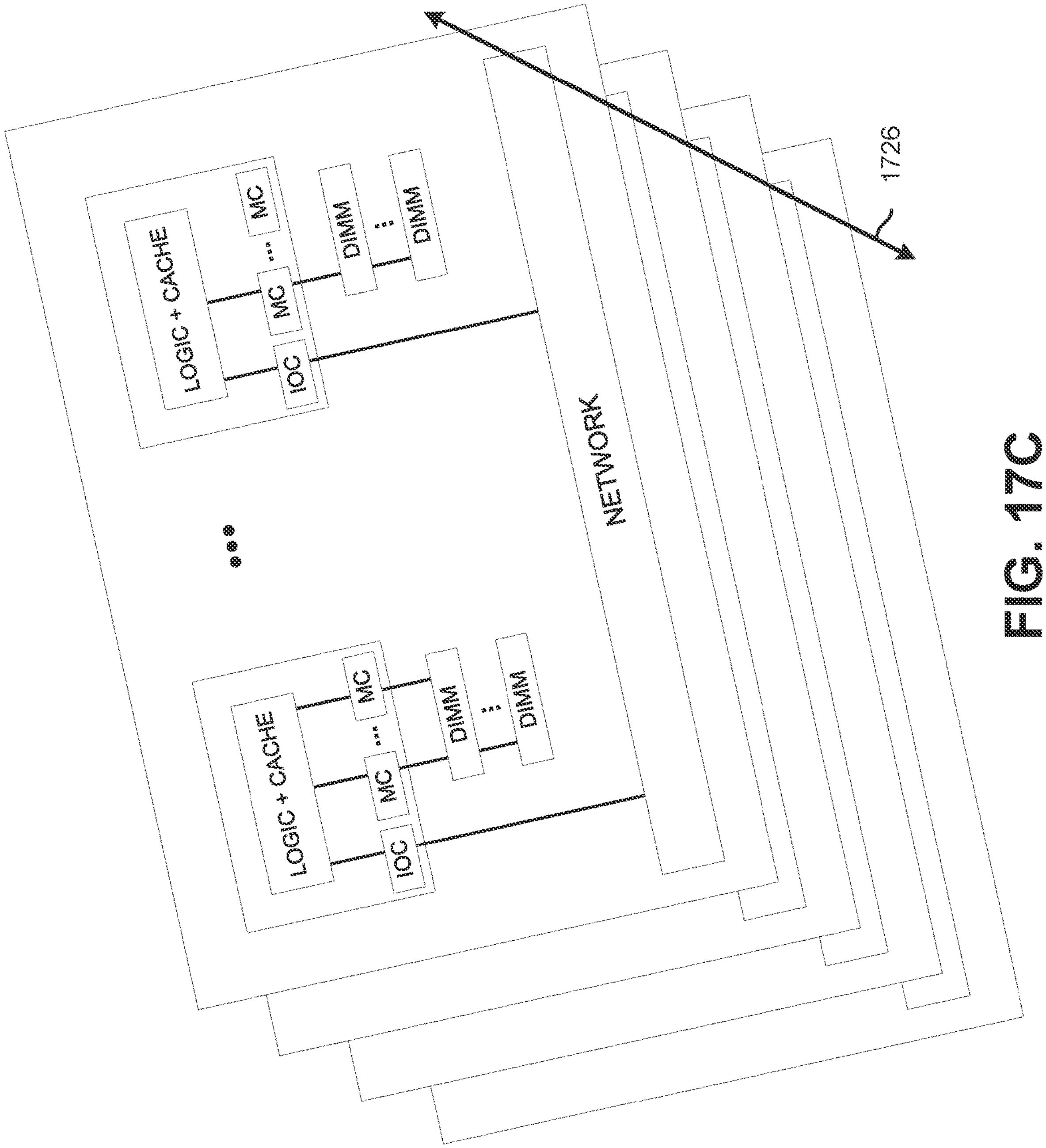
FIG. 17C illustrates a supercomputer at a rack level, in accordance with at least one embodiment.
Figure 17D:
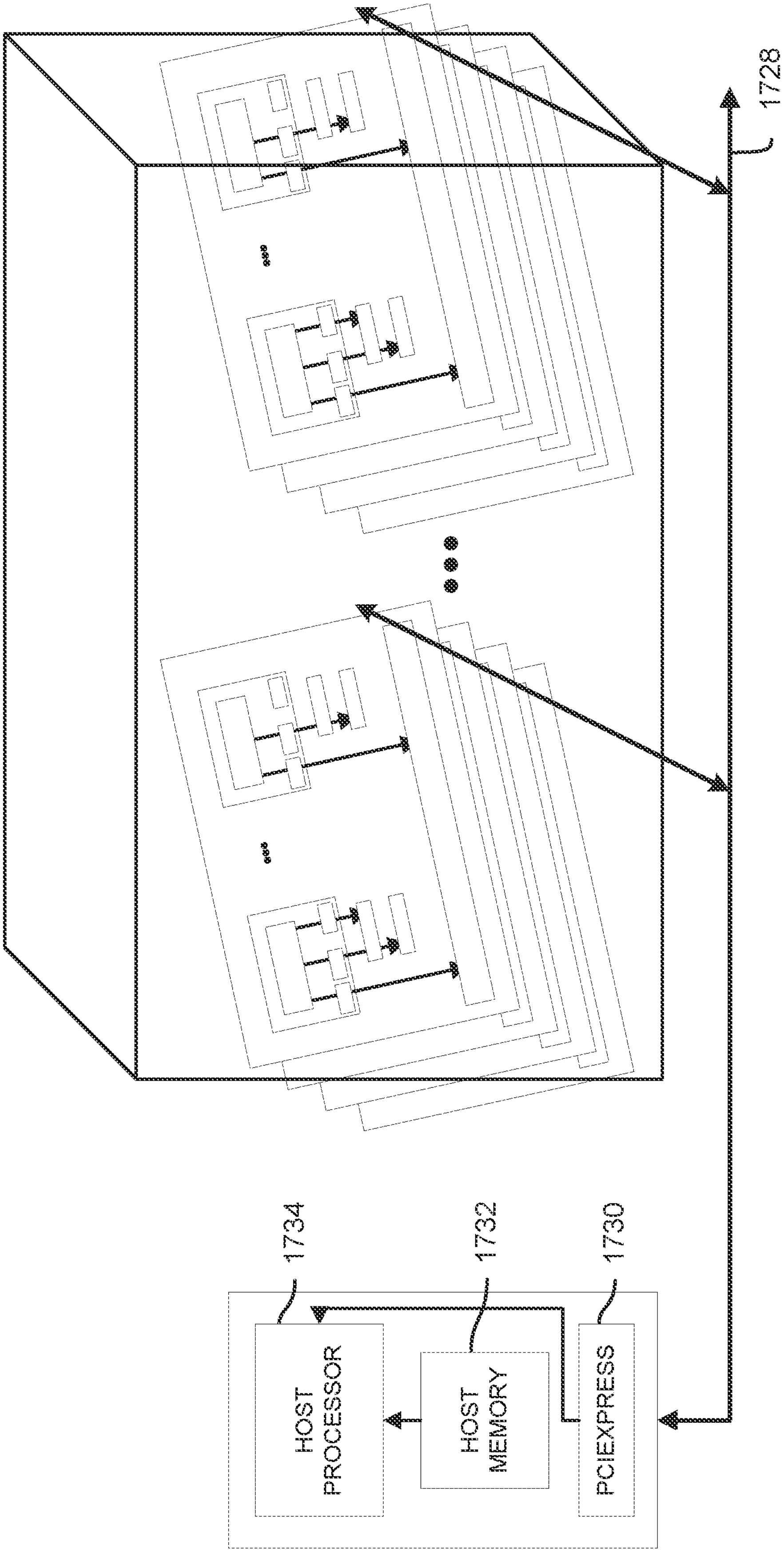
FIG. 17D illustrates a supercomputer at a whole system level, in accordance with at least one embodiment.

FIG. 17C illustrates a supercomputer at a rack level, in accordance with at least one embodiment. FIG. 17D illustrates a supercomputer at a whole system level, in accordance with at least one embodiment. In at least one embodiment, referring to FIG. 17C and FIG. 17D, between rack modules in a rack and across racks throughout an entire system, high-speed serial optical or copper cables (1726, 1728) are used to realize a scalable, possibly incomplete hypercube network. In at least one embodiment, one of FPGA/ASIC chips of an accelerator is connected to a host system through a PCI-Express connection (1730). In at least one embodiment, host system comprises a host microprocessor (1734) that a software part of an application runs on and a memory consisting of one or more host memory DRAM units (1732) that is kept coherent with memory on an accelerator. In at least one embodiment, host system can be a separate module on one of racks, or can be integrated with one of a supercomputer's modules. In at least one embodiment, cube-connected cycles topology provide communication links to create a hypercube network for a large supercomputer. In at least one embodiment, a small group of FPGA/ASIC chips on a rack module can act as a single hypercube node, such that a total number of external links of each group is increased, compared to a single chip. In at least one embodiment, a group contains chips A, B, C and D on a rack module with internal wide differential busses connecting A, B, C and D in a torus organization. In at least one embodiment, there are 12 serial communication cables connecting a rack module to an outside world. In at least one embodiment, chip A on a rack module connects to serial communication cables 0, 1, 2. In at least one embodiment, chip B connects to cables 3, 4, 5. In at least one embodiment, chip C connects to 6, 7, 8. In at least one embodiment, chip D connects to 9, 10, 11. In at least one embodiment, an entire group {A, B, C, D} constituting a rack module can form a hypercube node within a supercomputer system, with up to 212=4096 rack modules (16384 FPGA/ASIC chips). In at least one embodiment, for chip A to send a message out on link 4 of group {A, B, C, D}, a message has to be routed first to chip B with an on-board differential wide bus connection. In at least one embodiment, a message arriving into a group {A, B, C, D} on link 4 (i.e., arriving at B) destined to chip A, also has to be routed first to a correct destination chip (A) internally within a group {A, B, C, D}. In at least one embodiment, parallel supercomputer systems of other sizes may also be implemented.

In at least one embodiment, at least one component shown or described with respect to FIGS. 17A-17D is used to perform techniques and/or functions described in connection with FIGS. 1-13. In at least one embodiment, at least one component shown or described with respect to FIGS. 17A-17D is used to perform operations described herein, such as to detect whether one or more objects within one or more images is likely to be duplicated in an image interpolated using the one or more images. In at least one embodiment, at least one component shown or described with respect to FIGS. 17A-17D is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Computer Systems

Figure 18:
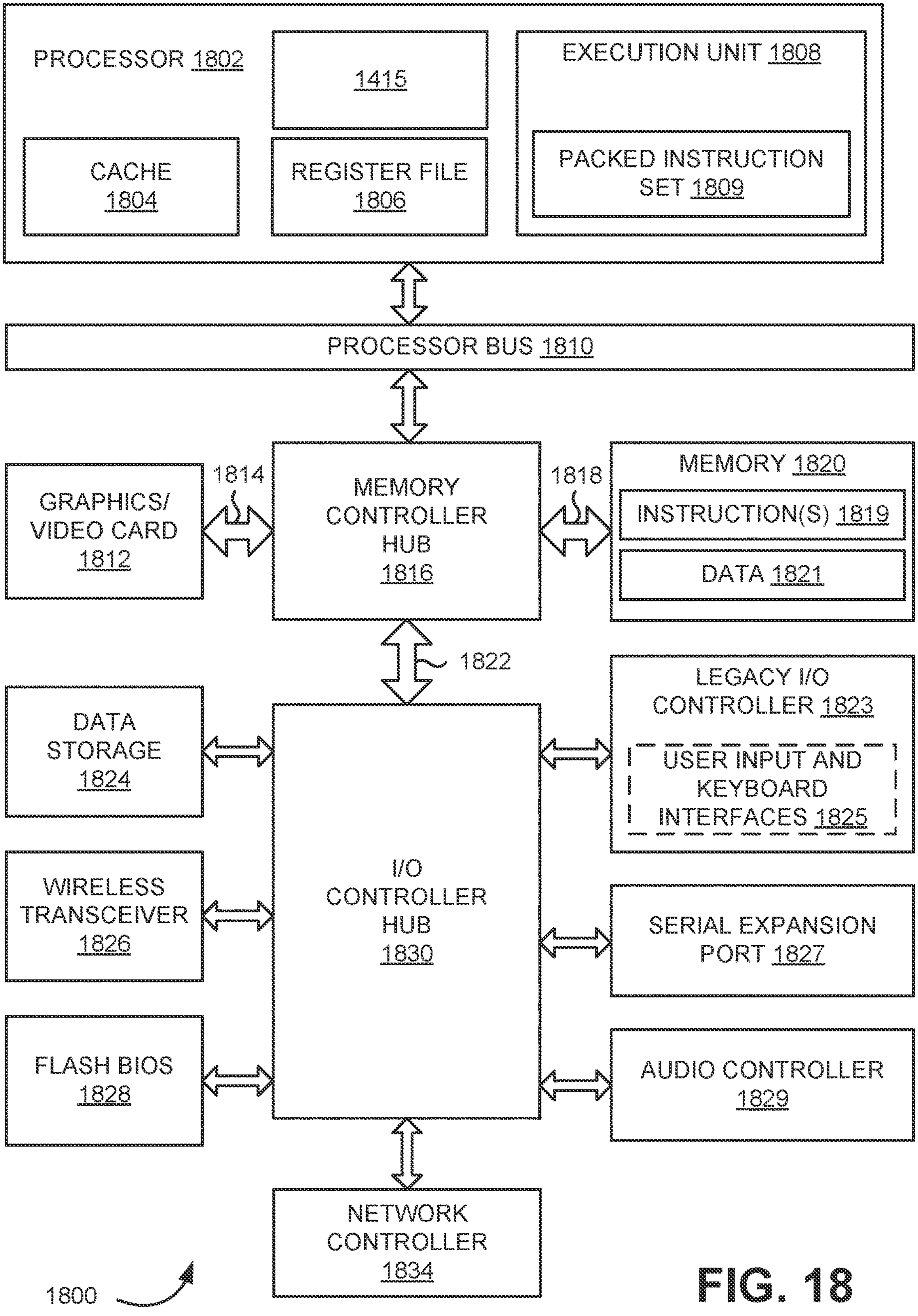
FIG. 18 is a block diagram illustrating a computer system, according to at least one embodiment.

FIG. 18 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 1800 may include, without limitation, a component, such as a processor 1802 to employ execution units including logic to perform algorithms for process data, in accordance with present disclosure, such as in embodiment described herein. In at least one embodiment, computer system 1800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1800 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1800 may include, without limitation, processor 1802 that may include, without limitation, one or more execution units 1808 to perform machine learning model training and/or inferencing according to techniques described herein. In at least one embodiment, computer system 1800 is a single processor desktop or server system, but in another embodiment, computer system 1800 may be a multiprocessor system. In at least one embodiment, processor 1802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1802 may be coupled to a processor bus 1810 that may transmit data signals between processor 1802 and other components in computer system 1800.

In at least one embodiment, processor 1802 may include, without limitation, a Level 1 ("L1") internal cache memory ("cache") 1804. In at least one embodiment, processor 1802 may have a single internal cache or multiple levels of internal cache. In at least one embodiment, cache memory may reside external to processor 1802. Other embodiments may also include a combination of both internal and external caches depending on particular implementation and needs. In at least one embodiment, a register file 1806 may store different types of data in various registers including, without limitation, integer registers, floating point registers, status registers, and an instruction pointer register.

In at least one embodiment, execution unit 1808, including, without limitation, logic to perform integer and floating point operations, also resides in processor 1802. In at least one embodiment, processor 1802 may also include a microcode ("ucode") read only memory ("ROM") that stores microcode for certain macro instructions. In at least one embodiment, execution unit 1808 may include logic to handle a packed instruction set 1809. In at least one embodiment, by including packed instruction set 1809 in an instruction set of a general-purpose processor, along with associated circuitry to execute instructions, operations used by many multimedia applications may be performed using packed data in processor 1802. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 1808 may also be used in microcontrollers, embedded processors, graphics devices, DSPs, and other types of logic circuits. In at least one embodiment, computer system 1800 may include, without limitation, a memory 1820. In at least one embodiment, memory 1820 may be a Dynamic Random Access Memory ("DRAM") device, a Static Random Access Memory ("SRAM") device, a flash memory device, or another memory device. In at least one embodiment, memory 1820 may store instruction(s) 1819 and/or data 1821 represented by data signals that may be executed by processor 1802.

In at least one embodiment, a system logic chip may be coupled to processor bus 1810 and memory 1820. In at least one embodiment, a system logic chip may include, without limitation, a memory controller hub ("MCH") 1816, and processor 1802 may communicate with MCH 1816 via processor bus 1810. In at least one embodiment, MCH 1816 may provide a high bandwidth memory path 1818 to memory 1820 for instruction and data storage and for storage of graphics commands, data and textures. In at least one embodiment, MCH 1816 may direct data signals between processor 1802, memory 1820, and other components in computer system 1800 and to bridge data signals between processor bus 1810, memory 1820, and a system I/O interface 1822. In at least one embodiment, a system logic chip may provide a graphics port for coupling to a graphics controller. In at least one embodiment, MCH 1816 may be coupled to memory 1820 through high bandwidth memory path 1818 and a graphics/video card 1812 may be coupled to MCH 1816 through an Accelerated Graphics Port ("AGP") interconnect 1814.

In at least one embodiment, computer system 1800 may use system I/O interface 1822 as a proprietary hub interface bus to couple MCH 1816 to an I/O controller hub ("ICH") 1830. In at least one embodiment, ICH 1830 may provide direct connections to some I/O devices via a local I/O bus. In at least one embodiment, a local I/O bus may include, without limitation, a high-speed I/O bus for connecting peripherals to memory 1820, a chipset, and processor 1802. Examples may include, without limitation, an audio controller 1829, a firmware hub ("flash BIOS") 1828, a wireless transceiver 1826, a data storage 1824, a legacy I/O controller 1823 containing user input and keyboard interfaces 1825, a serial expansion port 1827, such as a Universal Serial Bus ("USB") port, and a network controller 1834. In at least one embodiment, data storage 1824 may comprise a hard disk drive, a floppy disk drive, a CD-ROM device, a flash memory device, or other mass storage device.

In at least one embodiment, FIG. 18 illustrates a system, which includes interconnected hardware devices or "chips", whereas in other embodiments, FIG. 18 may illustrate an exemplary SoC. In at least one embodiment, devices illustrated in FIG. 18 may be interconnected with proprietary interconnects, standardized interconnects (e.g., PCIe) or some combination thereof. In at least one embodiment, one or more components of computer system 1800 are interconnected using compute express link (CXL) interconnects.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in system FIG. 18 for inferencing or predicting operations based, at least in part, on weight parameters calculated using neural network training operations, neural network functions and/or architectures, or neural network use cases described herein.

In at least one embodiment, at least one component shown or described with respect to FIG. 18 is used to perform techniques and/or functions described in connection with FIGS. 1-13. In at least one embodiment, at least one component shown or described with respect to FIG. 18 is used to perform operations described herein, such as to detect whether one or more objects within one or more images is likely to be duplicated in an image interpolated using the one or more images. In at least one embodiment, at least one component shown or described with respect to 18 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 19:
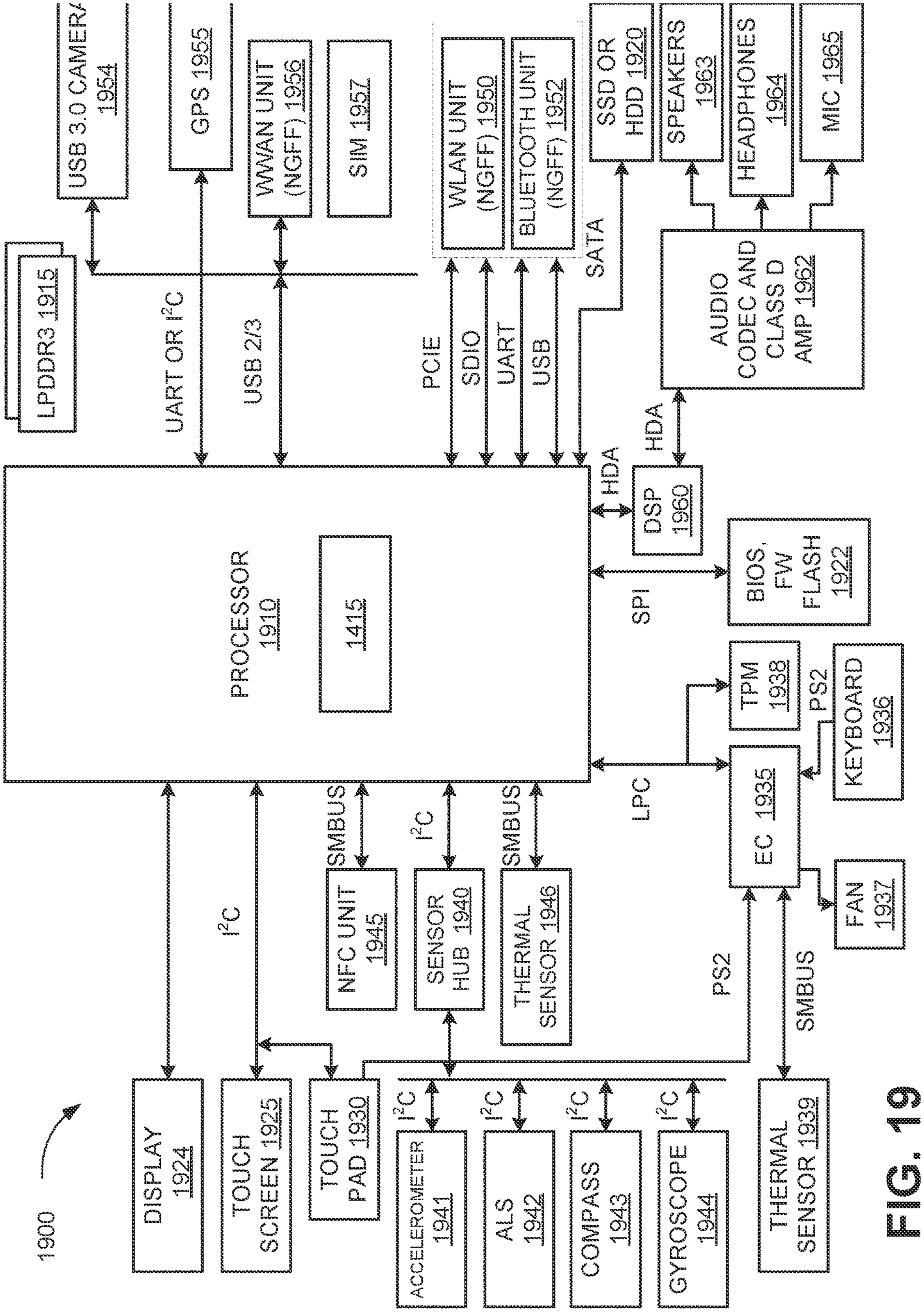
FIG. 19 is a block diagram illustrating a computer system, according to at least one embodiment.

FIG. 19 is a block diagram illustrating an electronic device 1900 for utilizing a processor 1910, according to at least one embodiment. In at least one embodiment, electronic device 1900 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1900 may include, without limitation, processor 1910 communicatively coupled to any suitable number or kind of components, peripherals, modules, or devices. In at least one embodiment, processor 1910 is coupled using a bus or interface, such as a $I^2C$ bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 19 illustrates a system, which includes interconnected hardware devices or "chips", whereas in other embodiments, FIG. 19 may illustrate an exemplary SoC. In at least one embodiment, devices illustrated in FIG. 19 may be interconnected with proprietary interconnects, standardized interconnects (e.g., PCIe) or some combination thereof. In at least one embodiment, one or more components of FIG. 19 are interconnected using compute express link (CXL) interconnects.

In at least one embodiment, FIG. 19 may include a display 1924, a touch screen 1925, a touch pad 1930, a Near Field Communications unit ("NFC") 1945, a sensor hub 1940, a thermal sensor 1946, an Express Chipset ("EC") 1935, a Trusted Platform Module ("TPM") 1938, BIOS/firmware/ flash memory ("BIOS, FW Flash") 1922, a DSP 1960, a drive 1920 such as a Solid State Disk ("SSD") or a Hard Disk Drive ("HDD"), a wireless local area network unit ("WLAN") 1950, a Bluetooth unit 1952, a Wireless Wide Area Network unit ("WWAN") 1956, a Global Positioning System (GPS) unit 1955, a camera ("USB 3.0 camera") 1954 such as a USB 3.0 camera, and/or a Low Power Double Data Rate ("LPDDR") memory unit ("LPDDR3") 1915 implemented in, for example, an LPDDR3 standard. These components may each be implemented in any suitable manner.

In at least one embodiment, other components may be communicatively coupled to processor 1910 through components described herein. In at least one embodiment, an accelerometer 1941, an ambient light sensor ("ALS") 1942, a compass 1943, and a gyroscope 1944 may be communicatively coupled to sensor hub 1940. In at least one embodiment, a thermal sensor 1939, a fan 1937, a keyboard 1936, and touch pad 1930 may be communicatively coupled to EC 1935. In at least one embodiment, speakers 1963, headphones 1964, and a microphone ("mic") 1965 may be communicatively coupled to an audio unit ("audio codec and class D amp") 1962, which may in turn be communicatively coupled to DSP 1960. In at least one embodiment, audio unit 1962 may include, for example and without limitation, an audio coder/decoder ("codec") and a class D amplifier. In at least one embodiment, a SIM card ("SIM") 1957 may be communicatively coupled to WWAN unit 1956. In at least one embodiment, components such as WLAN unit 1950 and Bluetooth unit 1952, as well as WWAN unit 1956 may be implemented in a Next Generation Form Factor ("NGFF").

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in system FIG. 19 for inferencing or predicting operations based, at least in part, on weight parameters calculated using network use cases described herein.

In at least one embodiment, at least one component shown or described with respect to FIG. 19 is used to perform techniques and/or functions described in connection with FIGS. 1-13. In at least one embodiment, at least one component shown or described with respect to FIG. 19 is used to perform operations described herein, such as to detect whether one or more objects within one or more images is likely to be duplicated in an image interpolated using the one or more images. In at least one embodiment, at least one component shown or described with respect to FIG. 19 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 20:
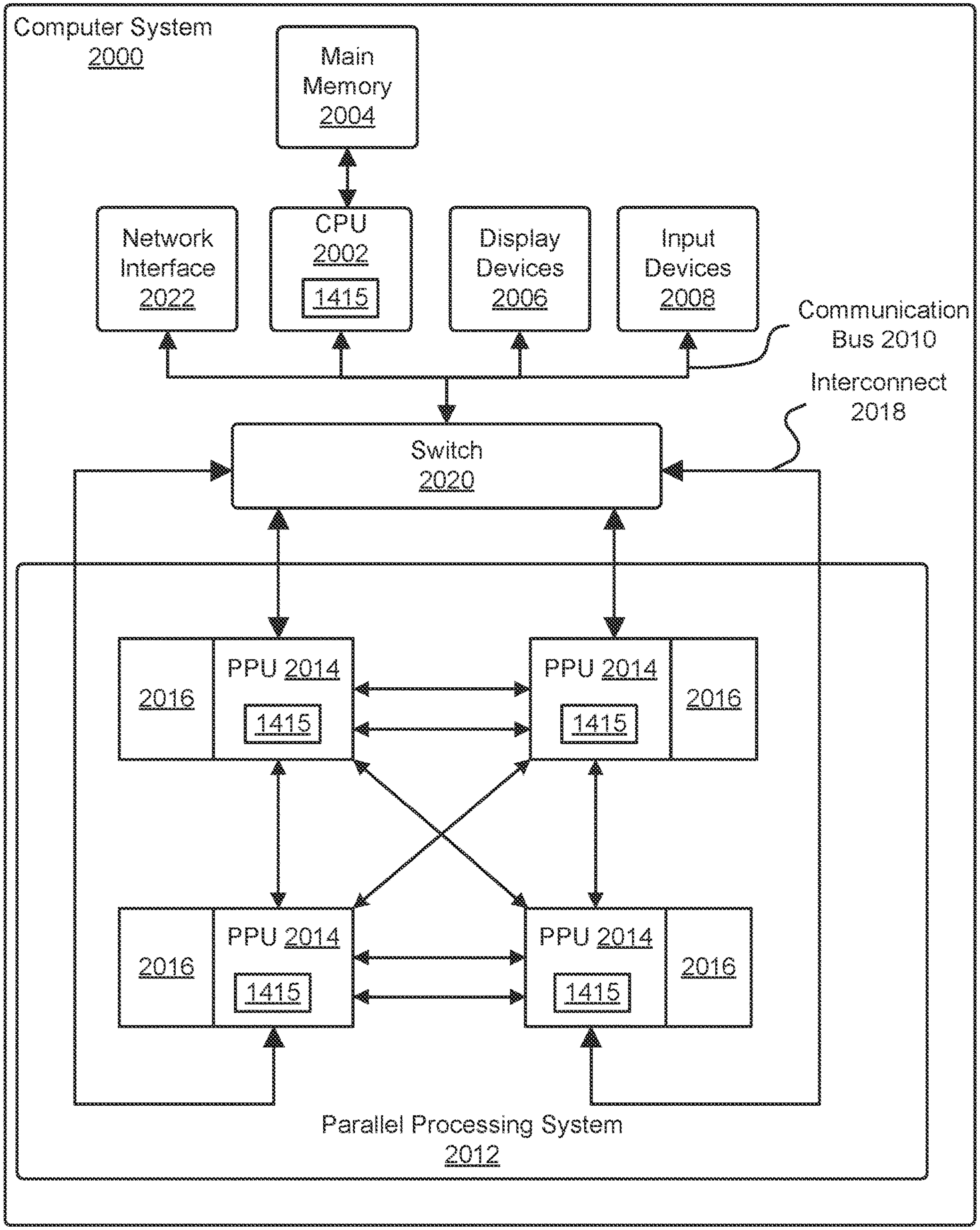
FIG. 20 illustrates a computer system, according to at least one embodiment.

FIG. 20 illustrates a computer system 2000, according to at least one embodiment. In at least one embodiment, computer system 2000 is configured to implement various processes and methods described throughout this disclosure.

In at least one embodiment, computer system 2000 comprises, without limitation, at least one central processing unit ("CPU") 2002 that is connected to a communication bus 2010 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 2000 includes, without limitation, a main memory 2004 and control logic (e.g., implemented as hardware, software, or a combination thereof) and data are stored in main memory 2004, which may take form of random access memory ("RAM"). In at least one embodiment, a network interface subsystem ("network interface") 2022 provides an interface to other computing devices and networks for receiving data from and transmitting data to other systems with computer system 2000.

In at least one embodiment, computer system 2000, in at least one embodiment, includes, without limitation, input devices 2008, a parallel processing system 2012, and display devices 2006 that can be implemented using a conventional cathode ray tube ("CRT"), a liquid crystal display ("LCD"), a light emitting diode ("LED") display, a plasma display, or other suitable display technologies. In at least one embodiment, user input is received from input devices 2008 such as keyboard, mouse, touchpad, microphone, etc. In at least one embodiment, each module described herein can be situated on a single semiconductor platform to form a processing system.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in system FIG. 20 for inferencing or predicting operations based, at least in part, on weight parameters calculated using neural network training operations, neural network functions and/or architectures, or neural network use cases described herein.

In at least one embodiment, at least one component shown or described with respect to FIG. 20 is used to perform techniques and/or functions described in connection with FIGS. 1-13. In at least one embodiment, at least one component shown or described with respect to FIG. 20 is used to perform operations described herein, such as to detect whether one or more objects within one or more images is likely to be duplicated in an image interpolated using the one or more images. In at least one embodiment, at least one component shown or described with respect to FIG. 20 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 21:
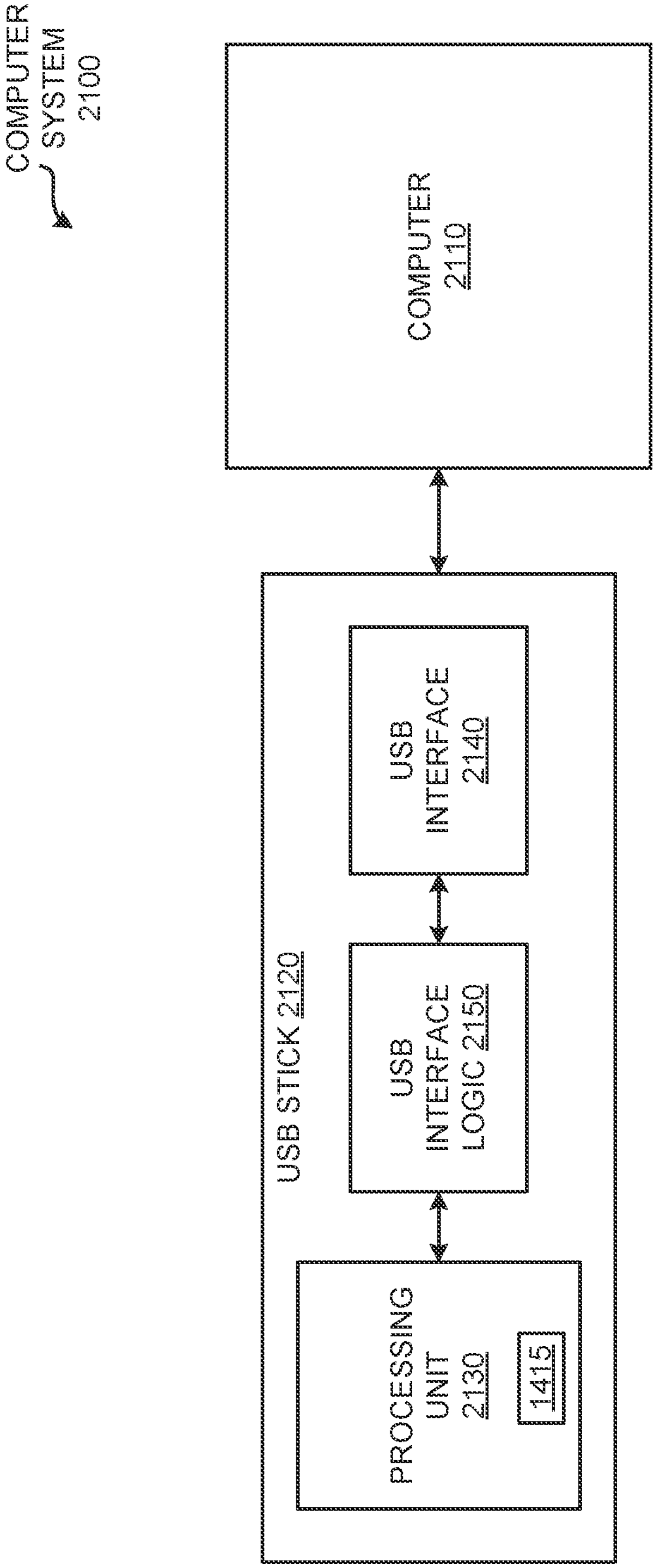
FIG. 21 illustrates a computer system, according to at least one embodiment.

FIG. 21 illustrates a computer system 2100, according to at least one embodiment. In at least one embodiment, computer system 2100 includes, without limitation, a computer 2110 and a USB stick 2120. In at least one embodiment, computer 2110 may include, without limitation, any number and type of processor(s) (not shown) and a memory (not shown). In at least one embodiment, computer 2110 includes, without limitation, a server, a cloud instance, a laptop, and a desktop computer.

In at least one embodiment, USB stick 2120 includes, without limitation, a processing unit 2130, a USB interface 2140, and USB interface logic 2150. In at least one embodiment, processing unit 2130 may be any instruction execution system, apparatus, or device capable of executing instructions. In at least one embodiment, processing unit 2130 may include, without limitation, any number and type of processing cores (not shown). In at least one embodiment, processing unit 2130 comprises an application specific integrated circuit ("ASIC") that is optimized to perform any amount and type of operations associated with machine learning. For instance, in at least one embodiment, processing unit 2130 is a tensor processing unit ("TPC") that is optimized to perform machine learning inference operations. In at least one embodiment, processing unit 2130 is a vision processing unit ("VPU") that is optimized to perform machine vision and machine learning inference operations.

In at least one embodiment, USB interface 2140 may be any type of USB connector or USB socket. For instance, in at least one embodiment, USB interface 2140 is a USB 3.0 Type-C socket for data and power. In at least one embodiment, USB interface 2140 is a USB 3.0 Type-A connector. In at least one embodiment, USB interface logic 2150 may include any amount and type of logic that enables processing unit 2130 to interface with devices (e.g., computer 2110) via USB connector 2140.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in system FIG. 21 for inferencing or predicting operations based, at least in part, on weight parameters calculated using neural network training operations, neural network functions and/or architectures, or neural network use cases described herein.

In at least one embodiment, at least one component shown or described with respect to FIG. 21 is used to perform techniques and/or functions described in connection with FIGS. 1-13. In at least one embodiment, at least one component shown or described with respect to FIG. 21 is used to perform operations described herein, such as to detect whether one or more objects within one or more images is likely to be duplicated in an image interpolated using the one or more images. In at least one embodiment, at least one component shown or described with respect to FIG. 21 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 22A:
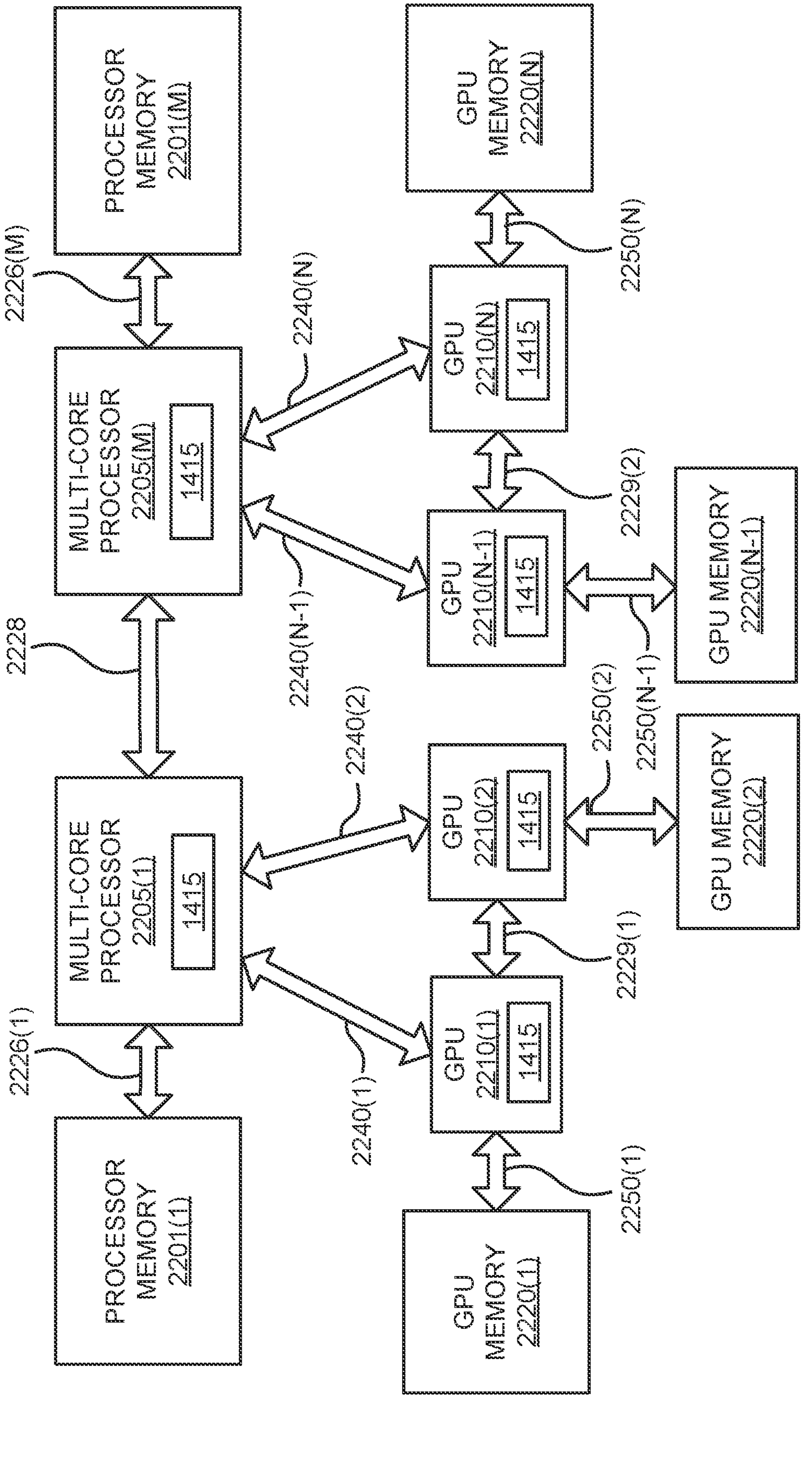
FIG. 22A illustrates a computer system, according to at least one embodiment.

FIG. 22A illustrates an exemplary architecture in which a plurality of GPUs 2210(1)-2210(N) is communicatively coupled to a plurality of multi-core processors 2205(1)-2205(M) over high-speed links 2240(1)-2240(N) (e.g., buses, point-to-point interconnects, etc.). In at least one embodiment, high-speed links 2240(1)-2240(N) support a communication throughput of 4 GB/s, 30 GB/s, 80 GB/s or higher. In at least one embodiment, various interconnect protocols may be used including, but not limited to, PCIe 4.0 or 5.0 and NVLink 2.0. In various figures, "N" and "M" represent positive integers, values of which may be different from figure to figure.

In addition, and in at least one embodiment, two or more of GPUs 2210 are interconnected over high-speed links 2229(1)-2229(2), which may be implemented using similar or different protocols/links than those used for high-speed links 2240(1)-2240(N). Similarly, two or more of multi-core processors 2205 may be connected over a high-speed link 2228 which may be symmetric multi-processor (SMP) buses operating at 20 GB/s, 30 GB/s, 120 GB/s or higher. Alternatively, all communication between various system components shown in FIG. 22A may be accomplished using similar protocols/links (e.g., over a common interconnection fabric).

In at least one embodiment, each multi-core processor 2205 is communicatively coupled to a processor memory 2201(1)-2201(M), via memory interconnects 2226(1)-2226(M), respectively, and each GPU 2210(1)-2210(N) is communicatively coupled to GPU memory 2220(1)-2220(N) over GPU memory interconnects 2250(1)-2250(N), respectively. In at least one embodiment, memory interconnects 2226 and 2250 may utilize similar or different memory access technologies. By way of example, and not limitation, processor memories 2201(1)-2201(M) and GPU memories 2220 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In at least one embodiment, some portion of processor memories 2201 may be volatile memory and another portion may be non-volatile memory (e.g., using a two-level memory (2LM) hierarchy).

As described herein, although various multi-core processors 2205 and GPUs 2210 may be physically coupled to a particular memory 2201, 2220, respectively, and/or a unified memory architecture may be implemented in which a virtual system address space (also referred to as "effective address" space) is distributed among various physical memories. For example, processor memories 2201(1)-2201(M) may each comprise 64 GB of system memory address space and GPU memories 2220(1)-2220(N) may each comprise 32 GB of system memory address space resulting in a total of 256 GB addressable memory when M=2 and N=4. Other values for N and M are possible.

Figure 22B:
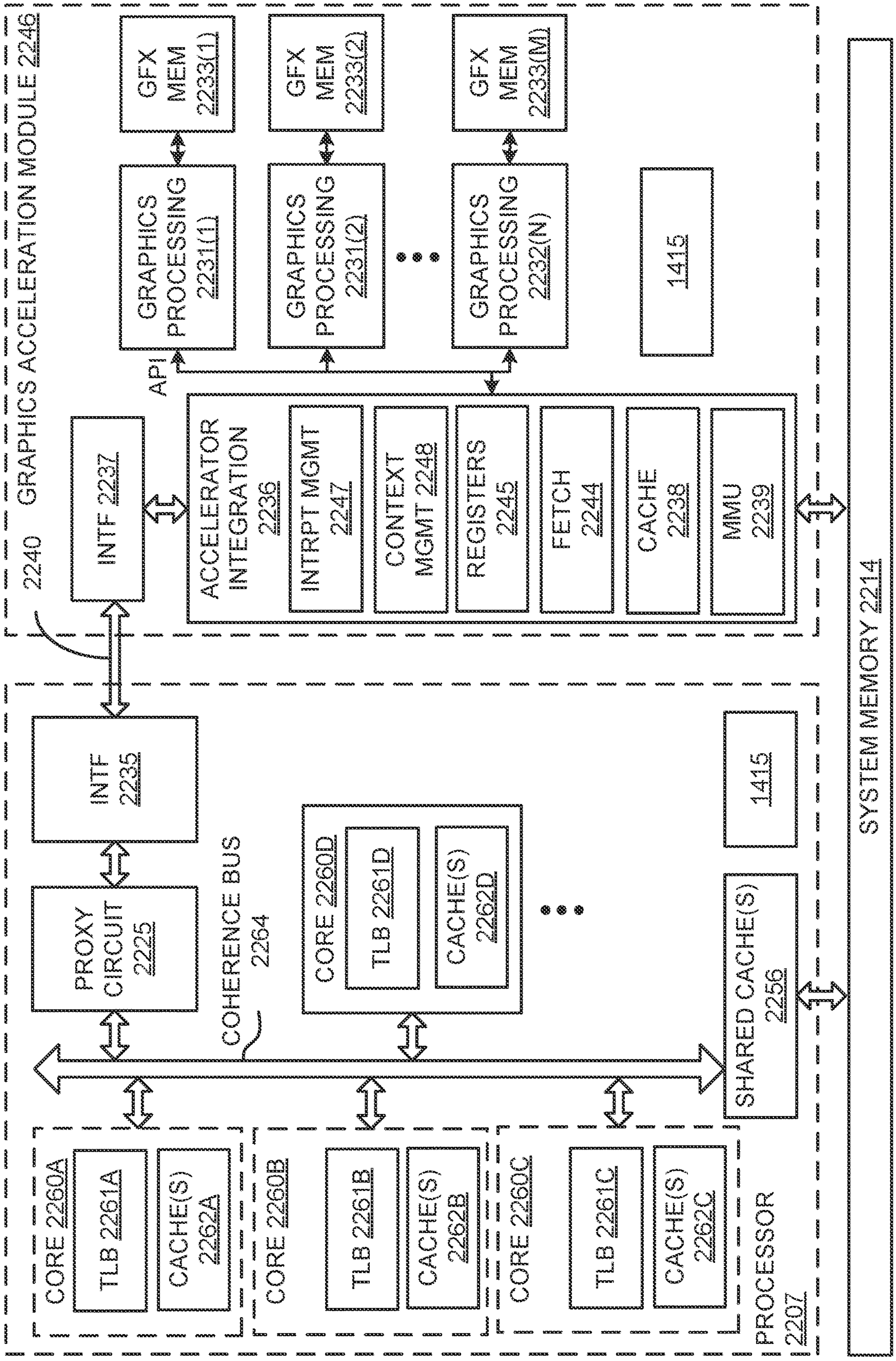
FIG. 22B illustrates a computer system, according to at least one embodiment.

FIG. 22B illustrates additional details for an interconnection between a multi-core processor 2207 and a graphics acceleration module 2246 in accordance with one exemplary embodiment. In at least one embodiment, graphics acceleration module 2246 may include one or more GPU chips integrated on a line card which is coupled to processor 2207 via high-speed link 2240 (e.g., a PCIe bus, NVLink, etc.). In at least one embodiment, graphics acceleration module 2246 may alternatively be integrated on a package or chip with processor 2207.

In at least one embodiment, processor 2207 includes a plurality of cores 2260A-2260D, each with a translation lookaside buffer ("TLB") 2261A-2261D and one or more caches 2262A-2262D. In at least one embodiment, cores 2260A-2260D may include various other components for executing instructions and processing data that are not illustrated. In at least one embodiment, caches 2262A-2262D may comprise Level 1 (L1) and Level 2 (L2) caches. In addition, one or more shared caches 2256 may be included in caches 2262A-2262D and shared by sets of cores 2260A-2260D. For example, one embodiment of processor 2207 includes 24 cores, each with its own L1 cache, twelve shared L2 caches, and twelve shared L3 caches. In this embodiment, one or more L2 and L3 caches are shared by two adjacent cores. In at least one embodiment, processor 2207 and graphics acceleration module 2246 connect with system memory 2214, which may include processor memories 2201(1)-2201(M) of FIG. 22A.

In at least one embodiment, coherency is maintained for data and instructions stored in various caches 2262A-2262D, 2256 and system memory 2214 via inter-core communication over a coherence bus 2264. In at least one embodiment, for example, each cache may have cache coherency logic/circuitry associated therewith to communicate to over coherence bus 2264 in response to detected reads or writes to particular cache lines. In at least one embodiment, a cache snooping protocol is implemented over coherence bus 2264 to snoop cache accesses.

In at least one embodiment, a proxy circuit 2225 communicatively couples graphics acceleration module 2246 to coherence bus 2264, allowing graphics acceleration module 2246 to participate in a cache coherence protocol as a peer of cores 2260A-2260D. In particular, in at least one embodiment, an interface 2235 provides connectivity to proxy circuit 2225 over high-speed link 2240 and an interface 2237 connects graphics acceleration module 2246 to high-speed link 2240.

In at least one embodiment, an accelerator integration circuit 2236 provides cache management, memory access, context management, and interrupt management services on behalf of a plurality of graphics processing engines 2231(1)-2231(N) of graphics acceleration module 2246. In at least one embodiment, graphics processing engines 2231(1)-2231(N) may each comprise a separate graphics processing unit (GPU). In at least one embodiment, graphics processing engines 2231(1)-2231(N) alternatively may comprise different types of graphics processing engines within a GPU, such as graphics execution units, media processing engines (e.g., video encoders/decoders), samplers, and blit engines. In at least one embodiment, graphics acceleration module 2246 may be a GPU with a plurality of graphics processing engines 2231(1)-2231(N) or graphics processing engines 2231(1)-2231(N) may be individual GPUs integrated on a common package, line card, or chip.

In at least one embodiment, accelerator integration circuit 2236 includes a memory management unit (MMU) 2239 for performing various memory management functions such as virtual-to-physical memory translations (also referred to as effective-to-real memory translations) and memory access protocols for accessing system memory 2214. In at least one embodiment, MMU 2239 may also include a translation lookaside buffer (TLB) (not shown) for caching virtual/effective to physical/real address translations. In at least one embodiment, a cache 2238 can store commands and data for efficient access by graphics processing engines 2231(1)-2231(N). In at least one embodiment, data stored in cache 2238 and graphics memories 2233(1)-2233(M) is kept coherent with core caches 2262A-2262D, 2256 and system memory 2214, possibly using a fetch unit 2244. As mentioned, this may be accomplished via proxy circuit 2225 on behalf of cache 2238 and memories 2233(1)-2233(M) (e.g., sending updates to cache 2238 related to modifications/accesses of cache lines on processor caches 2262A-2262D, 2256 and receiving updates from cache 2238).

In at least one embodiment, a set of registers 2245 store context data for threads executed by graphics processing engines 2231(1)-2231(N) and a context management circuit 2248 manages thread contexts. For example, context management circuit 2248 may perform save and restore operations to save and restore contexts of various threads during contexts switches (e.g., where a first thread is saved and a second thread is stored so that a second thread can be execute by a graphics processing engine). For example, on a context switch, context management circuit 2248 may store current register values to a designated region in memory (e.g., identified by a context pointer). It may then restore register values when returning to a context. In at least one embodiment, an interrupt management circuit 2247 receives and processes interrupts received from system devices.

In at least one embodiment, virtual/effective addresses from a graphics processing engine 2231 are translated to real/physical addresses in system memory 2214 by MMU 2239. In at least one embodiment, accelerator integration circuit 2236 supports multiple (e.g., 4, 8, 16) graphics accelerator modules 2246 and/or other accelerator devices. In at least one embodiment, graphics accelerator module 2246 may be dedicated to a single application executed on processor 2207 or may be shared between multiple applications. In at least one embodiment, a virtualized graphics execution environment is presented in which resources of graphics processing engines 2231(1)-2231(N) are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 2236 performs as a bridge to a system for graphics acceleration module 2246 and provides address translation and system memory cache services. In addition, in at least one embodiment, accelerator integration circuit 2236 may provide virtualization facilities for a host processor to manage virtualization of graphics processing engines 2231(1)-2231(N), interrupts, and memory management.

In at least one embodiment, because hardware resources of graphics processing engines 2231(1)-2231(N) are mapped explicitly to a real address space seen by host processor 2207, any host processor can address these resources directly using an effective address value. In at least one embodiment, one function of accelerator integration circuit 2236 is physical separation of graphics processing engines 2231(1)-2231(N) so that they appear to a system as independent units.

In at least one embodiment, one or more graphics memories 2233(1)-2233(M) are coupled to each of graphics processing engines 2231(1)-2231(N), respectively and N=M. In at least one embodiment, graphics memories 2233(1)-2233(M) store instructions and data being processed by each of graphics processing engines 2231(1)-2231(N). In at least one embodiment, graphics memories 2233(1)-2233(M) may be volatile memories such as DRAMs (including stacked DRAMs), GDDR memory (e.g., GDDR5, GDDR6), or HBM, and/or may be non-volatile memories such as 3D XPoint or Nano-Ram.

In at least one embodiment, to reduce data traffic over high-speed link 2240, biasing techniques can be used to ensure that data stored in graphics memories 2233(1)-2233(M) is data that will be used most frequently by graphics processing engines 2231(1)-2231(N) and preferably not used by cores 2260A-2260D (at least not frequently). Similarly, in at least one embodiment, a biasing mechanism attempts to keep data needed by cores (and preferably not graphics processing engines 2231(1)-2231(N)) within caches 2262A-2262D, 2256 and system memory 2214.

Figure 22C:
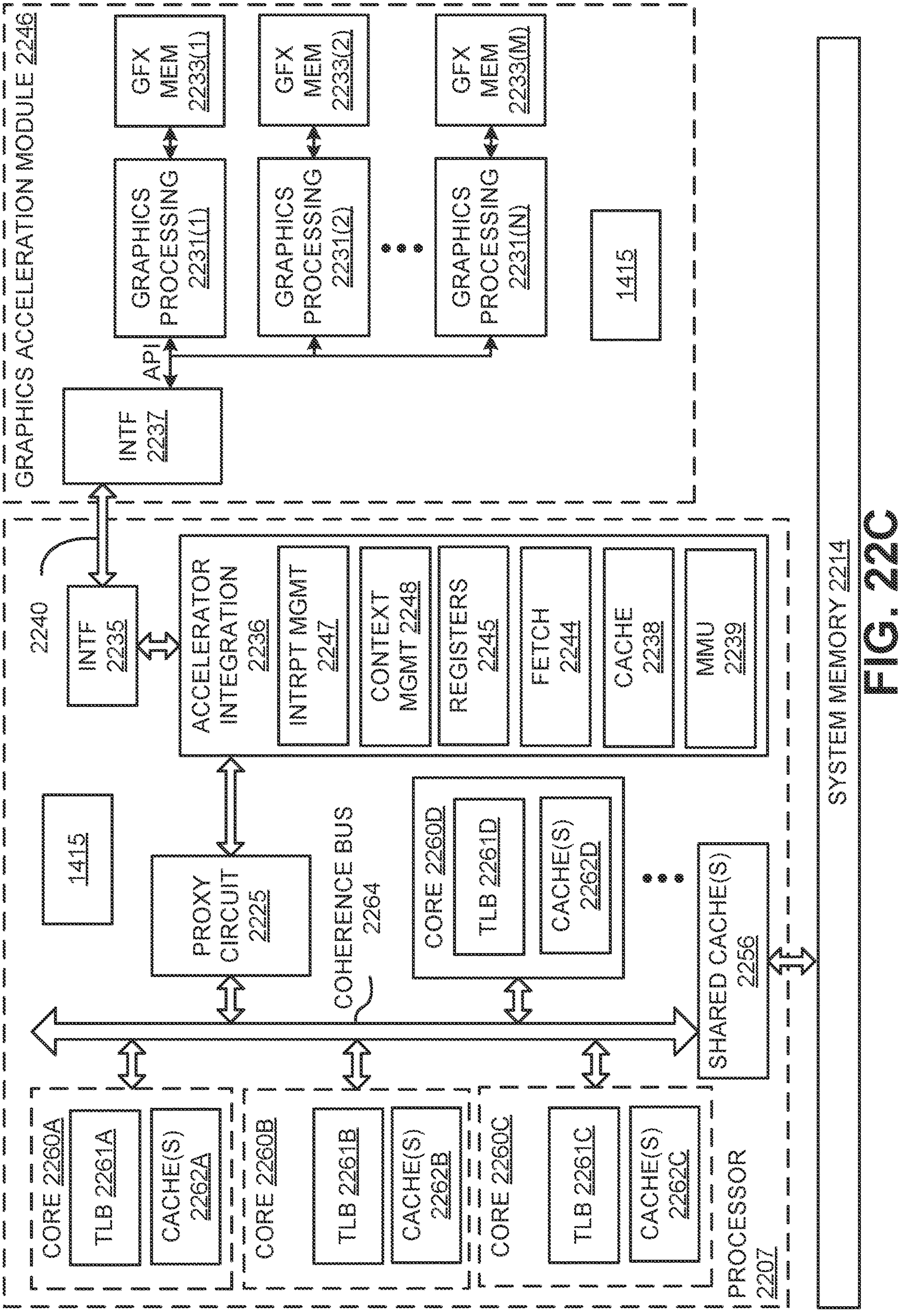
FIG. 22C illustrates a computer system, according to at least one embodiment.

FIG. 22C illustrates another exemplary embodiment in which accelerator integration circuit 2236 is integrated within processor 2207. In this embodiment, graphics processing engines 2231(1)-2231(N) communicate directly over high-speed link 2240 to accelerator integration circuit 2236 via interface 2237 and interface 2235 (which, again, may be any form of bus or interface protocol). In at least one embodiment, accelerator integration circuit 2236 may perform similar operations as those described with respect to FIG. 22B, but potentially at a higher throughput given its close proximity to coherence bus 2264 and caches 2262A-2262D, 2256. In at least one embodiment, an accelerator integration circuit supports different programming models including a dedicated-process programming model (no graphics acceleration module virtualization) and shared programming models (with virtualization), which may include programming models which are controlled by accelerator integration circuit 2236 and programming models which are controlled by graphics acceleration module 2246.

In at least one embodiment, graphics processing engines 2231(1)-2231(N) are dedicated to a single application or process under a single operating system. In at least one embodiment, a single application can funnel other application requests to graphics processing engines 2231(1)-2231(N), providing virtualization within a VM/partition.

In at least one embodiment, graphics processing engines 2231(1)-2231(N), may be shared by multiple VM/application partitions. In at least one embodiment, shared models may use a system hypervisor to virtualize graphics processing engines 2231(1)-2231(N) to allow access by each operating system. In at least one embodiment, for single-partition systems without a hypervisor, graphics processing engines 2231(1)-2231(N) are owned by an operating system. In at least one embodiment, an operating system can virtualize graphics processing engines 2231(1)-2231(N) to provide access to each process or application.

In at least one embodiment, graphics acceleration module 2246 or an individual graphics processing engine 2231(1)-2231(N) selects a process element using a process handle. In at least one embodiment, process elements are stored in system memory 2214 and are addressable using an effective address to real address translation technique described herein. In at least one embodiment, a process handle may be an implementation-specific value provided to a host process when registering its context with graphics processing engine 2231(1)-2231(N) (that is, calling system software to add a process element to a process element linked list). In at least one embodiment, a lower 16-bits of a process handle may be an offset of a process element within a process element linked list.

Figure 22D:
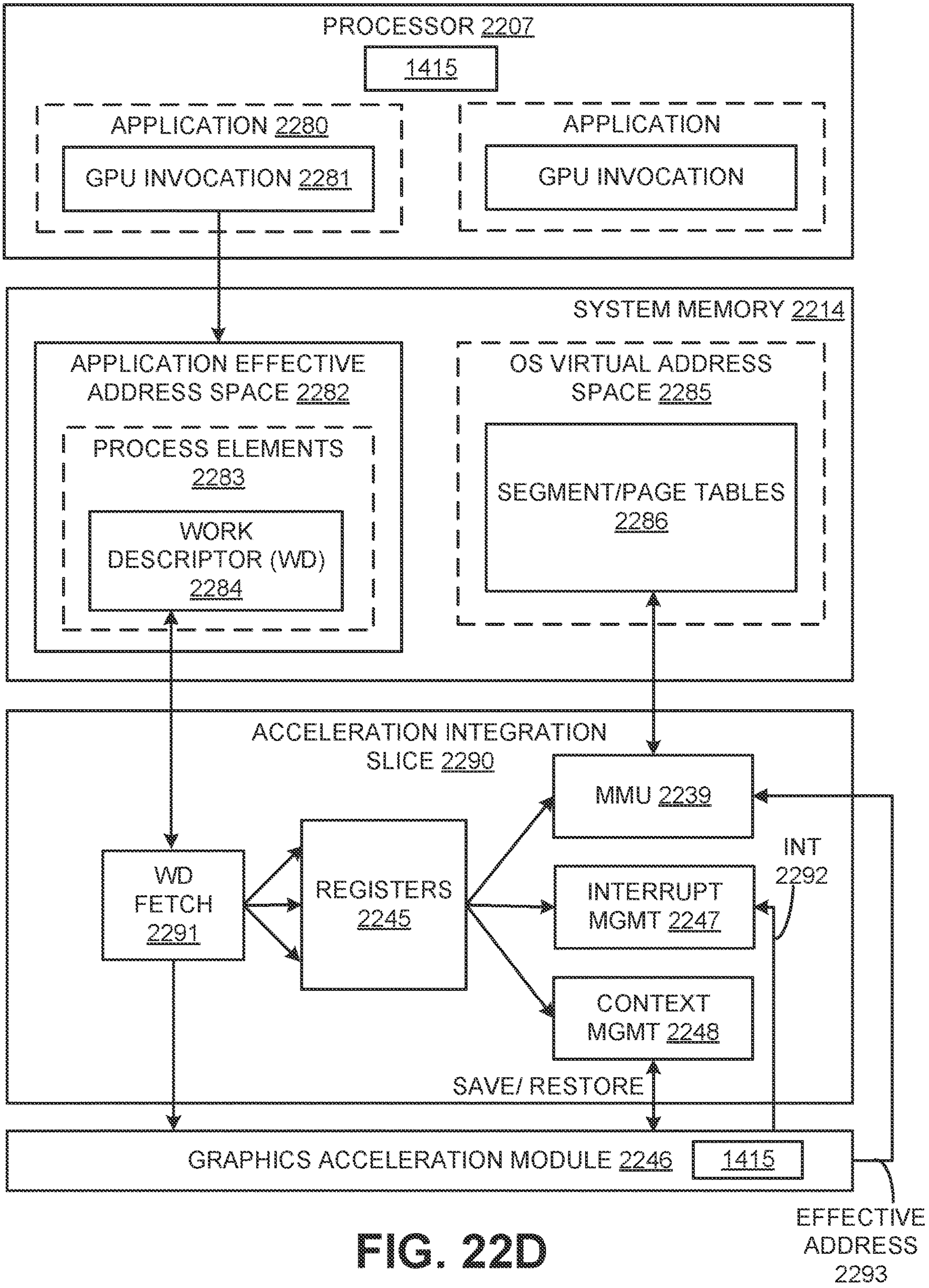
FIG. 22D illustrates a computer system, according to at least one embodiment.

FIG. 22D illustrates an exemplary accelerator integration slice 2290. In at least one embodiment, a "slice" comprises a specified portion of processing resources of accelerator integration circuit 2236. In at least one embodiment, an application is effective address space 2282 within system memory 2214 stores process elements 2283. In at least one embodiment, process elements 2283 are stored in response to GPU invocations 2281 from applications 2280 executed on processor 2207. In at least one embodiment, a process element 2283 contains process state for corresponding application 2280. In at least one embodiment, a work descriptor (WD) 2284 contained in process element 2283 can be a single job requested by an application or may contain a pointer to a queue of jobs. In at least one embodiment, WD 2284 is a pointer to a job request queue in an application's effective address space 2282. In at least one embodiment, accelerator integration slice 2290 is also referred to as a "render slice", where said render slice comprises one or more cores or "processing cores" to perform upsampling or upscaling operations (e.g., upsample a low-resolution or lower-resolution image or frame to a high-resolution or higher-resolution image or frame). In at least one embodiment, accelerator integration slice 2290 comprises one or more ray tracing units, L1 caches, L2 caches. In at least one embodiment, accelerator integration slice 2290 comprises one or more cores, where each of said one or more cores comprises one or more vector engines that are to compute vector values as part of performing operations.

In at least one embodiment, graphics acceleration module 2246 and/or individual graphics processing engines 2231(1)-2231(N) can be shared by all or a subset of processes in a system. In at least one embodiment, an infrastructure for setting up process states and sending a WD 2284 to a graphics acceleration module 2246 to start a job in a virtualized environment may be included.

In at least one embodiment, a dedicated-process programming model is implementation-specific. In at least one embodiment, in this model, a single process owns graphics acceleration module 2246 or an individual graphics processing engine 2231. In at least one embodiment, when graphics acceleration module 2246 is owned by a single process, a hypervisor initializes accelerator integration circuit 2236 for an owning partition and an operating system initializes accelerator integration circuit 2236 for an owning process when graphics acceleration module 2246 is assigned.

In at least one embodiment, in operation, a WD fetch unit 2291 in accelerator integration slice 2290 fetches next WD 2284, which includes an indication of work to be done by one or more graphics processing engines of graphics acceleration module 2246. In at least one embodiment, data from WD 2284 may be stored in registers 2245 and used by MMU 2239, interrupt management circuit 2247 and/or context management circuit 2248 as illustrated. For example, one embodiment of MMU 2239 includes segment/page walk circuitry for accessing segment/page tables 2286 within an OS virtual address space 2285. In at least one embodiment, interrupt management circuit 2247 may process interrupt events 2292 received from graphics acceleration module 2246. In at least one embodiment, when performing graphics operations, an effective address 2293 generated by a graphics processing engine 2231(1)-2231(N) is translated to a real address by MMU 2239.

In at least one embodiment, registers 2245 are duplicated for each graphics processing engine 2231(1)-2231(N) and/or graphics acceleration module 2246 and may be initialized by a hypervisor or an operating system. In at least one embodiment, each of these duplicated registers may be included in an accelerator integration slice 2290. Exemplary registers that may be initialized by a hypervisor are shown in Table 1.

TABLE 1

Hypervisor Initialized Registers

| Register # | Description |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| Operating System Initialized Registers | |
|---|---|
| Register # | Description |
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In at least one embodiment, each WD 2284 is specific to a particular graphics acceleration module 2246 and/or graphics processing engines 2231(1)-2231(N). In at least one embodiment, it contains all information required by a graphics processing engine 2231(1)-2231(N) to do work, or it can be a pointer to a memory location where an application has set up a command queue of work to be completed.

Figure 22E:
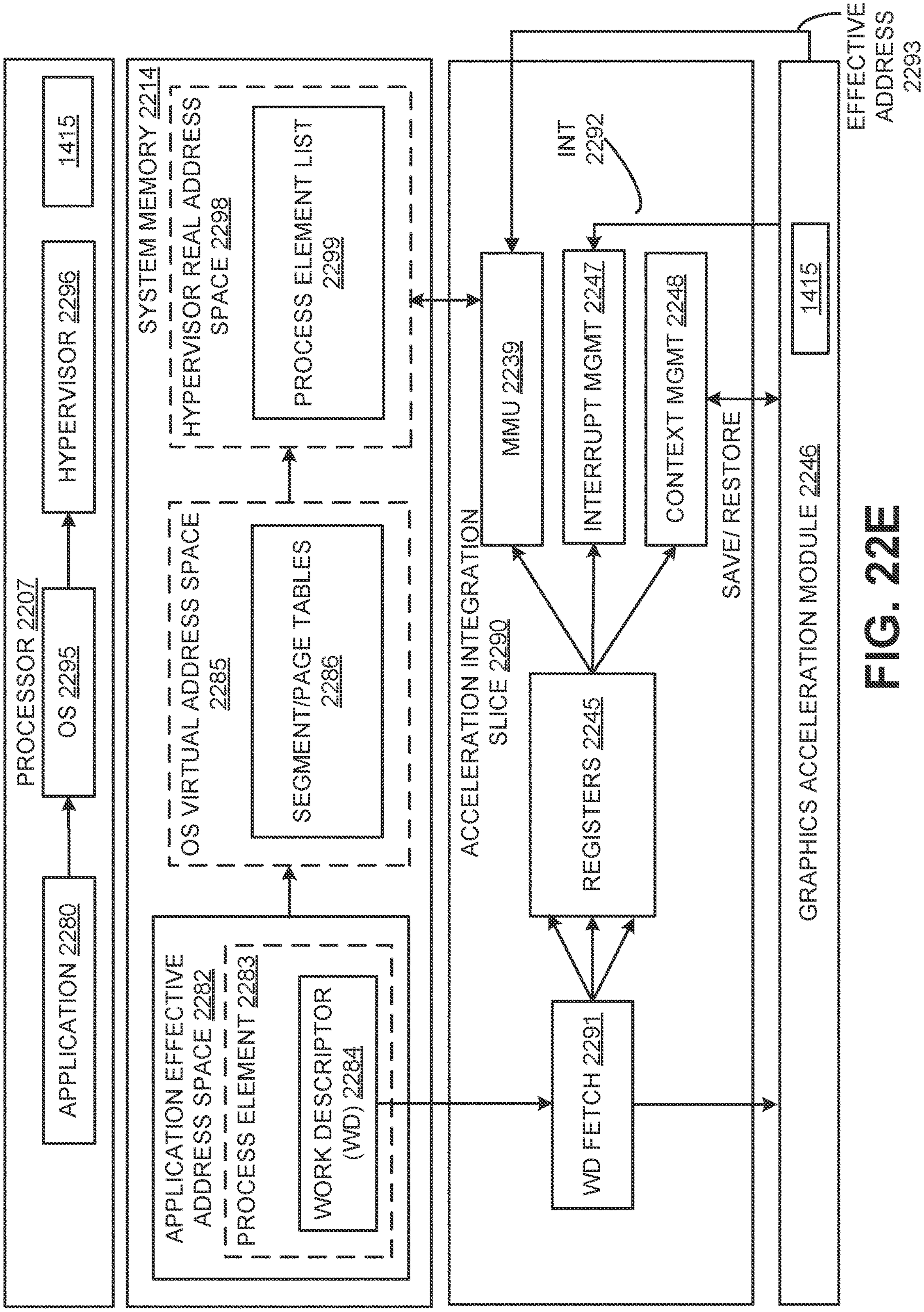
FIGS. 22E and 22F illustrate a shared programming model, according to at least one embodiment.

FIG. 22E illustrates additional details for one exemplary embodiment of a shared model. This embodiment includes a hypervisor real address space 2298 in which a process element list 2299 is stored. In at least one embodiment, hypervisor real address space 2298 is accessible via a hypervisor 2296 which virtualizes graphics acceleration module engines for operating system 2295.

In at least one embodiment, shared programming models allow for all or a subset of processes from all or a subset of partitions in a system to use a graphics acceleration module 2246. In at least one embodiment, there are two programming models where graphics acceleration module 2246 is shared by multiple processes and partitions, namely time-sliced shared and graphics directed shared.

In at least one embodiment, in this model, system hypervisor 2296 owns graphics acceleration module 2246 and makes its function available to all operating systems 2295. In at least one embodiment, for a graphics acceleration module 2246 to support virtualization by system hypervisor 2296, graphics acceleration module 2246 may adhere to certain requirements, such as (1) an application's job request must be autonomous (that is, state does not need to be maintained between jobs), or graphics acceleration module 2246 must provide a context save and restore mechanism, (2) an application's job request is guaranteed by graphics acceleration module 2246 to complete in a specified amount of time, including any translation faults, or graphics acceleration module 2246 provides an ability to preempt processing of a job, and (3) graphics acceleration module 2246 must be guaranteed fairness between processes when operating in a directed shared programming model.

In at least one embodiment, application 2280 is required to make an operating system 2295 system call with a graphics acceleration module type, a work descriptor (WD), an authority mask register (AMR) value, and a context save/restore area pointer (CSRP). In at least one embodiment, graphics acceleration module type describes a targeted acceleration function for a system call. In at least one embodiment, graphics acceleration module type may be a system-specific value. In at least one embodiment, WD is formatted specifically for graphics acceleration module 2246 and can be in a form of a graphics acceleration module 2246 command, an effective address pointer to a user-defined structure, an effective address pointer to a queue of commands, or any other data structure to describe work to be done by graphics acceleration module 2246.

In at least one embodiment, an AMR value is an AMR state to use for a current process. In at least one embodiment, a value passed to an operating system is similar to an application setting an AMR. In at least one embodiment, if accelerator integration circuit 2236 (not shown) and graphics acceleration module 2246 implementations do not support a User Authority Mask Override Register (UAMOR), an operating system may apply a current UAMOR value to an AMR value before passing an AMR in a hypervisor call. In at least one embodiment, hypervisor 2296 may optionally apply a current Authority Mask Override Register (AMOR) value before placing an AMR into process element 2283. In at least one embodiment, CSRP is one of registers 2245 containing an effective address of an area in an application's effective address space 2282 for graphics acceleration module 2246 to save and restore context state. In at least one embodiment, this pointer is optional if no state is required to be saved between jobs or when a job is preempted. In at least one embodiment, context save/restore area may be pinned system memory.

Upon receiving a system call, operating system 2295 may verify that application 2280 has registered and been given authority to use graphics acceleration module 2246. In at least one embodiment, operating system 2295 then calls hypervisor 2296 with information shown in Table 3.

TABLE 3

| OS to Hypervisor Call Parameters | |
|---|---|
| Parameter # | Description |
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

In at least one embodiment, upon receiving a hypervisor call, hypervisor 2296 verifies that operating system 2295 has registered and been given authority to use graphics acceleration module 2246. In at least one embodiment, hypervisor 2296 then puts process element 2283 into a process element linked list for a corresponding graphics acceleration module 2246 type. In at least one embodiment, a process element may include information shown in Table 4.

TABLE 4

| Process Element Information | |
|---|---|
| Element # | Description |
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |

TABLE 4-continued

| Process Element Information | |
|---|---|
| Element # | Description |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 2290 registers 2245.

Figure 22F:
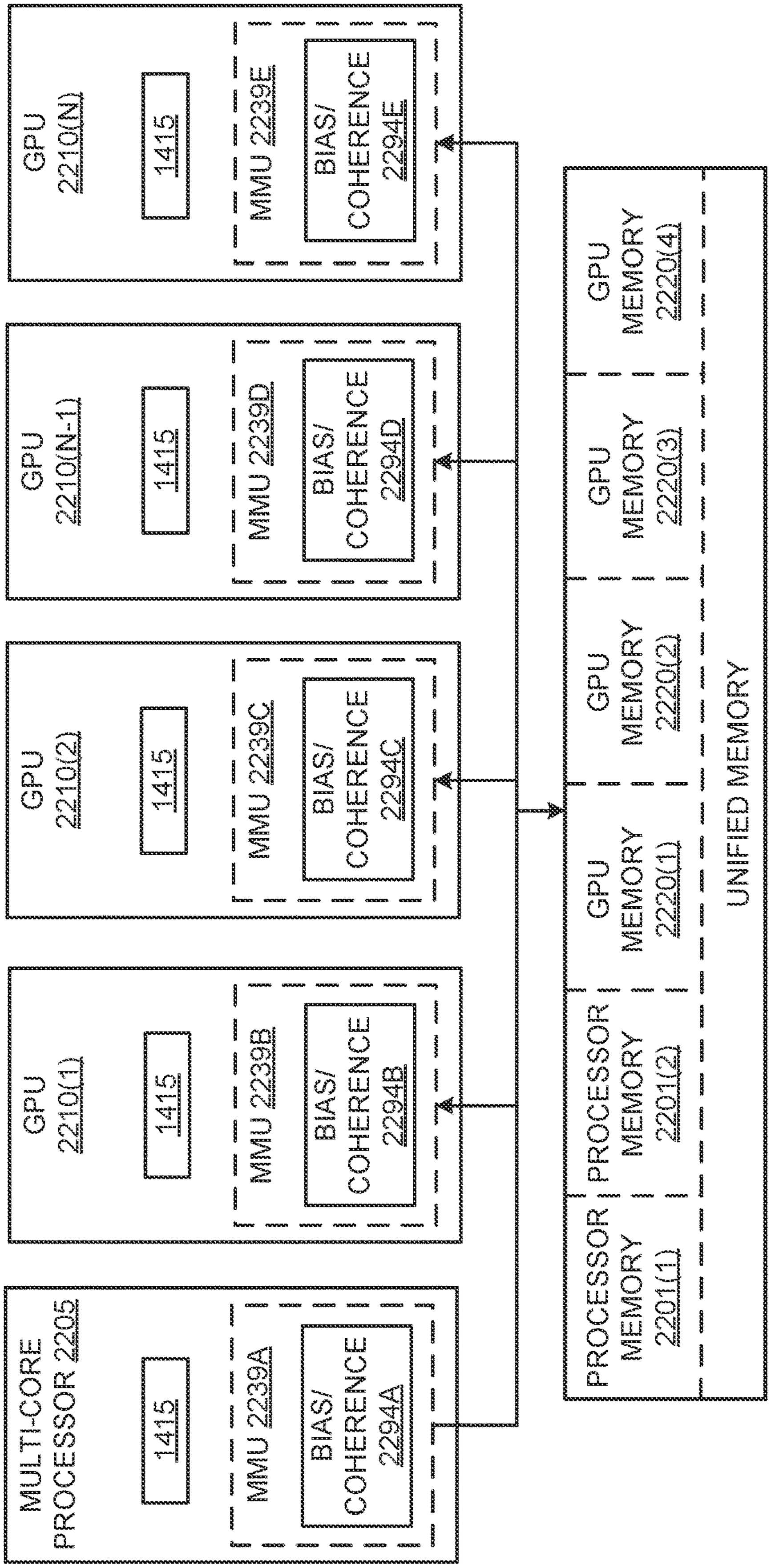

As illustrated in FIG. 22F, in at least one embodiment, a unified memory is used, addressable via a common virtual memory address space used to access physical processor memories 2201(1)-2201(N) and GPU memories 2220(1)-2220(N). In this implementation, operations executed on GPUs 2210(1)-2210(N) utilize a same virtual/effective memory address space to access processor memories 2201(1)-2201(M) and vice versa, thereby simplifying programmability. In at least one embodiment, a first portion of a virtual/effective address space is allocated to processor memory 2201(1), a second portion to second processor memory 2201(N), a third portion to GPU memory 2220(1), and so on. In at least one embodiment, an entire virtual/effective memory space (sometimes referred to as an effective address space) is thereby distributed across each of processor memories 2201 and GPU memories 2220, allowing any processor or GPU to access any physical memory with a virtual address mapped to that memory.

In at least one embodiment, bias/coherence management circuitry 2294A-2294E within one or more of MMUs 2239A-2239E ensures cache coherence between caches of one or more host processors (e.g., 2205) and GPUs 2210 and implements biasing techniques indicating physical memories in which certain types of data should be stored. In at least one embodiment, while multiple instances of bias/coherence management circuitry 2294A-2294E are illustrated in FIG. 22F, bias/coherence circuitry may be implemented within an MMU of one or more host processors 2205 and/or within accelerator integration circuit 2236.

One embodiment allows GPU memories 2220 to be mapped as part of system memory, and accessed using shared virtual memory (SVM) technology, but without suffering performance drawbacks associated with full system cache coherence. In at least one embodiment, an ability for GPU memories 2220 to be accessed as system memory without onerous cache coherence overhead provides a beneficial operating environment for GPU offload. In at least one embodiment, this arrangement allows software of host processor 2205 to setup operands and access computation results, without overhead of tradition I/O DMA data copies. In at least one embodiment, such traditional copies involve driver calls, interrupts and memory mapped I/O (MMIO) accesses that are all inefficient relative to simple memory accesses. In at least one embodiment, an ability to access GPU memories 2220 without cache coherence overheads can be critical to execution time of an offloaded computation. In at least one embodiment, in cases with substantial streaming write memory traffic, for example, cache coherence overhead can significantly reduce an effective write bandwidth seen by a GPU 2210. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. In at least one embodiment, a bias table may be used, for example, which may be a page-granular structure (e.g., controlled at a granularity of a memory page) that includes 1 or 2 bits per GPU-attached memory page. In at least one embodiment, a bias table may be implemented in a stolen memory range of one or more GPU memories 2220, with or without a bias cache in a GPU 2210 (e.g., to cache frequently/recently used entries of a bias table). Alternatively, in at least one embodiment, an entire bias table may be maintained within a GPU.

In at least one embodiment, a bias table entry associated with each access to a GPU attached memory 2220 is accessed prior to actual access to a GPU memory, causing following operations. In at least one embodiment, local requests from a GPU 2210 that find their page in GPU bias are forwarded directly to a corresponding GPU memory 2220. In at least one embodiment, local requests from a GPU that find their page in host bias are forwarded to processor 2205 (e.g., over a high-speed link as described herein). In at least one embodiment, requests from processor 2205 that find a requested page in host processor bias complete a request like a normal memory read. Alternatively, requests directed to a GPU-biased page may be forwarded to a GPU 2210. In at least one embodiment, a GPU may then transition a page to a host processor bias if it is not currently using a page. In at least one embodiment, a bias state of a page can be changed either by a software-based mechanism, a hardware-assisted software-based mechanism, or, for a limited set of cases, a purely hardware-based mechanism.

In at least one embodiment, one mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, a cache flushing operation is used for a transition from host processor 2205 bias to GPU bias, but is not for an opposite transition.

In at least one embodiment, cache coherency is maintained by temporarily rendering GPU-biased pages uncacheable by host processor 2205. In at least one embodiment, to access these pages, processor 2205 may request access from GPU 2210, which may or may not grant access right away. In at least one embodiment, thus, to reduce communication between processor 2205 and GPU 2210 it is beneficial to ensure that GPU-biased pages are those which are required by a GPU but not host processor 2205 and vice versa.

In at least one embodiment, at least one component shown or described with respect to FIGS. 22A-22F is used to perform techniques and/or functions described in connection with FIGS. 1-13. In at least one embodiment, at least one component shown or described with respect to FIGS. 22A-22F is used to perform operations described herein, such as to detect whether one or more objects within one or more images is likely to be duplicated in an image interpolated using the one or more images. In at least one embodiment, at least one component shown or described with respect to FIGS. 22A-22F is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 23:
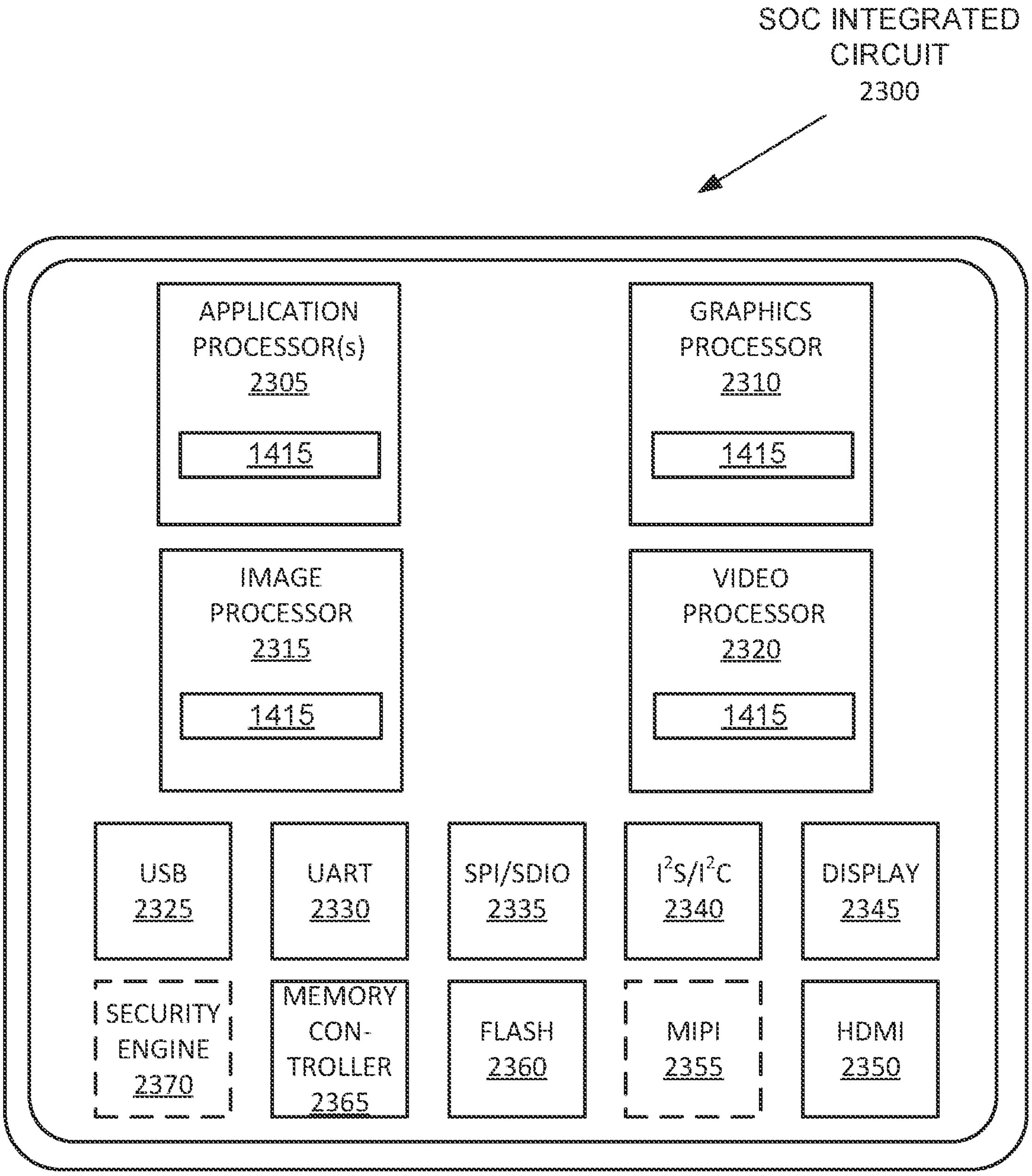
FIG. 23 illustrates exemplary integrated circuits and associated graphics processors, according to at least one embodiment.

FIG. 23 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 23 is a block diagram illustrating an exemplary system on a chip integrated circuit 2300 that may be fabricated using one or more IP cores, according to at least one embodiment. In at least one embodiment, integrated circuit 2300 includes one or more application processor(s) 2305 (e.g., CPUs), at least one graphics processor 2310, and may additionally include an image processor 2315 and/or a video processor 2320, any of which may be a modular IP core. In at least one embodiment, integrated circuit 2300 includes peripheral or bus logic including a USB controller 2325, a UART controller 2330, an SPI/SDIO controller 2335, and an $I^2S/I^2C$ controller 2340. In at least one embodiment, integrated circuit 2300 can include a display device 2345 coupled to one or more of a high-definition multimedia interface (HDMI) controller 2350 and a mobile industry processor interface (MIPI) display interface 2355. In at least one embodiment, storage may be provided by a flash memory subsystem 2360 including flash memory and a flash memory controller. In at least one embodiment, a memory interface may be provided via a memory controller 2365 for access to SDRAM or SRAM memory devices. In at least one embodiment, some integrated circuits additionally include an embedded security engine 2370.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in integrated circuit 2300 for inferencing or predicting operations based, at least in part, on weight parameters calculated using neural network training operations, neural network functions and/or architectures, or neural network use cases described herein.

In at least one embodiment, at least one component shown or described with respect to FIG. 23 is used to perform techniques and/or functions described in connection with FIGS. 1-13. In at least one embodiment, at least one component shown or described with respect to FIG. 23 is used to perform operations described herein, such as to detect whether one or more objects within one or more images is likely to be duplicated in an image interpolated using the one or more images. In at least one embodiment, at least one component shown or described with respect to FIG. 23 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 24A:
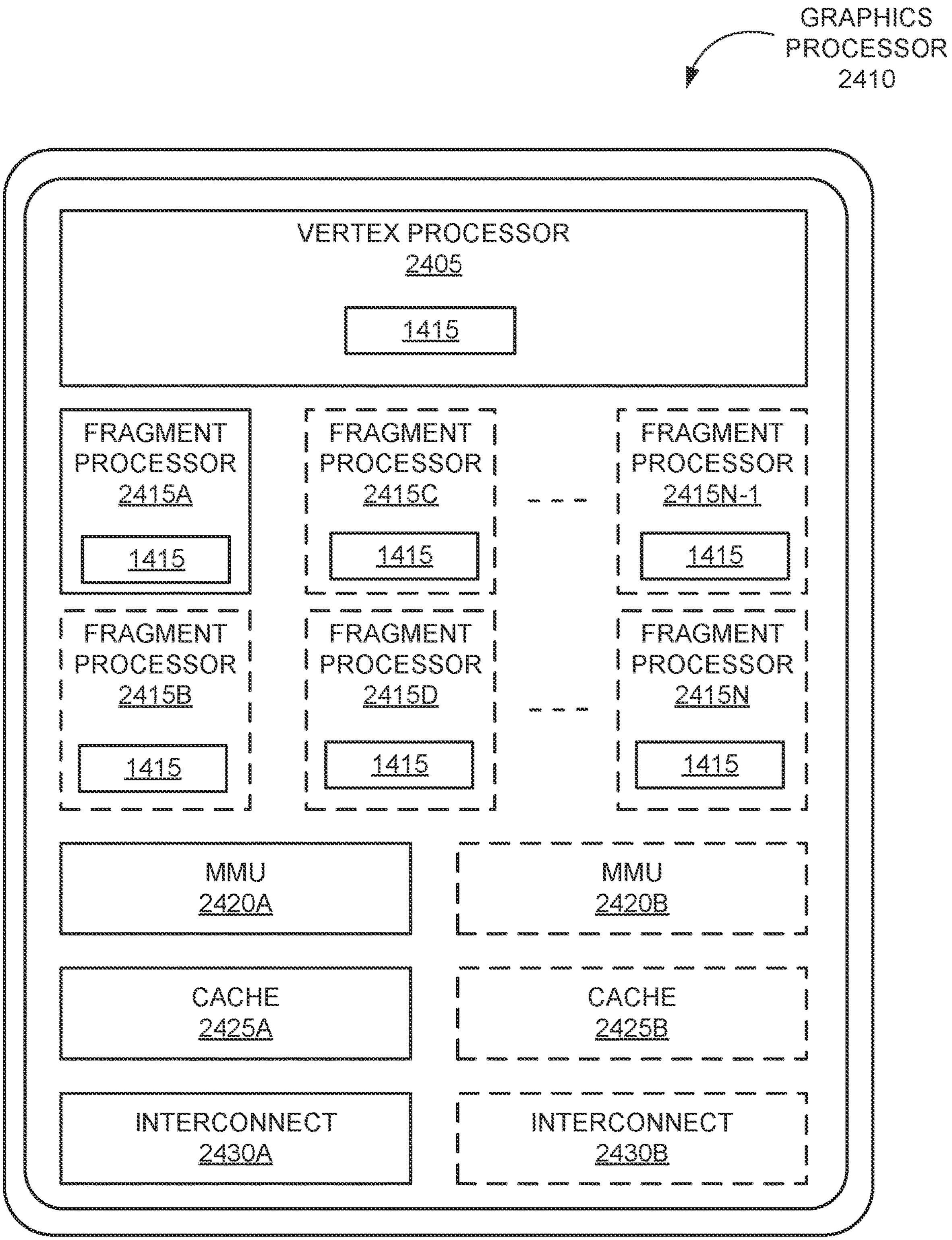
FIGS. 24A-24B illustrate exemplary integrated circuits and associated graphics processors, according to at least one embodiment.
Figure 24B:
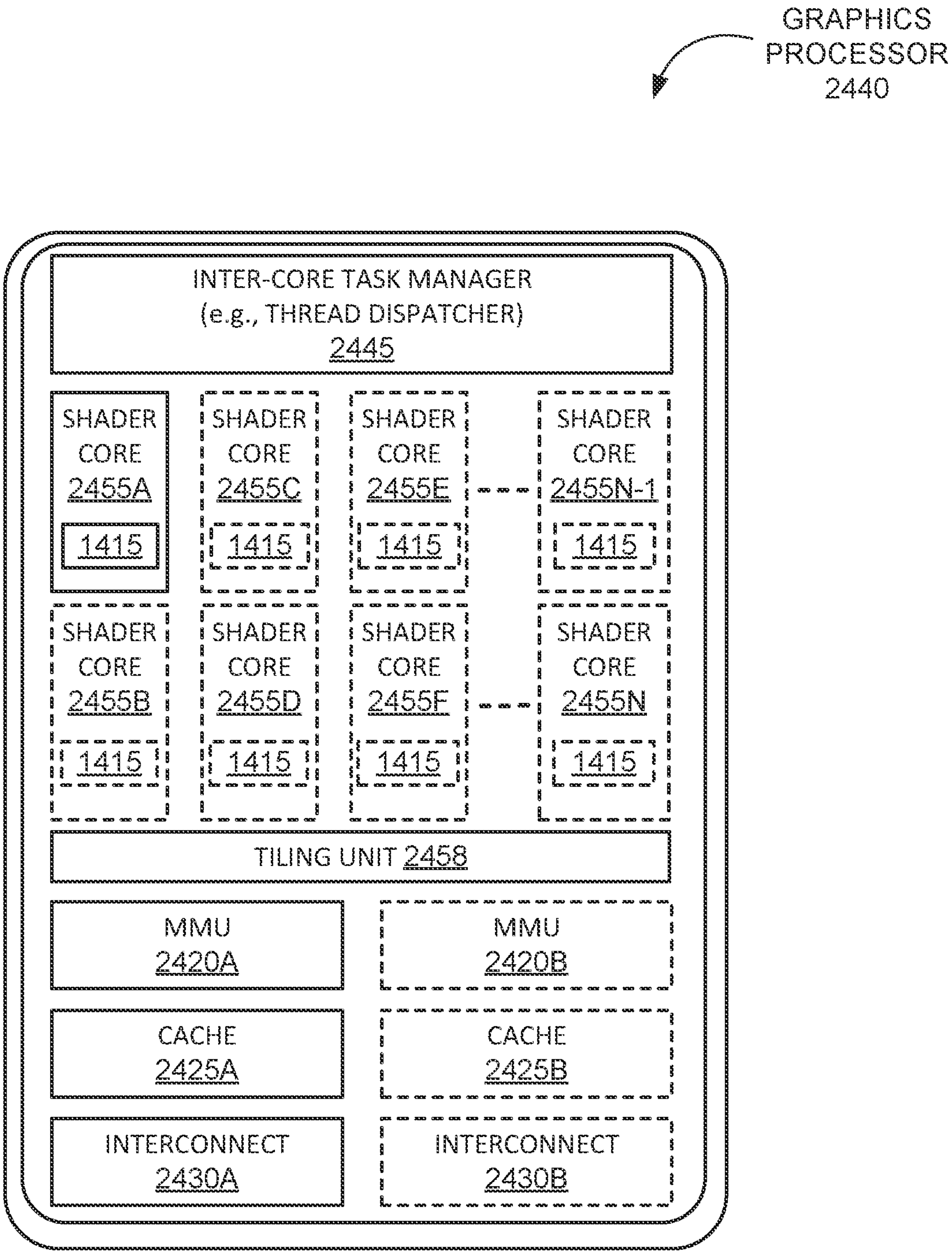

FIGS. 24A-24B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 24A-24B are block diagrams illustrating exemplary graphics processors for use within an SoC, according to embodiments described herein. FIG. 24A illustrates an exemplary graphics processor 2410 of a system on a chip integrated circuit that may be fabricated using one or more IP cores, according to at least one embodiment. FIG. 24B illustrates an additional exemplary graphics processor 2440 of a system on a chip integrated circuit that may be fabricated using one or more IP cores, according to at least one embodiment. In at least one embodiment, graphics processor 2410 of FIG. 24A is a low power graphics processor core. In at least one embodiment, graphics processor 2440 of FIG. 24B is a higher performance graphics processor core. In at least one embodiment, each of graphics processors 2410, 2440 can be variants of graphics processor 2310 of FIG. 23.

In at least one embodiment, graphics processor 2410 includes a vertex processor 2405 and one or more fragment processor(s) 2415A-2415N (e.g., 2415A, 2415B, 2415C, 2415D, through 2415N-1, and 2415N). In at least one embodiment, graphics processor 2410 can execute different shader programs via separate logic, such that vertex processor 2405 is optimized to execute operations for vertex shader programs, while one or more fragment processor(s) 2415A-2415N execute fragment (e.g., pixel) shading operations for fragment or pixel shader programs. In at least one embodiment, vertex processor 2405 performs a vertex processing stage of a 3D graphics pipeline and generates primitives and vertex data. In at least one embodiment, fragment processor(s) 2415A-2415N use primitive and vertex data generated by vertex processor 2405 to produce a framebuffer that is displayed on a display device. In at least one embodiment, fragment processor(s) 2415A-2415N are optimized to execute fragment shader programs as provided for in an OpenGL API, which may be used to perform similar operations as a pixel shader program as provided for in a Direct 3D API.

In at least one embodiment, graphics processor 2410 additionally includes one or more memory management units (MMUs) 2420A-2420B, cache(s) 2425A-2425B, and circuit interconnect(s) 2430A-2430B. In at least one embodiment, one or more MMU(s) 2420A-2420B provide for virtual to physical address mapping for graphics processor 2410, including for vertex processor 2405 and/or fragment processor(s) 2415A-2415N, which may reference vertex or image/texture data stored in memory, in addition to vertex or image/texture data stored in one or more cache(s) 2425A-2425B. In at least one embodiment, one or more MMU(s) 2420A-2420B may be synchronized with other MMUs within a system, including one or more MMUs associated with one or more application processor(s) 2305, image processors 2315, and/or video processors 2320 of FIG. 23, such that each processor 2305-2320 can participate in a shared or unified virtual memory system. In at least one embodiment, one or more circuit interconnect(s) 2430A-2430B enable graphics processor 2410 to interface with other IP cores within SoC, either via an internal bus of SoC or via a direct connection.

In at least one embodiment, graphics processor 2440 includes one or more shader core(s) 2455A-2455N (e.g., 2455A, 2455B, 2455C, 2455D, 2455E, 2455F, through 2455N-1, and 2455N) as shown in FIG. 24B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2440 includes an inter-core task manager 2445, which acts as a thread dispatcher to dispatch execution threads to one or more shader cores 2455A-2455N and a tiling unit 2458 to accelerate tiling operations for tile-based rendering, in which rendering operations for a scene are subdivided in image space, for example to exploit local spatial coherence within a scene or to optimize use of internal caches.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in integrated circuit 24A and/or 24B for inferencing or predicting operations based, at least in part, on weight parameters calculated using neural network training operations, neural network functions and/or architectures, or neural network use cases described herein.

In at least one embodiment, at least one component shown or described with respect to FIGS. 24A-24B is used to perform techniques and/or functions described in connection with FIGS. 1-13. In at least one embodiment, at least one component shown or described with respect to FIGS. 24A-24B is used to perform operations described herein, such as to detect whether one or more objects within one or more images is likely to be duplicated in an image interpolated using the one or more images. In at least one embodiment, at least one component shown or described with respect to FIGS. 24A-24B is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 25A:
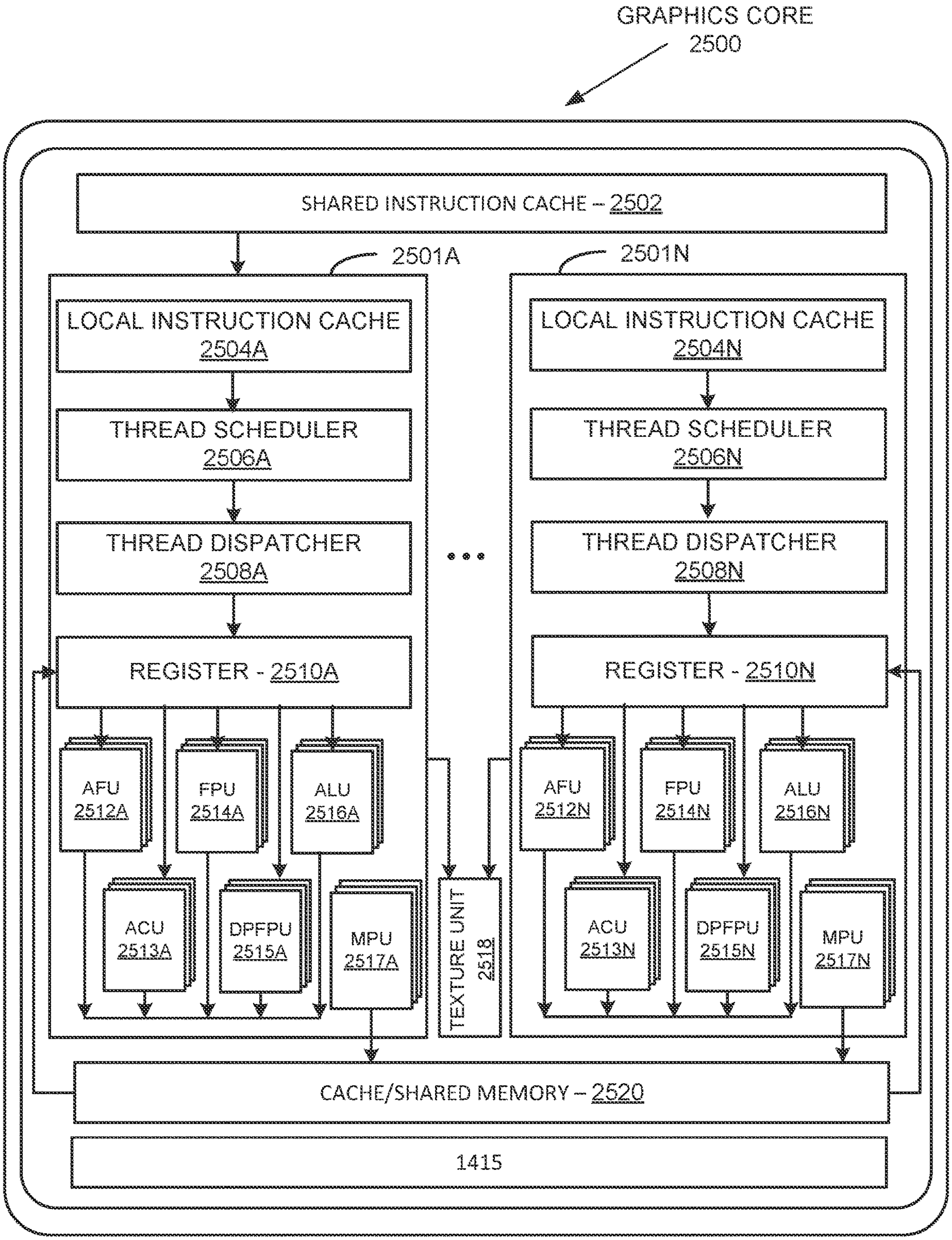
FIGS. 25A-25B illustrate additional exemplary graphics processor logic according to at least one embodiment.
Figure 25B:
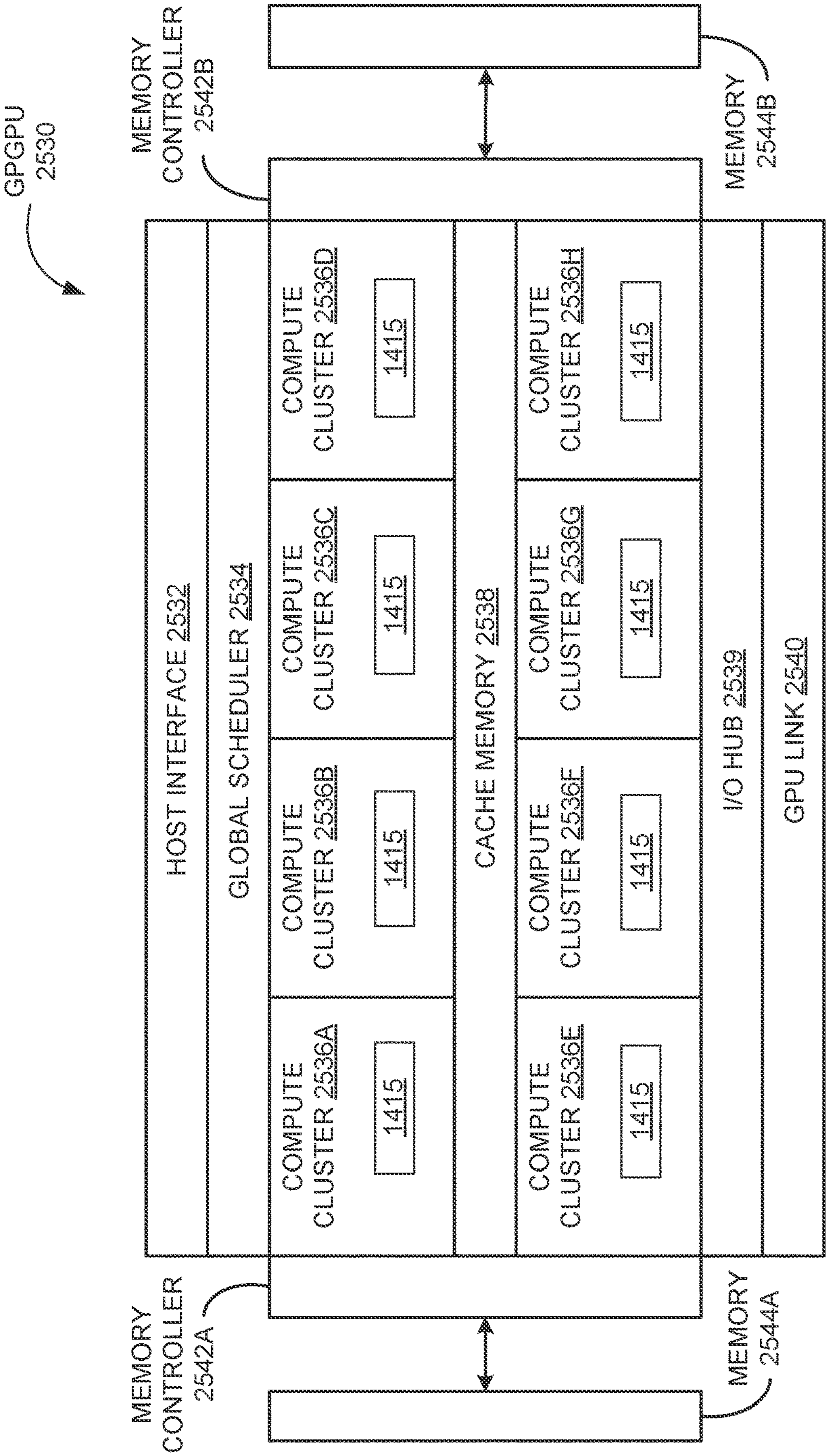

FIGS. 25A-25B illustrate additional exemplary graphics processor logic according to embodiments described herein. FIG. 25A illustrates a graphics core 2500 that may be included within graphics processor 2310 of FIG. 23, in at least one embodiment, and may be a unified shader core 2455A-2455N as in FIG. 24B in at least one embodiment. FIG. 25B illustrates a highly-parallel general-purpose graphics processing unit ("GPGPU") 2530 suitable for deployment on a multi-chip module in at least one embodiment.

In at least one embodiment, graphics core 2500 includes a shared instruction cache 2502, a texture unit 2518, and a cache/shared memory 2520 that are common to execution resources within graphics core 2500. In at least one embodiment, graphics core 2500 can include multiple slices 2501A-2501N or a partition for each core, and a graphics processor can include multiple instances of graphics core 2500. In at least one embodiment, slices 2501A-2501N can include support logic including a local instruction cache 2504A-2504N, a thread scheduler 2506A-2506N, a thread dispatcher 2508A-2508N, and a set of registers 2510A-2510N. In at least one embodiment, slices 2501A-2501N can include a set of additional function units (AFUs 2512A-2512N), floating-point units (FPUs 2514A-2514N), integer arithmetic logic units (ALUs 2516A-2516N), address computational units (ACUs 2513A-2513N), double-precision floating-point units (DPFPUs 2515A-2515N), and matrix processing units (MPUs 2517A-2517N).

In at least one embodiment, FPUs 2514A-2514N can perform single-precision (32-bit) and half-precision (16-bit) floating point operations, while DPFPUs 2515A-2515N perform double precision (64-bit) floating point operations. In at least one embodiment, ALUs 2516A-2516N can perform variable precision integer operations at 8-bit, 16-bit, and 32-bit precision, and can be configured for mixed precision operations. In at least one embodiment, MPUs 2517A-2517N can also be configured for mixed precision matrix operations, including half-precision floating point and 8-bit integer operations. In at least one embodiment, MPUs 2517-2517N can perform a variety of matrix operations to accelerate machine learning application frameworks, including enabling support for accelerated general matrix to matrix multiplication (GEMM). In at least one embodiment, AFUs 2512A-2512N can perform additional logic operations not supported by floating-point or integer units, including trigonometric operations (e.g., sine, cosine, etc.).

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in graphics core 2500 for inferencing or predicting operations based, at least in part, on weight parameters calculated using neural network training operations, neural network functions and/or architectures, or neural network use cases described herein.

FIG. 25B illustrates a general-purpose processing unit (GPGPU) 2530 that can be configured to enable highly-parallel compute operations to be performed by an array of graphics processing units, in at least one embodiment. In at least one embodiment, GPGPU 2530 can be linked directly to other instances of GPGPU 2530 to create a multi-GPU cluster to improve training speed for deep neural networks. In at least one embodiment, GPGPU 2530 includes a host interface 2532 to enable a connection with a host processor. In at least one embodiment, host interface 2532 is a PCI Express interface. In at least one embodiment, host interface 2532 can be a vendor-specific communications interface or communications fabric. In at least one embodiment, GPGPU 2530 receives commands from a host processor and uses a global scheduler 2534 to distribute execution threads associated with those commands to a set of compute clusters 2536A-2536H. In at least one embodiment, compute clusters 2536A-2536H share a cache memory 2538. In at least one embodiment, cache memory 2538 can serve as a higher-level cache for cache memories within compute clusters 2536A-2536H.

In at least one embodiment, GPGPU 2530 includes memory 2544A-2544B coupled with compute clusters 2536A-2536H via a set of memory controllers 2542A-2542B. In at least one embodiment, memory 2544A-2544B can include various types of memory devices including dynamic random access memory (DRAM) or graphics random access memory, such as synchronous graphics random access memory (SGRAM), including graphics double data rate (GDDR) memory.

In at least one embodiment, compute clusters 2536A-2536H each include a set of graphics cores, such as graphics core 2500 of FIG. 25A, which can include multiple types of integer and floating point logic units that can perform computational operations at a range of precisions including suited for machine learning computations. For example, in at least one embodiment, at least a subset of floating point units in each of compute clusters 2536A-2536H can be configured to perform 16-bit or 32-bit floating point operations, while a different subset of floating point units can be configured to perform 64-bit floating point operations.

In at least one embodiment, multiple instances of GPGPU 2530 can be configured to operate as a compute cluster. In at least one embodiment, communication used by compute clusters 2536A-2536H for synchronization and data exchange varies across embodiments. In at least one embodiment, multiple instances of GPGPU 2530 communicate over host interface 2532. In at least one embodiment, GPGPU 2530 includes an I/O hub 2539 that couples GPGPU 2530 with a GPU link 2540 that enables a direct connection to other instances of GPGPU 2530. In at least one embodiment, GPU link 2540 is coupled to a dedicated GPU-to-GPU bridge that enables communication and synchronization between multiple instances of GPGPU 2530. In at least one embodiment, GPU link 2540 couples with a high-speed interconnect to transmit and receive data to other GPGPUs or parallel processors. In at least one embodiment, multiple instances of GPGPU 2530 are located in separate data processing systems and communicate via a network device that is accessible via host interface 2532. In at least one embodiment GPU link 2540 can be configured to enable a connection to a host processor in addition to or as an alternative to host interface 2532.

In at least one embodiment, GPGPU 2530 can be configured to train neural networks. In at least one embodiment, GPGPU 2530 can be used within an inferencing platform. In at least one embodiment, in which GPGPU 2530 is used for inferencing, GPGPU 2530 may include fewer compute clusters 2536A-2536H relative to when GPGPU 2530 is used for training a neural network. In at least one embodiment, memory technology associated with memory 2544A-2544B may differ between inferencing and training configurations, with higher bandwidth memory technologies devoted to training configurations. In at least one embodiment, an inferencing configuration of GPGPU 2530 can support inferencing specific instructions. For example, in at least one embodiment, an inferencing configuration can provide support for one or more 8-bit integer dot product instructions, which may be used during inferencing operations for deployed neural networks.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in GPGPU 2530 for inferencing or predicting operations based, at least in part, on weight parameters calculated using neural network training operations, neural network functions and/or architectures, or neural network use cases described herein.

In at least one embodiment, at least one component shown or described with respect to FIGS. 25A-25B is used to perform techniques and/or functions described in connection with FIGS. 1-13. In at least one embodiment, at least one component shown or described with respect to FIGS. 25A-25B is used to perform operations described herein, such as to detect whether one or more objects within one or more images is likely to be duplicated in an image interpolated using the one or more images. In at least one embodiment, at least one component shown or described with respect to FIGS. 25A-25B is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 26:
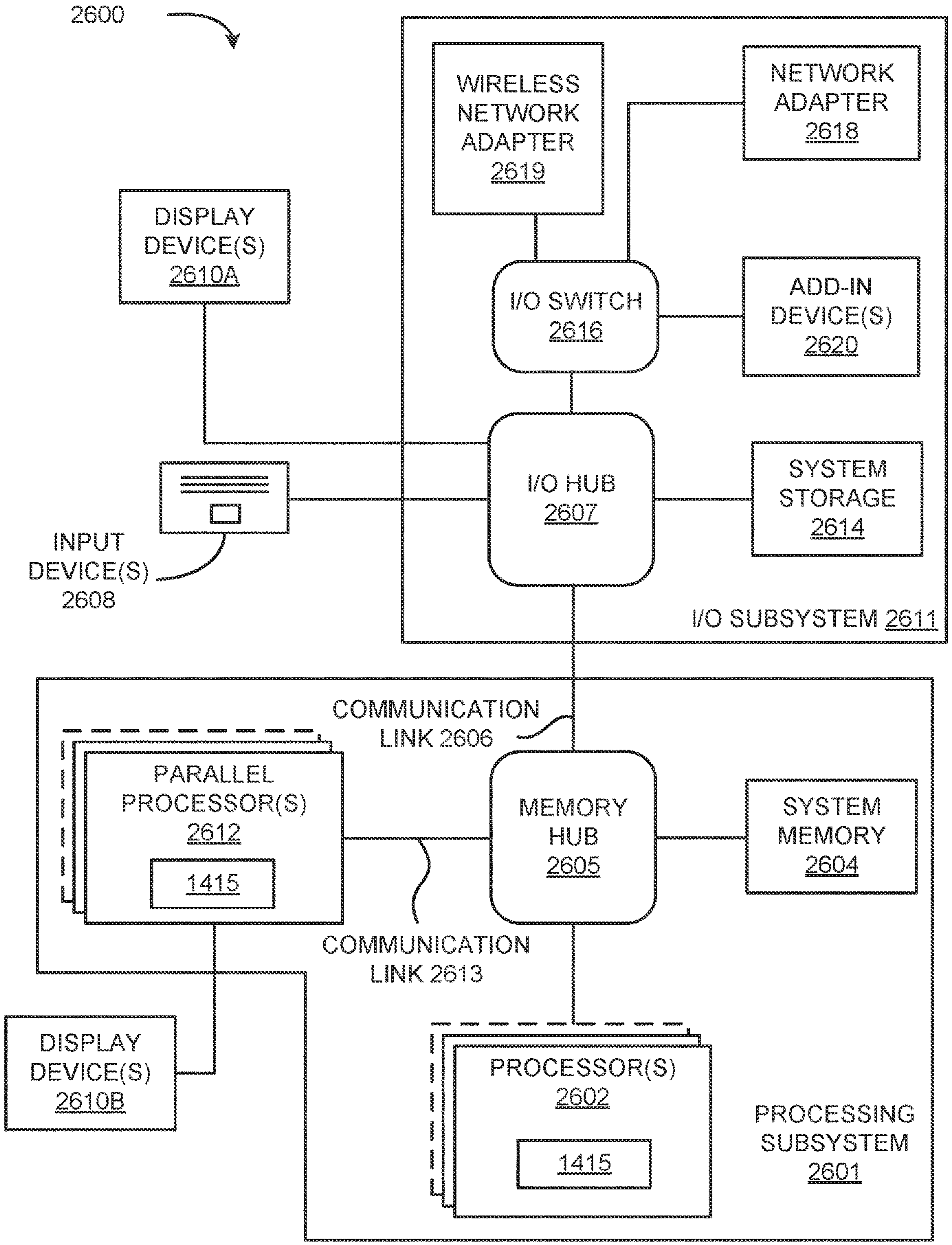
FIG. 26 illustrates a computer system, according to at least one embodiment.

FIG. 26 is a block diagram illustrating a computing system 2600 according to at least one embodiment. In at least one embodiment, computing system 2600 includes a processing subsystem 2601 having one or more processor(s) 2602 and a system memory 2604 communicating via an interconnection path that may include a memory hub 2605. In at least one embodiment, memory hub 2605 may be a separate component within a chipset component or may be integrated within one or more processor(s) 2602. In at least one embodiment, memory hub 2605 couples with an I/O subsystem 2611 via a communication link 2606. In at least one embodiment, I/O subsystem 2611 includes an I/O hub 2607 that can enable computing system 2600 to receive input from one or more input device(s) 2608. In at least one embodiment, I/O hub 2607 can enable a display controller, which may be included in one or more processor(s) 2602, to provide outputs to one or more display device(s) 2610A. In at least one embodiment, one or more display device(s) 2610A coupled with I/O hub 2607 can include a local, internal, or embedded display device.

In at least one embodiment, processing subsystem 2601 includes one or more parallel processor(s) 2612 coupled to memory hub 2605 via a bus or other communication link 2613. In at least one embodiment, communication link 2613 may use one of any number of standards based communication link technologies or protocols, such as, but not limited to PCI Express, or may be a vendor-specific communications interface or communications fabric. In at least one embodiment, one or more parallel processor(s) 2612 form a computationally focused parallel or vector processing system that can include a large number of processing cores and/or processing clusters, such as a many-integrated core (MIC) processor. In at least one embodiment, vector processing systems are referred to as "vector engines" and vector engines can perform one or more operations including rasterizing, lighting, upsampling, upscaling, de-aliasing, or post-processing operations. In at least one embodiment, some or all of parallel processor(s) 2612 form a graphics processing subsystem that can output pixels to one of one or more display device(s) 2610A coupled via I/O Hub 2607. In at least one embodiment, parallel processor(s) 2612 can also include a display controller and display interface (not shown) to enable a direct connection to one or more display device(s) 2610B.

In at least one embodiment, a system storage unit 2614 can connect to I/O hub 2607 to provide a storage mechanism for computing system 2600. In at least one embodiment, an I/O switch 2616 can be used to provide an interface mechanism to enable connections between I/O hub 2607 and other components, such as a network adapter 2618 and/or a wireless network adapter 2619 that may be integrated into platform, and various other devices that can be added via one or more add-in device(s) 2620. In at least one embodiment, network adapter 2618 can be an Ethernet adapter or another wired network adapter. In at least one embodiment, wireless network adapter 2619 can include one or more of a Wi-Fi, Bluetooth, near field communication (NFC), or other network device that includes one or more wireless radios.

In at least one embodiment, computing system 2600 can include other components not explicitly shown, including USB or other port connections, optical storage drives, video capture devices, and like, may also be connected to I/O hub 2607. In at least one embodiment, communication paths interconnecting various components in FIG. 26 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 2612 incorporate circuitry optimized for graphics and video processing, including, for example, video output circuitry, and constitutes a graphics processing unit (GPU). In at least one embodiment, parallel processor(s) 2612 incorporate circuitry optimized for general purpose processing. In at least embodiment, components of computing system 2600 may be integrated with one or more other system elements on a single integrated circuit. For example, in at least one embodiment, parallel processor(s) 2612, memory hub 2605, processor(s) 2602, and I/O hub 2607 can be integrated into a system on chip (SoC) integrated circuit. In at least one embodiment, components of computing system 2600 can be integrated into a single package to form a system in package (SIP) configuration. In at least one embodiment, at least a portion of components of computing system 2600 can be integrated into a multi-chip module (MCM), which can be interconnected with other multi-chip modules into a modular computing system.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in system FIG. 2600 for inferencing or predicting operations based, at least in part, on weight parameters calculated using neural network training operations, neural network functions and/or architectures, or neural network use cases described herein.

In at least one embodiment, at least one component shown or described with respect to FIG. 26 is used to perform techniques and/or functions described in connection with FIGS. 1-13. In at least one embodiment, at least one component shown or described with respect to FIG. 26 is used to perform operations described herein, such as to detect whether one or more objects within one or more images is likely to be duplicated in an image interpolated using the one or more images. In at least one embodiment, at least one component shown or described with respect to FIG. 26 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Processors

Figure 27A:
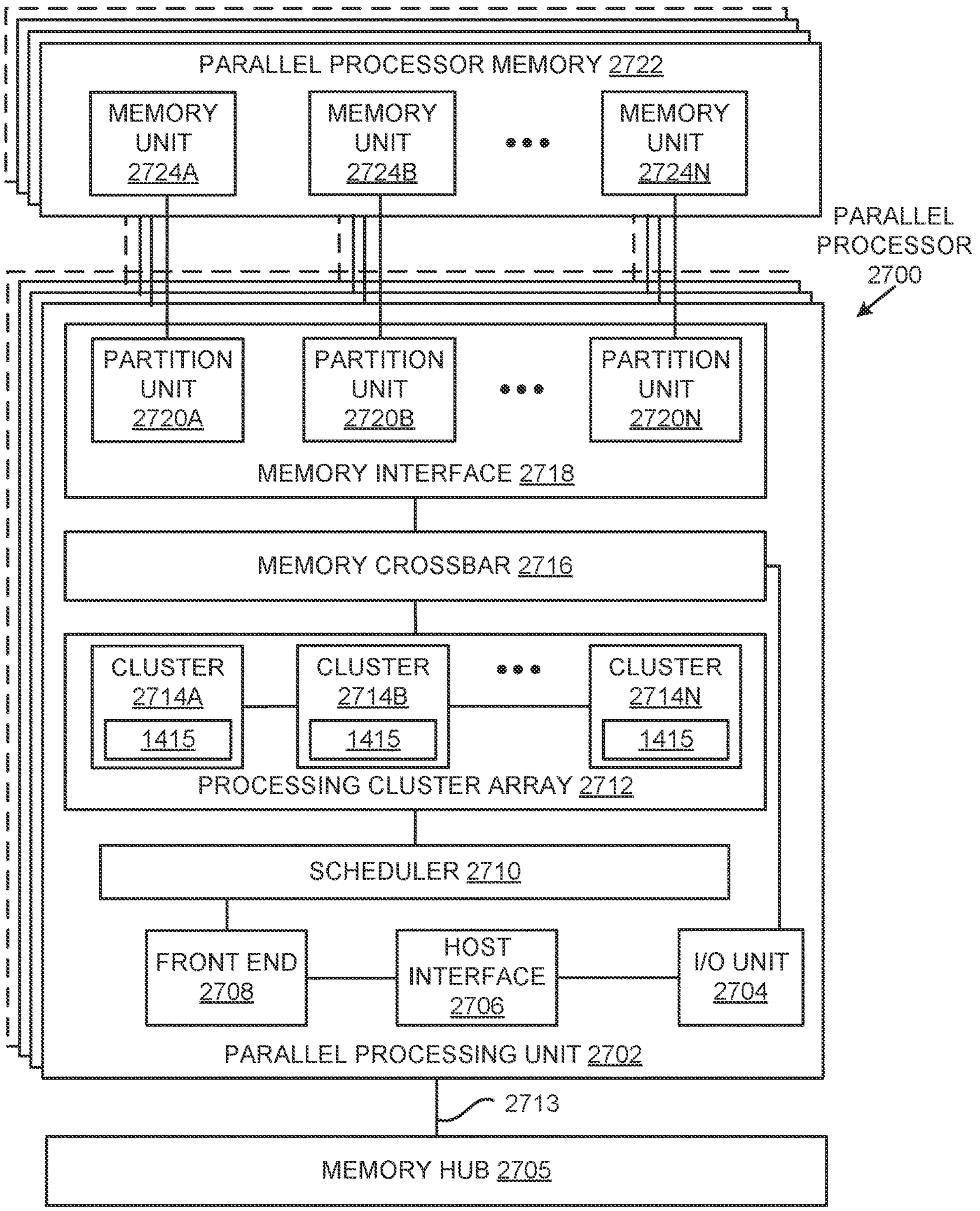
FIG. 27A illustrates a parallel processor, according to at least one embodiment.

FIG. 27A illustrates a parallel processor 2700 according to at least one embodiment. In at least one embodiment, various components of parallel processor 2700 may be implemented using one or more integrated circuit devices, such as programmable processors, application specific integrated circuits (ASICs), or field programmable gate arrays (FPGA). In at least one embodiment, illustrated parallel processor 2700 is a variant of one or more parallel processor(s) 2612 shown in FIG. 26 according to an exemplary embodiment.

In at least one embodiment, parallel processor 2700 includes a parallel processing unit 2702. In at least one embodiment, parallel processing unit 2702 includes an I/O unit 2704 that enables communication with other devices, including other instances of parallel processing unit 2702. In at least one embodiment, I/O unit 2704 may be directly connected to other devices. In at least one embodiment, I/O unit 2704 connects with other devices via use of a hub or switch interface, such as a memory hub 2705. In at least one embodiment, connections between memory hub 2705 and I/O unit 2704 form a communication link 2713. In at least one embodiment, I/O unit 2704 connects with a host interface 2706 and a memory crossbar 2716, where host interface 2706 receives commands directed to performing processing operations and memory crossbar 2716 receives commands directed to performing memory operations.

In at least one embodiment, when host interface 2706 receives a command buffer via I/O unit 2704, host interface 2706 can direct work operations to perform those commands to a front end 2708. In at least one embodiment, front end 2708 couples with a scheduler 2710, which is configured to distribute commands or other work items to a processing cluster array 2712. In at least one embodiment, scheduler 2710 ensures that processing cluster array 2712 is properly configured and in a valid state before tasks are distributed to a cluster of processing cluster array 2712. In at least one embodiment, scheduler 2710 is implemented via firmware logic executing on a microcontroller. In at least one embodiment, microcontroller implemented scheduler 2710 is configurable to perform complex scheduling and work distribution operations at coarse and fine granularity, enabling rapid preemption and context switching of threads executing on processing array 2712. In at least one embodiment, host software can prove workloads for scheduling on processing cluster array 2712 via one of multiple graphics processing paths. In at least one embodiment, workloads can then be automatically distributed across processing array cluster 2712 by scheduler 2710 logic within a microcontroller including scheduler 2710.

In at least one embodiment, processing cluster array 2712 can include up to "N" processing clusters (e.g., cluster 2714A, cluster 2714B, through cluster 2714N), where "N" represents a positive integer (which may be a different integer "N" than used in other figures). In at least one embodiment, each cluster 2714A-2714N of processing cluster array 2712 can execute a large number of concurrent threads. In at least one embodiment, scheduler 2710 can allocate work to clusters 2714A-2714N of processing cluster array 2712 using various scheduling and/or work distribution algorithms, which may vary depending on workload arising for each type of program or computation. In at least one embodiment, scheduling can be handled dynamically by scheduler 2710, or can be assisted in part by compiler logic during compilation of program logic configured for execution by processing cluster array 2712. In at least one embodiment, different clusters 2714A-2714N of processing cluster array 2712 can be allocated for processing different types of programs or for performing different types of computations.

In at least one embodiment, processing cluster array 2712 can be configured to perform various types of parallel processing operations. In at least one embodiment, processing cluster array 2712 is configured to perform general-purpose parallel compute operations. For example, in at least one embodiment, processing cluster array 2712 can include logic to execute processing tasks including filtering of video and/or audio data, performing modeling operations, including physics operations, and performing data transformations.

In at least one embodiment, processing cluster array 2712 is configured to perform parallel graphics processing operations. In at least one embodiment, processing cluster array 2712 can include additional logic to support execution of such graphics processing operations, including but not limited to, texture sampling logic to perform texture operations, as well as tessellation logic and other vertex processing logic. In at least one embodiment, processing cluster array 2712 can be configured to execute graphics processing related shader programs such as, but not limited to, vertex shaders, tessellation shaders, geometry shaders, and pixel shaders. In at least one embodiment, parallel processing unit 2702 can transfer data from system memory via I/O unit 2704 for processing. In at least one embodiment, during processing, transferred data can be stored to on-chip memory (e.g., parallel processor memory 2722) during processing, then written back to system memory.

In at least one embodiment, when parallel processing unit 2702 is used to perform graphics processing, scheduler 2710 can be configured to divide a processing workload into approximately equal sized tasks, to better enable distribution of graphics processing operations to multiple clusters 2714A-2714N of processing cluster array 2712. In at least one embodiment, portions of processing cluster array 2712 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2714A-2714N may be stored in buffers to allow intermediate data to be transmitted between clusters 2714A-2714N for further processing.

In at least one embodiment, processing cluster array 2712 can receive processing tasks to be executed via scheduler 2710, which receives commands defining processing tasks from front end 2708. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2710 may be configured to fetch indices corresponding to tasks or may receive indices from front end 2708. In at least one embodiment, front end 2708 can be configured to ensure processing cluster array 2712 is configured to a valid state before a workload specified by incoming command buffers (e.g., batch-buffers, push buffers, etc.) is initiated.

In at least one embodiment, each of one or more instances of parallel processing unit 2702 can couple with a parallel processor memory 2722. In at least one embodiment, parallel processor memory 2722 can be accessed via memory crossbar 2716, which can receive memory requests from processing cluster array 2712 as well as I/O unit 2704. In at least one embodiment, memory crossbar 2716 can access parallel processor memory 2722 via a memory interface 2718. In at least one embodiment, memory interface 2718 can include multiple partition units (e.g., partition unit 2720A, partition unit 2720B, through partition unit 2720N) that can each couple to a portion (e.g., memory unit) of parallel processor memory 2722. In at least one embodiment, a number of partition units 2720A-2720N is configured to be equal to a number of memory units, such that a first partition unit 2720A has a corresponding first memory unit 2724A, a second partition unit 2720B has a corresponding memory unit 2724B, and an N-th partition unit 2720N has a corresponding N-th memory unit 2724N. In at least one embodiment, a number of partition units 2720A-2720N may not be equal to a number of memory units.

In at least one embodiment, memory units 2724A-2724N can include various types of memory devices, including dynamic random access memory (DRAM) or graphics random access memory, such as synchronous graphics random access memory (SGRAM), including graphics double data rate (GDDR) memory. In at least one embodiment, memory units 2724A-2724N may also include 3D stacked memory, including but not limited to high bandwidth memory (HBM). In at least one embodiment, render targets, such as frame buffers or texture maps may be stored across memory units 2724A-2724N, allowing partition units 2720A-2720N to write portions of each render target in parallel to efficiently use available bandwidth of parallel processor memory 2722. In at least one embodiment, a local instance of parallel processor memory 2722 may be excluded in favor of a unified memory design that utilizes system memory in conjunction with local cache memory.

In at least one embodiment, any one of clusters 2714A-2714N of processing cluster array 2712 can process data that will be written to any of memory units 2724A-2724N within parallel processor memory 2722. In at least one embodiment, memory crossbar 2716 can be configured to transfer an output of each cluster 2714A-2714N to any partition unit 2720A-2720N or to another cluster 2714A-2714N, which can perform additional processing operations on an output. In at least one embodiment, each cluster 2714A-2714N can communicate with memory interface 2718 through memory crossbar 2716 to read from or write to various external memory devices. In at least one embodiment, memory crossbar 2716 has a connection to memory interface 2718 to communicate with I/O unit 2704, as well as a connection to a local instance of parallel processor memory 2722, enabling processing units within different processing clusters 2714A-2714N to communicate with system memory or other memory that is not local to parallel processing unit 2702. In at least one embodiment, memory crossbar 2716 can use virtual channels to separate traffic streams between clusters 2714A-2714N and partition units 2720A-2720N.

In at least one embodiment, multiple instances of parallel processing unit 2702 can be provided on a single add-in card, or multiple add-in cards can be interconnected. In at least one embodiment, different instances of parallel processing unit 2702 can be configured to interoperate even if different instances have different numbers of processing cores, different amounts of local parallel processor memory, and/or other configuration differences. For example, in at least one embodiment, some instances of parallel processing unit 2702 can include higher precision floating point units relative to other instances. In at least one embodiment, systems incorporating one or more instances of parallel processing unit 2702 or parallel processor 2700 can be implemented in a variety of configurations and form factors, including but not limited to desktop, laptop, or handheld personal computers, servers, workstations, game consoles, and/or embedded systems.

In at least one embodiment, at least one component shown or described with respect to FIG. 27A is used to perform techniques and/or functions described in connection with FIGS. 1-13. In at least one embodiment, at least one component shown or described with respect to FIG. 27A is used to perform operations described herein, such as to detect whether one or more objects within one or more images is likely to be duplicated in an image interpolated using the one or more images. In at least one embodiment, at least one component shown or described with respect to FIG. 27A is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 27B:
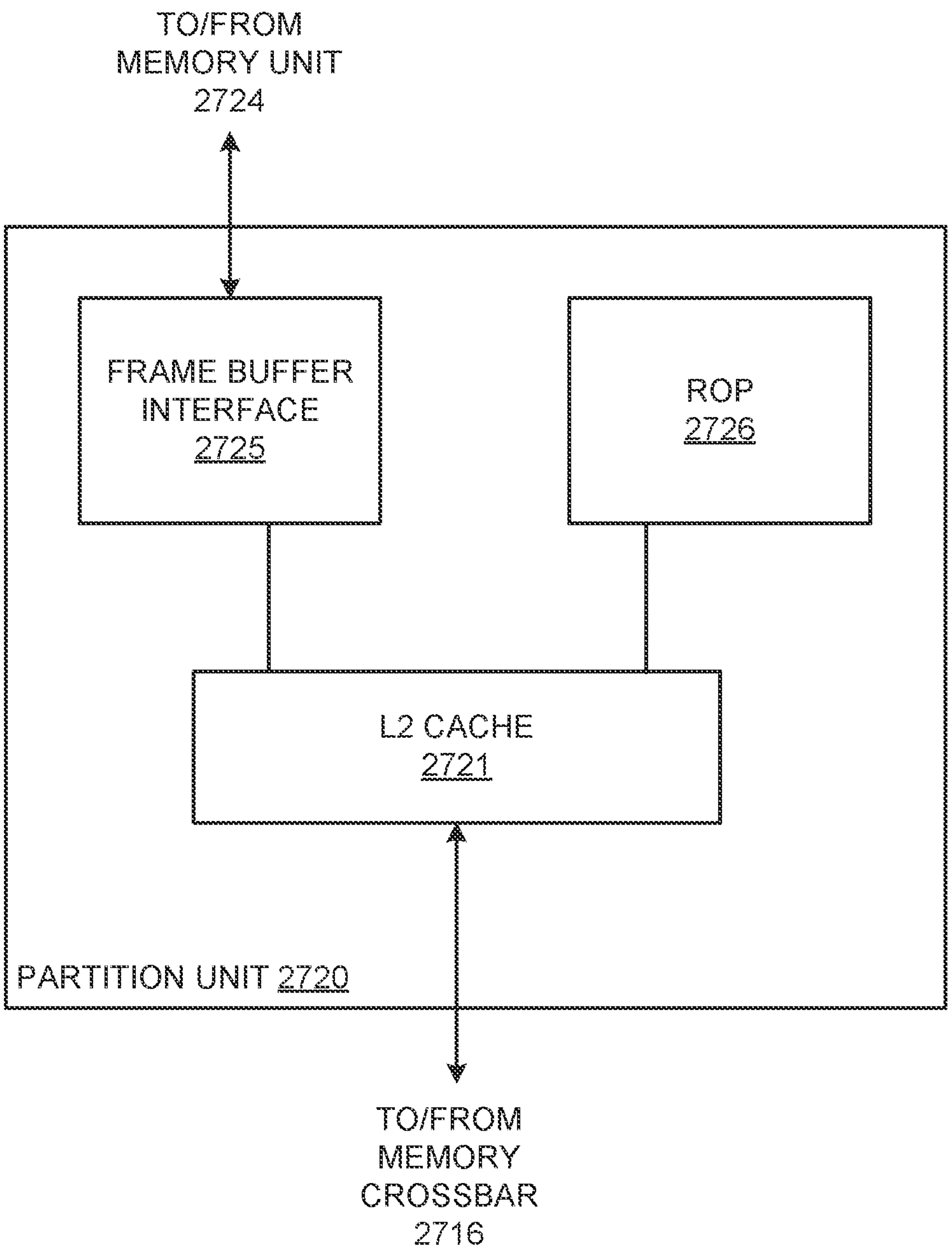
FIG. 27B illustrates a partition unit, according to at least one embodiment.

FIG. 27B is a block diagram of a partition unit 2720 according to at least one embodiment. In at least one embodiment, partition unit 2720 is an instance of one of partition units 2720A-2720N of FIG. 27A. In at least one embodiment, partition unit 2720 includes an L2 cache 2721, a frame buffer interface 2725, and a ROP 2726 (raster operations unit). In at least one embodiment, L2 cache 2721 is a read/write cache that is configured to perform load and store operations received from memory crossbar 2716 and ROP 2726. In at least one embodiment, read misses and urgent write-back requests are output by L2 cache 2721 to frame buffer interface 2725 for processing. In at least one embodiment, updates can also be sent to a frame buffer via frame buffer interface 2725 for processing. In at least one embodiment, frame buffer interface 2725 interfaces with one of memory units in parallel processor memory, such as memory units 2724A-2724N of FIG. 27 (e.g., within parallel processor memory 2722).

In at least one embodiment, ROP 2726 is a processing unit that performs raster operations such as stencil, z test, blending, etc. In at least one embodiment, ROP 2726 then outputs processed graphics data that is stored in graphics memory. In at least one embodiment, ROP 2726 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 2726 can vary based on statistical characteristics of data to be compressed. For example, in at least one embodiment, delta color compression is performed on depth and color data on a per-tile basis.

In at least one embodiment, ROP 2726 is included within each processing cluster (e.g., cluster 2714A-2714N of FIG. 27A) instead of within partition unit 2720. In at least one embodiment, read and write requests for pixel data are transmitted over memory crossbar 2716 instead of pixel fragment data. In at least one embodiment, processed graphics data may be displayed on a display device, such as one of one or more display device(s) 2610 of FIG. 26, routed for further processing by processor(s) 2602, or routed for further processing by one of processing entities within parallel processor 2700 of FIG. 27A.

In at least one embodiment, at least one component shown or described with respect to FIG. 27B is used to perform techniques and/or functions described in connection with FIGS. 1-13. In at least one embodiment, at least one component shown or described with respect to FIG. 27B is used to perform operations described herein, such as to detect whether one or more objects within one or more images is likely to be duplicated in an image interpolated using the one or more images. In at least one embodiment, at least one component shown or described with respect to FIG. 27B is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 27C:
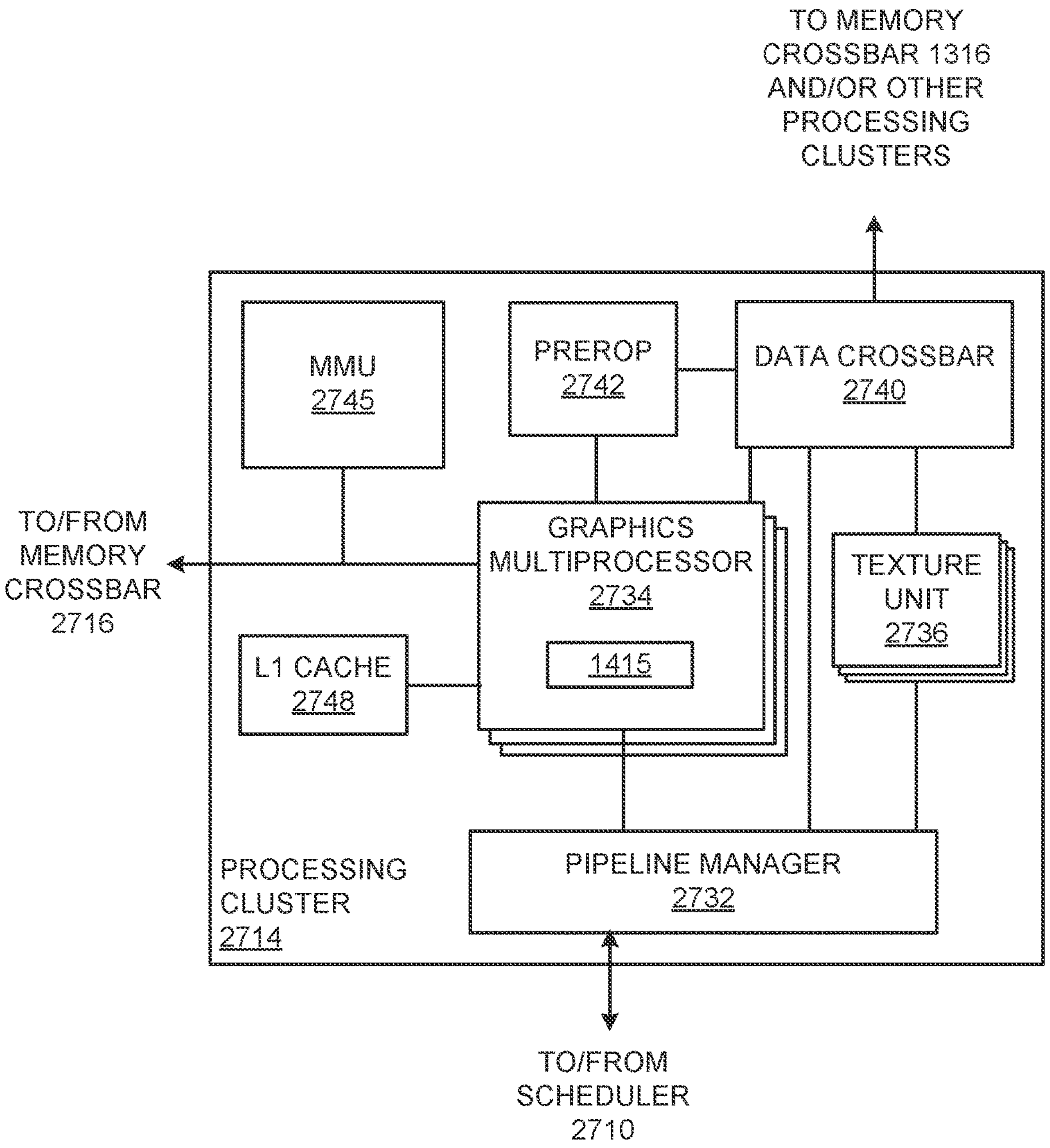
FIG. 27C illustrates a processing cluster, according to at least one embodiment.

FIG. 27C is a block diagram of a processing cluster 2714 within a parallel processing unit according to at least one embodiment. In at least one embodiment, a processing cluster is an instance of one of processing clusters 2714A-2714N of FIG. 27A. In at least one embodiment, processing cluster 2714 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 2714 can be controlled via a pipeline manager 2732 that distributes processing tasks to SIMT parallel processors. In at least one embodiment, pipeline manager 2732 receives instructions from scheduler 2710 of FIG. 27A and manages execution of those instructions via a graphics multiprocessor 2734 and/or a texture unit 2736. In at least one embodiment, graphics multiprocessor 2734 is an exemplary instance of a SIMT parallel processor. However, in at least one embodiment, various types of SIMT parallel processors of differing architectures may be included within processing cluster 2714. In at least one embodiment, one or more instances of graphics multiprocessor 2734 can be included within a processing cluster 2714. In at least one embodiment, graphics multiprocessor 2734 can process data and a data crossbar 2740 can be used to distribute processed data to one of multiple possible destinations, including other shader units. In at least one embodiment, pipeline manager 2732 can facilitate distribution of processed data by specifying destinations for processed data to be distributed via data crossbar 2740.

In at least one embodiment, each graphics multiprocessor 2734 within processing cluster 2714 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2714 constitute a thread. In at least one embodiment, a set of threads executing across a set of parallel processing engines is a thread group. In at least one embodiment, a thread group executes a common program on different input data. In at least one embodiment, each thread within a thread group can be assigned to a different processing engine within a graphics multiprocessor 2734. In at least one embodiment, a thread group may include fewer threads than a number of processing engines within graphics multiprocessor 2734. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 2734. In at least one embodiment, when a thread group includes more threads than number of processing engines within graphics multiprocessor 2734, processing can be performed over consecutive clock cycles. In at least one embodiment, multiple thread groups can be executed concurrently on a graphics multiprocessor 2734.

In at least one embodiment, graphics multiprocessor 2734 includes an internal cache memory to perform load and store operations. In at least one embodiment, graphics multiprocessor 2734 can forego an internal cache and use a cache memory (e.g., L1 cache 2748) within processing cluster 2714. In at least one embodiment, each graphics multiprocessor 2734 also has access to L2 caches within partition units (e.g., partition units 2720A-2720N of FIG. 27A) that are shared among all processing clusters 2714 and may be used to transfer data between threads. In at least one embodiment, graphics multiprocessor 2734 may also access off-chip global memory, which can include one or more of local parallel processor memory and/or system memory. In at least one embodiment, any memory external to parallel processing unit 2702 may be used as global memory. In at least one embodiment, processing cluster 2714 includes multiple instances of graphics multiprocessor 2734 and can share common instructions and data, which may be stored in L1 cache 2748.

In at least one embodiment, each processing cluster 2714 may include an MMU 2745 (memory management unit) that is configured to map virtual addresses into physical addresses. In at least one embodiment, one or more instances of MMU 2745 may reside within memory interface 2718 of FIG. 27A. In at least one embodiment, MMU 2745 includes a set of page table entries (PTEs) used to map a virtual address to a physical address of a tile and optionally a cache line index. In at least one embodiment, MMU 2745 may include address translation lookaside buffers (TLB) or caches that may reside within graphics multiprocessor 2734 or L1 2748 cache or processing cluster 2714. In at least one embodiment, a physical address is processed to distribute surface data access locally to allow for efficient request interleaving among partition units. In at least one embodiment, a cache line index may be used to determine whether a request for a cache line is a hit or miss.

In at least one embodiment, a processing cluster 2714 may be configured such that each graphics multiprocessor 2734 is coupled to a texture unit 2736 for performing texture mapping operations, e.g., determining texture sample positions, reading texture data, and filtering texture data. In at least one embodiment, texture data is read from an internal texture L1 cache (not shown) or from an L1 cache within graphics multiprocessor 2734 and is fetched from an L2 cache, local parallel processor memory, or system memory, as needed. In at least one embodiment, each graphics multiprocessor 2734 outputs processed tasks to data crossbar 2740 to provide processed task to another processing cluster 2714 for further processing or to store processed task in an L2 cache, local parallel processor memory, or system memory via memory crossbar 2716. In at least one embodiment, a preROP 2742 (pre-raster operations unit) is configured to receive data from graphics multiprocessor 2734, and direct data to ROP units, which may be located with partition units as described herein (e.g., partition units 2720A-2720N of FIG. 27A). In at least one embodiment, preROP 2742 unit can perform optimizations for color blending, organizing pixel color data, and performing address translations.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in graphics processing cluster 2714 for inferencing or predicting operations based, at least in part, on weight parameters calculated using neural network training operations, neural network functions and/or architectures, or neural network use cases described herein.

In at least one embodiment, at least one component shown or described with respect to FIG. 27C is used to perform techniques and/or functions described in connection with FIGS. 1-13. In at least one embodiment, at least one component shown or described with respect to FIG. 27C is used to perform operations described herein, such as to detect whether one or more objects within one or more images is likely to be duplicated in an image interpolated using the one or more images. In at least one embodiment, at least one component shown or described with respect to FIG. 27C is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 27D:
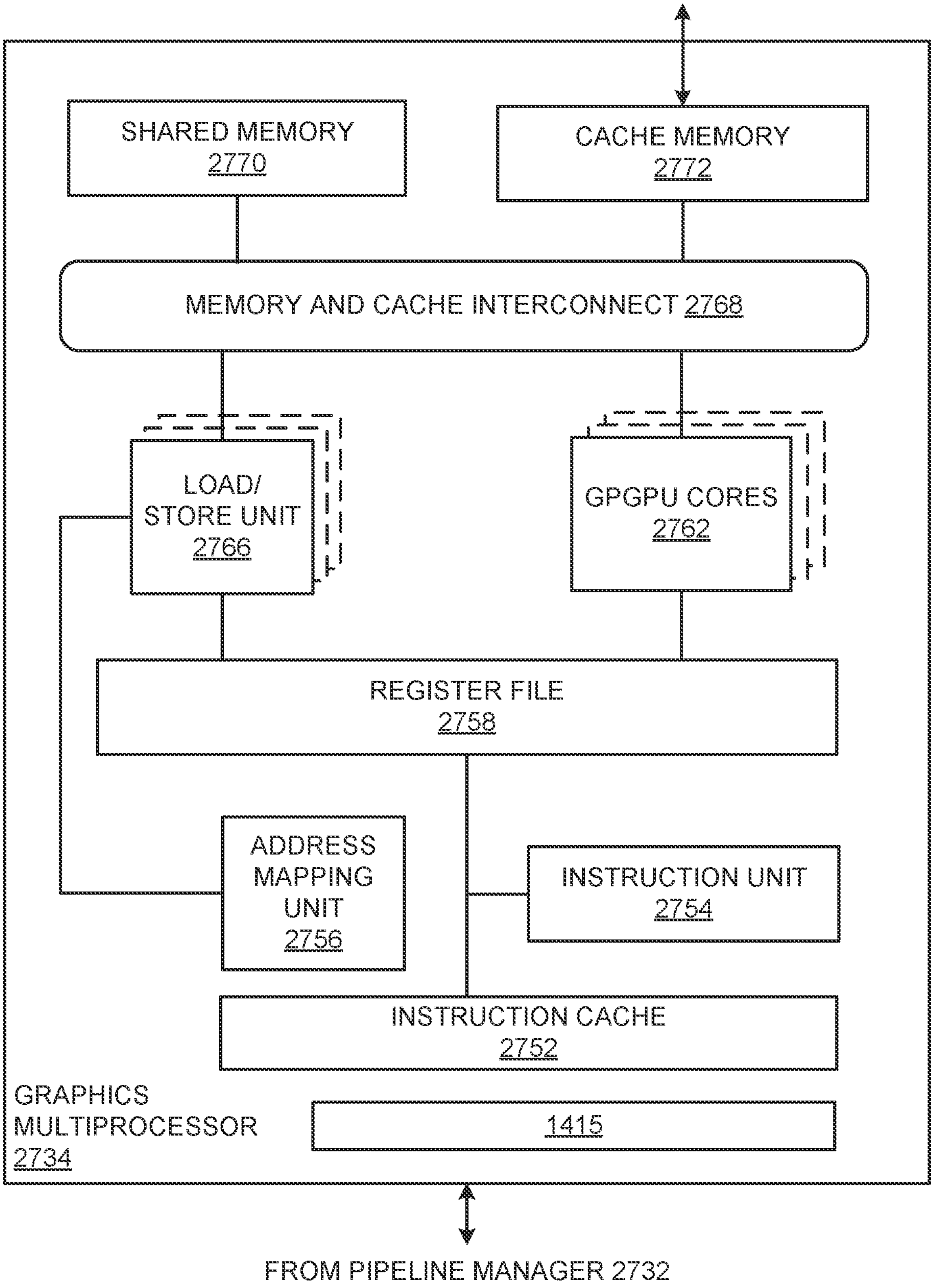
FIG. 27D illustrates a graphics multiprocessor, according to at least one embodiment.

FIG. 27D shows a graphics multiprocessor 2734 according to at least one embodiment. In at least one embodiment, graphics multiprocessor 2734 couples with pipeline manager 2732 of processing cluster 2714. In at least one embodiment, graphics multiprocessor 2734 has an execution pipeline including but not limited to an instruction cache 2752, an instruction unit 2754, an address mapping unit 2756, a register file 2758, one or more general purpose graphics processing unit (GPGPU) cores 2762, and one or more load/store units 2766. In at least one embodiment, GPGPU cores 2762 and load/store units 2766 are coupled with cache memory 2772 and shared memory 2770 via a memory and cache interconnect 2768.

In at least one embodiment, instruction cache 2752 receives a stream of instructions to execute from pipeline manager 2732. In at least one embodiment, instructions are cached in instruction cache 2752 and dispatched for execution by an instruction unit 2754. In at least one embodiment, instruction unit 2754 can dispatch instructions as thread groups (e.g., warps), with each thread of thread group assigned to a different execution unit within GPGPU cores 2762. In at least one embodiment, an instruction can access any of a local, shared, or global address space by specifying an address within a unified address space. In at least one embodiment, address mapping unit 2756 can be used to translate addresses in a unified address space into a distinct memory address that can be accessed by load/store units 2766.

In at least one embodiment, register file 2758 provides a set of registers for functional units of graphics multiprocessor 2734. In at least one embodiment, register file 2758 provides temporary storage for operands connected to data paths of functional units (e.g., GPGPU cores 2762, load/store units 2766) of graphics multiprocessor 2734. In at least one embodiment, register file 2758 is divided between each of functional units such that each functional unit is allocated a dedicated portion of register file 2758. In at least one embodiment, register file 2758 is divided between different warps being executed by graphics multiprocessor 2734.

In at least one embodiment, GPGPU cores 2762 can each include floating point units (FPUs) and/or integer arithmetic logic units (ALUs) that are used to execute instructions of graphics multiprocessor 2734. In at least one embodiment, GPGPU cores 2762 can be similar in architecture or can differ in architecture. In at least one embodiment, a first portion of GPGPU cores 2762 include a single precision FPU and an integer ALU while a second portion of GPGPU cores include a double precision FPU. In at least one embodiment, FPUs can implement IEEE 754-2008 standard floating point arithmetic or enable variable precision floating point arithmetic. In at least one embodiment, graphics multiprocessor 2734 can additionally include one or more fixed function or special function units to perform specific functions such as copy rectangle or pixel blending operations. In at least one embodiment, one or more of GPGPU cores 2762 can also include fixed or special function logic.

In at least one embodiment, GPGPU cores 2762 include SIMD logic capable of performing a single instruction on multiple sets of data. In at least one embodiment, GPGPU cores 2762 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 2768 is an interconnect network that connects each functional unit of graphics multiprocessor 2734 to register file 2758 and to shared memory 2770. In at least one embodiment, memory and cache interconnect 2768 is a crossbar interconnect that allows load/store unit 2766 to implement load and store operations between shared memory 2770 and register file 2758. In at least one embodiment, register file 2758 can operate at a same frequency as GPGPU cores 2762, thus data transfer between GPGPU cores 2762 and register file 2758 can have very low latency. In at least one embodiment, shared memory 2770 can be used to enable communication between threads that execute on functional units within graphics multiprocessor 2734. In at least one embodiment, cache memory 2772 can be used as a data cache for example, to cache texture data communicated between functional units and texture unit 2736. In at least one embodiment, shared memory 2770 can also be used as a program managed cache. In at least one embodiment, threads executing on GPGPU cores 2762 can programmatically store data within shared memory in addition to automatically cached data that is stored within cache memory 2772.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high-speed interconnect such as PCIe or NVLink). In at least one embodiment, a GPU may be integrated on a package or chip as cores and communicatively coupled to cores over an internal processor bus/interconnect internal to a package or chip. In at least one embodiment, regardless a manner in which a GPU is connected, processor cores may allocate work to such GPU in a form of sequences of commands/instructions contained in a work descriptor. In at least one embodiment, that GPU then uses dedicated circuitry/logic for efficiently processing these commands/instructions.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in graphics multiprocessor 2734 for inferencing or predicting operations based, at least in part, on weight parameters calculated using neural network training operations, neural network functions and/or architectures, or neural network use cases described herein.

In at least one embodiment, at least one component shown or described with respect to FIG. 27D is used to perform techniques and/or functions described in connection with FIGS. 1-13. In at least one embodiment, at least one component shown or described with respect to FIG. 27D is used to perform operations described herein, such as to detect whether one or more objects within one or more images is likely to be duplicated in an image interpolated using the one or more images. In at least one embodiment, at least one component shown or described with respect to FIG. 27D is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 28:
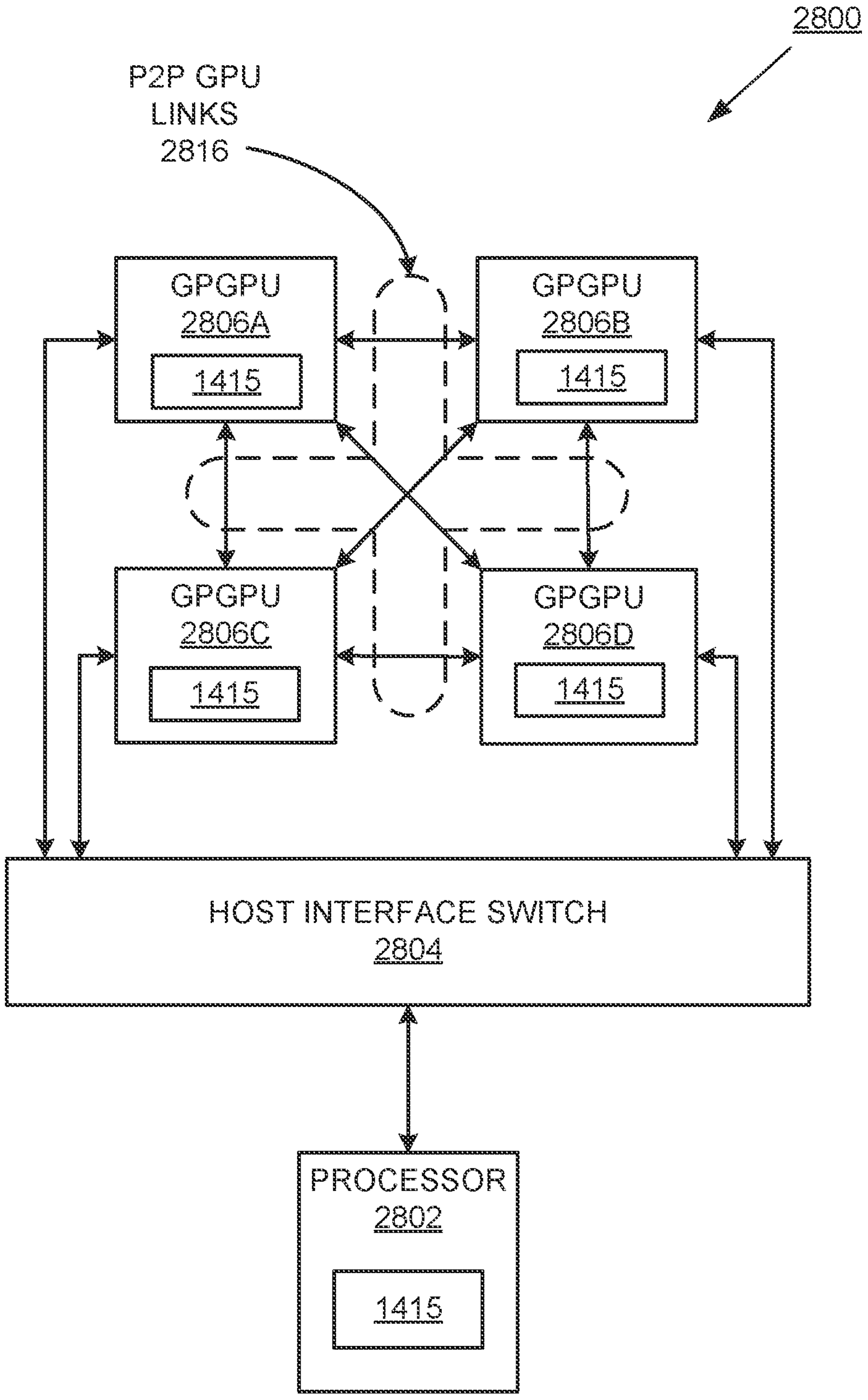
FIG. 28 illustrates a multi-graphics processing unit (GPU) system, according to at least one embodiment.

FIG. 28 illustrates a multi-GPU computing system 2800, according to at least one embodiment. In at least one embodiment, multi-GPU computing system 2800 can include a processor 2802 coupled to multiple general purpose graphics processing units (GPGPUs) 2806A-D via a host interface switch 2804. In at least one embodiment, host interface switch 2804 is a PCI express switch device that couples processor 2802 to a PCI express bus over which processor 2802 can communicate with GPGPUs 2806A-D. In at least one embodiment, GPGPUs 2806A-D can interconnect via a set of high-speed point-to-point GPU-to-GPU links 2816. In at least one embodiment, GPU-to-GPU links 2816 connect to each of GPGPUs 2806A-D via a dedicated GPU link. In at least one embodiment, P2P GPU links 2816 enable direct communication between each of GPGPUs 2806A-D without requiring communication over host interface switch 2804 to which processor 2802 is connected. In at least one embodiment, with GPU-to-GPU traffic directed to P2P GPU links 2816, host interface switch 2804 remains available for system memory access or to communicate with other instances of multi-GPU computing system 2800, for example, via one or more network devices. While in at least one embodiment GPGPUs 2806A-D connect to processor 2802 via host interface switch 2804, in at least one embodiment processor 2802 includes direct support for P2P GPU links 2816 and can connect directly to GPGPUs 2806A-D.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in multi-GPU computing system 2800 for inferencing or predicting operations based, at least in part, on weight parameters calculated using neural network training operations, neural network functions and/or architectures, or neural network use cases described herein.

In at least one embodiment, at least one component shown or described with respect to FIG. 28 is used to perform techniques and/or functions described in connection with FIGS. 1-13. In at least one embodiment, at least one component shown or described with respect to FIG. 28 is used to perform operations described herein, such as to detect whether one or more objects within one or more images is likely to be duplicated in an image interpolated using the one or more images. In at least one embodiment, at least one component shown or described with respect to FIG. 28 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 29:
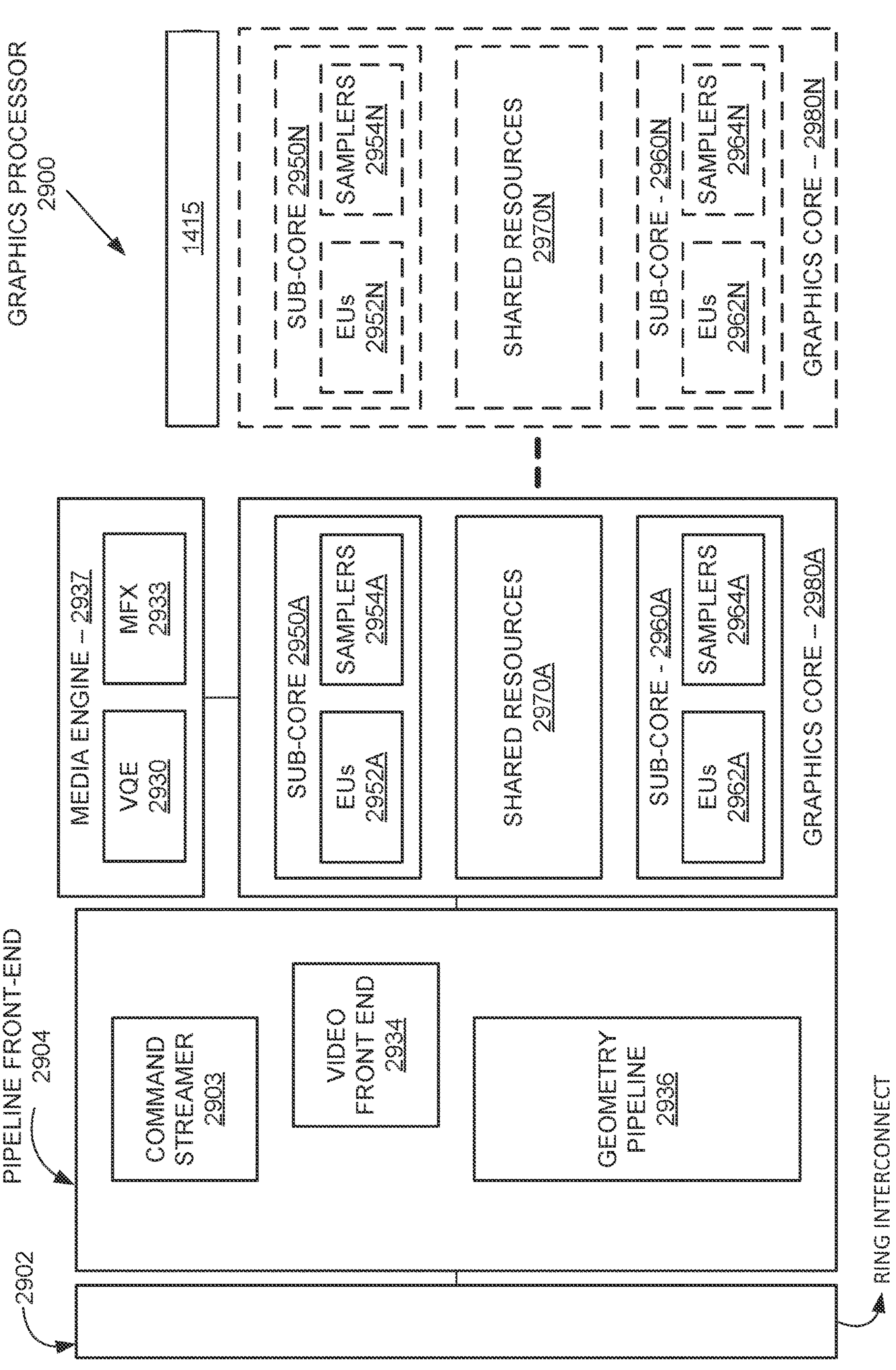
FIG. 29 illustrates a graphics processor, according to at least one embodiment.

FIG. 29 is a block diagram of a graphics processor 2900, according to at least one embodiment. In at least one embodiment, graphics processor 2900 includes a ring interconnect 2902, a pipeline front-end 2904, a media engine 2937, and graphics cores 2980A-2980N. In at least one embodiment, ring interconnect 2902 couples graphics processor 2900 to other processing units, including other graphics processors or one or more general-purpose processor cores. In at least one embodiment, graphics processor 2900 is one of many processors integrated within a multi-core processing system.

In at least one embodiment, graphics processor 2900 receives batches of commands via ring interconnect 2902. In at least one embodiment, incoming commands are interpreted by a command streamer 2903 in pipeline front-end 2904. In at least one embodiment, graphics processor 2900 includes scalable execution logic to perform 3D geometry processing and media processing via graphics core(s) 2980A-2980N. In at least one embodiment, for 3D geometry processing commands, command streamer 2903 supplies commands to geometry pipeline 2936. In at least one embodiment, for at least some media processing commands, command streamer 2903 supplies commands to a video front end 2934, which couples with media engine 2937. In at least one embodiment, media engine 2937 includes a Video Quality Engine (VQE) 2930 for video and image post-processing and a multi-format encode/decode (MFX) 2933 engine to provide hardware-accelerated media data encoding and decoding. In at least one embodiment, geometry pipeline 2936 and media engine 2937 each generate execution threads for thread execution resources provided by at least one graphics core 2980.

In at least one embodiment, graphics processor 2900 includes scalable thread execution resources featuring graphics cores 2980A-2980N (which can be modular and are sometimes referred to as core slices), each having multiple sub-cores 2950A-50N, 2960A-2960N (sometimes referred to as core sub-slices). In at least one embodiment, graphics processor 2900 can have any number of graphics cores 2980A. In at least one embodiment, graphics processor 2900 includes a graphics core 2980A having at least a first sub-core 2950A and a second sub-core 2960A. In at least one embodiment, graphics processor 2900 is a low power processor with a single sub-core (e.g., 2950A). In at least one embodiment, graphics processor 2900 includes multiple graphics cores 2980A-2980N, each including a set of first sub-cores 2950A-2950N and a set of second sub-cores 2960A-2960N. In at least one embodiment, each sub-core in first sub-cores 2950A-2950N includes at least a first set of execution units 2952A-2952N and media/texture samplers 2954A-2954N. In at least one embodiment, each sub-core in second sub-cores 2960A-2960N includes at least a second set of execution units 2962A-2962N and samplers 2964A-2964N. In at least one embodiment, each sub-core 2950A-2950N, 2960A-2960N shares a set of shared resources 2970A-2970N. In at least one embodiment, shared resources include shared cache memory and pixel operation logic.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, inference and/or training logic 1415 may be used in graphics processor 2900 for inferencing or predicting operations based, at least in part, on weight parameters calculated using neural network training operations, neural network functions and/or architectures, or neural network use cases described herein.

In at least one embodiment, at least one component shown or described with respect to FIG. 29 is used to perform techniques and/or functions described in connection with FIGS. 1-13. In at least one embodiment, at least one component shown or described with respect to FIG. 29 is used to perform operations described herein, such as to detect whether one or more objects within one or more images is likely to be duplicated in an image interpolated using the one or more images. In at least one embodiment, at least one component shown or described with respect to FIG. 29 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 30:
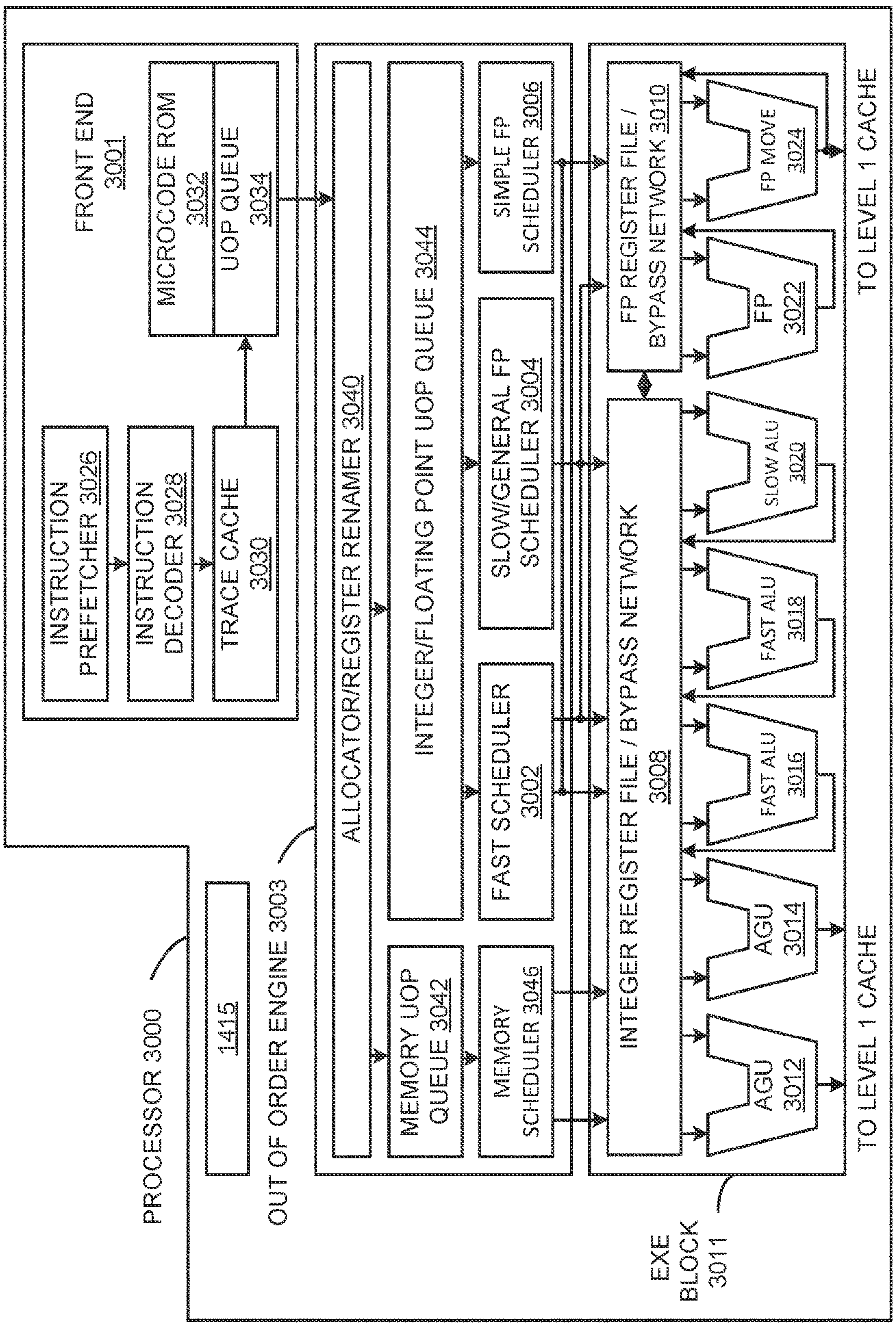
FIG. 30 is a block diagram illustrating a processor micro-architecture for a processor, according to at least one embodiment.

FIG. 30 is a block diagram illustrating micro-architecture for a processor 3000 that may include logic circuits to perform instructions, according to at least one embodiment. In at least one embodiment, processor 3000 may perform instructions, including x86 instructions, ARM instructions, specialized instructions for application-specific integrated circuits (ASICs), etc. In at least one embodiment, processor 3000 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processor 3000 may perform instructions to accelerate machine learning or deep learning algorithms, training, or inferencing.

In at least one embodiment, processor 3000 includes an in-order front end ("front end") 3001 to fetch instructions to be executed and prepare instructions to be used later in a processor pipeline. In at least one embodiment, front end 3001 may include several units. In at least one embodiment, an instruction prefetcher 3026 fetches instructions from memory and feeds instructions to an instruction decoder 3028 which in turn decodes or interprets instructions. For example, in at least one embodiment, instruction decoder 3028 decodes a received instruction into one or more operations called "micro-instructions" or "micro-operations" (also called "micro ops" or "uops") that a machine may execute. In at least one embodiment, instruction decoder 3028 parses an instruction into an opcode and corresponding data and control fields that may be used by micro-architecture to perform operations in accordance with at least one embodiment. In at least one embodiment, a trace cache 3030 may assemble decoded uops into program ordered sequences or traces in a uop queue 3034 for execution. In at least one embodiment, when trace cache 3030 encounters a complex instruction, a microcode ROM 3032 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 3028 may access microcode ROM 3032 to perform that instruction. In at least one embodiment, an instruction may be decoded into a small number of micro-ops for processing at instruction decoder 3028. In at least one embodiment, an instruction may be stored within microcode ROM 3032 should a number of micro-ops be needed to accomplish such operation. In at least one embodiment, trace cache 3030 refers to an entry point programmable logic array ("PLA") to determine a correct micro-instruction pointer for reading microcode sequences to complete one or more instructions from microcode ROM 3032 in accordance with at least one embodiment. In at least one embodiment, after microcode ROM 3032 finishes sequencing micro-ops for an instruction, front end 3001 of a machine may resume fetching micro-ops from trace cache 3030.

In at least one embodiment, out-of-order execution engine ("out of order engine") 3003 may prepare instructions for execution. In at least one embodiment, out-of-order execution logic has a number of buffers to smooth out and re-order flow of instructions to optimize performance as they go down a pipeline and get scheduled for execution. In at least one embodiment, out-of-order execution engine 3003 includes, without limitation, an allocator/register renamer 3040, a memory uop queue 3042, an integer/floating point uop queue 3044, a memory scheduler 3046, a fast scheduler 3002, a slow/general floating point scheduler ("slow/general FP scheduler") 3004, and a simple floating point scheduler ("simple FP scheduler") 3006. In at least one embodiment, fast schedule 3002, slow/general floating point scheduler 3004, and simple floating point scheduler 3006 are also collectively referred to herein as "uop schedulers 3002, 3004, 3006." In at least one embodiment, allocator/register renamer 3040 allocates machine buffers and resources that each uop needs in order to execute. In at least one embodiment, allocator/register renamer 3040 renames logic registers onto entries in a register file. In at least one embodiment, allocator/register renamer 3040 also allocates an entry for each uop in one of two uop queues, memory uop queue 3042 for memory operations and integer/floating point uop queue 3044 for non-memory operations, in front of memory scheduler 3046 and uop schedulers 3002, 3004, 3006. In at least one embodiment, uop schedulers 3002, 3004, 3006, determine when a uop is ready to execute based on readiness of their dependent input register operand sources and availability of execution resources uops need to complete their operation. In at least one embodiment, fast scheduler 3002 may schedule on each half of a main clock cycle while slow/general floating point scheduler 3004 and simple floating point scheduler 3006 may schedule once per main processor clock cycle. In at least one embodiment, uop schedulers 3002, 3004, 3006 arbitrate for dispatch ports to schedule uops for execution.

In at least one embodiment, execution block 3011 includes, without limitation, an integer register file/bypass network 3008, a floating point register file/bypass network ("FP register file/bypass network") 3010, address generation units ("AGUs") 3012 and 3014, fast Arithmetic Logic Units (ALUs) ("fast ALUs") 3016 and 3018, a slow Arithmetic Logic Unit ("slow ALU") 3020, a floating point ALU ("FP") 3022, and a floating point move unit ("FP move") 3024. In at least one embodiment, integer register file/bypass network 3008 and floating point register file/bypass network 3010 are also referred to herein as "register files 3008, 3010." In at least one embodiment, AGUSs 3012 and 3014, fast ALUs 3016 and 3018, slow ALU 3020, floating point ALU 3022, and floating point move unit 3024 are also referred to herein as "execution units 3012, 3014, 3016, 3018, 3020, 3022, and 3024." In at least one embodiment, execution block 3011 may include, without limitation, any number (including zero) and type of register files, bypass networks, address generation units, and execution units, in any combination.

In at least one embodiment, register networks 3008, 3010 may be arranged between uop schedulers 3002, 3004, 3006, and execution units 3012, 3014, 3016, 3018, 3020, 3022, and 3024. In at least one embodiment, integer register file/bypass network 3008 performs integer operations. In at least one embodiment, floating point register file/bypass network 3010 performs floating point operations. In at least one embodiment, each of register networks 3008, 3010 may include, without limitation, a bypass network that may bypass or forward just completed results that have not yet been written into a register file to new dependent uops. In at least one embodiment, register networks 3008, 3010 may communicate data with each other. In at least one embodiment, integer register file/bypass network 3008 may include, without limitation, two separate register files, one register file for a low-order thirty-two bits of data and a second register file for a high order thirty-two bits of data. In at least one embodiment, floating point register file/bypass network 3010 may include, without limitation, 128-bit wide entries because floating point instructions typically have operands from 64 to 128 bits in width.

In at least one embodiment, execution units 3012, 3014, 3016, 3018, 3020, 3022, 3024 may execute instructions. In at least one embodiment, register networks 3008, 3010 store integer and floating point data operand values that micro-instructions need to execute. In at least one embodiment, processor 3000 may include, without limitation, any number and combination of execution units 3012, 3014, 3016, 3018, 3020, 3022, 3024. In at least one embodiment, floating point ALU 3022 and floating point move unit 3024, may execute floating point, MMX, SIMD, AVX and SSE, or other operations, including specialized machine learning instructions. In at least one embodiment, floating point ALU 3022 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 3016, 3018. In at least one embodiment, fast ALUS 3016, 3018 may execute fast operations with an effective latency of half a clock cycle. In at least one embodiment, most complex integer operations go to slow ALU 3020 as slow ALU 3020 may include, without limitation, integer execution hardware for long-latency type of operations, such as a multiplier, shifts, flag logic, and branch processing. In at least one embodiment, memory load/store operations may be executed by AGUs 3012, 3014. In at least one embodiment, fast ALU 3016, fast ALU 3018, and slow ALU 3020 may perform integer operations on 64-bit data operands. In at least one embodiment, fast ALU 3016, fast ALU 3018, and slow ALU 3020 may be implemented to support a variety of data bit sizes including sixteen, thirty-two, 128, 256, etc. In at least one embodiment, floating point ALU 3022 and floating point move unit 3024 may be implemented to support a range of operands having bits of various widths, such as 128-bit wide packed data operands in conjunction with SIMD and multimedia instructions. In at least one embodiment, processor 3000 comprises one or more arithmetic logic units (ALUs) to perform training and/or inferencing using neural networks to upsample or upscale a low-resolution or lower resolution image to a high-resolution image, which can be referred to as a super-resolution image.

In at least one embodiment, uop schedulers 3002, 3004, 3006 dispatch dependent operations before a parent load has finished executing. In at least one embodiment, as uops may be speculatively scheduled and executed in processor 3000, processor 3000 may also include logic to handle memory misses. In at least one embodiment, if a data load misses in a data cache, there may be dependent operations in flight in a pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and a replay mechanism of at least one embodiment of a processor may also be designed to catch instruction sequences for text string comparison operations.

In at least one embodiment, "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment portions or all of inference and/or training logic 1415 may be incorporated into execution block 3011 and other memory or registers shown or not shown. For example, in at least one embodiment, training and/or inferencing techniques described herein may use one or more of ALUs illustrated in execution block 3011. Moreover, weight parameters may be stored in on-chip or off-chip memory and/or registers (shown or not shown) that configure ALUs of execution block 3011 to perform one or more machine learning algorithms, neural network architectures, use cases, or training techniques described herein.

In at least one embodiment, at least one component shown or described with respect to FIG. 30 is used to perform techniques and/or functions described in connection with FIGS. 1-13. In at least one embodiment, at least one component shown or described with respect to FIG. 30 is used to perform operations described herein, such as to detect whether one or more objects within one or more images is likely to be duplicated in an image interpolated using the one or more images. In at least one embodiment, at least one component shown or described with respect to FIG. 30 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 31:
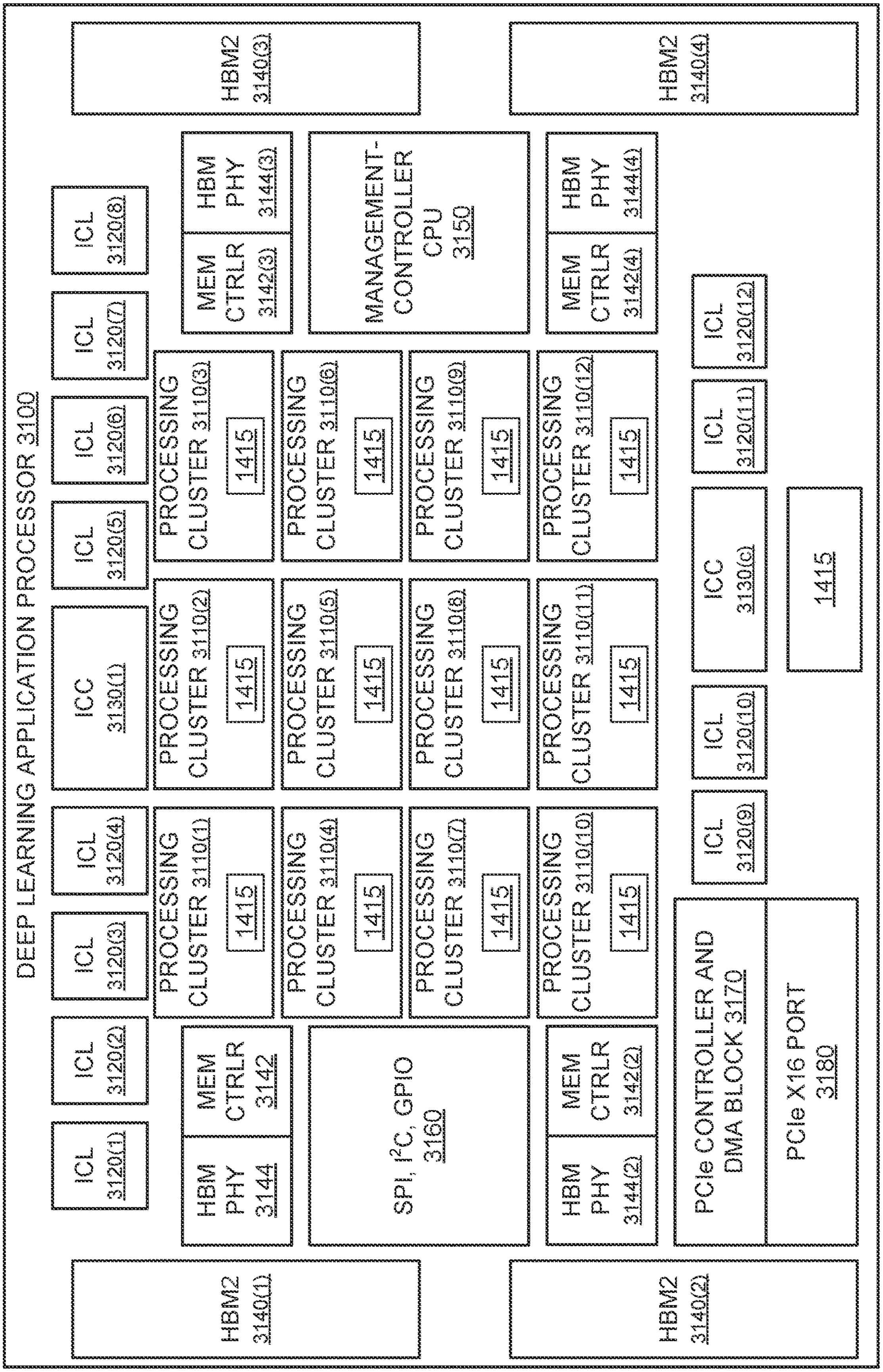
FIG. 31 illustrates a deep learning application processor, according to at least one embodiment.

FIG. 31 illustrates a deep learning application processor 3100, according to at least one embodiment. In at least one embodiment, deep learning application processor 3100 uses instructions that, if executed by deep learning application processor 3100, cause deep learning application processor 3100 to perform some or all of processes and techniques described throughout this disclosure. In at least one embodiment, deep learning application processor 3100 is an application-specific integrated circuit (ASIC). In at least one embodiment, application processor 3100 performs matrix multiply operations either "hard-wired" into hardware as a result of performing one or more instructions or both. In at least one embodiment, deep learning application processor 3100 includes, without limitation, processing clusters 3110(1)-3110(12), Inter-Chip Links ("ICLs") 3120(1)-3120(12), Inter-Chip Controllers ("ICCs") 3130(1)-3130(2), high-bandwidth memory second generation ("HBM2") 3140(1)-3140(4), memory controllers ("Mem Ctrlrs") 3142(1)-3142(4), high bandwidth memory physical layer ("HBM PHY") 3144(1)-3144(4), a management-controller central processing unit ("management-controller CPU") 3150, a Serial Peripheral Interface, Inter-Integrated Circuit, and General Purpose Input/Output block ("SPI, $I^2C$, GPIO") 3160, a peripheral component interconnect express controller and direct memory access block ("PCIe Controller and DMA") 3170, and a sixteen-lane peripheral component interconnect express port ("PCI Express×16") 3180.

In at least one embodiment, processing clusters 3110 may perform deep learning operations, including inference or prediction operations based on weight parameters calculated one or more training techniques, including those described herein. In at least one embodiment, each processing cluster 3110 may include, without limitation, any number and type of processors. In at least one embodiment, deep learning application processor 3100 may include any number and type of processing clusters 3110. In at least one embodiment, Inter-Chip Links 3120 are bi-directional. In at least one embodiment, Inter-Chip Links 3120 and Inter-Chip Controllers 3130 enable multiple deep learning application processors 3100 to exchange information, including activation information resulting from performing one or more machine learning algorithms embodied in one or more neural networks. In at least one embodiment, deep learning application processor 3100 may include any number (including zero) and type of ICLs 3120 and ICCs 3130.

In at least one embodiment, HBM2s 3140 provide a total of 32 Gigabytes (GB) of memory. In at least one embodiment, HBM2 3140(*i*) is associated with both memory controller 3142(*i*) and HBM PHY 3144(*i*) where "i" is an arbitrary integer. In at least one embodiment, any number of HBM2s 3140 may provide any type and total amount of high bandwidth memory and may be associated with any number (including zero) and type of memory controllers 3142 and HBM PHYs 3144. In at least one embodiment, SPI, $I^2C$, GPIO 3160, PCIe Controller and DMA 3170, and/or PCIe 3180 may be replaced with any number and type of blocks that enable any number and type of communication standards in any technically feasible fashion.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, deep learning application processor is used to train a machine learning model, such as a neural network, to predict or infer information provided to deep learning application processor 3100. In at least one embodiment, deep learning application processor 3100 is used to infer or predict information based on a trained machine learning model (e.g., neural network) that has been trained by another processor or system or by deep learning application processor 3100. In at least one embodiment, processor 3100 may be used to perform one or more neural network use cases described herein.

In at least one embodiment, at least one component shown or described with respect to FIG. 31 is used to perform techniques and/or functions described in connection with FIGS. 1-13. In at least one embodiment, at least one component shown or described with respect to FIG. 31 is used to perform operations described herein, such as to detect whether one or more objects within one or more images is likely to be duplicated in an image interpolated using the one or more images. In at least one embodiment, at least one component shown or described with respect to FIG. 31 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 32:
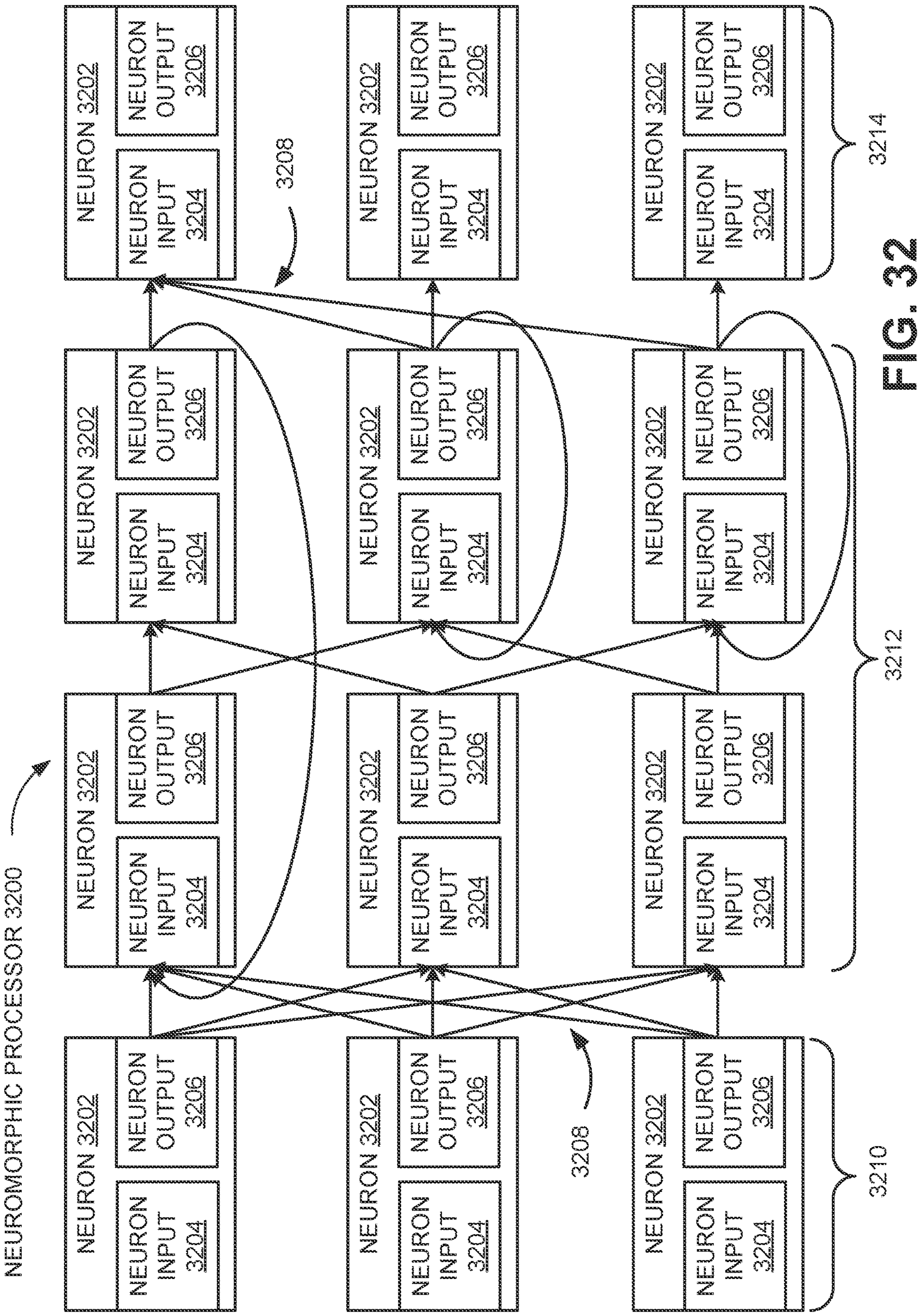
FIG. 32 is a block diagram illustrating an example neuromorphic processor, according to at least one embodiment.

FIG. 32 is a block diagram of a neuromorphic processor 3200, according to at least one embodiment. In at least one embodiment, neuromorphic processor 3200 may receive one or more inputs from sources external to neuromorphic processor 3200. In at least one embodiment, these inputs may be transmitted to one or more neurons 3202 within neuromorphic processor 3200. In at least one embodiment, neurons 3202 and components thereof may be implemented using circuitry or logic, including one or more arithmetic logic units (ALUs). In at least one embodiment, neuromorphic processor 3200 may include, without limitation, thousands or millions of instances of neurons 3202, but any suitable number of neurons 3202 may be used. In at least one embodiment, each instance of neuron 3202 may include a neuron input 3204 and a neuron output 3206. In at least one embodiment, neurons 3202 may generate outputs that may be transmitted to inputs of other instances of neurons 3202. For example, in at least one embodiment, neuron inputs 3204 and neuron outputs 3206 may be interconnected via synapses 3208.

In at least one embodiment, neurons 3202 and synapses 3208 may be interconnected such that neuromorphic processor 3200 operates to process or analyze information received by neuromorphic processor 3200. In at least one embodiment, neurons 3202 may transmit an output pulse (or "fire" or "spike") when inputs received through neuron input 3204 exceed a threshold. In at least one embodiment, neurons 3202 may sum or integrate signals received at neuron inputs 3204. For example, in at least one embodiment, neurons 3202 may be implemented as leaky integrate-and-fire neurons, wherein if a sum (referred to as a "membrane potential") exceeds a threshold value, neuron 3202 may generate an output (or "fire") using a transfer function such as a sigmoid or threshold function. In at least one embodiment, a leaky integrate-and-fire neuron may sum signals received at neuron inputs 3204 into a membrane potential and may also apply a decay factor (or leak) to reduce a membrane potential. In at least one embodiment, a leaky integrate-and-fire neuron may fire if multiple input signals are received at neuron inputs 3204 rapidly enough to exceed a threshold value (i.e., before a membrane potential decays too low to fire). In at least one embodiment, neurons 3202 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 3202 may include, without limitation, comparator circuits or logic that generate an output spike at neuron output 3206 when result of applying a transfer function to neuron input 3204 exceeds a threshold. In at least one embodiment, once neuron 3202 fires, it may disregard previously received input information by, for example, resetting a membrane potential to 0 or another suitable default value. In at least one embodiment, once membrane potential is reset to 0, neuron 3202 may resume normal operation after a suitable period of time (or refractory period).

In at least one embodiment, neurons 3202 may be interconnected through synapses 3208. In at least one embodiment, synapses 3208 may operate to transmit signals from an output of a first neuron 3202 to an input of a second neuron 3202. In at least one embodiment, neurons 3202 may transmit information over more than one instance of synapse 3208. In at least one embodiment, one or more instances of neuron output 3206 may be connected, via an instance of synapse 3208, to an instance of neuron input 3204 in same neuron 3202. In at least one embodiment, an instance of neuron 3202 generating an output to be transmitted over an instance of synapse 3208 may be referred to as a "pre-synaptic neuron" with respect to that instance of synapse 3208. In at least one embodiment, an instance of neuron 3202 receiving an input transmitted over an instance of synapse 3208 may be referred to as a "post-synaptic neuron" with respect to that instance of synapse 3208. Because an instance of neuron 3202 may receive inputs from one or more instances of synapse 3208, and may also transmit outputs over one or more instances of synapse 3208, a single instance of neuron 3202 may therefore be both a "pre-synaptic neuron" and "post-synaptic neuron," with respect to various instances of synapses 3208, in at least one embodiment.

In at least one embodiment, neurons 3202 may be organized into one or more layers. In at least one embodiment, each instance of neuron 3202 may have one neuron output 3206 that may fan out through one or more synapses 3208 to one or more neuron inputs 3204. In at least one embodiment, neuron outputs 3206 of neurons 3202 in a first layer 3210 may be connected to neuron inputs 3204 of neurons 3202 in a second layer 3212. In at least one embodiment, layer 3210 may be referred to as a "feed-forward layer." In at least one embodiment, each instance of neuron 3202 in an instance of first layer 3210 may fan out to each instance of neuron 3202 in second layer 3212. In at least one embodiment, first layer 3210 may be referred to as a "fully connected feed-forward layer." In at least one embodiment, each instance of neuron 3202 in an instance of second layer 3212 may fan out to fewer than all instances of neuron 3202 in a third layer 3214. In at least one embodiment, second layer 3212 may be referred to as a "sparsely connected feed-forward layer." In at least one embodiment, neurons 3202 in second layer 3212 may fan out to neurons 3202 in multiple other layers, including to neurons 3202 also in second layer 3212. In at least one embodiment, second layer 3212 may be referred to as a "recurrent layer." In at least one embodiment, neuromorphic processor 3200 may include, without limitation, any suitable combination of recurrent layers and feed-forward layers, including, without limitation, both sparsely connected feed-forward layers and fully connected feed-forward layers.

In at least one embodiment, neuromorphic processor 3200 may include, without limitation, a reconfigurable interconnect architecture or dedicated hard-wired interconnects to connect synapse 3208 to neurons 3202. In at least one embodiment, neuromorphic processor 3200 may include, without limitation, circuitry or logic that allows synapses to be allocated to different neurons 3202 as needed based on neural network topology and neuron fan-in/out. For example, in at least one embodiment, synapses 3208 may be connected to neurons 3202 using an interconnect fabric, such as network-on-chip, or with dedicated connections. In at least one embodiment, synapse interconnections and components thereof may be implemented using circuitry or logic.

In at least one embodiment, at least one component shown or described with respect to FIG. 32 is used to perform techniques and/or functions described in connection with FIGS. 1-13. In at least one embodiment, at least one component shown or described with respect to FIG. 32 is used to perform operations described herein, such as to detect whether one or more objects within one or more images is likely to be duplicated in an image interpolated using the one or more images. In at least one embodiment, at least one component shown or described with respect to FIG. 32 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 33:
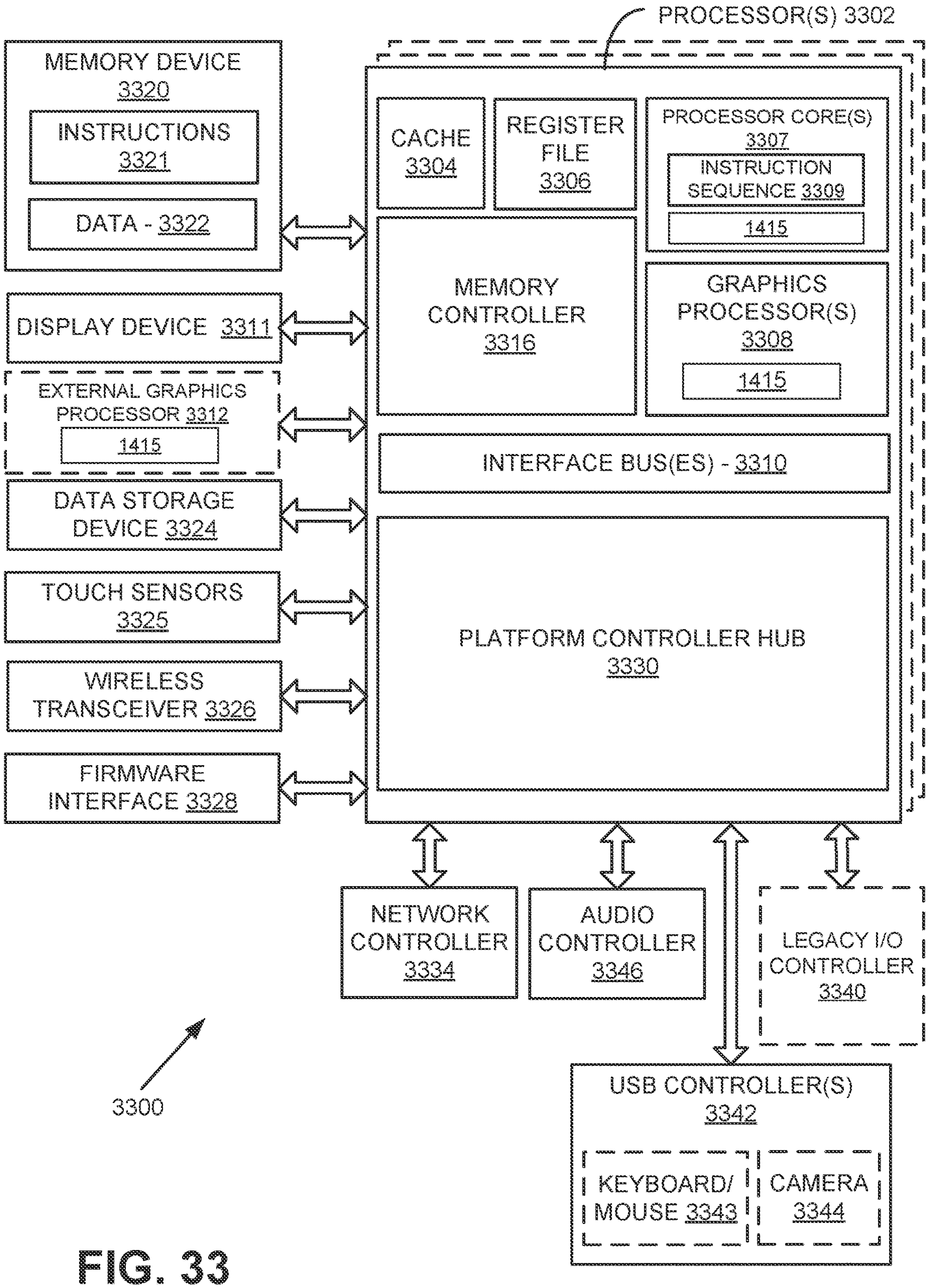
FIG. 33 illustrates at least portions of a graphics processor, according to one or more embodiments.

FIG. 33 is a block diagram of a processing system, according to at least one embodiment. In at least one embodiment, system 3300 includes one or more processors 3302 and one or more graphics processors 3308, and may be a single processor desktop system, a multiprocessor workstation system, or a server system having a large number of processors 3302 or processor cores 3307. In at least one embodiment, system 3300 is a processing platform incorporated within a system-on-a-chip (SoC) integrated circuit for use in mobile, handheld, or embedded devices.

In at least one embodiment, system 3300 can include, or be incorporated within a server-based gaming platform, a game console, including a game and media console, a mobile gaming console, a handheld game console, or an online game console. In at least one embodiment, system 3300 is a mobile phone, a smart phone, a tablet computing device or a mobile Internet device. In at least one embodiment, processing system 3300 can also include, couple with, or be integrated within a wearable device, such as a smart watch wearable device, a smart eyewear device, an augmented reality device, or a virtual reality device. In at least one embodiment, processing system 3300 is a television or set top box device having one or more processors 3302 and a graphical interface generated by one or more graphics processors 3308.

In at least one embodiment, one or more processors 3302 each include one or more processor cores 3307 to process instructions which, when executed, perform operations for system and user software. In at least one embodiment, each of one or more processor cores 3307 is configured to process a specific instruction sequence 3309. In at least one embodiment, instruction sequence 3309 may facilitate Complex Instruction Set Computing (CISC), Reduced Instruction Set Computing (RISC), or computing via a Very Long Instruction Word (VLIW). In at least one embodiment, processor cores 3307 may each process a different instruction sequence 3309, which may include instructions to facilitate emulation of other instruction sequences. In at least one embodiment, processor core 3307 may also include other processing devices, such a Digital Signal Processor (DSP).

In at least one embodiment, processor 3302 includes a cache memory 3304. In at least one embodiment, processor 3302 can have a single internal cache or multiple levels of internal cache. In at least one embodiment, cache memory is shared among various components of processor 3302. In at least one embodiment, processor 3302 also uses an external cache (e.g., a Level-3 (L3) cache or Last Level Cache (LLC)) (not shown), which may be shared among processor cores 3307 using known cache coherency techniques. In at least one embodiment, a register file 3306 is additionally included in processor 3302, which may include different types of registers for storing different types of data (e.g., integer registers, floating point registers, status registers, and an instruction pointer register). In at least one embodiment, register file 3306 may include general-purpose registers or other registers.

In at least one embodiment, one or more processor(s) 3302 are coupled with one or more interface bus(es) 3310 to transmit communication signals such as address, data, or control signals between processor 3302 and other components in system 3300. In at least one embodiment, interface bus 3310 can be a processor bus, such as a version of a Direct Media Interface (DMI) bus. In at least one embodiment, interface bus 3310 is not limited to a DMI bus, and may include one or more Peripheral Component Interconnect buses (e.g., PCI, PCI Express), memory busses, or other types of interface busses. In at least one embodiment processor(s) 3302 include an integrated memory controller 3316 and a platform controller hub 3330. In at least one embodiment, memory controller 3316 facilitates communication between a memory device and other components of system 3300, while platform controller hub (PCH) 3330 provides connections to I/O devices via a local I/O bus.

In at least one embodiment, a memory device 3320 can be a dynamic random access memory (DRAM) device, a static random access memory (SRAM) device, flash memory device, phase-change memory device, or some other memory device having suitable performance to serve as process memory. In at least one embodiment, memory device 3320 can operate as system memory for system 3300, to store data 3322 and instructions 3321 for use when one or more processors 3302 executes an application or process. In at least one embodiment, memory controller 3316 also couples with an optional external graphics processor 3312, which may communicate with one or more graphics processors 3308 in processors 3302 to perform graphics and media operations. In at least one embodiment, a display device 3311 can connect to processor(s) 3302. In at least one embodiment, display device 3311 can include one or more of an internal display device, as in a mobile electronic device or a laptop device, or an external display device attached via a display interface (e.g., DisplayPort, etc.). In at least one embodiment, display device 3311 can include a head mounted display (HMD) such as a stereoscopic display device for use in virtual reality (VR) applications or augmented reality (AR) applications.

In at least one embodiment, platform controller hub 3330 enables peripherals to connect to memory device 3320 and processor 3302 via a high-speed I/O bus. In at least one embodiment, I/O peripherals include, but are not limited to, an audio controller 3346, a network controller 3334, a firmware interface 3328, a wireless transceiver 3326, touch sensors 3325, a data storage device 3324 (e.g., hard disk drive, flash memory, etc.). In at least one embodiment, data storage device 3324 can connect via a storage interface (e.g., SATA) or via a peripheral bus, such as a Peripheral Component Interconnect bus (e.g., PCI, PCI Express). In at least one embodiment, touch sensors 3325 can include touch screen sensors, pressure sensors, or fingerprint sensors. In at least one embodiment, wireless transceiver 3326 can be a Wi-Fi transceiver, a Bluetooth transceiver, or a mobile network transceiver such as a 3G, 4G, or Long Term Evolution (LTE) transceiver. In at least one embodiment, firmware interface 3328 enables communication with system firmware, and can be, for example, a unified extensible firmware interface (UEFI). In at least one embodiment, network controller 3334 can enable a network connection to a wired network. In at least one embodiment, a high-performance network controller (not shown) couples with interface bus 3310. In at least one embodiment, audio controller 3346 is a multi-channel high definition audio controller. In at least one embodiment, system 3300 includes an optional legacy I/O controller 3340 for coupling legacy (e.g., Personal System 2 (PS/2)) devices to system 3300. In at least one embodiment, platform controller hub 3330 can also connect to one or more Universal Serial Bus (USB) controllers 3342 connect input devices, such as keyboard and mouse 3343 combinations, a camera 3344, or other USB input devices.

In at least one embodiment, an instance of memory controller 3316 and platform controller hub 3330 may be integrated into a discreet external graphics processor, such as external graphics processor 3312. In at least one embodiment, platform controller hub 3330 and/or memory controller 3316 may be external to one or more processor(s) 3302. For example, in at least one embodiment, system 3300 can include an external memory controller 3316 and platform controller hub 3330, which may be configured as a memory controller hub and peripheral controller hub within a system chipset that is in communication with processor(s) 3302.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment portions or all of inference and/or training logic 1415 may be incorporated into graphics processor(s) 3308. For example, in at least one embodiment, training and/or inferencing techniques described herein may use one or more of ALUs embodied in a 3D pipeline. Moreover, in at least one embodiment, inferencing and/or training operations described herein may be done using logic other than logic illustrated in FIG. 14A or 14B. In at least one embodiment, weight parameters may be stored in on-chip or off-chip memory and/or registers (shown or not shown) that configure ALUs of graphics processor(s) 3308 to perform one or more machine learning algorithms, neural network architectures, use cases, or training techniques described herein.

In at least one embodiment, at least one component shown or described with respect to FIG. 33 is used to perform techniques and/or functions described in connection with FIGS. 1-13. In at least one embodiment, at least one component shown or described with respect to FIG. 33 is used to perform operations described herein, such as to detect whether one or more objects within one or more images is likely to be duplicated in an image interpolated using the one or more images. In at least one embodiment, at least one component shown or described with respect to FIG. 33 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 34:
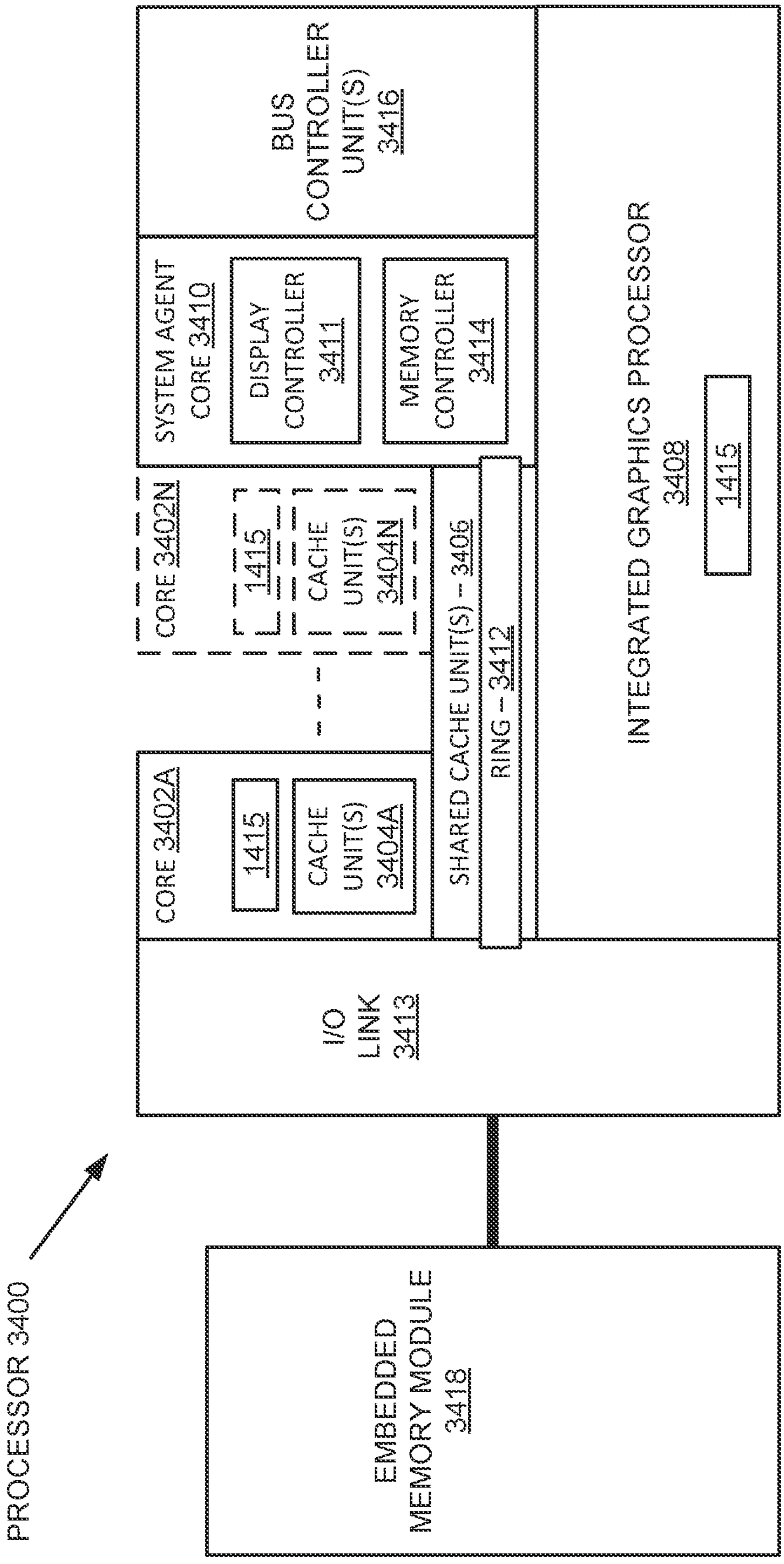
FIG. 34 illustrates at least portions of a graphics processor, according to one or more embodiments.

FIG. 34 is a block diagram of a processor 3400 having one or more processor cores 3402A-3402N, an integrated memory controller 3414, and an integrated graphics processor 3408, according to at least one embodiment. In at least one embodiment, processor 3400 can include additional cores up to and including additional core 3402N represented by dashed lined boxes. In at least one embodiment, each of processor cores 3402A-3402N includes one or more internal cache units 3404A-3404N. In at least one embodiment, each processor core also has access to one or more shared cached units 3406.

In at least one embodiment, internal cache units 3404A-3404N and shared cache units 3406 represent a cache memory hierarchy within processor 3400. In at least one embodiment, cache memory units 3404A-3404N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 3406 and 3404A-3404N.

In at least one embodiment, processor 3400 may also include a set of one or more bus controller units 3416 and a system agent core 3410. In at least one embodiment, bus controller units 3416 manage a set of peripheral buses, such as one or more PCI or PCI express busses. In at least one embodiment, system agent core 3410 provides management functionality for various processor components. In at least one embodiment, system agent core 3410 includes one or more integrated memory controllers 3414 to manage access to various external memory devices (not shown).

In at least one embodiment, one or more of processor cores 3402A-3402N include support for simultaneous multi-threading. In at least one embodiment, system agent core 3410 includes components for coordinating and operating cores 3402A-3402N during multi-threaded processing. In at least one embodiment, system agent core 3410 may additionally include a power control unit (PCU), which includes logic and components to regulate one or more power states of processor cores 3402A-3402N and graphics processor 3408.

In at least one embodiment, processor 3400 additionally includes graphics processor 3408 to execute graphics processing operations. In at least one embodiment, graphics processor 3408 couples with shared cache units 3406, and system agent core 3410, including one or more integrated memory controllers 3414. In at least one embodiment, system agent core 3410 also includes a display controller 3411 to drive graphics processor output to one or more coupled displays. In at least one embodiment, display controller 3411 may also be a separate module coupled with graphics processor 3408 via at least one interconnect, or may be integrated within graphics processor 3408.

In at least one embodiment, a ring-based interconnect unit 3412 is used to couple internal components of processor 3400. In at least one embodiment, an alternative interconnect unit may be used, such as a point-to-point interconnect, a switched interconnect, or other techniques. In at least one embodiment, graphics processor 3408 couples with ring interconnect 3412 via an I/O link 3413.

In at least one embodiment, I/O link 3413 represents at least one of multiple varieties of I/O interconnects, including an on package I/O interconnect which facilitates communication between various processor components and a high-performance embedded memory module 3418, such as an eDRAM module. In at least one embodiment, each of processor cores 3402A-3402N and graphics processor 3408 use embedded memory module 3418 as a shared Last Level Cache.

In at least one embodiment, processor cores 3402A-3402N are homogeneous cores executing a common instruction set architecture. In at least one embodiment, processor cores 3402A-3402N are heterogeneous in terms of instruction set architecture (ISA), where one or more of processor cores 3402A-3402N execute a common instruction set, while one or more other cores of processor cores 3402A-3402N executes a subset of a common instruction set or a different instruction set. In at least one embodiment, processor cores 3402A-3402N are heterogeneous in terms of microarchitecture, where one or more cores having a relatively higher power consumption couple with one or more power cores having a lower power consumption. In at least one embodiment, processor 3400 can be implemented on one or more chips or as an SoC integrated circuit (e.g., processor 3400 is electronically coupled to an accelerator or one or more GPUs to form an SoC).

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment portions or all of inference and/or training logic 1415 may be incorporated into processor 3400. For example, in at least one embodiment, training and/or inferencing techniques described herein may use one or more of ALUs embodied in a 3D pipeline, graphics core(s) 3402, shared function logic, or other logic in FIG. 34. Moreover, in at least one embodiment, inferencing and/or training operations described herein may be done using logic other than logic illustrated in FIG. 14A or 14B. In at least one embodiment, weight parameters may be stored in on-chip or off-chip memory and/or registers (shown or not shown) that configure ALUs of processor 3400 to perform one or more machine learning algorithms, neural network architectures, use cases, or training techniques described herein.

In at least one embodiment, at least one component shown or described with respect to FIG. 34 is used to perform techniques and/or functions described in connection with FIGS. 1-13. In at least one embodiment, at least one component shown or described with respect to FIG. 34 is used to perform operations described herein, such as to detect whether one or more objects within one or more images is likely to be duplicated in an image interpolated using the one or more images. In at least one embodiment, at least one component shown or described with respect to FIG. 34 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 35:
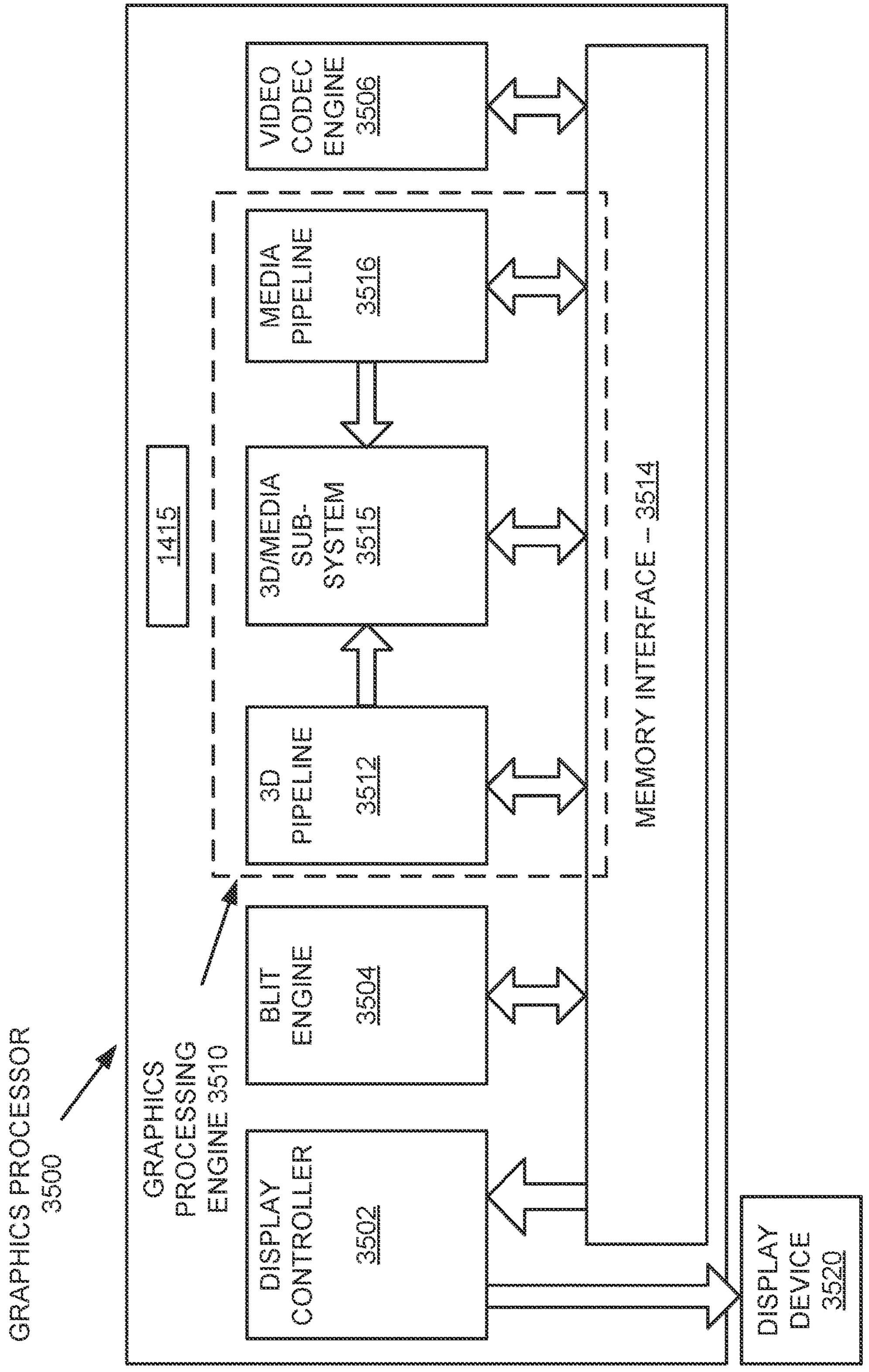
FIG. 35 illustrates at least portions of a graphics processor, according to one or more embodiments.

FIG. 35 is a block diagram of a graphics processor 3500, which may be a discrete graphics processing unit, or may be a graphics processor integrated with a plurality of processing cores. In at least one embodiment, graphics processor 3500 communicates via a memory mapped I/O interface to registers on graphics processor 3500 and with commands placed into memory. In at least one embodiment, graphics processor 3500 includes a memory interface 3514 to access memory. In at least one embodiment, memory interface 3514 is an interface to local memory, one or more internal caches, one or more shared external caches, and/or to system memory.

In at least one embodiment, graphics processor 3500 also includes a display controller 3502 to drive display output data to a display device 3520. In at least one embodiment, display controller 3502 includes hardware for one or more overlay planes for display device 3520 and composition of multiple layers of video or user interface elements. In at least one embodiment, display device 3520 can be an internal or external display device. In at least one embodiment, display device 3520 is a head mounted display device, such as a virtual reality (VR) display device or an augmented reality (AR) display device. In at least one embodiment, graphics processor 3500 includes a video codec engine 3506 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 3500 includes a block image transfer (BLIT) engine 3504 to perform two-dimensional (2D) rasterizer operations including, for example, bit-boundary block transfers. However, in at least one embodiment, 2D graphics operations are performed using one or more components of a graphics processing engine (GPE) 3510. In at least one embodiment, GPE 3510 is a compute engine for performing graphics operations, including three-dimensional (3D) graphics operations and media operations.

In at least one embodiment, GPE 3510 includes a 3D pipeline 3512 for performing 3D operations, such as rendering three-dimensional images and scenes using processing functions that act upon 3D primitive shapes (e.g., rectangle, triangle, etc.). In at least one embodiment, 3D pipeline 3512 includes programmable and fixed function elements that perform various tasks and/or spawn execution threads to a 3D/Media sub-system 3515. While 3D pipeline 3512 can be used to perform media operations, in at least one embodiment, GPE 3510 also includes a media pipeline 3516 that is used to perform media operations, such as video post-processing and image enhancement.

In at least one embodiment, media pipeline 3516 includes fixed function or programmable logic units to perform one or more specialized media operations, such as video decode acceleration, video de-interlacing, and video encode acceleration in place of, or on behalf of, video codec engine 3506. In at least one embodiment, media pipeline 3516 additionally includes a thread spawning unit to spawn threads for execution on 3D/Media sub-system 3515. In at least one embodiment, spawned threads perform computations for media operations on one or more graphics execution units included in 3D/Media sub-system 3515.

In at least one embodiment, 3D/Media subsystem 3515 includes logic for executing threads spawned by 3D pipeline 3512 and media pipeline 3516. In at least one embodiment, 3D pipeline 3512 and media pipeline 3516 send thread execution requests to 3D/Media subsystem 3515, which includes thread dispatch logic for arbitrating and dispatching various requests to available thread execution resources. In at least one embodiment, execution resources include an array of graphics execution units to process 3D and media threads. In at least one embodiment, 3D/Media subsystem 3515 includes one or more internal caches for thread instructions and data. In at least one embodiment, subsystem 3515 also includes shared memory, including registers and addressable memory, to share data between threads and to store output data.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment portions or all of inference and/or training logic 1415 may be incorporated into graphics processor 3500. For example, in at least one embodiment, training and/or inferencing techniques described herein may use one or more of ALUs embodied in 3D pipeline 3512. Moreover, in at least one embodiment, inferencing and/or training operations described herein may be done using logic other than logic illustrated in FIG. 14A or 14B. In at least one embodiment, weight parameters may be stored in on-chip or off-chip memory and/or registers (shown or not shown) that configure ALUs of graphics processor 3500 to perform one or more machine learning algorithms, neural network architectures, use cases, or training techniques described herein.

In at least one embodiment, at least one component shown or described with respect to FIG. 35 is used to perform techniques and/or functions described in connection with FIGS. 1-13. In at least one embodiment, at least one component shown or described with respect to FIG. 35 is used to perform operations described herein, such as to detect whether one or more objects within one or more images is likely to be duplicated in an image interpolated using the one or more images. In at least one embodiment, at least one component shown or described with respect to FIG. 35 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 36:
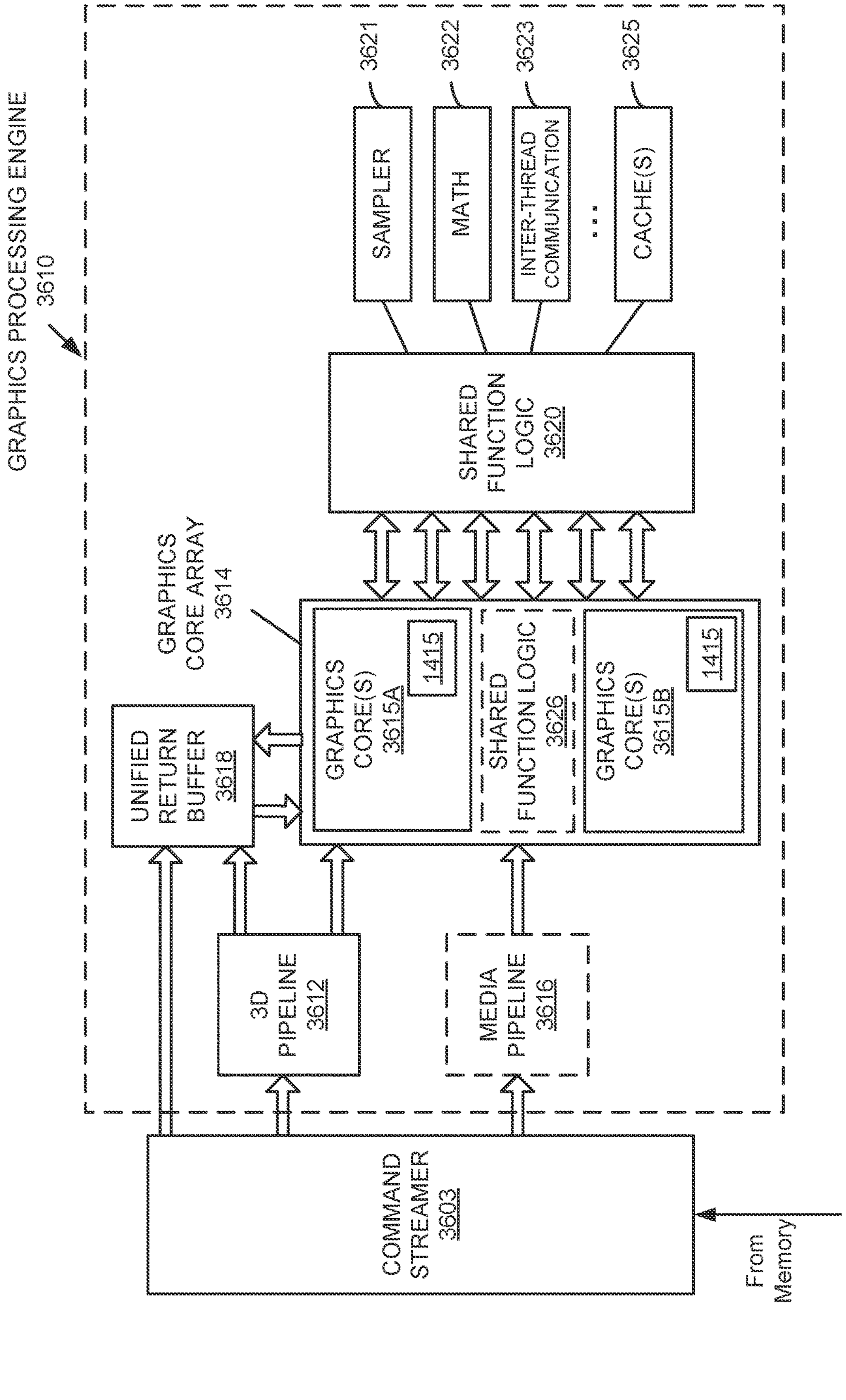
FIG. 36 is a block diagram of a graphics processing engine of a graphics processor in accordance with at least one embodiment.

FIG. 36 is a block diagram of a graphics processing engine 3610 of a graphics processor in accordance with at least one embodiment. In at least one embodiment, graphics processing engine (GPE) 3610 is a version of GPE 3510 shown in FIG. 35. In at least one embodiment, a media pipeline 3616 is optional and may not be explicitly included within GPE 3610. In at least one embodiment, a separate media and/or image processor is coupled to GPE 3610.

In at least one embodiment, GPE 3610 is coupled to or includes a command streamer 3603, which provides a command stream to a 3D pipeline 3612 and/or media pipeline 3616. In at least one embodiment, command streamer 3603 is coupled to memory, which can be system memory, or one or more of internal cache memory and shared cache memory. In at least one embodiment, command streamer 3603 receives commands from memory and sends commands to 3D pipeline 3612 and/or media pipeline 3616. In at least one embodiment, commands are instructions, primitives, or micro-operations fetched from a ring buffer, which stores commands for 3D pipeline 3612 and media pipeline 3616. In at least one embodiment, a ring buffer can additionally include batch command buffers storing batches of multiple commands. In at least one embodiment, commands for 3D pipeline 3612 can also include references to data stored in memory, such as, but not limited to, vertex and geometry data for 3D pipeline 3612 and/or image data and memory objects for media pipeline 3616. In at least one embodiment, 3D pipeline 3612 and media pipeline 3616 process commands and data by performing operations or by dispatching one or more execution threads to a graphics core array 3614. In at least one embodiment, graphics core array 3614 includes one or more blocks of graphics cores (e.g., graphics core(s) 3615A, graphics core(s) 3615B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 1415 in FIG. 14A and FIG. 14B.

In at least one embodiment, 3D pipeline 3612 includes fixed function and programmable logic to process one or more shader programs, such as vertex shaders, geometry shaders, pixel shaders, fragment shaders, compute shaders, or other shader programs, by processing instructions and dispatching execution threads to graphics core array 3614. In at least one embodiment, graphics core array 3614 provides a unified block of execution resources for use in processing shader programs. In at least one embodiment, a multi-purpose execution logic (e.g., execution units) within graphics core(s) 3615A-3615B of graphic core array 3614 includes support for various 3D API shader languages and can execute multiple simultaneous execution threads associated with multiple shaders.

In at least one embodiment, graphics core array 3614 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 3614 can output data to memory in a unified return buffer (URB) 3618. In at least one embodiment, URB 3618 can store data for multiple threads. In at least one embodiment, URB 3618 may be used to send data between different threads executing on graphics core array 3614. In at least one embodiment, URB 3618 may additionally be used for synchronization between threads on graphics core array 3614 and fixed function logic within shared function logic 3620.

In at least one embodiment, graphics core array 3614 is scalable, such that graphics core array 3614 includes a variable number of graphics cores, each having a variable number of execution units based on a target power and performance level of GPE 3610. In at least one embodiment, execution resources are dynamically scalable, such that execution resources may be enabled or disabled as needed.

In at least one embodiment, graphics core array 3614 is coupled to shared function logic 3620 that includes multiple resources that are shared between graphics cores in graphics core array 3614. In at least one embodiment, shared functions performed by shared function logic 3620 are embodied in hardware logic units that provide specialized supplemental functionality to graphics core array 3614. In at least one embodiment, shared function logic 3620 includes but is not limited to a sampler unit 3621, a math unit 3622, and inter-thread communication (ITC) logic 3623. In at least one embodiment, one or more cache(s) 3625 are included in, or coupled to, shared function logic 3620.

In at least one embodiment, a shared function is used if demand for a specialized function is insufficient for inclusion within graphics core array 3614. In at least one embodiment, a single instantiation of a specialized function is used in shared function logic 3620 and shared among other execution resources within graphics core array 3614. In at least one embodiment, specific shared functions within shared function logic 3620 that are used extensively by graphics core array 3614 may be included within shared function logic 3626 within graphics core array 3614. In at least one embodiment, shared function logic 3626 within graphics core array 3614 can include some or all logic within shared function logic 3620. In at least one embodiment, all logic elements within shared function logic 3620 may be duplicated within shared function logic 3626 of graphics core array 3614. In at least one embodiment, shared function logic 3620 is excluded in favor of shared function logic 3626 within graphics core array 3614.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment portions or all of inference and/or training logic 1415 may be incorporated into graphics processor 3610. For example, in at least one embodiment, training and/or inferencing techniques described herein may use one or more of ALUs embodied in 3D pipeline 3612, graphics core(s) 3615, shared function logic 3626, shared function logic 3620, or other logic in FIG. 36. Moreover, in at least one embodiment, inferencing and/or training operations described herein may be done using logic other than logic illustrated in FIG. 14A or 14B. In at least one embodiment, weight parameters may be stored in on-chip or off-chip memory and/or registers (shown or not shown) that configure ALUs of graphics processor 3610 to perform one or more machine learning algorithms, neural network architectures, use cases, or training techniques described herein.

In at least one embodiment, at least one component shown or described with respect to FIG. 36 is used to perform techniques and/or functions described in connection with FIGS. 1-13. In at least one embodiment, at least one component shown or described with respect to FIG. 36 is used to perform operations described herein, such as to detect whether one or more objects within one or more images is likely to be duplicated in an image interpolated using the one or more images. In at least one embodiment, at least one component shown or described with respect to FIG. 36 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 37:
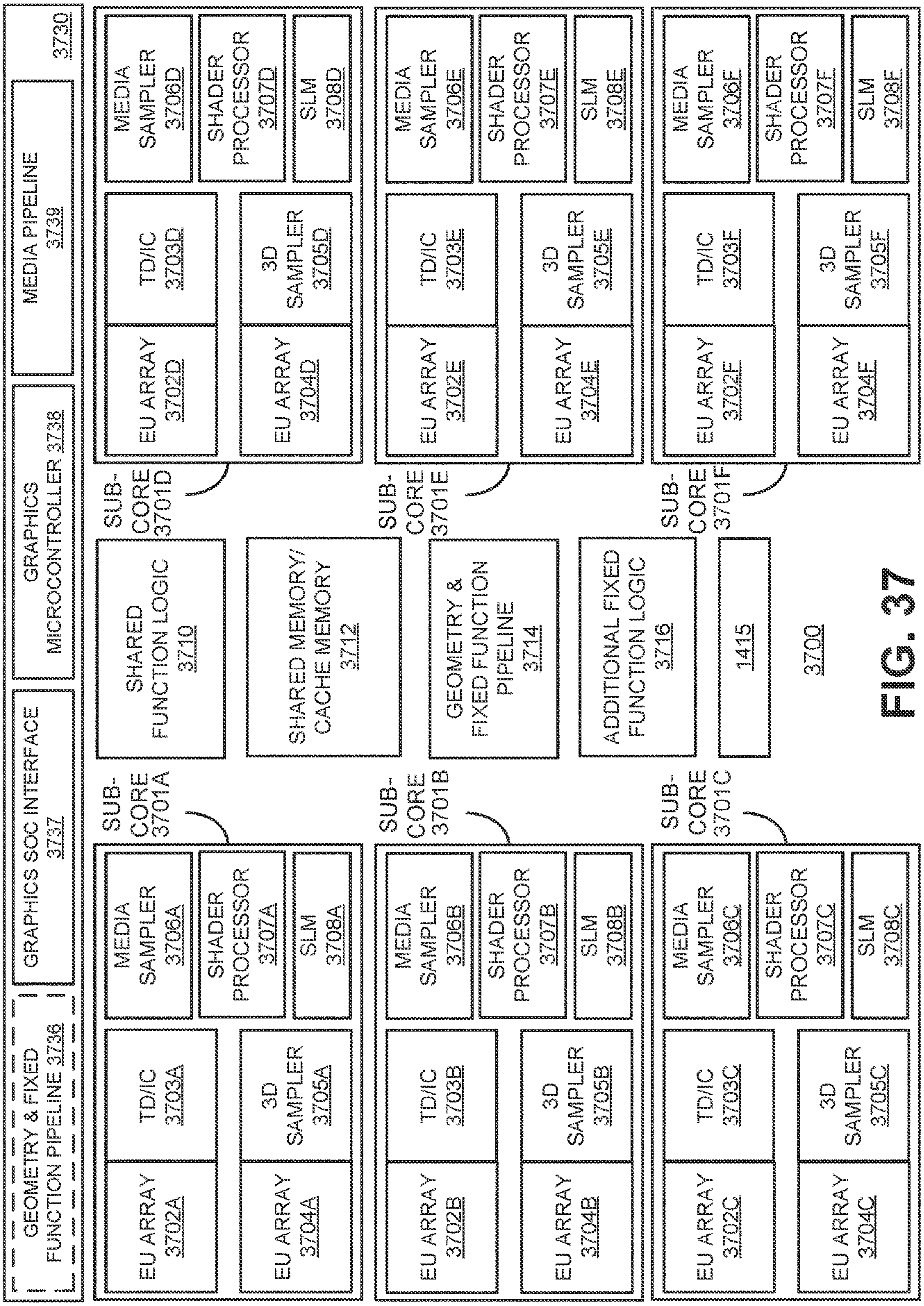
FIG. 37 is a block diagram of at least portions of a graphics processor core, according to at least one embodiment.

FIG. 37 is a block diagram of hardware logic of a graphics processor core 3700, according to at least one embodiment described herein. In at least one embodiment, graphics processor core 3700 is included within a graphics core array. In at least one embodiment, graphics processor core 3700, sometimes referred to as a core slice, can be one or multiple graphics cores within a modular graphics processor. In at least one embodiment, graphics processor core 3700 is exemplary of one graphics core slice, and a graphics processor as described herein may include multiple graphics core slices based on target power and performance envelopes. In at least one embodiment, each graphics core 3700 can include a fixed function block 3730 coupled with multiple sub-cores 3701A-3701F, also referred to as sub-slices, that include modular blocks of general-purpose and fixed function logic.

In at least one embodiment, fixed function block 3730 includes a geometry and fixed function pipeline 3736 that can be shared by all sub-cores in graphics processor 3700, for example, in lower performance and/or lower power graphics processor implementations. In at least one embodiment, geometry and fixed function pipeline 3736 includes a 3D fixed function pipeline, a video front-end unit, a thread spawner and thread dispatcher, and a unified return buffer manager, which manages unified return buffers.

In at least one embodiment, fixed function block 3730 also includes a graphics SoC interface 3737, a graphics microcontroller 3738, and a media pipeline 3739. In at least one embodiment, graphics SoC interface 3737 provides an interface between graphics core 3700 and other processor cores within a system on a chip integrated circuit. In at least one embodiment, graphics microcontroller 3738 is a programmable sub-processor that is configurable to manage various functions of graphics processor 3700, including thread dispatch, scheduling, and pre-emption. In at least one embodiment, media pipeline 3739 includes logic to facilitate decoding, encoding, pre-processing, and/or post-processing of multimedia data, including image and video data. In at least one embodiment, media pipeline 3739 implements media operations via requests to compute or sampling logic within sub-cores 3701A-3701F.

In at least one embodiment, SoC interface 3737 enables graphics core 3700 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 3737 can also enable communication with fixed function devices within an SoC, such as camera imaging pipelines, and enables use of and/or implements global memory atomics that may be shared between graphics core 3700 and CPUs within an SoC. In at least one embodiment, graphics SoC interface 3737 can also implement power management controls for graphics processor core 3700 and enable an interface between a clock domain of graphics processor core 3700 and other clock domains within an SoC. In at least one embodiment, SoC interface 3737 enables receipt of command buffers from a command streamer and global thread dispatcher that are configured to provide commands and instructions to each of one or more graphics cores within a graphics processor. In at least one embodiment, commands and instructions can be dispatched to media pipeline 3739, when media operations are to be performed, or a geometry and fixed function pipeline (e.g., geometry and fixed function pipeline 3736, and/or a geometry and fixed function pipeline 3714) when graphics processing operations are to be performed.

In at least one embodiment, graphics microcontroller 3738 can be configured to perform various scheduling and management tasks for graphics core 3700. In at least one embodiment, graphics microcontroller 3738 can perform graphics and/or compute workload scheduling on various graphics parallel engines within execution unit (EU) arrays 3702A-3702F, 3704A-3704F within sub-cores 3701A-3701F. In at least one embodiment, host software executing on a CPU core of an SoC including graphics core 3700 can submit workloads to one of multiple graphic processor paths, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 3738 can also facilitate low-power or idle states for graphics core 3700, providing graphics core 3700 with an ability to save and restore registers within graphics core 3700 across low-power state transitions independently from an operating system and/or graphics driver software on a system.

In at least one embodiment, graphics core 3700 may have greater than or fewer than illustrated sub-cores 3701A-3701F, up to N modular sub-cores. For each set of N sub-cores, in at least one embodiment, graphics core 3700 can also include shared function logic 3710, shared and/or cache memory 3712, geometry/fixed function pipeline 3714, as well as additional fixed function logic 3716 to accelerate various graphics and compute processing operations. In at least one embodiment, shared function logic 3710 can include logic units (e.g., sampler, math, and/or inter-thread communication logic) that can be shared by each N sub-cores within graphics core 3700. In at least one embodiment, shared and/or cache memory 3712 can be a last-level cache for N sub-cores 3701A-3701F within graphics core 3700 and can also serve as shared memory that is accessible by multiple sub-cores. In at least one embodiment, geometry/fixed function pipeline 3714 can be included instead of geometry/fixed function pipeline 3736 within fixed function block 3730 and can include similar logic units.

In at least one embodiment, graphics core 3700 includes additional fixed function logic 3716 that can include various fixed function acceleration logic for use by graphics core 3700. In at least one embodiment, additional fixed function logic 3716 includes an additional geometry pipeline for use in position-only shading. In position-only shading, at least two geometry pipelines exist, whereas in a full geometry pipeline within geometry and fixed function pipelines 3714, 3736, and a cull pipeline, which is an additional geometry pipeline that may be included within additional fixed function logic 3716. In at least one embodiment, a cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3716 can execute position shaders in parallel with a main application and generally generates critical results faster than a full pipeline, as a cull pipeline fetches and shades position attributes of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 3716 can also include machine-learning acceleration logic, such as fixed function matrix multiplication logic, for implementations including optimizations for machine learning training or inferencing.

In at least one embodiment, within each graphics sub-core 3701A-3701F includes a set of execution resources that may be used to perform graphics, media, and compute operations in response to requests by graphics pipeline, media pipeline, or shader programs. In at least one embodiment, graphics sub-cores 3701A-3701F include multiple EU arrays 3702A-3702F, 3704A-3704F, thread dispatch and inter-thread communication (TD/IC) logic 3703A-3703F, a 3D (e.g., texture) sampler 3705A-3705F, a media sampler 3706A-3706F, a shader processor 3707A-3707F, and shared local memory (SLM) 3708A-3708F. In at least one embodiment, EU arrays 3702A-3702F, 3704A-3704F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3703A-3703F performs local thread dispatch and thread control operations for execution units within a sub-core and facilitates communication between threads executing on execution units of a sub-core. In at least one embodiment, 3D samplers 3705A-3705F can read texture or other 3D graphics related data into memory. In at least one embodiment, 3D samplers can read texture data differently based on a configured sample state and texture format associated with a given texture. In at least one embodiment, media samplers 3706A-3706F can perform similar read operations based on a type and format associated with media data. In at least one embodiment, each graphics sub-core 3701A-3701F can alternately include a unified 3D and media sampler. In at least one embodiment, threads executing on execution units within each of sub-cores 3701A-3701F can make use of shared local memory 3708A-3708F within each sub-core, to enable threads executing within a thread group to execute using a common pool of on-chip memory.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, portions or all of inference and/or training logic 1415 may be incorporated into graphics processor 3700. For example, in at least one embodiment, training and/or inferencing techniques described herein may use one or more of ALUs embodied in a 3D pipeline, graphics microcontroller 3738, geometry and fixed function pipeline 3714 and 3736, or other logic in FIG. 37. Moreover, in at least one embodiment, inferencing and/or training operations described herein may be done using logic other than logic illustrated in FIG. 14A or 14B. In at least one embodiment, weight parameters may be stored in on-chip or off-chip memory and/or registers (shown or not shown) that configure ALUs of graphics processor 3700 to perform one or more machine learning algorithms, neural network architectures, use cases, or training techniques described herein.

In at least one embodiment, at least one component shown or described with respect to FIG. 37 is used to perform techniques and/or functions described in connection with FIGS. 1-13. In at least one embodiment, at least one component shown or described with respect to FIG. 37 is used to perform operations described herein, such as to detect whether one or more objects within one or more images is likely to be duplicated in an image interpolated using the one or more images. In at least one embodiment, at least one component shown or described with respect to FIG. 37 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 38A:
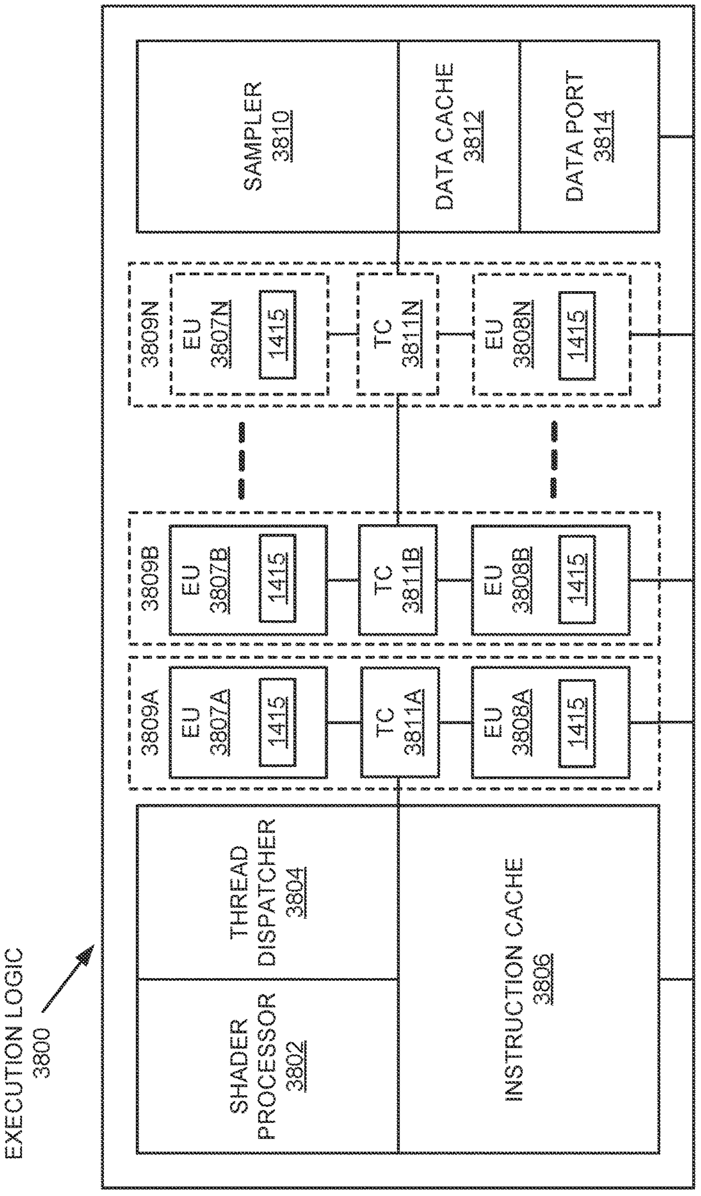
FIGS. 38A-38B illustrate thread execution logic including an array of processing elements of a graphics processor core according to at least one embodiment.
Figure 38B:
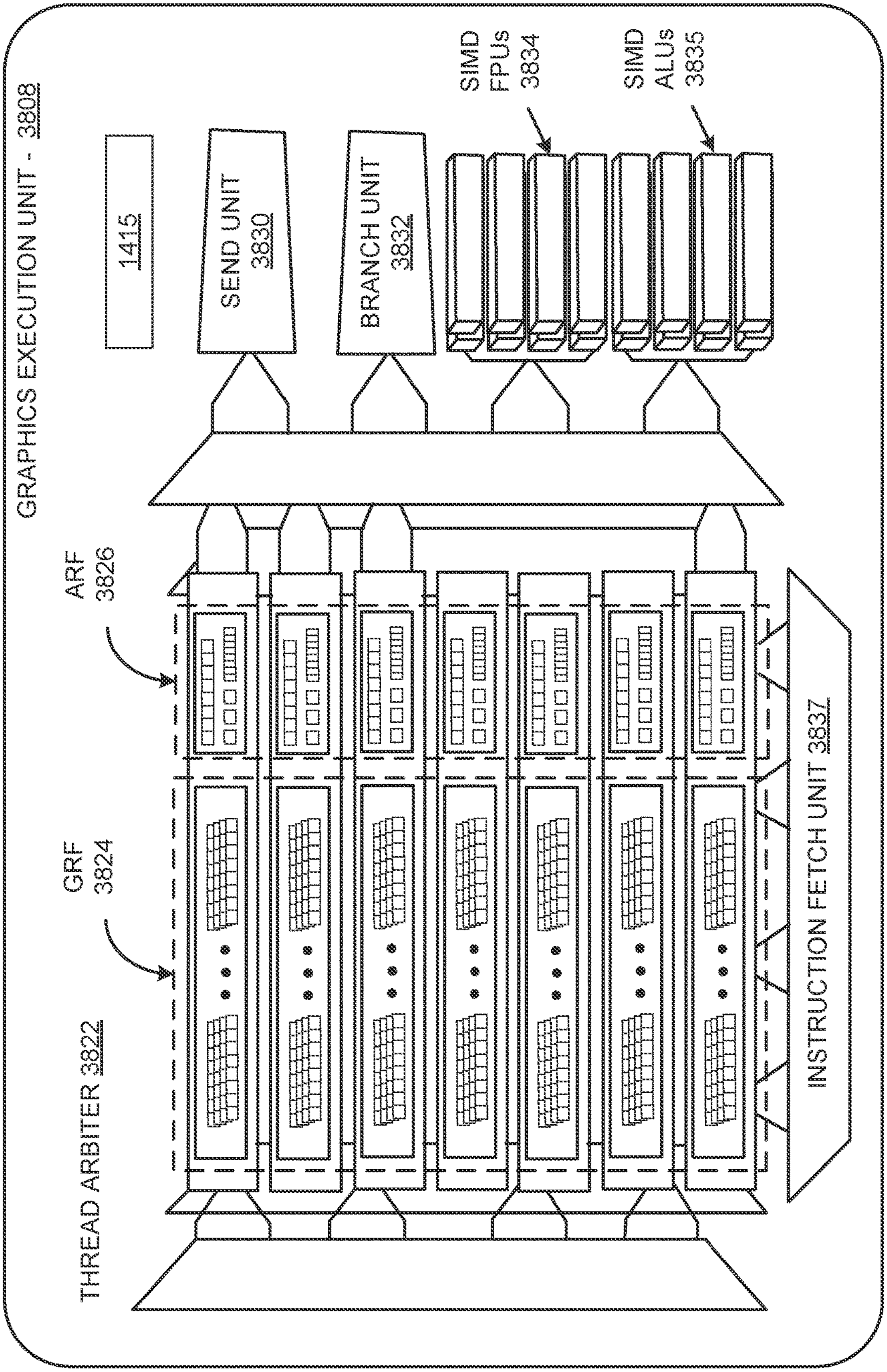

FIGS. 38A-38B illustrate thread execution logic 3800 including an array of processing elements of a graphics processor core according to at least one embodiment. FIG. 38A illustrates at least one embodiment, in which thread execution logic 3800 is used. FIG. 38B illustrates exemplary internal details of a graphics execution unit 3808, according to at least one embodiment.

As illustrated in FIG. 38A, in at least one embodiment, thread execution logic 3800 includes a shader processor 3802, a thread dispatcher 3804, an instruction cache 3806, a scalable execution unit array including a plurality of execution units 3807A-3807N and 3808A-3808N, a sampler 3810, a data cache 3812, and a data port 3814. In at least one embodiment, a scalable execution unit array can dynamically scale by enabling or disabling one or more execution units (e.g., any of execution unit 3808A-N or 3807A-N) based on computational requirements of a workload, for example. In at least one embodiment, scalable execution units are interconnected via an interconnect fabric that links to each execution unit. In at least one embodiment, thread execution logic 3800 includes one or more connections to memory, such as system memory or cache memory, through one or more of instruction cache 3806, data port 3814, sampler 3810, and execution units 3807 or 3808. In at least one embodiment, each execution unit (e.g., 3807A) is a stand-alone programmable general-purpose computational unit that is capable of executing multiple simultaneous hardware threads while processing multiple data elements in parallel for each thread. In at least one embodiment, array of execution units 3807 and/or 3808 is scalable to include any number individual execution units.

In at least one embodiment, execution units 3807 and/or 3808 are primarily used to execute shader programs. In at least one embodiment, shader processor 3802 can process various shader programs and dispatch execution threads associated with shader programs via a thread dispatcher 3804. In at least one embodiment, thread dispatcher 3804 includes logic to arbitrate thread initiation requests from graphics and media pipelines and instantiate requested threads on one or more execution units in execution units 3807 and/or 3808. For example, in at least one embodiment, a geometry pipeline can dispatch vertex, tessellation, or geometry shaders to thread execution logic for processing. In at least one embodiment, thread dispatcher 3804 can also process runtime thread spawning requests from executing shader programs.

In at least one embodiment, execution units 3807 and/or 3808 support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, and/or vertex shaders), pixel processing (e.g., pixel shaders, fragment shaders) and general-purpose processing (e.g., compute and media shaders). In at least one embodiment, each of execution units 3807 and/or 3808, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 3807 and/or 3808 causes a waiting thread to sleep until requested data has been returned. In at least one embodiment, while an awaiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 3807 and/or 3808 operates on arrays of data elements. In at least one embodiment, a number of data elements is an "execution size," or number of channels for an instruction. In at least one embodiment, an execution channel is a logical unit of execution for data element access, masking, and flow control within instructions. In at least one embodiment, a number of channels may be independent of a number of physical arithmetic logic units (ALUs) or floating point units (FPUs) for a particular graphics processor. In at least one embodiment, execution units 3807 and/or 3808 support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 3809A-3809N having thread control logic (3811A-3811N) that is common to fused EUs such as execution unit 3807A fused with execution unit 3808A into fused execution unit 3809A. In at least one embodiment, multiple EUs can be fused into an EU group. In at least one embodiment, each EU in a fused EU group can be configured to execute a separate SIMD hardware thread, with a number of EUs in a fused EU group possibly varying according to various embodiments. In at least one embodiment, various SIMD widths can be performed per-EU, including but not limited to SIMD8, SIMD16, and SIMD32. In at least one embodiment, each fused graphics execution unit 3809A-3809N includes at least two execution units. For example, in at least one embodiment, fused execution unit 3809A includes a first EU 3807A, second EU 3808A, and thread control logic 3811A that is common to first EU 3807A and second EU 3808A. In at least one embodiment, thread control logic 3811A controls threads executed on fused graphics execution unit 3809A, allowing each EU within fused execution units 3809A-3809N to execute using a common instruction pointer register.

In at least one embodiment, one or more internal instruction caches (e.g., 3806) are included in thread execution logic 3800 to cache thread instructions for execution units. In at least one embodiment, one or more data caches (e.g., 3812) are included to cache thread data during thread execution. In at least one embodiment, sampler 3810 is included to provide texture sampling for 3D operations and media sampling for media operations. In at least one embodiment, sampler 3810 includes specialized texture or media sampling functionality to process texture or media data during sampling process before providing sampled data to an execution unit.

During execution, in at least one embodiment, graphics and media pipelines send thread initiation requests to thread execution logic 3800 via thread spawning and dispatch logic. In at least one embodiment, once a group of geometric objects has been processed and rasterized into pixel data, pixel processor logic (e.g., pixel shader logic, fragment shader logic, etc.) within shader processor 3802 is invoked to further compute output information and cause results to be written to output surfaces (e.g., color buffers, depth buffers, stencil buffers, etc.). In at least one embodiment, a pixel shader or a fragment shader calculates values of various vertex attributes that are to be interpolated across a rasterized object. In at least one embodiment, pixel processor logic within shader processor 3802 then executes an application programming interface (API)-supplied pixel or fragment shader program. In at least one embodiment, to execute a shader program, shader processor 3802 dispatches threads to an execution unit (e.g., 3808A) via thread dispatcher 3804. In at least one embodiment, shader processor 3802 uses texture sampling logic in sampler 3810 to access texture data in texture maps stored in memory. In at least one embodiment, arithmetic operations on texture data and input geometry data compute pixel color data for each geometric fragment, or discards one or more pixels from further processing.

In at least one embodiment, data port 3814 provides a memory access mechanism for thread execution logic 3800 to output processed data to memory for further processing on a graphics processor output pipeline. In at least one embodiment, data port 3814 includes or couples to one or more cache memories (e.g., data cache 3812) to cache data for memory access via a data port.

As illustrated in FIG. 38B, in at least one embodiment, a graphics execution unit 3808 can include an instruction fetch unit 3837, a general register file array (GRF) 3824, an architectural register file array (ARF) 3826, a thread arbiter 3822, a send unit 3830, a branch unit 3832, a set of SIMD floating point units (FPUs) 3834, and a set of dedicated integer SIMD ALUs 3835. In at least one embodiment, GRF 3824 and ARF 3826 includes a set of general register files and architecture register files associated with each simultaneous hardware thread that may be active in graphics execution unit 3808. In at least one embodiment, per thread architectural state is maintained in ARF 3826, while data used during thread execution is stored in GRF 3824. In at least one embodiment, execution state of each thread, including instruction pointers for each thread, can be held in thread-specific registers in ARF 3826.

In at least one embodiment, graphics execution unit 3808 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 3808 can co-issue multiple instructions, which may each be different instructions. In at least one embodiment, thread arbiter 3822 of graphics execution unit thread 3808 can dispatch instructions to one of send unit 3830, branch unit 3832, or SIMD FPU(s) 3834 for execution. In at least one embodiment, each execution thread can access 128 general-purpose registers within GRF 3824, where each register can store 32 bytes, accessible as a SIMD 8-element vector of 32-bit data elements. In at least one embodiment, each execution unit thread has access to 4 kilobytes within GRF 3824, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 kilobytes, GRF 3824 can store a total of 28 kilobytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing to send unit 3830. In at least one embodiment, branch instructions are dispatched to branch unit 3832 to facilitate SIMD divergence and eventual convergence.

In at least one embodiment, graphics execution unit 3808 includes one or more SIMD floating point units (FPU(s))

3834 to perform floating-point operations. In at least one embodiment, FPU(s) 3834 also support integer computation. In at least one embodiment, FPU(s) 3834 can SIMD execute up to M number of 32-bit floating-point (or integer) operations, or SIMD execute up to 2M 16-bit integer or 16-bit floating-point operations. In at least one embodiment, at least one FPU provides extended math capability to support high-throughput transcendental math functions and double precision 64-bit floating-point. In at least one embodiment, a set of 8-bit integer SIMD ALUs 3835 are also present, and may be specifically optimized to perform operations associated with machine learning computations.

In at least one embodiment, arrays of multiple instances of graphics execution unit 3808 can be instantiated in a graphics sub-core grouping (e.g., a sub-slice). In at least one embodiment, execution unit 3808 can execute instructions across a plurality of execution channels. In at least one embodiment, each thread executed on graphics execution unit 3808 is executed on a different channel.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, portions or all of inference and/or training logic 1415 may be incorporated into thread execution logic 3800. Moreover, in at least one embodiment, inferencing and/or training operations described herein may be done using logic other than logic illustrated in FIG. 14A or 14B. In at least one embodiment, weight parameters may be stored in on-chip or off-chip memory and/or registers (shown or not shown) that configure ALUs thread of execution logic 3800 to perform one or more machine learning algorithms, neural network architectures, use cases, or training techniques described herein.

In at least one embodiment, at least one component shown or described with respect to FIGS. 38A-38B is used to perform techniques and/or functions described in connection with FIGS. 1-13. In at least one embodiment, at least one component shown or described with respect to FIGS. 38A-38B is used to perform operations described herein, such as to detect whether one or more objects within one or more images is likely to be duplicated in an image interpolated using the one or more images. In at least one embodiment, at least one component shown or described with respect to FIGS. 38A-38B is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 39:
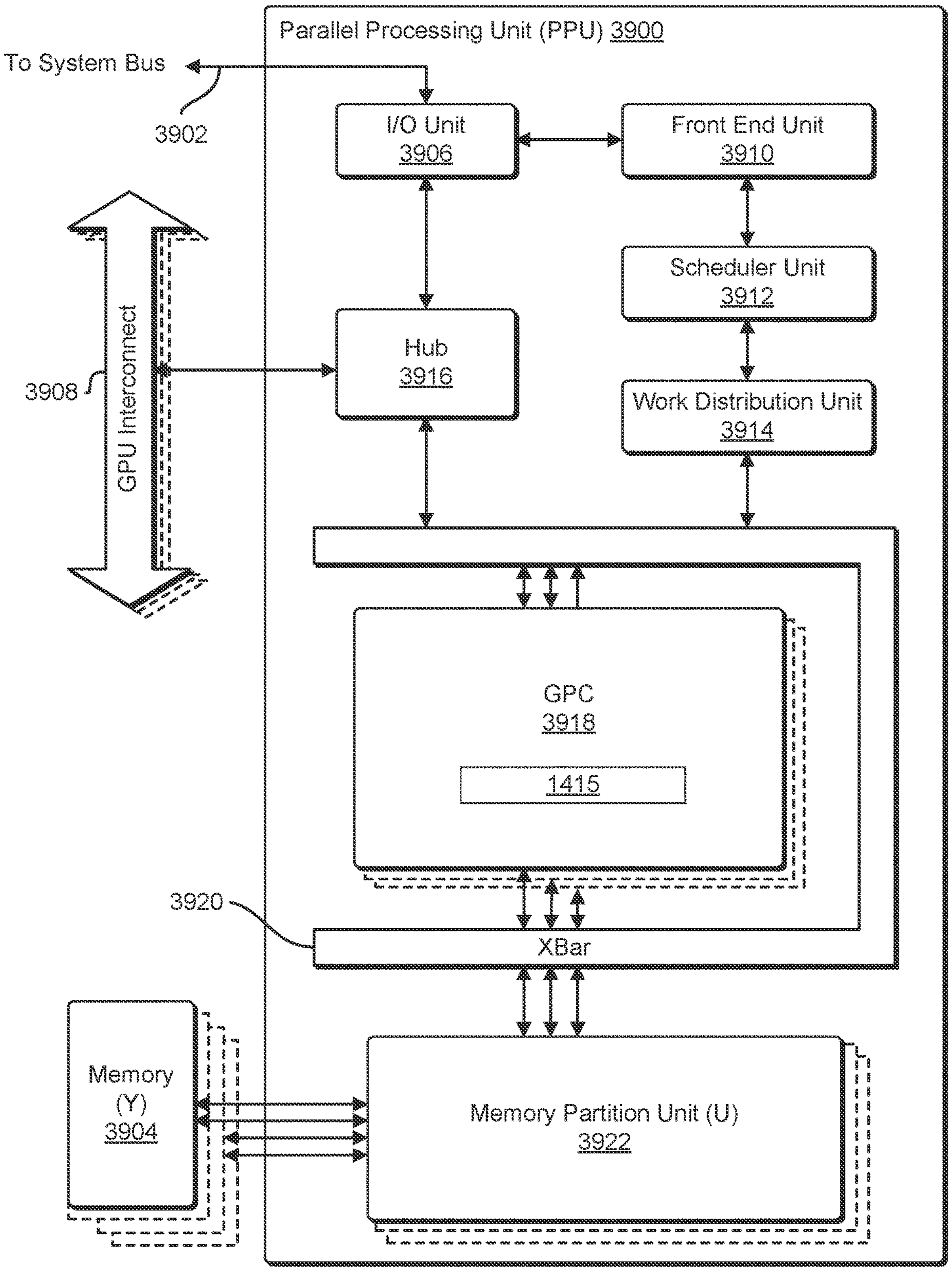
FIG. 39 illustrates a parallel processing unit ("PPU"), according to at least one embodiment.

FIG. 39 illustrates a parallel processing unit ("PPU") 3900, according to at least one embodiment. In at least one embodiment, PPU 3900 is configured with machine-readable code that, if executed by PPU 3900, causes PPU 3900 to perform some or all of processes and techniques described throughout this disclosure. In at least one embodiment, PPU 3900 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 3900. In at least one embodiment, PPU 3900 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 3900 is utilized to perform computations such as linear algebra operations and machine-learning operations. FIG. 39 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 3900 are configured to accelerate High Performance Computing ("HPC"), data center, and machine learning applications. In at least one embodiment, PPU 3900 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 3900 includes, without limitation, an Input/Output ("I/O") unit 3906, a front-end unit 3910, a scheduler unit 3912, a work distribution unit 3914, a hub 3916, a crossbar ("XBar") 3920, one or more general processing clusters ("GPCs") 3918, and one or more partition units ("memory partition units") 3922. In at least one embodiment, PPU 3900 is connected to a host processor or other PPUs 3900 via one or more high-speed GPU interconnects ("GPU interconnects") 3908. In at least one embodiment, PPU 3900 is connected to a host processor or other peripheral devices via a system bus 3902. In at least one embodiment, PPU 3900 is connected to a local memory comprising one or more memory devices ("memory") 3904. In at least one embodiment, memory devices 3904 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3908 may refer to a wire-based multi-lane communications link that is used by systems to scale and include one or more PPUs 3900 combined with one or more central processing units ("CPUs"), supports cache coherence between PPUs 3900 and CPUs, and CPU mastering. In at least one embodiment, data and/or commands are transmitted by high-speed GPU interconnect 3908 through hub 3916 to/from other units of PPU 3900 such as one or more copy engines, video encoders, video decoders, power management units, and other components which may not be explicitly illustrated in FIG. 39.

In at least one embodiment, I/O unit 3906 is configured to transmit and receive communications (e.g., commands, data) from a host processor (not illustrated in FIG. 39) over system bus 3902. In at least one embodiment, I/O unit 3906 communicates with host processor directly via system bus 3902 or through one or more intermediate devices such as a memory bridge. In at least one embodiment, I/O unit 3906 may communicate with one or more other processors, such as one or more of PPUs 3900 via system bus 3902. In at least one embodiment, I/O unit 3906 implements a Peripheral Component Interconnect Express ("PCIe") interface for communications over a PCIe bus. In at least one embodiment, I/O unit 3906 implements interfaces for communicating with external devices.

In at least one embodiment, I/O unit 3906 decodes packets received via system bus 3902. In at least one embodiment, at least some packets represent commands configured to cause PPU 3900 to perform various operations. In at least one embodiment, I/O unit 3906 transmits decoded commands to various other units of PPU 3900 as specified by commands. In at least one embodiment, commands are transmitted to front-end unit 3910 and/or transmitted to hub 3916 or other units of PPU 3900 such as one or more copy engines, a video encoder, a video decoder, a power management unit, etc. (not explicitly illustrated in FIG. 39). In at least one embodiment, I/O unit 3906 is configured to route communications between and among various logical units of PPU 3900.

In at least one embodiment, a program executed by host processor encodes a command stream in a buffer that provides workloads to PPU 3900 for processing. In at least one embodiment, a workload comprises instructions and data to be processed by those instructions. In at least one embodiment, a buffer is a region in a memory that is accessible (e.g., read/write) by both a host processor and PPU 3900-*a* host interface unit may be configured to access that buffer in a system memory connected to system bus 3902 via memory requests transmitted over system bus 3902 by I/O unit 3906. In at least one embodiment, a host processor writes a command stream to a buffer and then transmits a pointer to a start of a command stream to PPU 3900 such that front-end unit 3910 receives pointers to one or more command streams and manages one or more command streams, reading commands from command streams and forwarding commands to various units of PPU 3900.

In at least one embodiment, front-end unit 3910 is coupled to scheduler unit 3912 that configures various GPCs 3918 to process tasks defined by one or more command streams. In at least one embodiment, scheduler unit 3912 is configured to track state information related to various tasks managed by scheduler unit 3912 where state information may indicate which of GPCs 3918 a task is assigned to, whether task is active or inactive, a priority level associated with task, and so forth. In at least one embodiment, scheduler unit 3912 manages execution of a plurality of tasks on one or more of GPCs 3918.

In at least one embodiment, scheduler unit 3912 is coupled to work distribution unit 3914 that is configured to dispatch tasks for execution on GPCs 3918. In at least one embodiment, work distribution unit 3914 tracks a number of scheduled tasks received from scheduler unit 3912 and work distribution unit 3914 manages a pending task pool and an active task pool for each of GPCs 3918. In at least one embodiment, pending task pool comprises a number of slots (e.g., 32 slots) that contain tasks assigned to be processed by a particular GPC 3918; an active task pool may comprise a number of slots (e.g., 4 slots) for tasks that are actively being processed by GPCs 3918 such that as one of GPCs 3918 completes execution of a task, that task is evicted from that active task pool for GPC 3918 and another task from a pending task pool is selected and scheduled for execution on GPC 3918. In at least one embodiment, if an active task is idle on GPC 3918, such as while waiting for a data dependency to be resolved, then that active task is evicted from GPC 3918 and returned to that pending task pool while another task in that pending task pool is selected and scheduled for execution on GPC 3918.

In at least one embodiment, work distribution unit 3914 communicates with one or more GPCs 3918 via XBar 3920. In at least one embodiment, XBar 3920 is an interconnect network that couples many of units of PPU 3900 to other units of PPU 3900 and can be configured to couple work distribution unit 3914 to a particular GPC 3918. In at least one embodiment, one or more other units of PPU 3900 may also be connected to XBar 3920 via hub 3916.

In at least one embodiment, tasks are managed by scheduler unit 3912 and dispatched to one of GPCs 3918 by work distribution unit 3914. In at least one embodiment, GPC 3918 is configured to process task and generate results. In at least one embodiment, results may be consumed by other tasks within GPC 3918, routed to a different GPC 3918 via XBar 3920, or stored in memory 3904. In at least one embodiment, results can be written to memory 3904 via partition units 3922, which implement a memory interface for reading and writing data to/from memory 3904. In at least one embodiment, results can be transmitted to another PPU 3900 or CPU via high-speed GPU interconnect 3908. In at least one embodiment, PPU 3900 includes, without limitation, a number U of partition units 3922 that is equal to a number of separate and distinct memory devices 3904 coupled to PPU 3900, as described in more detail herein in conjunction with FIG. 41.

In at least one embodiment, a host processor executes a driver kernel that implements an application programming interface ("API") that enables one or more applications executing on a host processor to schedule operations for execution on PPU 3900. In at least one embodiment, multiple compute applications are simultaneously executed by PPU 3900 and PPU 3900 provides isolation, quality of service ("QoS"), and independent address spaces for multiple compute applications. In at least one embodiment, an application generates instructions (e.g., in form of API calls) that cause a driver kernel to generate one or more tasks for execution by PPU 3900 and that driver kernel outputs tasks to one or more streams being processed by PPU 3900. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail in conjunction with FIG. 41.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, deep learning application processor is used to train a machine learning model, such as a neural network, to predict or infer information provided to PPU 3900. In at least one embodiment, PPU 3900 is used to infer or predict information based on a trained machine learning model (e.g., neural network) that has been trained by another processor or system or by PPU 3900. In at least one embodiment, PPU 3900 may be used to perform one or more neural network use cases described herein.

In at least one embodiment, at least one component shown or described with respect to FIG. 39 is used to perform techniques and/or functions described in connection with FIGS. 1-13. In at least one embodiment, at least one component shown or described with respect to FIG. 39 is used to perform operations described herein, such as to detect whether one or more objects within one or more images is likely to be duplicated in an image interpolated using the one or more images. In at least one embodiment, at least one component shown or described with respect to FIG. 39 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 40:
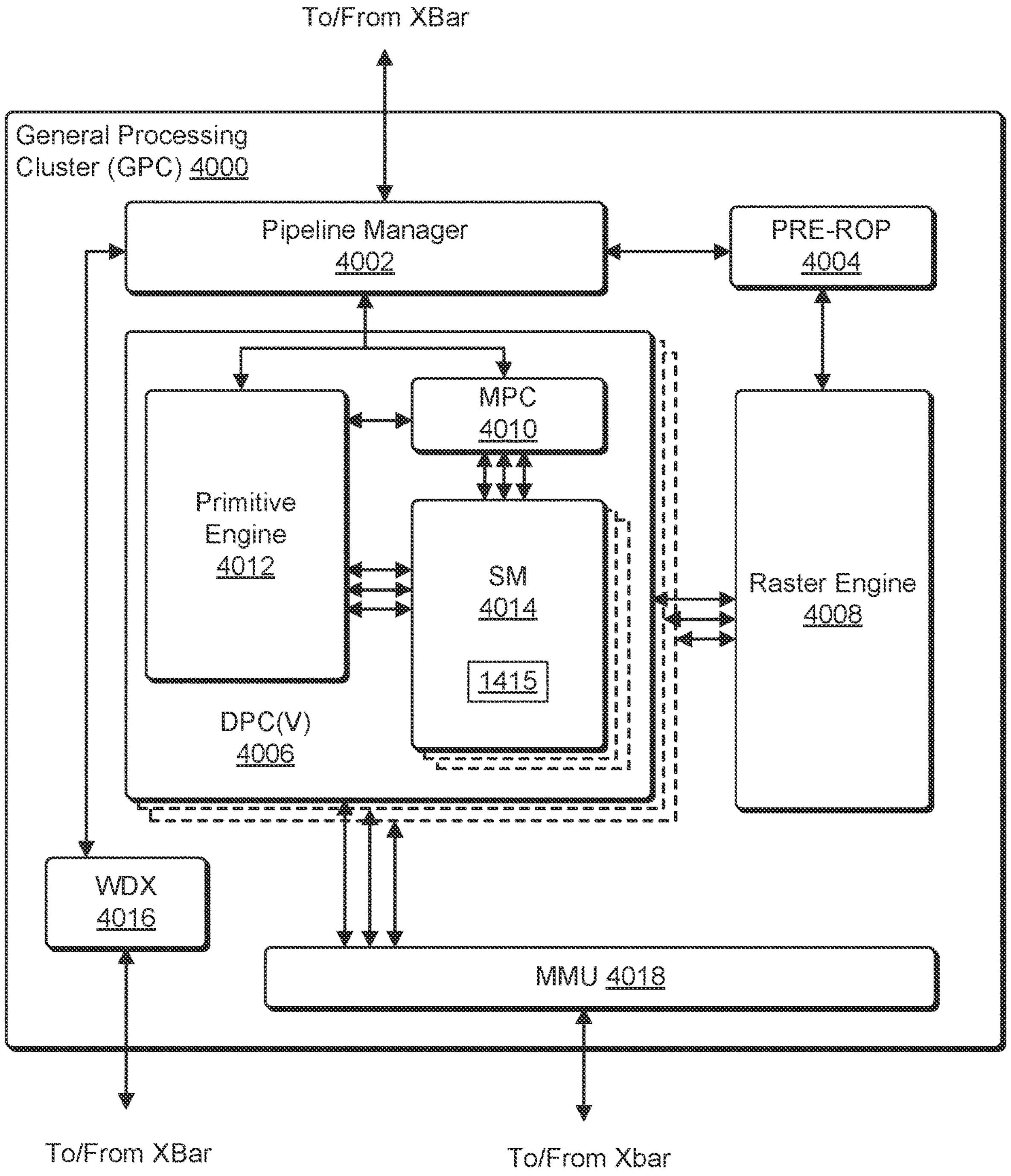
FIG. 40 illustrates a general processing cluster ("GPC"), according to at least one embodiment.

FIG. 40 illustrates a general processing cluster ("GPC") 4000, according to at least one embodiment. In at least one embodiment, GPC 4000 is GPC 3918 of FIG. 39. In at least one embodiment, each GPC 4000 includes, without limitation, a number of hardware units for processing tasks and each GPC 4000 includes, without limitation, a pipeline manager 4002, a pre-raster operations unit ("preROP") 4004, a raster engine 4008, a work distribution crossbar ("WDX") 4016, a memory management unit ("MMU") 4018, one or more Data Processing Clusters ("DPCs") 4006, and any suitable combination of parts.

In at least one embodiment, operation of GPC 4000 is controlled by pipeline manager 4002. In at least one embodiment, pipeline manager 4002 manages configuration of one or more DPCs 4006 for processing tasks allocated to GPC 4000. In at least one embodiment, pipeline manager 4002 configures at least one of one or more DPCs 4006 to implement at least a portion of a graphics rendering pipeline. In at least one embodiment, DPC 4006 is configured to execute a vertex shader program on a programmable streaming multi-processor ("SM") 4014. In at least one embodiment, pipeline manager 4002 is configured to route packets received from a work distribution unit to appropriate logical units within GPC 4000, in at least one embodiment, and some packets may be routed to fixed function hardware units in preROP 4004 and/or raster engine 4008 while other packets may be routed to DPCs 4006 for processing by a primitive engine 4012 or SM 4014. In at least one embodiment, pipeline manager 4002 configures at least one of DPCs 4006 to implement a neural network model and/or a computing pipeline.

In at least one embodiment, preROP unit 4004 is configured, in at least one embodiment, to route data generated by raster engine 4008 and DPCs 4006 to a Raster Operations ("ROP") unit in partition unit 3922, described in more detail above in conjunction with FIG. 39. In at least one embodiment, preROP unit 4004 is configured to perform optimizations for color blending, organize pixel data, perform address translations, and more. In at least one embodiment, raster engine 4008 includes, without limitation, a number of fixed function hardware units configured to perform various raster operations, in at least one embodiment, and raster engine 4008 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to a coarse raster engine to generate coverage information (e.g., an x, y coverage mask for a tile) for primitive; output of a coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, an output of raster engine 4008 comprises fragments to be processed by any suitable entity, such as by a fragment shader implemented within DPC 4006.

In at least one embodiment, each DPC 4006 included in GPC 4000 comprises, without limitation, an M-Pipe Controller ("MPC") 4010; primitive engine 4012; one or more SMs 4014; and any suitable combination thereof. In at least one embodiment, MPC 4010 controls operation of DPC 4006, routing packets received from pipeline manager 4002 to appropriate units in DPC 4006. In at least one embodiment, packets associated with a vertex are routed to primitive engine 4012, which is configured to fetch vertex attributes associated with a vertex from memory; in contrast, packets associated with a shader program may be transmitted to SM 4014.

In at least one embodiment, SM 4014 comprises, without limitation, a programmable streaming processor that is configured to process tasks represented by a number of threads. In at least one embodiment, SM 4014 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute a common set of instructions. In at least one embodiment, SM 4014 implements a Single-Instruction, Multiple Thread ("SIMT") architecture wherein each thread in a group of threads is configured to process a different set of data based on that common set of instructions, but where individual threads in a group of threads are allowed to diverge during execution. In at least one embodiment, a program counter, call stack, and execution state is maintained for each warp, enabling concurrency between warps and serial execution within warps when threads within a warp diverge. In another embodiment, a program counter, call stack, and execution state is maintained for each individual thread, enabling equal concurrency between all threads, within and between warps. In at least one embodiment, execution state is maintained for each individual thread and threads executing common instructions may be converged and executed in parallel for better efficiency. At least one embodiment of SM 4014 is described in more detail herein.

In at least one embodiment, MMU 4018 provides an interface between GPC 4000 and a memory partition unit (e.g., partition unit 3922 of FIG. 39) and MMU 4018 provides translation of virtual addresses into physical addresses, memory protection, and arbitration of memory requests. In at least one embodiment, MMU 4018 provides one or more translation lookaside buffers ("TLBs") for performing translation of virtual addresses into physical addresses in memory.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, deep learning application processor is used to train a machine learning model, such as a neural network, to predict or infer information provided to GPC 4000. In at least one embodiment, GPC 4000 is used to infer or predict information based on a trained machine learning model (e.g., neural network) that has been trained by another processor or system or by GPC 4000. In at least one embodiment, GPC 4000 may be used to perform one or more neural network use cases described herein.

In at least one embodiment, at least one component shown or described with respect to FIG. 40 is used to perform techniques and/or functions described in connection with FIGS. 1-13. In at least one embodiment, at least one component shown or described with respect to FIG. 40 is used to perform operations described herein, such as to detect whether one or more objects within one or more images is likely to be duplicated in an image interpolated using the one or more images. In at least one embodiment, at least one component shown or described with respect to FIG. 40 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 41:
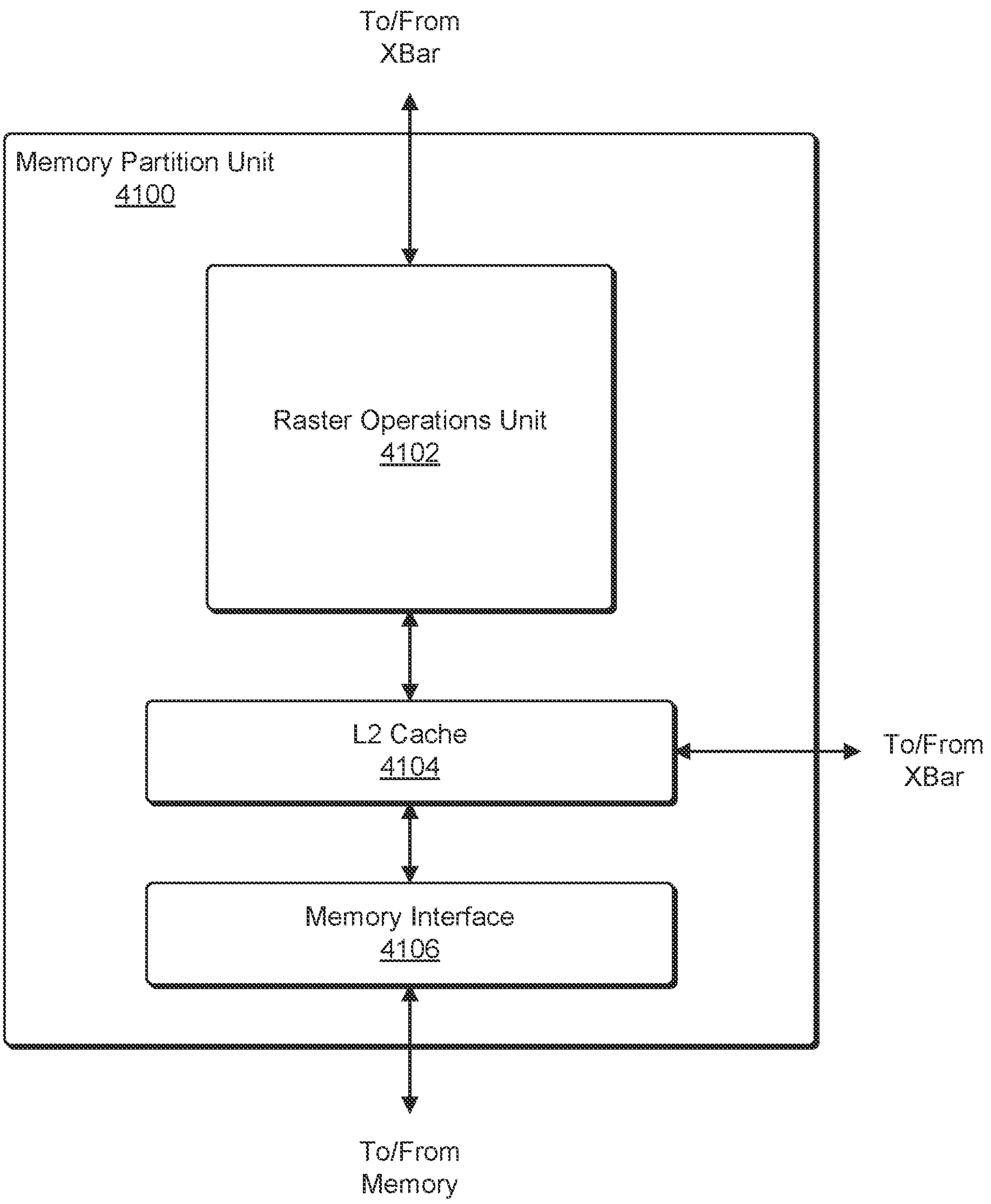
FIG. 41 illustrates a memory partition unit of a parallel processing unit ("PPU"), according to at least one embodiment.

FIG. 41 illustrates a memory partition unit 4100 of a parallel processing unit ("PPU"), in accordance with at least one embodiment. In at least one embodiment, memory partition unit 4100 includes, without limitation, a Raster Operations ("ROP") unit 4102, a level two ("L2") cache 4104, a memory interface 4106, and any suitable combination thereof. In at least one embodiment, memory interface 4106 is coupled to memory. In at least one embodiment, memory interface 4106 may implement 32, 64, 128, 1024-bit data buses, or like, for high-speed data transfer. In at least one embodiment, PPU incorporates U memory interfaces 4106 where U is a positive integer, with one memory interface 4106 per pair of partition units 4100, where each pair of partition units 4100 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 4106 implements a high bandwidth memory second generation ("HBM2") memory interface and Y equals half of U. In at least one embodiment, HBM2 memory stacks are located on a physical package with a PPU, providing substantial power and area savings compared with conventional GDDR5 SDRAM systems. In at least one embodiment, each HBM2 stack includes, without limitation, four memory dies with Y=4, with each HBM2 stack including two 128-bit channels per die for a total of 8 channels and a data bus width of 1024 bits. In at least one embodiment, that memory supports Single-Error Correcting Double-Error Detecting ("SECDED") Error Correction Code ("ECC") to protect data. In at least one embodiment, ECC can provide higher reliability for compute applications that are sensitive to data corruption.

In at least one embodiment, PPU implements a multi-level memory hierarchy. In at least one embodiment, memory partition unit 4100 supports a unified memory to provide a single unified virtual address space for central processing unit ("CPU") and PPU memory, enabling data sharing between virtual memory systems. In at least one embodiment frequency of accesses by a PPU to a memory located on other processors is traced to ensure that memory pages are moved to physical memory of PPU that is accessing pages more frequently. In at least one embodiment, high-speed GPU interconnect 3908 supports address translation services allowing PPU to directly access a CPU's page tables and providing full access to CPU memory by a PPU.

In at least one embodiment, copy engines transfer data between multiple PPUs or between PPUs and CPUs. In at least one embodiment, copy engines can generate page faults for addresses that are not mapped into page tables and memory partition unit 4100 then services page faults, mapping addresses into page table, after which copy engine performs a transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and a copy process is transparent.

Data from memory 3904 of FIG. 39 or other system memory is fetched by memory partition unit 4100 and stored in L2 cache 4104, which is located on-chip and is shared between various GPCs, in accordance with at least one embodiment. Each memory partition unit 4100, in at least one embodiment, includes, without limitation, at least a portion of L2 cache associated with a corresponding memory device. In at least one embodiment, lower level caches are implemented in various units within GPCs. In at least one embodiment, each of SMs 4014 in FIG. 40 may implement a Level 1 ("L1") cache wherein that L1 cache is private memory that is dedicated to a particular SM 4014 and data from L2 cache 4104 is fetched and stored in each L1 cache for processing in functional units of SMs 4014. In at least one embodiment, L2 cache 4104 is coupled to memory interface 4106 and XBar 3920 shown in FIG. 39.

ROP unit 4102 performs graphics raster operations related to pixel color, such as color compression, pixel blending, and more, in at least one embodiment. ROP unit 4102, in at least one embodiment, implements depth testing in conjunction with raster engine 4008, receiving a depth for a sample location associated with a pixel fragment from a culling engine of raster engine 4008. In at least one embodiment, depth is tested against a corresponding depth in a depth buffer for a sample location associated with a fragment. In at least one embodiment, if that fragment passes that depth test for that sample location, then ROP unit 4102 updates depth buffer and transmits a result of that depth test to raster engine 4008. It will be appreciated that a number of partition units 4100 may be different than a number of GPCs and, therefore, each ROP unit 4102 can, in at least one embodiment, be coupled to each GPC. In at least one embodiment, ROP unit 4102 tracks packets received from different GPCs and determines whether a result generated by ROP unit 4102 is to be routed to through XBar 3920.

In at least one embodiment, at least one component shown or described with respect to FIG. 41 is used to perform techniques and/or functions described in connection with FIGS. 1-13. In at least one embodiment, at least one component shown or described with respect to FIG. 41 is used to perform operations described herein, such as to detect whether one or more objects within one or more images is likely to be duplicated in an image interpolated using the one or more images. In at least one embodiment, at least one component shown or described with respect to FIG. 41 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 42:
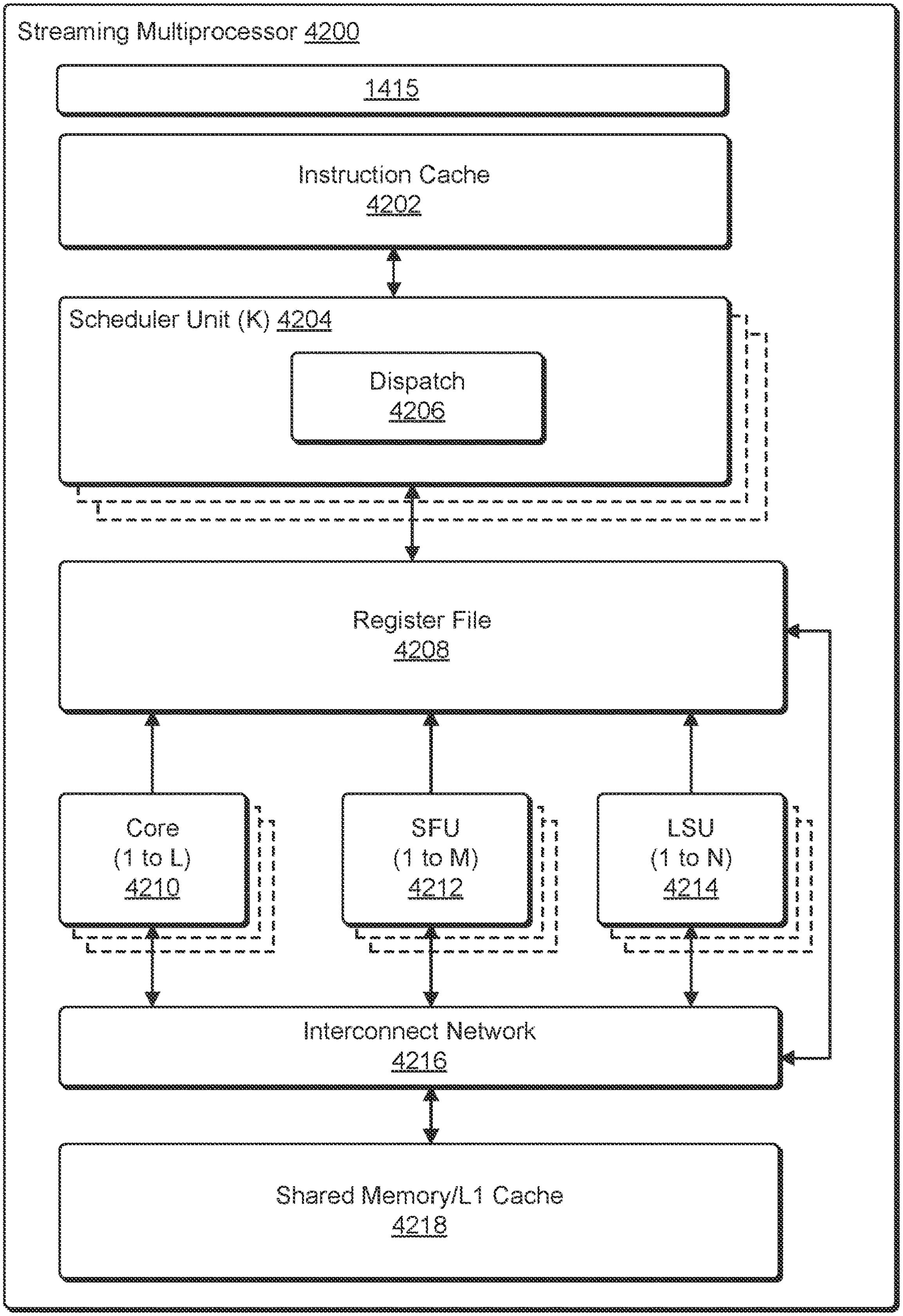
FIG. 42 illustrates a streaming multi-processor, according to at least one embodiment.

FIG. 42 illustrates a streaming multi-processor ("SM") 4200, according to at least one embodiment. In at least one embodiment, SM 4200 is SM of FIG. 40. In at least one embodiment, SM 4200 includes, without limitation, an instruction cache 4202, one or more scheduler units 4204, a register file 4208, one or more processing cores ("cores") 4210, one or more special function units ("SFUs") 4212, one or more load/store units ("LSUs") 4214, an interconnect network 4216, a shared memory/level one ("L1") cache 4218, and/or any suitable combination thereof.

In at least one embodiment, a work distribution unit dispatches tasks for execution on general processing clusters ("GPCs") of parallel processing units ("PPUs") and each task is allocated to a particular Data Processing Cluster ("DPC") within a GPC and, if a task is associated with a shader program, that task is allocated to one of SMs 4200. In at least one embodiment, scheduler unit 4204 receives tasks from a work distribution unit and manages instruction scheduling for one or more thread blocks assigned to SM 4200. In at least one embodiment, scheduler unit 4204 schedules thread blocks for execution as warps of parallel threads, wherein each thread block is allocated at least one warp. In at least one embodiment, each warp executes threads. In at least one embodiment, scheduler unit 4204 manages a plurality of different thread blocks, allocating warps to different thread blocks and then dispatching instructions from plurality of different cooperative groups to various functional units (e.g., processing cores 4210, SFUs 4212, and LSUs 4214) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, that programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 4206 is configured to transmit instructions to one or more functional units and scheduler unit 4204 and includes, without limitation, two dispatch units 4206 that enable two different instructions from a common warp to be dispatched during each clock cycle. In at least one embodiment, each scheduler unit 4204 includes a single dispatch unit 4206 or additional dispatch units 4206.

In at least one embodiment, each SM 4200, in at least one embodiment, includes, without limitation, register file 4208 that provides a set of registers for functional units of SM 4200. In at least one embodiment, register file 4208 is divided between each functional unit such that each functional unit is allocated a dedicated portion of register file 4208. In at least one embodiment, register file 4208 is divided between different warps being executed by SM 4200 and register file 4208 provides temporary storage for operands connected to data paths of functional units. In at least one embodiment, each SM 4200 comprises, without limitation, a plurality of L processing cores 4210, where L is a positive integer. In at least one embodiment, SM 4200 includes, without limitation, a large number (e.g., 128 or more) of distinct processing cores 4210. In at least one embodiment, each processing core 4210 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 4210 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 4210. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation, $D=A\times B+C$, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA 9 C++ API, exposes specialized matrix load, matrix multiply and accumulate, and matrix store operations to efficiently use tensor cores from a CUDA-C++ program. In at least one embodiment, at a CUDA level, a warp-level interface assumes 16×16 size matrices spanning all 32 threads of warp.

In at least one embodiment, each SM 4200 comprises, without limitation, M SFUs 4212 that perform special functions (e.g., attribute evaluation, reciprocal square root, and like). In at least one embodiment, SFUs 4212 include, without limitation, a tree traversal unit configured to traverse a hierarchical tree data structure. In at least one embodiment, SFUs 4212 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 4200. In at least one embodiment, texture maps are stored in shared memory/L1 cache 4218. In at least one embodiment, texture units implement texture operations such as filtering operations using mip-maps (e.g., texture maps of varying levels of detail), in accordance with at least one embodiment. In at least one embodiment, each SM 4200 includes, without limitation, two texture units.

Each SM 4200 comprises, without limitation, N LSUs 4214 that implement load and store operations between shared memory/L1 cache 4218 and register file 4208, in at least one embodiment. Interconnect network 4216 connects each functional unit to register file 4208 and LSU 4214 to register file 4208 and shared memory/L1 cache 4218 in at least one embodiment. In at least one embodiment, interconnect network 4216 is a crossbar that can be configured to connect any functional units to any registers in register file 4208 and connect LSUs 4214 to register file 4208 and memory locations in shared memory/L1 cache 4218.

In at least one embodiment, shared memory/L1 cache 4218 is an array of on-chip memory that allows for data storage and communication between SM 4200 and primitive engine and between threads in SM 4200, in at least one embodiment. In at least one embodiment, shared memory/L1 cache 4218 comprises, without limitation, 128 KB of storage capacity and is in a path from SM 4200 to a partition unit. In at least one embodiment, shared memory/L1 cache 4218, in at least one embodiment, is used to cache reads and writes. In at least one embodiment, one or more of shared memory/L1 cache 4218, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of a capacity, and texture and load/store operations can use remaining capacity. Integration within shared memory/L1 cache 4218 enables shared memory/L1 cache 4218 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In a general purpose parallel computation configuration, a work distribution unit assigns and distributes blocks of threads directly to DPCs, in at least one embodiment. In at least one embodiment, threads in a block execute a common program, using a unique thread ID in calculation to ensure each thread generates unique results, using SM 4200 to execute program and perform calculations, shared memory/L1 cache 4218 to communicate between threads, and LSU 4214 to read and write global memory through shared memory/L1 cache 4218 and memory partition unit. In at least one embodiment, when configured for general purpose parallel computation, SM 4200 writes commands that scheduler unit 4204 can use to launch new work on DPCs.

In at least one embodiment, a PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, a PPU is embodied on a single semiconductor substrate. In at least one embodiment, a PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, a PPU may be included on a graphics card that includes one or more memory devices. In at least one embodiment, that graphics card may be configured to interface with a PCIe slot on a motherboard of a desktop computer. In at least one embodiment, that PPU may be an integrated graphics processing unit ("iGPU") included in chipset of a motherboard.

Inference and/or training logic 1415 are used to perform inferencing and/or training operations associated with one or more embodiments. Details regarding inference and/or training logic 1415 are provided herein in conjunction with FIGS. 14A and/or 14B. In at least one embodiment, deep learning application processor is used to train a machine learning model, such as a neural network, to predict or infer information provided to SM 4200. In at least one embodiment, SM 4200 is used to infer or predict information based on a trained machine learning model (e.g., neural network) that has been trained by another processor or system or by SM 4200. In at least one embodiment, SM 4200 may be used to perform one or more neural network use cases described herein.

In at least one embodiment, at least one component shown or described with respect to FIG. 42 is used to perform techniques and/or functions described in connection with FIGS. 1-13. In at least one embodiment, at least one component shown or described with respect to FIG. 42 is used to perform operations described herein, such as to detect whether one or more objects within one or more images is likely to be duplicated in an image interpolated using the one or more images. In at least one embodiment, at least one component shown or described with respect to FIG. 42 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Computing Platforms

Embodiments are disclosed related a virtualized computing platform for advanced computing, such as image inferencing and image processing in medical applications. Without limitation, embodiments may include radiography, magnetic resonance imaging (MRI), nuclear medicine, ultrasound, sonography, elastography, photoacoustic imaging, tomography, echocardiography, functional near-infrared spectroscopy, and magnetic particle imaging, or a combination thereof. In at least one embodiment, a virtualized computing platform and associated processes described herein may additionally or alternatively be used, without limitation, in forensic science analysis, sub-surface detection and imaging (e.g., oil exploration, archaeology, paleontology, etc.), topography, oceanography, geology, osteology, meteorology, intelligent area or object tracking and monitoring, sensor data processing (e.g., RADAR, SONAR, LIDAR, etc.), and/or genomics and gene sequencing.

Figure 43:
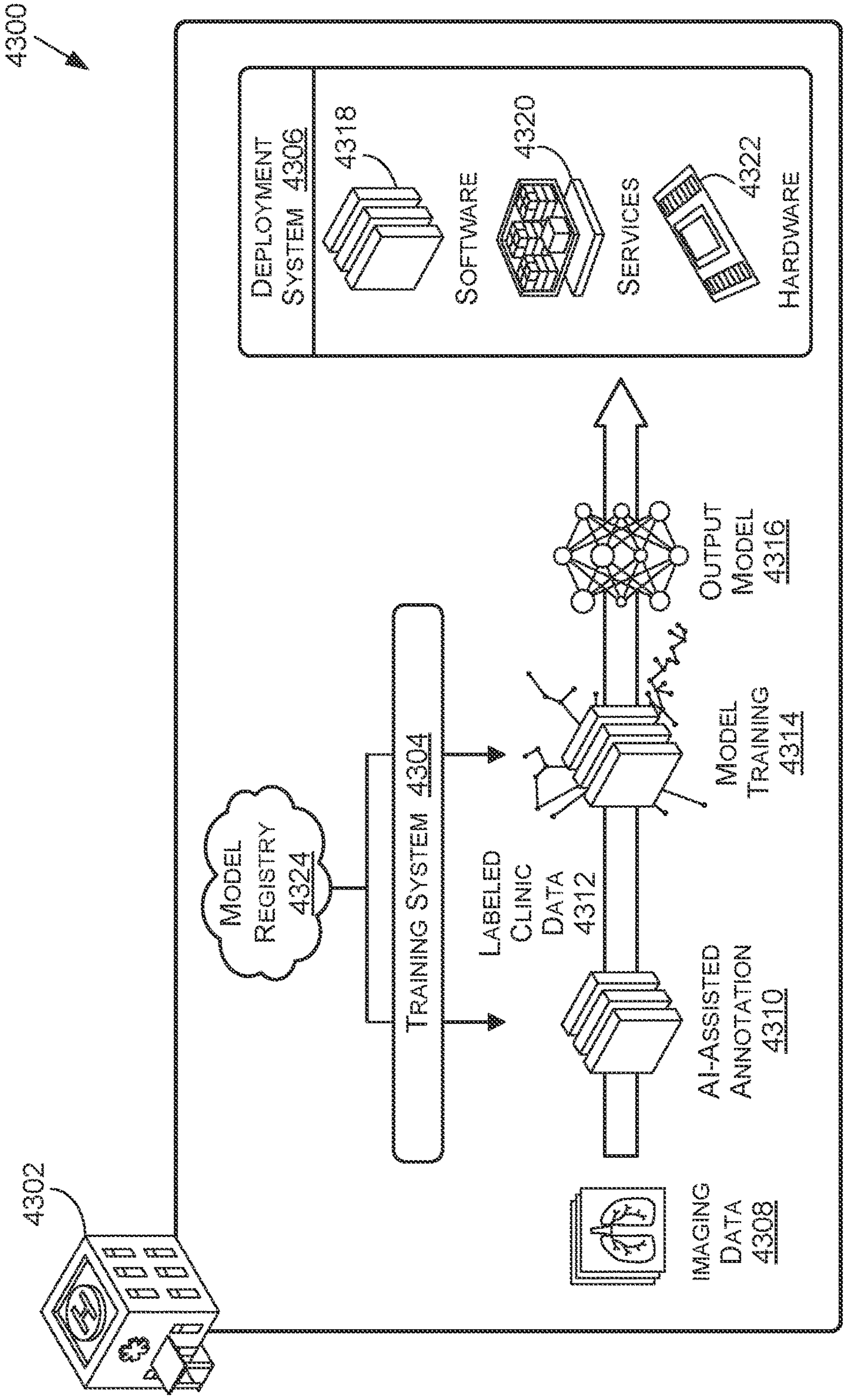
FIG. 43 is an example data flow diagram for an advanced computing pipeline, in accordance with at least one embodiment.

With reference to FIG. 43, FIG. 43 is an example data flow diagram for a process 4300 of generating and deploying an image processing and inferencing pipeline, in accordance with at least one embodiment. In at least one embodiment, process 4300 may be deployed for use with imaging devices, processing devices, genomics devices, gene sequencing devices, radiology devices, and/or other device types at one or more facilities 4302, such as medical facilities, hospitals, healthcare institutes, clinics, research or diagnostic labs, etc. In at least one embodiment, process 4300 may be deployed to perform genomics analysis and inferencing on sequencing data. Examples of genomic analyses that may be performed using systems and processes described herein include, without limitation, variant calling, mutation detection, and gene expression quantification.

In at least one embodiment, process 4300 may be executed within a training system 4304 and/or a deployment system 4306. In at least one embodiment, training system 4304 may be used to perform training, deployment, and implementation of machine learning models (e.g., neural networks, object detection algorithms, computer vision algorithms, etc.) for use in deployment system 4306. In at least one embodiment, deployment system 4306 may be configured to offload processing and compute resources among a distributed computing environment to reduce infrastructure requirements at facility 4302. In at least one embodiment, deployment system 4306 may provide a streamlined platform for selecting, customizing, and implementing virtual instruments for use with imaging devices (e.g., MRI, CT Scan, X-Ray, Ultrasound, etc.) or sequencing devices at facility 4302. In at least one embodiment, virtual instruments may include software-defined applications for performing one or more processing operations with respect to imaging data generated by imaging devices, sequencing devices, radiology devices, and/or other device types. In at least one embodiment, one or more applications in a pipeline may use or call upon services (e.g., inference, visualization, compute, AI, etc.) of deployment system 4306 during execution of applications.

In at least one embodiment, some of applications used in advanced processing and inferencing pipelines may use machine learning models or other AI to perform one or more processing steps. In at least one embodiment, machine learning models may be trained at facility 4302 using data 4308 (such as imaging data) generated at facility 4302 (and stored on one or more picture archiving and communication system (PACS) servers at facility 4302), may be trained using imaging or sequencing data 4308 from another facility or facilities (e.g., a different hospital, lab, clinic, etc.), or a combination thereof. In at least one embodiment, training system 4304 may be used to provide applications, services, and/or other resources for generating working, deployable machine learning models for deployment system 4306.

In at least one embodiment, a model registry 4324 may be backed by object storage that may support versioning and object metadata. In at least one embodiment, object storage may be accessible through, for example, a cloud storage (e.g., a cloud 4426 of FIG. 44) compatible application programming interface (API) from within a cloud platform. In at least one embodiment, machine learning models within model registry 4324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 4404 (FIG. 44) may include a scenario where facility 4302 is training their own machine learning model, or has an existing machine learning model that needs to be optimized or updated. In at least one embodiment, imaging data 4308 generated by imaging device(s), sequencing devices, and/or other device types may be received. In at least one embodiment, once imaging data 4308 is received, AI-assisted annotation 4310 may be used to aid in generating annotations corresponding to imaging data 4308 to be used as ground truth data for a machine learning model. In at least one embodiment, AI-assisted annotation 4310 may include one or more machine learning models (e.g., convolutional neural networks (CNNs)) that may be trained to generate annotations corresponding to certain types of imaging data 4308 (e.g., from certain devices) and/or certain types of anomalies in imaging data 4308. In at least one embodiment, AI-assisted annotations 4310 may then be used directly, or may be adjusted or fine-tuned using an annotation tool (e.g., by a researcher, a clinician, a doctor, a scientist, etc.), to generate ground truth data. In at least one embodiment, in some examples, labeled clinic data 4312 (e.g., annotations provided by a clinician, doctor, scientist, technician, etc.) may be used as ground truth data for training a machine learning model. In at least one embodiment, AI-assisted annotations 4310, labeled clinic data 4312, or a combination thereof may be used as ground truth data for training a machine learning model. In at least one embodiment, a trained machine learning model may be referred to as an output model 4316, and may be used by deployment system 4306, as described herein.

In at least one embodiment, training pipeline 4404 (FIG. 44) may include a scenario where facility 4302 needs a machine learning model for use in performing one or more processing tasks for one or more applications in deployment system 4306, but facility 4302 may not currently have such a machine learning model (or may not have a model that is optimized, efficient, or effective for such purposes). In at least one embodiment, an existing machine learning model may be selected from model registry 4324. In at least one embodiment, model registry 4324 may include machine learning models trained to perform a variety of different inference tasks on imaging data. In at least one embodiment, machine learning models in model registry 4324 may have been trained on imaging data from different facilities than facility 4302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained- or partially trained—at one location, a machine learning model may be added to model registry 4324. In at least one embodiment, a machine learning model may then be retrained, or updated, at any number of other facilities, and a retrained or updated model may be made available in model registry 4324. In at least one embodiment, a machine learning model may then be selected from model registry 4324—and referred to as output model 4316—and may be used in deployment system 4306 to perform one or more processing tasks for one or more applications of a deployment system.

In at least one embodiment, training pipeline 4404 (FIG. 44) may be used in a scenario that includes facility 4302 requiring a machine learning model for use in performing one or more processing tasks for one or more applications in deployment system 4306, but facility 4302 may not currently have such a machine learning model (or may not have a model that is optimized, efficient, or effective for such purposes). In at least one embodiment, a machine learning model selected from model registry 4324 might not be fine-tuned or optimized for imaging data 4308 generated at facility 4302 because of differences in populations, genetic variations, robustness of training data used to train a machine learning model, diversity in anomalies of training data, and/or other issues with training data. In at least one embodiment, AI-assisted annotation 4310 may be used to aid in generating annotations corresponding to imaging data 4308 to be used as ground truth data for retraining or updating a machine learning model. In at least one embodiment, labeled clinic data 4312 (e.g., annotations provided by a clinician, doctor, scientist, etc.) may be used as ground truth data for training a machine learning model. In at least one embodiment, retraining or updating a machine learning model may be referred to as model training 4314. In at least one embodiment, model training 4314—e.g., AI-assisted annotations 4310, labeled clinic data 4312, or a combination thereof—may be used as ground truth data for retraining or updating a machine learning model.

In at least one embodiment, deployment system 4306 may include software 4318, services 4320, hardware 4322, and/or other components, features, and functionality. In at least one embodiment, deployment system 4306 may include a software "stack," such that software 4318 may be built on top of services 4320 and may use services 4320 to perform some or all of processing tasks, and services 4320 and software 4318 may be built on top of hardware 4322 and use hardware 4322 to execute processing, storage, and/or other compute tasks of deployment system 4306.

In at least one embodiment, software 4318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of imaging device (e.g., CT, MRI, X-Ray, ultrasound, sonography, echocardiography, etc.), sequencing device, radiology device, genomics device, etc., there may be any number of containers that may perform a data processing task with respect to imaging data 4308 (or other data types, such as those described herein) generated by a device. In at least one embodiment, an advanced processing and inferencing pipeline may be defined based on selections of different containers that are desired or required for processing imaging data 4308, in addition to containers that receive and configure imaging data for use by each container and/or for use by facility 4302 after processing through a pipeline (e.g., to convert outputs back to a usable data type, such as digital imaging and communications in medicine (DICOM) data, radiology information system (RIS) data, clinical information system (CIS) data, remote procedure call (RPC) data, data substantially compliant with a representation state transfer (REST) interface, data substantially compliant with a file-based interface, and/or raw data, for storage and display at facility 4302). In at least one embodiment, a combination of containers within software 4318 (e.g., that make up a pipeline) may be referred to as a virtual instrument (as described in more detail herein), and a virtual instrument may leverage services 4320 and hardware 4322 to execute some or all processing tasks of applications instantiated in containers.

In at least one embodiment, a data processing pipeline may receive input data (e.g., imaging data 4308) in a DICOM, RIS, CIS, REST compliant, RPC, raw, and/or other format in response to an inference request (e.g., a request from a user of deployment system 4306, such as a clinician, a doctor, a radiologist, etc.). In at least one embodiment, input data may be representative of one or more images, video, and/or other data representations generated by one or more imaging devices, sequencing devices, radiology devices, genomics devices, and/or other device types. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 4316 of training system 4304.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 4324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 4320 as a system (e.g., system 4400 of FIG. 44). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming DICOM data. In at least one embodiment, once validated by system 4400 (e.g., for accuracy, safety, patient privacy, etc.), an application may be available in a container registry for selection and/or implementation by a user (e.g., a hospital, clinic, lab, healthcare provider, etc.) to perform one or more processing tasks with respect to data at a facility (e.g., a second facility) of a user.

Figure 44:
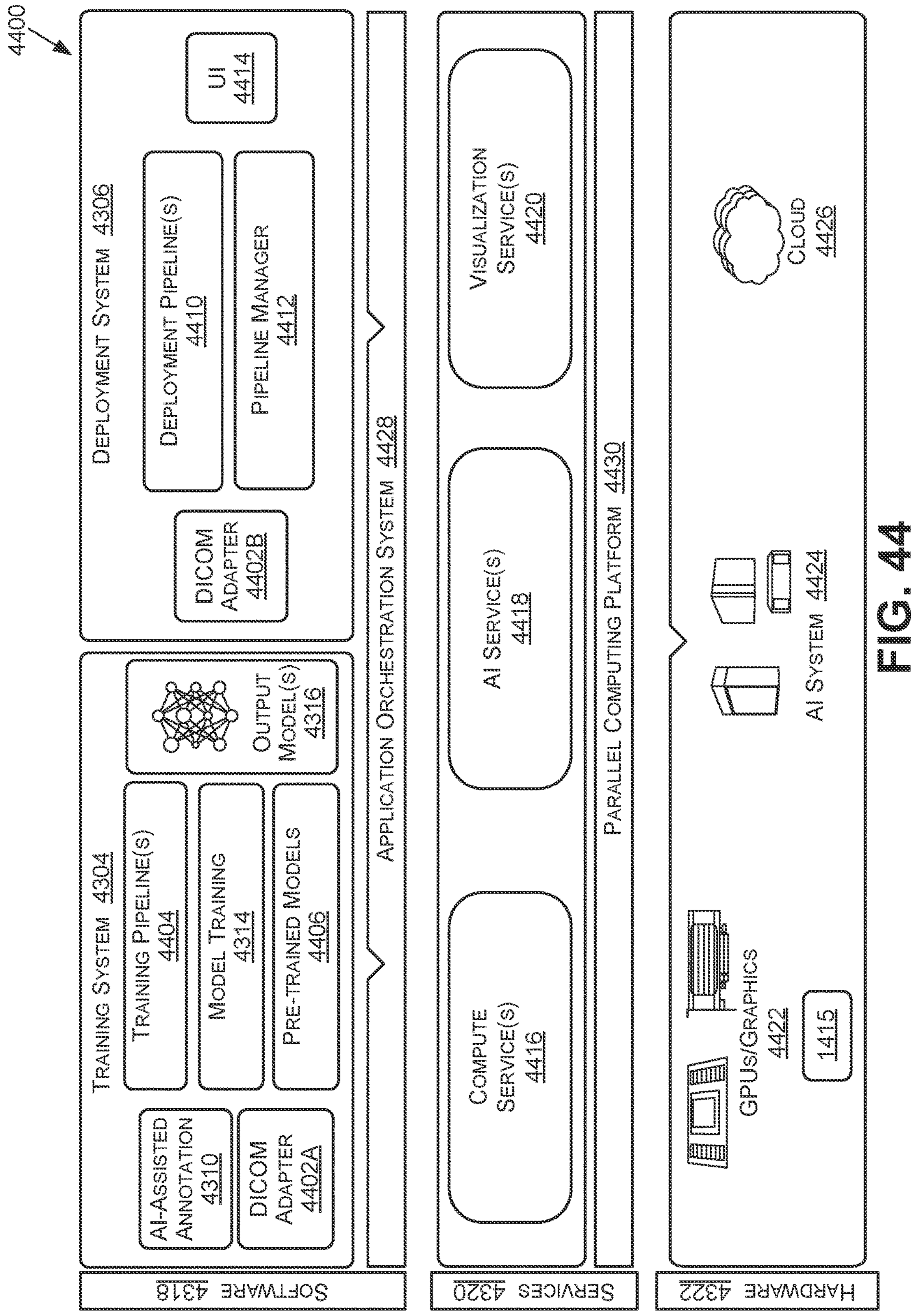
FIG. 44 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 4400 of FIG. 44). In at least one embodiment, completed and validated applications or containers may be stored in a container registry and associated machine learning models may be stored in model registry 4324. In at least one embodiment, a requesting entity (e.g., a user at a medical facility)—who provides an inference or image processing request—may browse a container registry and/or model registry 4324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 4306 (e.g., a cloud) to perform processing of data processing pipeline. In at least one embodiment, processing by deployment system 4306 may include referencing selected elements (e.g., applications, containers, models, etc.) from a container registry and/or model registry 4324. In at least one embodiment, once results are generated by a pipeline, results may be returned to a user for reference (e.g., for viewing in a viewing application suite executing on a local, on-premises workstation or terminal). In at least one embodiment, a radiologist may receive results from an data processing pipeline including any number of application and/or containers, where results may include anomaly detection in X-rays, CT scans, MRIs, etc.

In at least one embodiment, to aid in processing or execution of applications or containers in pipelines, services 4320 may be leveraged. In at least one embodiment, services 4320 may include compute services, artificial intelligence (AI) services, visualization services, and/or other service types. In at least one embodiment, services 4320 may provide functionality that is common to one or more applications in software 4318, so functionality may be abstracted to a service that may be called upon or leveraged by applications. In at least one embodiment, functionality provided by services 4320 may run dynamically and more efficiently, while also scaling well by allowing applications to process data in parallel (e.g., using a parallel computing platform 4430 (FIG. 44)). In at least one embodiment, rather than each application that shares a same functionality offered by a service 4320 being required to have a respective instance of service 4320, service 4320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects-such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 4320 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 4318 implementing advanced processing and inferencing pipeline that includes segmentation application and anomaly detection application may be streamlined because each application may call upon a same inference service to perform one or more inferencing tasks.

In at least one embodiment, hardware 4322 may include GPUs, CPUs, graphics cards, an AI/deep learning system (e.g., an AI supercomputer, such as NVIDIA's DGX supercomputer system), a cloud platform, or a combination thereof. In at least one embodiment, different types of hardware 4322 may be used to provide efficient, purpose-built support for software 4318 and services 4320 in deployment system 4306. In at least one embodiment, use of GPU processing may be implemented for processing locally (e.g., at facility 4302), within an AI/deep learning system, in a cloud system, and/or in other processing components of deployment system 4306 to improve efficiency, accuracy, and efficacy of image processing, image reconstruction, segmentation, MRI exams, stroke or heart attack detection (e.g., in real-time), image quality in rendering, etc. In at least one embodiment, a facility may include imaging devices, genomics devices, sequencing devices, and/or other device types on-premises that may leverage GPUs to generate imaging data representative of a subject's anatomy.

In at least one embodiment, software 4318 and/or services 4320 may be optimized for GPU processing with respect to deep learning, machine learning, and/or high-performance computing, as non-limiting examples. In at least one embodiment, at least some of computing environment of deployment system 4306 and/or training system 4304 may be executed in a datacenter one or more supercomputers or high performance computing systems, with GPU optimized software (e.g., hardware and software combination of NVIDIA's DGX system). In at least one embodiment, datacenters may be compliant with provisions of HIPAA, such that receipt, processing, and transmission of imaging data and/or other patient data is securely handled with respect to privacy of patient data. In at least one embodiment, hardware 4322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

In at least one embodiment, at least one component shown or described with respect to FIG. 43 is used to perform techniques and/or functions described in connection with FIGS. 1-13. In at least one embodiment, at least one component shown or described with respect to FIG. 43 is used to perform operations described herein, such as to detect whether one or more objects within one or more images is likely to be duplicated in an image interpolated using the one or more images. In at least one embodiment, at least one component shown or described with respect to FIG. 43 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

FIG. 44 is a system diagram for an example system 4400 for generating and deploying an imaging deployment pipeline, in accordance with at least one embodiment. In at least one embodiment, system 4400 may be used to implement process 4300 of FIG. 43 and/or other processes including advanced processing and inferencing pipelines. In at least one embodiment, system 4400 may include training system 4304 and deployment system 4306. In at least one embodiment, training system 4304 and deployment system 4306 may be implemented using software 4318, services 4320, and/or hardware 4322, as described herein.

In at least one embodiment, system 4400 (e.g., training system 4304 and/or deployment system 4306) may implemented in a cloud computing environment (e.g., using cloud 4426). In at least one embodiment, system 4400 may be implemented locally with respect to a healthcare services facility, or as a combination of both cloud and local computing resources. In at least one embodiment, in embodiments where cloud computing is implemented, patient data may be separated from, or unprocessed by, by one or more components of system 4400 that would render processing non-compliant with HIPAA and/or other data handling and privacy regulations or laws. In at least one embodiment, access to APIs in cloud 4426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 4400, may be restricted to a set of public IPs that have been vetted or authorized for interaction.

In at least one embodiment, various components of system 4400 may communicate between and among one another using any of a variety of different network types, including but not limited to local area networks (LANs) and/or wide area networks (WANs) via wired and/or wireless communication protocols. In at least one embodiment, communication between facilities and components of system 4400 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 4304 may execute training pipelines 4404, similar to those described herein with respect to FIG. 43. In at least one embodiment, where one or more machine learning models are to be used in deployment pipelines 4410 by deployment system 4306, training pipelines 4404 may be used to train or retrain one or more (e.g., pre-trained) models, and/or implement one or more of pre-trained models 4406 (e.g., without a need for retraining or updating). In at least one embodiment, as a result of training pipelines 4404, output model(s) 4316 may be generated. In at least one embodiment, training pipelines 4404 may include any number of processing steps, such as but not limited to imaging data (or other input data) conversion or adaption (e.g., using DICOM adapter 4402A to convert DICOM images to another format suitable for processing by respective machine learning models, such as Neuroimaging Informatics Technology Initiative (NIfTI) format), AI-assisted annotation 4310, labeling or annotating of imaging data 4308 to generate labeled clinic data 4312, model selection from a model registry, model training 4314, training, retraining, or updating models, and/or other processing steps. In at least one embodiment, for different machine learning models used by deployment system 4306, different training pipelines 4404 may be used. In at least one embodiment, training pipeline 4404 similar to a first example described with respect to FIG. 43 may be used for a first machine learning model, training pipeline 4404 similar to a second example described with respect to FIG. 43 may be used for a second machine learning model, and training pipeline 4404 similar to a third example described with respect to FIG. 43 may be used for a third machine learning model. In at least one embodiment, any combination of tasks within training system 4304 may be used depending on what is required for each respective machine learning model. In at least one embodiment, one or more of machine learning models may already be trained and ready for deployment so machine learning models may not undergo any processing by training system 4304, and may be implemented by deployment system 4306.

In at least one embodiment, output model(s) 4316 and/or pre-trained model(s) 4406 may include any types of machine learning models depending on implementation or embodiment. In at least one embodiment, and without limitation, machine learning models used by system 4400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 47A:
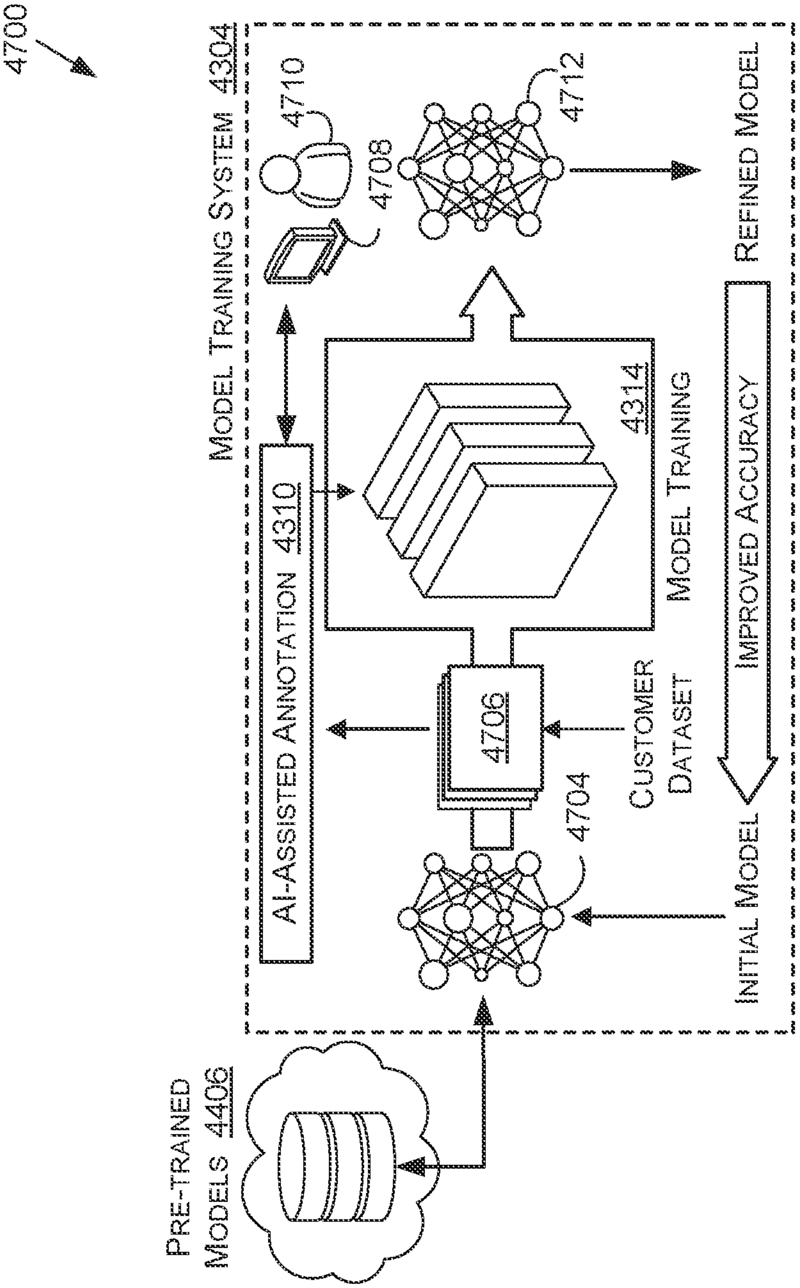
FIG. 47A illustrates a data flow diagram for a process to train a machine learning model, in accordance with at least one embodiment.
Figure 47B:
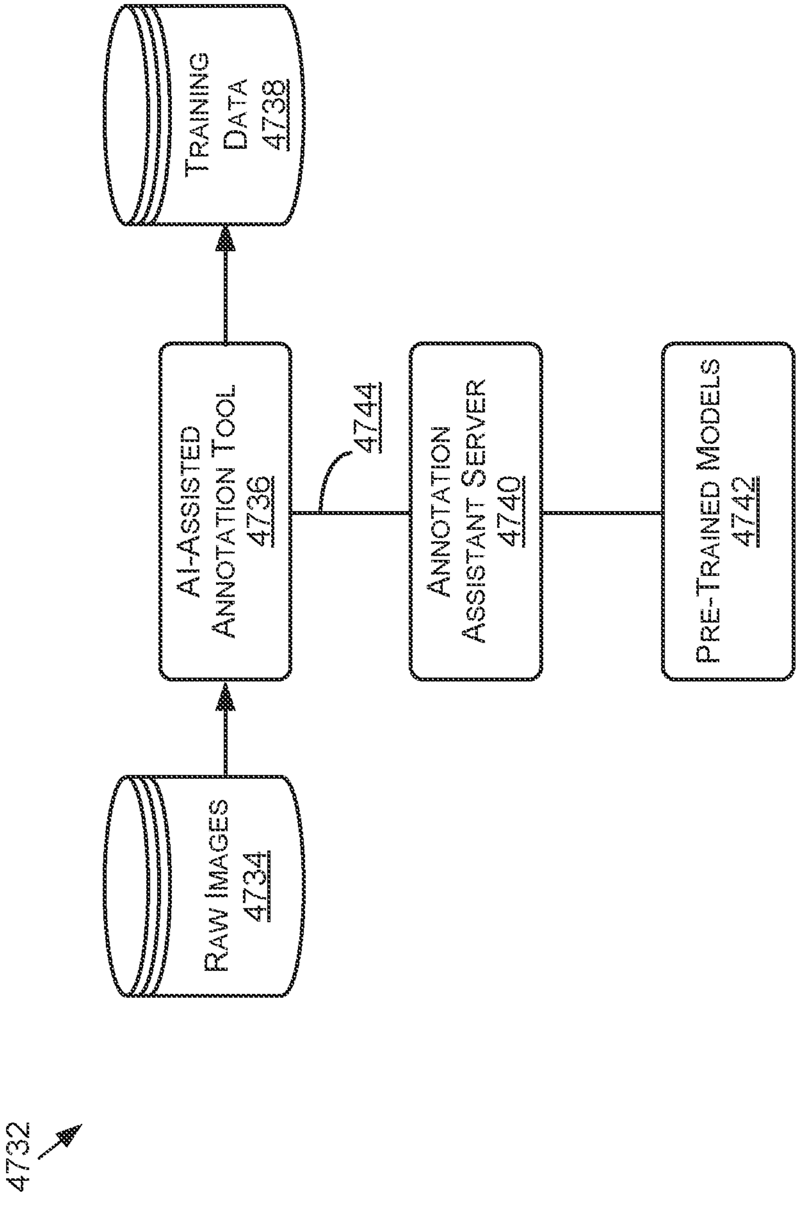
FIG. 47B is an example illustration of a client-server architecture to enhance annotation tools with pre-trained annotation models, in accordance with at least one embodiment.

In at least one embodiment, training pipelines 4404 may include AI-assisted annotation, as described in more detail herein with respect to at least FIG. 47B. In at least one embodiment, labeled clinic data 4312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 4308 (or other data type used by machine learning models), there may be corresponding ground truth data generated by training system 4304. In at least one embodiment, AI-assisted annotation may be performed as part of deployment pipelines 4410; either in addition to, or in lieu of AI-assisted annotation included in training pipelines 4404. In at least one embodiment, system 4400 may include a multi-layer platform that may include a software layer (e.g., software 4318) of diagnostic applications (or other application types) that may perform one or more medical imaging and diagnostic functions. In at least one embodiment, system 4400 may be communicatively coupled to (e.g., via encrypted links) PACS server networks of one or more facilities. In at least one embodiment, system 4400 may be configured to access and referenced data (e.g., DICOM data, RIS data, raw data, CIS data, REST compliant data, RPC data, raw data, etc.) from PACS servers (e.g., via a DICOM adapter 4402, or another data type adapter such as RIS, CIS, REST compliant, RPC, raw, etc.) to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 4302). In at least one embodiment, applications may then call or execute one or more services 4320 for performing compute, AI, or visualization tasks associated with respective applications, and software 4318 and/or services 4320 may leverage hardware 4322 to perform processing tasks in an effective and efficient manner.

In at least one embodiment, deployment system 4306 may execute deployment pipelines 4410. In at least one embodiment, deployment pipelines 4410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 4410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 4410 depending on information desired from data generated by a device. In at least one embodiment, where detections of anomalies are desired from an MRI machine, there may be a first deployment pipeline 4410, and where image enhancement is desired from output of an MRI machine, there may be a second deployment pipeline 4410.

In at least one embodiment, applications available for deployment pipelines 4410 may include any application that may be used for performing processing tasks on imaging data or other data from devices. In at least one embodiment, different applications may be responsible for image enhancement, segmentation, reconstruction, anomaly detection, object detection, feature detection, treatment planning, dosimetry, beam planning (or other radiation treatment procedures), and/or other analysis, image processing, or inferencing tasks. In at least one embodiment, deployment system 4306 may define constructs for each of applications, such that users of deployment system 4306 (e.g., medical facilities, labs, clinics, etc.) may understand constructs and adapt applications for implementation within their respective facility. In at least one embodiment, an application for image reconstruction may be selected for inclusion in deployment pipeline 4410, but data type generated by an imaging device may be different from a data type used within an application. In at least one embodiment, DICOM adapter 4402B (and/or a DICOM reader) or another data type adapter or reader (e.g., RIS, CIS, REST compliant, RPC, raw, etc.) may be used within deployment pipeline 4410 to convert data to a form useable by an application within deployment system 4306. In at least one embodiment, access to DICOM, RIS, CIS, REST compliant, RPC, raw, and/or other data type libraries may be accumulated and pre-processed, including decoding, extracting, and/or performing any convolutions, color corrections, sharpness, gamma, and/or other augmentations to data. In at least one embodiment, DICOM, RIS, CIS, REST compliant, RPC, and/or raw data may be unordered and a pre-pass may be executed to organize or sort collected data. In at least one embodiment, because various applications may share common image operations, in some embodiments, a data augmentation library (e.g., as one of services 4320) may be used to accelerate these operations. In at least one embodiment, to avoid bottlenecks of conventional processing approaches that rely on CPU processing, parallel computing platform 4430 may be used for GPU acceleration of these processing tasks.

In at least one embodiment, an image reconstruction application may include a processing task that includes use of a machine learning model. In at least one embodiment, a user may desire to use their own machine learning model, or to select a machine learning model from model registry 4324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 4400—such as services 4320 and hardware 4322—deployment pipelines 4410 may be even more user friendly, provide for easier integration, and produce more accurate, efficient, and timely results.

In at least one embodiment, deployment system 4306 may include a user interface 4414 (e.g., a graphical user interface, a web interface, etc.) that may be used to select applications for inclusion in deployment pipeline(s) 4410, arrange applications, modify or change applications or parameters or constructs thereof, use and interact with deployment pipeline(s) 4410 during set-up and/or deployment, and/or to otherwise interact with deployment system 4306. In at least one embodiment, although not illustrated with respect to training system 4304, user interface 4414 (or a different user interface) may be used for selecting models for use in deployment system 4306, for selecting models for training, or retraining, in training system 4304, and/or for otherwise interacting with training system 4304.

Figure 45:
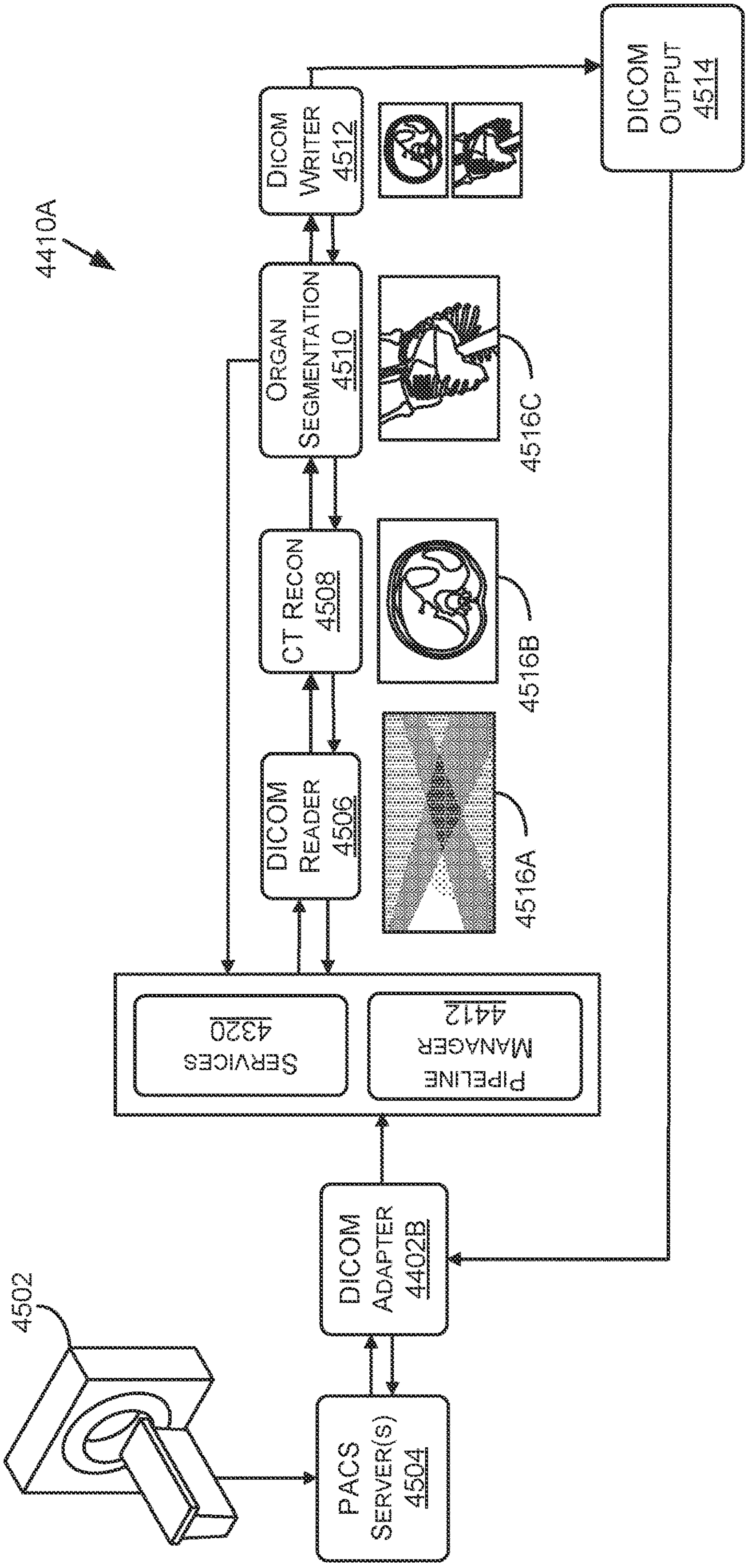
FIG. 45 includes an example illustration of an advanced computing pipeline 4410A for processing imaging data, in accordance with at least one embodiment.

In at least one embodiment, pipeline manager 4412 may be used, in addition to an application orchestration system 4428, to manage interaction between applications or containers of deployment pipeline(s) 4410 and services 4320 and/or hardware 4322. In at least one embodiment, pipeline manager 4412 may be configured to facilitate interactions from application to application, from application to service 4320, and/or from application or service to hardware 4322. In at least one embodiment, although illustrated as included in software 4318, this is not intended to be limiting, and in some examples (e.g., as illustrated in FIG. 45) pipeline manager 4412 may be included in services 4320. In at least one embodiment, application orchestration system 4428 (e.g., Kubernetes, DOCKER, etc.) may include a container orchestration system that may group applications into containers as logical units for coordination, management, scaling, and deployment. In at least one embodiment, by associating applications from deployment pipeline(s) 4410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 4412 and application orchestration system 4428. In at least one embodiment, so long as an expected input and/or output of each container or application is known by a system (e.g., based on constructs of applications or containers), application orchestration system 4428 and/or pipeline manager 4412 may facilitate communication among and between, and sharing of resources among and between, each of applications or containers. In at least one embodiment, because one or more of applications or containers in deployment pipeline(s) 4410 may share same services and resources, application orchestration system 4428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 4428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 4320 leveraged by and shared by applications or containers in deployment system 4306 may include compute services 4416, AI services 4418, visualization services 4420, and/or other service types. In at least one embodiment, applications may call (e.g., execute) one or more of services 4320 to perform processing operations for an application. In at least one embodiment, compute services 4416 may be leveraged by applications to perform super-computing or other high-performance computing (HPC) tasks. In at least one embodiment, compute service(s) 4416 may be leveraged to perform parallel processing (e.g., using a parallel computing platform 4430) for processing data through one or more of applications and/or one or more tasks of a single application, substantially simultaneously. In at least one embodiment, parallel computing platform 4430 (e.g., NVIDIA's CUDA) may enable general purpose computing on GPUs (GPGPU) (e.g., GPUs 4422). In at least one embodiment, a software layer of parallel computing platform 4430 may provide access to virtual instruction sets and parallel computational elements of GPUs, for execution of compute kernels. In at least one embodiment, parallel computing platform 4430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 4430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 4418 may be leveraged to perform inferencing services for executing machine learning model(s) associated with applications (e.g., tasked with performing one or more processing tasks of an application). In at least one embodiment, AI services 4418 may leverage AI system 4424 to execute machine learning model(s) (e.g., neural networks, such as CNNs) for segmentation, reconstruction, object detection, feature detection, classification, and/or other inferencing tasks. In at least one embodiment, applications of deployment pipeline(s) 4410 may use one or more of output models 4316 from training system 4304 and/or other models of applications to perform inference on imaging data (e.g., DICOM data, RIS data, CIS data, REST compliant data, RPC data, raw data, etc.). In at least one embodiment, two or more examples of inferencing using application orchestration system 4428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 4428 may distribute resources (e.g., services 4320 and/or hardware 4322) based on priority paths for different inferencing tasks of AI services 4418.

In at least one embodiment, shared storage may be mounted to AI services 4418 within system 4400. In at least one embodiment, shared storage may operate as a cache (or other storage device type) and may be used to process inference requests from applications. In at least one embodiment, when an inference request is submitted, a request may be received by a set of API instances of deployment system 4306, and one or more instances may be selected (e.g., for best fit, for load balancing, etc.) to process a request. In at least one embodiment, to process a request, a request may be entered into a database, a machine learning model may be located from model registry 4324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 4412) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 4320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 4426, and an inference service may perform inferencing on a GPU.

In at least one embodiment, visualization services 4420 may be leveraged to generate visualizations for viewing outputs of applications and/or deployment pipeline(s) 4410. In at least one embodiment, GPUs 4422 may be leveraged by visualization services 4420 to generate visualizations. In at least one embodiment, rendering effects, such as ray-tracing, may be implemented by visualization services 4420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 4420 may include an internal visualizer, cinematics, and/or other rendering or image processing capabilities or functionality (e.g., ray tracing, rasterization, internal optics, etc.).

In at least one embodiment, hardware 4322 may include GPUs 4422, AI system 4424, cloud 4426, and/or any other hardware used for executing training system 4304 and/or deployment system 4306. In at least one embodiment, GPUs 4422 (e.g., NVIDIA's TESLA and/or QUADRO GPUs) may include any number of GPUs that may be used for executing processing tasks of compute services 4416, AI services 4418, visualization services 4420, other services, and/or any of features or functionality of software 4318. For example, with respect to AI services 4418, GPUs 4422 may be used to perform pre-processing on imaging data (or other data types used by machine learning models), post-processing on outputs of machine learning models, and/or to perform inferencing (e.g., to execute machine learning models). In at least one embodiment, cloud 4426, AI system 4424, and/or other components of system 4400 may use GPUs 4422. In at least one embodiment, cloud 4426 may include a GPU-optimized platform for deep learning tasks. In at least one embodiment, AI system 4424 may use GPUs, and cloud 4426—or at least a portion tasked with deep learning or inferencing—may be executed using one or more AI systems 4424. As such, although hardware 4322 is illustrated as discrete components, this is not intended to be limiting, and any components of hardware 4322 may be combined with, or leveraged by, any other components of hardware 4322.

In at least one embodiment, AI system 4424 may include a purpose-built computing system (e.g., a super-computer or an HPC) configured for inferencing, deep learning, machine learning, and/or other artificial intelligence tasks. In at least one embodiment, AI system 4424 (e.g., NVIDIA's DGX) may include GPU-optimized software (e.g., a software stack) that may be executed using a plurality of GPUs 4422, in addition to CPUs, RAM, storage, and/or other components, features, or functionality. In at least one embodiment, one or more AI systems 4424 may be implemented in cloud 4426 (e.g., in a data center) for performing some or all of AI-based processing tasks of system 4400.

In at least one embodiment, cloud 4426 may include a GPU-accelerated infrastructure (e.g., NVIDIA's NGC) that may provide a GPU-optimized platform for executing processing tasks of system 4400. In at least one embodiment, cloud 4426 may include an AI system(s) 4424 for performing one or more of AI-based tasks of system 4400 (e.g., as a hardware abstraction and scaling platform). In at least one embodiment, cloud 4426 may integrate with application orchestration system 4428 leveraging multiple GPUs to enable seamless scaling and load balancing between and among applications and services 4320. In at least one embodiment, cloud 4426 may tasked with executing at least some of services 4320 of system 4400, including compute services 4416, AI services 4418, and/or visualization services 4420, as described herein. In at least one embodiment, cloud 4426 may perform small and large batch inference (e.g., executing NVIDIA's TENSOR RT), provide an accelerated parallel computing API and platform 4430 (e.g., NVIDIA's CUDA), execute application orchestration system 4428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 4400.

In at least one embodiment, in an effort to preserve patient confidentiality (e.g., where patient data or records are to be used off-premises), cloud 4426 may include a registry-such as a deep learning container registry. In at least one embodiment, a registry may store containers for instantiations of applications that may perform pre-processing, post-processing, or other processing tasks on patient data. In at least one embodiment, cloud 4426 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

In at least one embodiment, at least one component shown or described with respect to FIG. 44 is used to perform techniques and/or functions described in connection with FIGS. 1-13. In at least one embodiment, at least one component shown or described with respect to FIG. 44 is used to perform operations described herein, such as to detect whether one or more objects within one or more images is likely to be duplicated in an image interpolated using the one or more images. In at least one embodiment, at least one component shown or described with respect to FIG. 44 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

FIG. 45 includes an example illustration of a deployment pipeline 4410A for processing imaging data, in accordance with at least one embodiment. In at least one embodiment, system 4400—and specifically deployment system 4306—may be used to customize, update, and/or integrate deployment pipeline(s) 4410A into one or more production environments. In at least one embodiment, deployment pipeline 4410A of FIG. 45 includes a non-limiting example of a deployment pipeline 4410A that may be custom defined by a particular user (or team of users) at a facility (e.g., at a hospital, clinic, lab, research environment, etc.). In at least one embodiment, to define deployment pipelines 4410A for a CT scanner 4502, a user may select—from a container registry, for example—one or more applications that perform specific functions or tasks with respect to imaging data generated by CT scanner 4502. In at least one embodiment, applications may be applied to deployment pipeline 4410A as containers that may leverage services 4320 and/or hardware 4322 of system 4400. In addition, deployment pipeline 4410A may include additional processing tasks or applications that may be implemented to prepare data for use by applications (e.g., DICOM adapter 4402B and DICOM reader 4506 may be used in deployment pipeline 4410A to prepare data for use by CT reconstruction 4508, organ segmentation 4510, etc.). In at least one embodiment, deployment pipeline 4410A may be customized or selected for consistent deployment, one time use, or for another frequency or interval. In at least one embodiment, a user may desire to have CT reconstruction 4508 and organ segmentation 4510 for several subjects over a specific interval, and thus may deploy pipeline 4410A for that period of time. In at least one embodiment, a user may select, for each request from system 4400, applications that a user wants to perform processing on that data for that request. In at least one embodiment, deployment pipeline 4410A may be adjusted at any interval and, because of adaptability and scalability of a container structure within system 4400, this may be a seamless process.

In at least one embodiment, deployment pipeline 4410A of FIG. 45 may include CT scanner 4502 generating imaging data of a patient or subject. In at least one embodiment, imaging data from CT scanner 4502 may be stored on a PACS server(s) 4504 associated with a facility housing CT scanner 4502. In at least one embodiment, PACS server(s) 4504 may include software and/or hardware components that may directly interface with imaging modalities (e.g., CT scanner 4502) at a facility. In at least one embodiment, DICOM adapter 4402B may enable sending and receipt of DICOM objects using DICOM protocols. In at least one embodiment, DICOM adapter 4402B may aid in preparation or configuration of DICOM data from PACS server(s) 4504 for use by deployment pipeline 4410A. In at least one embodiment, once DICOM data is processed through DICOM adapter 4402B, pipeline manager 4412 may route data through to deployment pipeline 4410A. In at least one embodiment, DICOM reader 4506 may extract image files and any associated metadata from DICOM data (e.g., raw sinogram data, as illustrated in visualization 4516A). In at least one embodiment, working files that are extracted may be stored in a cache for faster processing by other applications in deployment pipeline 4410A. In at least one embodiment, once DICOM reader 4506 has finished extracting and/or storing data, a signal of completion may be communicated to pipeline manager 4412. In at least one embodiment, pipeline manager 4412 may then initiate or call upon one or more other applications or containers in deployment pipeline 4410A.

In at least one embodiment, CT reconstruction 4508 application and/or container may be executed once data (e.g., raw sinogram data) is available for processing by CT reconstruction 4508 application. In at least one embodiment, CT reconstruction 4508 may read raw sinogram data from a cache, reconstruct an image file out of raw sinogram data (e.g., as illustrated in visualization 4516B), and store resulting image file in a cache. In at least one embodiment, at completion of reconstruction, pipeline manager 4412 may be signaled that reconstruction task is complete. In at least one embodiment, once reconstruction is complete, and a reconstructed image file may be stored in a cache (or other storage device), organ segmentation 4510 application and/or container may be triggered by pipeline manager 4412. In at least one embodiment, organ segmentation 4510 application and/or container may read an image file from a cache, normalize or convert an image file to format suitable for inference (e.g., convert an image file to an input resolution of a machine learning model), and run inference against a normalized image. In at least one embodiment, to run inference on a normalized image, organ segmentation 4510 application and/or container may rely on services 4320, and pipeline manager 4412 and/or application orchestration system 4428 may facilitate use of services 4320 by organ segmentation 4510 application and/or container. In at least one embodiment, for example, organ segmentation 4510 application and/or container may leverage AI services 4418 to perform inference on a normalized image, and AI services 4418 may leverage hardware 4322 (e.g., AI system 4424) to execute AI services 4418. In at least one embodiment, a result of an inference may be a mask file (e.g., as illustrated in visualization 4516C) that may be stored in a cache (or other storage device).

In at least one embodiment, once applications that process DICOM data and/or data extracted from DICOM data have completed processing, a signal may be generated for pipeline manager 4412. In at least one embodiment, pipeline manager 4412 may then execute DICOM writer 4512 to read results from a cache (or other storage device), package results into a DICOM format (e.g., as DICOM output 4514) for use by users at a facility who generated a request. In at least one embodiment, DICOM output 4514 may then be transmitted to DICOM adapter 4402B to prepare DICOM output 4514 for storage on PACS server(s) 4504 (e.g., for viewing by a DICOM viewer at a facility). In at least one embodiment, in response to a request for reconstruction and segmentation, visualizations 4516B and 4516C may be generated and available to a user for diagnoses, research, and/or for other purposes.

Although illustrated as consecutive application in deployment pipeline 4410A, CT reconstruction 4508 and organ segmentation 4510 applications may be processed in parallel in at least one embodiment. In at least one embodiment, where applications do not have dependencies on one another, and data is available for each application (e.g., after DICOM reader 4506 extracts data), applications may be executed at a same time, substantially at a same time, or with some overlap. In at least one embodiment, where two or more applications require similar services 4320, a scheduler of system 4400 may be used to load balance and distribute compute or processing resources between and among various applications. In at least one embodiment, in some embodiments, parallel computing platform 4430 may be used to perform parallel processing for applications to decrease run-time of deployment pipeline 4410A to provide real-time results.

Figure 46A:
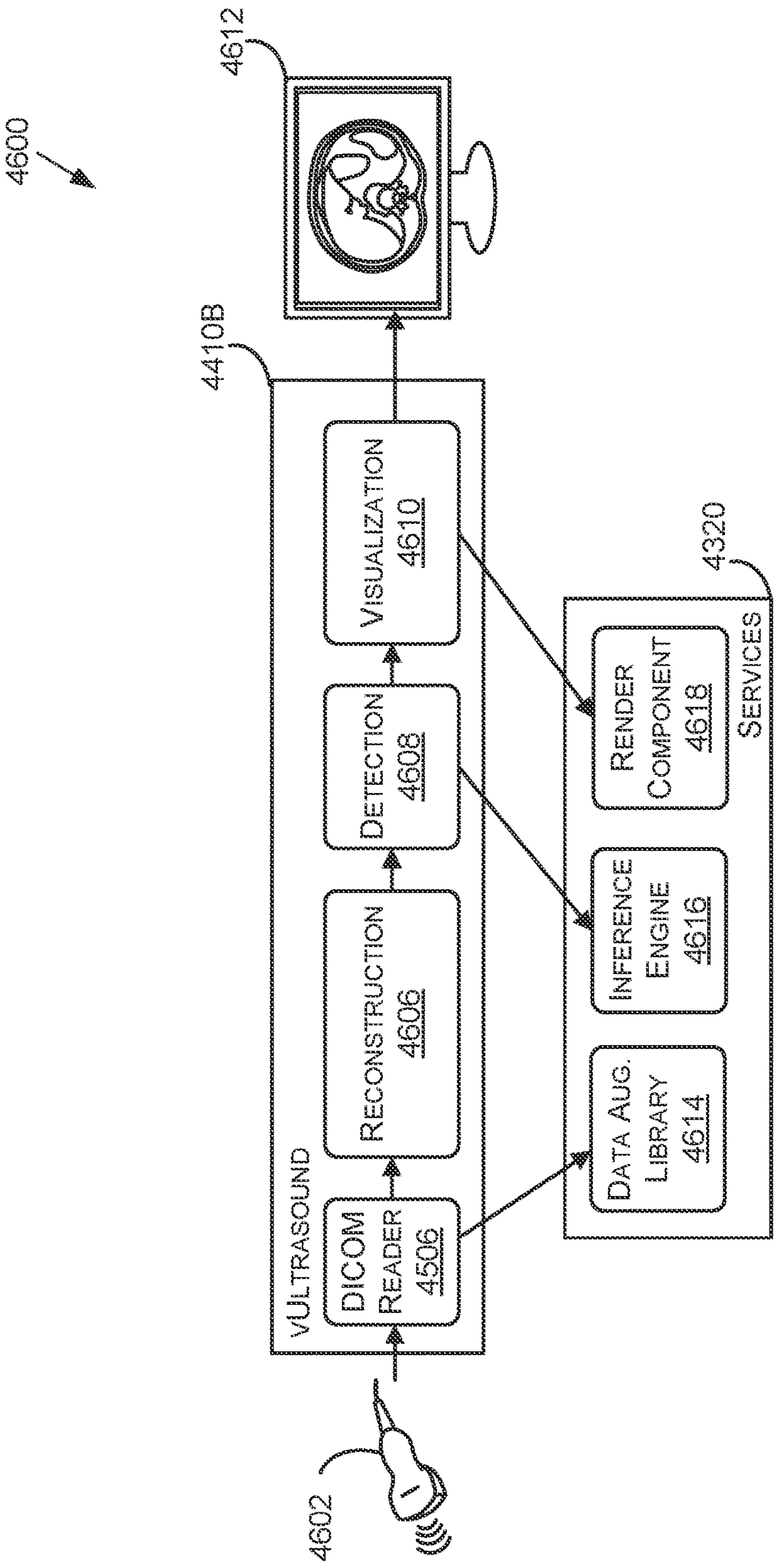
FIG. 46A includes an example data flow diagram of a virtual instrument supporting an ultrasound device, in accordance with at least one embodiment.
Figure 46B:
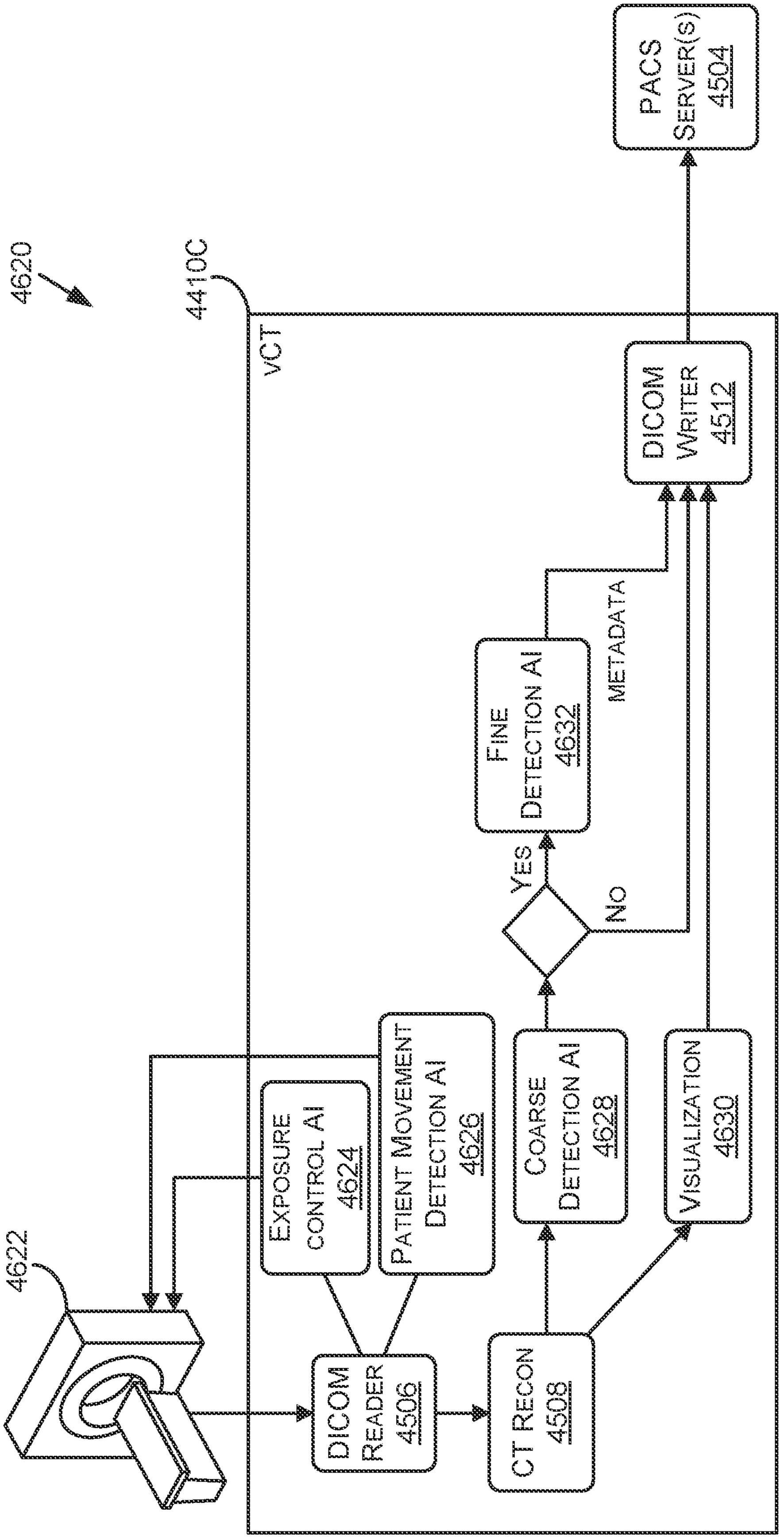
FIG. 46B includes an example data flow diagram of a virtual instrument supporting an CT scanner, in accordance with at least one embodiment.

In at least one embodiment, and with reference to FIGS. 46A-46B, deployment system 4306 may be implemented as one or more virtual instruments to perform different functionalities—such as image processing, segmentation, enhancement, AI, visualization, and inferencing—with imaging devices (e.g., CT scanners, X-ray machines, MRI machines, etc.), sequencing devices, genomics devices, and/or other device types. In at least one embodiment, system 4400 may allow for creation and provision of virtual instruments that may include a software-defined deployment pipeline 4410 that may receive raw/unprocessed input data generated by a device(s) and output processed/reconstructed data. In at least one embodiment, deployment pipelines 4410 (e.g., 4410A and 4410B) that represent virtual instruments may implement intelligence into a pipeline, such as by leveraging machine learning models, to provide containerized inference support to a system. In at least one embodiment, virtual instruments may execute any number of containers each including instantiations of applications. In at least one embodiment, such as where real-time processing is desired, deployment pipelines 4410 representing virtual instruments may be static (e.g., containers and/or applications may be set), while in other examples, container and/or applications for virtual instruments may be selected (e.g., on a per-request basis) from a pool of applications or resources (e.g., within a container registry).

In at least one embodiment, system 4400 may be instantiated or executed as one or more virtual instruments on-premise at a facility in, for example, a computing system deployed next to or otherwise in communication with a radiology machine, an imaging device, and/or another device type at a facility. In at least one embodiment, however, an on-premise installation may be instantiated or executed within a computing system of a device itself (e.g., a computing system integral to an imaging device), in a local datacenter (e.g., a datacenter on-premise), and/or in a cloud-environment (e.g., in cloud 4426). In at least one embodiment, deployment system 4306, operating as a virtual instrument, may be instantiated by a supercomputer or other HPC system in some examples. In at least one embodiment, on-premise installation may allow for high-bandwidth uses (via, for example, higher throughput local communication interfaces, such as RF over Ethernet) for real-time processing. In at least one embodiment, real-time or near real-time processing may be particularly useful where a virtual instrument supports an ultrasound device or other imaging modality where immediate visualizations are expected or required for accurate diagnoses and analyses. In at least one embodiment, a cloud-computing architecture may be capable of dynamic bursting to a cloud computing service provider, or other compute cluster, when local demand exceeds on-premise capacity or capability. In at least one embodiment, a cloud architecture, when implemented, may be tuned for training neural networks or other machine learning models, as described herein with respect to training system 4304. In at least one embodiment, with training pipelines in place, machine learning models may be continuously learn and improve as they process additional data from devices they support. In at least one embodiment, virtual instruments may be continually improved using additional data, new data, existing machine learning models, and/or new or updated machine learning models.

In at least one embodiment, a computing system may include some or all of hardware 4322 described herein, and hardware 4322 may be distributed in any of a number of ways including within a device, as part of a computing device coupled to and located proximate a device, in a local datacenter at a facility, and/or in cloud 4426. In at least one embodiment, because deployment system 4306 and associated applications or containers are created in software (e.g., as discrete containerized instantiations of applications), behavior, operation, and configuration of virtual instruments, as well as outputs generated by virtual instruments, may be modified or customized as desired, without having to change or alter raw output of a device that a virtual instrument supports.

In at least one embodiment, at least one component shown or described with respect to FIG. 45 is used to perform techniques and/or functions described in connection with FIGS. 1-13. In at least one embodiment, at least one component shown or described with respect to FIG. 45 is used to perform operations described herein, such as to detect whether one or more objects within one or more images is likely to be duplicated in an image interpolated using the one or more images. In at least one embodiment, at least one component shown or described with respect to FIG. 45 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

FIG. 46A includes an example data flow diagram of a virtual instrument supporting an ultrasound device, in accordance with at least one embodiment. In at least one embodiment, deployment pipeline 4410B may leverage one or more of services 4320 of system 4400. In at least one embodiment, deployment pipeline 4410B and services 4320 may leverage hardware 4322 of a system either locally or in cloud 4426. In at least one embodiment, although not illustrated, process 4600 may be facilitated by pipeline manager 4412, application orchestration system 4428, and/or parallel computing platform 4430.

In at least one embodiment, process 4600 may include receipt of imaging data from an ultrasound device 4602. In at least one embodiment, imaging data may be stored on PACS server(s) in a DICOM format (or other format, such as RIS, CIS, REST compliant, RPC, raw, etc.), and may be received by system 4400 for processing through deployment pipeline 4410 selected or customized as a virtual instrument (e.g., a virtual ultrasound) for ultrasound device 4602. In at least one embodiment, imaging data may be received directly from an imaging device (e.g., ultrasound device 4602) and processed by a virtual instrument. In at least one embodiment, a transducer or other signal converter communicatively coupled between an imaging device and a virtual instrument may convert signal data generated by an imaging device to image data that may be processed by a virtual instrument. In at least one embodiment, raw data and/or image data may be applied to DICOM reader 4506 to extract data for use by applications or containers of deployment pipeline 4410B. In at least one embodiment, DICOM reader 4506 may leverage data augmentation library 4614 (e.g., NVIDIA's DALI) as a service 4320 (e.g., as one of compute service(s) 4416) for extracting, resizing, rescaling, and/or otherwise preparing data for use by applications or containers.

In at least one embodiment, once data is prepared, a reconstruction 4606 application and/or container may be executed to reconstruct data from ultrasound device 4602 into an image file. In at least one embodiment, after reconstruction 4606, or at a same time as reconstruction 4606, a detection 4608 application and/or container may be executed for anomaly detection, object detection, feature detection, and/or other detection tasks related to data. In at least one embodiment, an image file generated during reconstruction 4606 may be used during detection 4608 to identify anomalies, objects, features, etc. In at least one embodiment, detection 4608 application may leverage an inference engine 4616 (e.g., as one of AI service(s) 4418) to perform inference on data to generate detections. In at least one embodiment, one or more machine learning models (e.g., from training system 4304) may be executed or called by detection 4608 application.

In at least one embodiment, once reconstruction 4606 and/or detection 4608 is/are complete, data output from these application and/or containers may be used to generate visualizations 4610, such as visualization 4612 (e.g., a grayscale output) displayed on a workstation or display terminal. In at least one embodiment, visualization may allow a technician or other user to visualize results of deployment pipeline 4410B with respect to ultrasound device 4602. In at least one embodiment, visualization 4610 may be executed by leveraging a render component 4618 of system 4400 (e.g., one of visualization service(s) 4420). In at least one embodiment, render component 4618 may execute a 2D, OpenGL, or ray-tracing service to generate visualization 4612.

In at least one embodiment, at least one component shown or described with respect to FIG. 46A is used to perform techniques and/or functions described in connection with FIGS. 1-13. In at least one embodiment, at least one component shown or described with respect to FIG. 46A is used to perform operations described herein, such as to detect whether one or more objects within one or more images is likely to be duplicated in an image interpolated using the one or more images. In at least one embodiment, at least one component shown or described with respect to 46A is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

FIG. 46B includes an example data flow diagram of a virtual instrument supporting a CT scanner, in accordance with at least one embodiment. In at least one embodiment, deployment pipeline 4410C may leverage one or more of services 4320 of system 4400. In at least one embodiment, deployment pipeline 4410C and services 4320 may leverage hardware 4322 of a system either locally or in cloud 4426. In at least one embodiment, although not illustrated, process 4620 may be facilitated by pipeline manager 4412, application orchestration system 4428, and/or parallel computing platform 4430.

In at least one embodiment, process 4620 may include CT scanner 4622 generating raw data that may be received by DICOM reader 4506 (e.g., directly, via a PACS server 4504, after processing, etc.). In at least one embodiment, a Virtual CT (instantiated by deployment pipeline 4410C) may include a first, real-time pipeline for monitoring a patient (e.g., patient movement detection AI 4626) and/or for adjusting or optimizing exposure of CT scanner 4622 (e.g., using exposure control AI 4624). In at least one embodiment, one or more of applications (e.g., 4624 and 4626) may leverage a service 4320, such as AI service(s) 4418. In at least one embodiment, outputs of exposure control AI 4624 application (or container) and/or patient movement detection AI 4626 application (or container) may be used as feedback to CT scanner 4622 and/or a technician for adjusting exposure (or other settings of CT scanner 4622) and/or informing a patient to move less.

In at least one embodiment, deployment pipeline 4410C may include a non-real-time pipeline for analyzing data generated by CT scanner 4622. In at least one embodiment, a second pipeline may include CT reconstruction 4508 application and/or container, a coarse detection AI 4628 application and/or container, a fine detection AI 4632 application and/or container (e.g., where certain results are detected by coarse detection AI 4628), a visualization 4630 application and/or container, and a DICOM writer 4512 (and/or other data type writer, such as RIS, CIS, REST compliant, RPC, raw, etc.) application and/or container. In at least one embodiment, raw data generated by CT scanner 4622 may be passed through pipelines of deployment pipeline 4410C (instantiated as a virtual CT instrument) to generate results. In at least one embodiment, results from DICOM writer 4512 may be transmitted for display and/or may be stored on PACS server(s) 4504 for later retrieval, analysis, or display by a technician, practitioner, or other user.

In at least one embodiment, at least one component shown or described with respect to FIG. 46B is used to perform techniques and/or functions described in connection with FIGS. 1-13. In at least one embodiment, at least one component shown or described with respect to FIG. 46B is used to perform operations described herein, such as to detect whether one or more objects within one or more images is likely to be duplicated in an image interpolated using the one or more images. In at least one embodiment, at least one component shown or described with respect to FIG. 46B is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

FIG. 47A illustrates a data flow diagram for a process 4700 to train, retrain, or update a machine learning model, in accordance with at least one embodiment. In at least one embodiment, process 4700 may be executed using, as a non-limiting example, system 4400 of FIG. 44. In at least one embodiment, process 4700 may leverage services 4320 and/or hardware 4322 of system 4400, as described herein. In at least one embodiment, refined models 4712 generated by process 4700 may be executed by deployment system 4306 for one or more containerized applications in deployment pipelines 4410.

In at least one embodiment, model training 4314 may include retraining or updating an initial model 4704 (e.g., a pre-trained model) using new training data (e.g., new input data, such as customer dataset 4706, and/or new ground truth data associated with input data). In at least one embodiment, to retrain, or update, initial model 4704, output or loss layer(s) of initial model 4704 may be reset, or deleted, and/or replaced with an updated or new output or loss layer(s). In at least one embodiment, initial model 4704 may have previously fine-tuned parameters (e.g., weights and/or biases) that remain from prior training, so training or retraining 4314 may not take as long or require as much processing as training a model from scratch. In at least one embodiment, during model training 4314, by having reset or replaced output or loss layer(s) of initial model 4704, parameters may be updated and re-tuned for a new data set based on loss calculations associated with accuracy of output or loss layer(s) at generating predictions on new, customer dataset 4706 (e.g., image data 4308 of FIG. 43).

In at least one embodiment, pre-trained models 4406 may be stored in a data store, or registry (e.g., model registry 4324 of FIG. 43). In at least one embodiment, pre-trained models 4406 may have been trained, at least in part, at one or more facilities other than a facility executing process 4700. In at least one embodiment, to protect privacy and rights of patients, subjects, or clients of different facilities, pre-trained models 4406 may have been trained, on-premise, using customer or patient data generated on-premise. In at least one embodiment, pre-trained models 4406 may be trained using cloud 4426 and/or other hardware 4322, but confidential, privacy protected patient data may not be transferred to, used by, or accessible to any components of cloud 4426 (or other off premise hardware). In at least one embodiment, where a pre-trained model 4406 is trained at using patient data from more than one facility, pre-trained model 4406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 4406 on-premise and/or off premise, such as in a datacenter or other cloud computing infrastructure.

In at least one embodiment, when selecting applications for use in deployment pipelines 4410, a user may also select machine learning models to be used for specific applications. In at least one embodiment, a user may not have a model for use, so a user may select a pre-trained model 4406 to use with an application. In at least one embodiment, pre-trained model 4406 may not be optimized for generating accurate results on customer dataset 4706 of a facility of a user (e.g., based on patient diversity, demographics, types of medical imaging devices used, etc.). In at least one embodiment, prior to deploying pre-trained model 4406 into deployment pipeline 4410 for use with an application(s), pre-trained model 4406 may be updated, retrained, and/or fine-tuned for use at a respective facility.

In at least one embodiment, a user may select pre-trained model 4406 that is to be updated, retrained, and/or fine-tuned, and pre-trained model 4406 may be referred to as initial model 4704 for training system 4304 within process 4700. In at least one embodiment, customer dataset 4706 (e.g., imaging data, genomics data, sequencing data, or other data types generated by devices at a facility) may be used to perform model training 4314 (which may include, without limitation, transfer learning) on initial model 4704 to generate refined model 4712. In at least one embodiment, ground truth data corresponding to customer dataset 4706 may be generated by training system 4304. In at least one embodiment, ground truth data may be generated, at least in part, by clinicians, scientists, doctors, practitioners, at a facility (e.g., as labeled clinic data 4312 of FIG. 43).

In at least one embodiment, AI-assisted annotation 4310 may be used in some examples to generate ground truth data. In at least one embodiment, AI-assisted annotation 4310 (e.g., implemented using an AI-assisted annotation SDK) may leverage machine learning models (e.g., neural networks) to generate suggested or predicted ground truth data for a customer dataset. In at least one embodiment, user 4710 may use annotation tools within a user interface (a graphical user interface (GUI)) on computing device 4708.

In at least one embodiment, user 4710 may interact with a GUI via computing device 4708 to edit or fine-tune annotations or auto-annotations. In at least one embodiment, a polygon editing feature may be used to move vertices of a polygon to more accurate or fine-tuned locations.

In at least one embodiment, once customer dataset 4706 has associated ground truth data, ground truth data (e.g., from AI-assisted annotation, manual labeling, etc.) may be used by during model training 4314 to generate refined model 4712. In at least one embodiment, customer dataset 4706 may be applied to initial model 4704 any number of times, and ground truth data may be used to update parameters of initial model 4704 until an acceptable level of accuracy is attained for refined model 4712. In at least one embodiment, once refined model 4712 is generated, refined model 4712 may be deployed within one or more deployment pipelines 4410 at a facility for performing one or more processing tasks with respect to medical imaging data.

In at least one embodiment, refined model 4712 may be uploaded to pre-trained models 4406 in model registry 4324 to be selected by another facility. In at least one embodiment, his process may be completed at any number of facilities such that refined model 4712 may be further refined on new datasets any number of times to generate a more universal model.

In at least one embodiment, at least one component shown or described with respect to FIG. 47A is used to perform techniques and/or functions described in connection with FIGS. 1-13. In at least one embodiment, at least one component shown or described with respect to FIG. 47A is used to perform operations described herein, such as to detect whether one or more objects within one or more images is likely to be duplicated in an image interpolated using the one or more images. In at least one embodiment, at least one component shown or described with respect to FIG. 47A is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

FIG. 47B is an example illustration of a client-server architecture 4732 to enhance annotation tools with pre-trained annotation models, in accordance with at least one embodiment. In at least one embodiment, AI-assisted annotation tools 4736 may be instantiated based on a client-server architecture 4732. In at least one embodiment, annotation tools 4736 in imaging applications may aid radiologists, for example, identify organs and abnormalities. In at least one embodiment, imaging applications may include software tools that help user 4710 to identify, as a non-limiting example, a few extreme points on a particular organ of interest in raw images 4734 (e.g., in a 3D MRI or CT scan) and receive auto-annotated results for all 2D slices of a particular organ. In at least one embodiment, results may be stored in a data store as training data 4738 and used as (for example and without limitation) ground truth data for training. In at least one embodiment, when computing device 4708 sends extreme points for AI-assisted annotation 4310, a deep learning model, for example, may receive this data as input and return inference results of a segmented organ or abnormality. In at least one embodiment, pre-instantiated annotation tools, such as AI-Assisted Annotation Tool 4736B in FIG. 47B, may be enhanced by making API calls (e.g., API Call 4744) to a server, such as an Annotation Assistant Server 4740 that may include a set of pre-trained models 4742 stored in an annotation model registry, for example. In at least one embodiment, an annotation model registry may store pre-trained models 4742 (e.g., machine learning models, such as deep learning models) that are pre-trained to perform AI-assisted annotation on a particular organ or abnormality. In at least one embodiment, these models may be further updated by using training pipelines 4404. In at least one embodiment, pre-installed annotation tools may be improved over time as new labeled clinic data 4312 is added.

Inference and/or training logic 1415 are used to perform inferencing and/or training operations associated with one or more embodiments. Details regarding inference and/or training logic 1415 are provided herein in conjunction with FIGS. 14A and/or 14B.

In at least one embodiment, at least one component shown or described with respect to FIG. 47B is used to perform techniques and/or functions described in connection with FIGS. 1-13. In at least one embodiment, at least one component shown or described with respect to FIG. 47B is used to perform operations described herein, such as to detect whether one or more objects within one or more images is likely to be duplicated in an image interpolated using the one or more images. In at least one embodiment, at least one component shown or described with respect to FIG. 47B is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Software Systems

Figure 48:
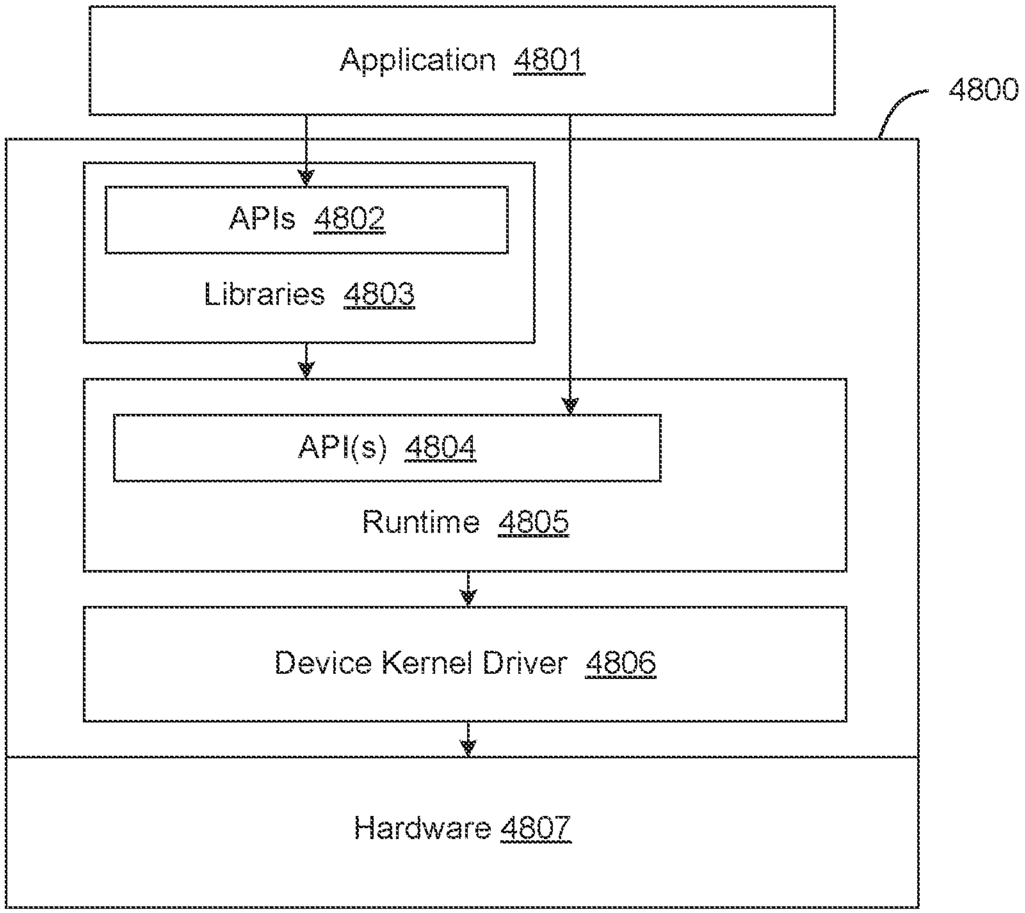
FIG. 48 illustrates a software stack of a programming platform, in accordance with at least one embodiment.

FIG. 48 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 4800 of a programming platform provides an execution environment for an application 4801. In at least one embodiment, application 4801 may include any computer software capable of being launched on software stack 4800. In at least one embodiment, application 4801 may include, but is not limited to, an artificial intelligence ("AI")/machine learning ("ML") application, a high performance computing ("HPC") application, a virtual desktop infrastructure ("VDI"), or a data center workload.

In at least one embodiment, application 4801 and software stack 4800 run on hardware 4807. Hardware 4807 may include one or more GPUs, CPUs, FPGAs, AI engines, and/or other types of compute devices that support a programming platform, in at least one embodiment. In at least one embodiment, such as with CUDA, software stack 4800 may be vendor specific and compatible with only devices from particular vendor(s). In at least one embodiment, such as in with OpenCL, software stack 4800 may be used with devices from different vendors. In at least one embodiment, hardware 4807 includes a host connected to one more devices that can be accessed to perform computational tasks via application programming interface ("API") calls. A device within hardware 4807 may include, but is not limited to, a GPU, FPGA, AI engine, or other compute device (but may also include a CPU) and its memory, as opposed to a host within hardware 4807 that may include, but is not limited to, a CPU (but may also include a compute device) and its memory, in at least one embodiment.

In at least one embodiment, software stack 4800 of a programming platform includes, without limitation, a number of libraries 4803, a runtime 4805, and a device kernel driver 4806. Each of libraries 4803 may include data and programming code that can be used by computer programs and leveraged during software development, in at least one embodiment. In at least one embodiment, libraries 4803 may include, but are not limited to, pre-written code and subroutines, classes, values, type specifications, configuration data, documentation, help data, and/or message templates. In at least one embodiment, libraries 4803 include functions that are optimized for execution on one or more types of devices. In at least one embodiment, libraries 4803 may include, but are not limited to, functions for performing mathematical, deep learning, and/or other types of operations on devices. In at least one embodiment, libraries 4903 are associated with corresponding APIs 4902, which may include one or more APIs, that expose functions implemented in libraries 4903.

In at least one embodiment, application 4801 is written as source code that is compiled into executable code, as discussed in greater detail below in conjunction with FIG. 53. Executable code of application 4801 may run, at least in part, on an execution environment provided by software stack 4800, in at least one embodiment. In at least one embodiment, during execution of application 4801, code may be reached that needs to run on a device, as opposed to a host. In such a case, runtime 4805 may be called to load and launch requisite code on a device, in at least one embodiment. In at least one embodiment, runtime 4805 may include any technically feasible runtime system that is able to support execution of application S01.

In at least one embodiment, runtime 4805 is implemented as one or more runtime libraries associated with corresponding APIs, which are shown as API(s) 4804. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 4804 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 4806 is configured to facilitate communication with an underlying device. In at least one embodiment, device kernel driver 4806 may provide low-level functionalities upon which APIs, such as API(s) 4804, and/or other software relies. In at least one embodiment, device kernel driver 4806 may be configured to compile intermediate representation ("IR") code into binary code at runtime. For CUDA, device kernel driver 4806 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 4806 to compile IR code at runtime.

In at least one embodiment, at least one component shown or described with respect to FIG. 48 is used to perform techniques and/or functions described in connection with FIGS. 1-13. In at least one embodiment, at least one component shown or described with respect to FIG. 48 is used to perform operations described herein, such as to detect whether one or more objects within one or more images is likely to be duplicated in an image interpolated using the one or more images. In at least one embodiment, at least one component shown or described with respect to FIG. 48 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 49:
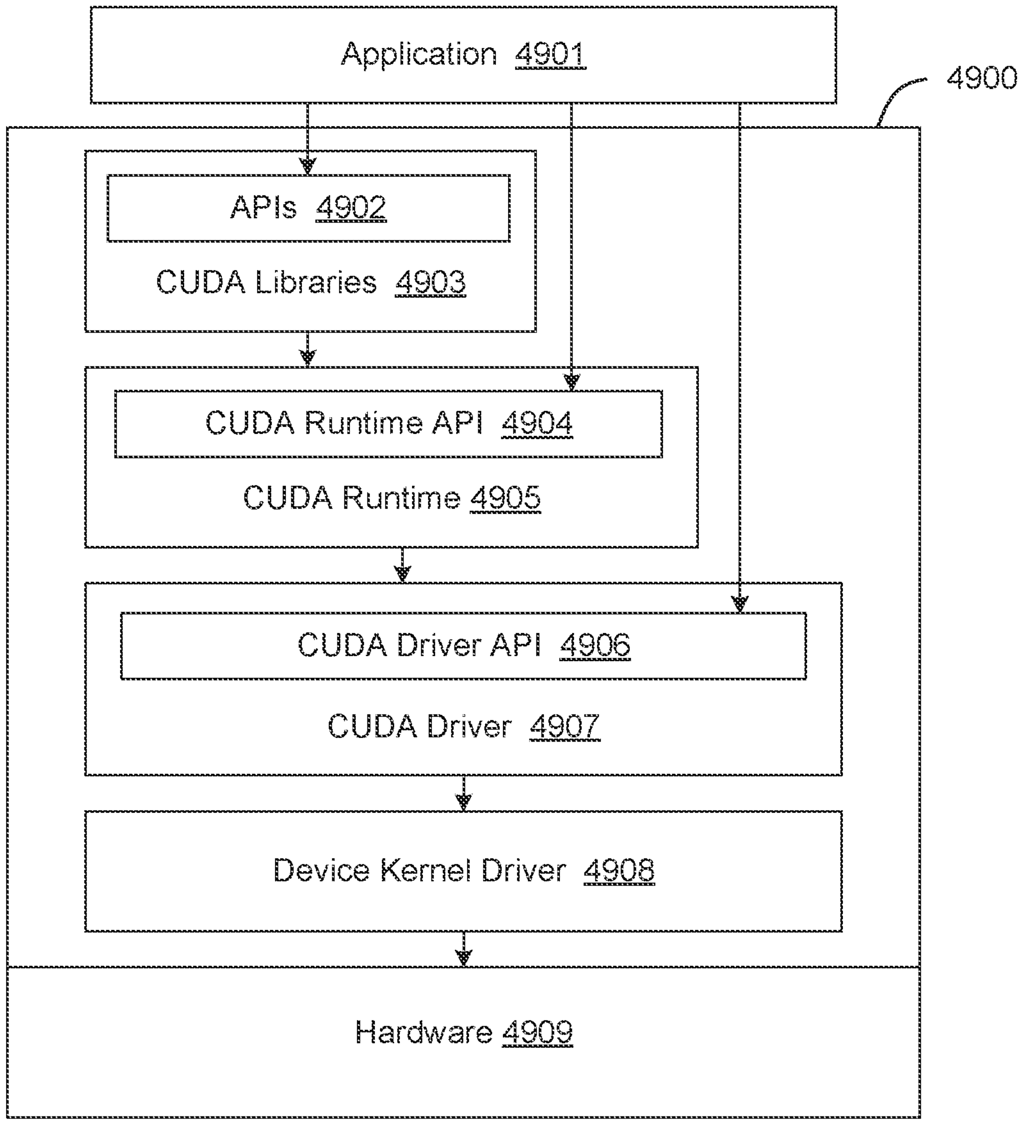
FIG. 49 illustrates a CUDA implementation of a software stack of FIG. 48, in accordance with at least one embodiment.

FIG. 49 illustrates a CUDA implementation of software stack 4800 of FIG. 48, in accordance with at least one embodiment. In at least one embodiment, a CUDA software stack 4900, on which an application 4901 may be launched, includes CUDA libraries 4903, a CUDA runtime 4905, a CUDA driver 4907, and a device kernel driver 4908. In at least one embodiment, CUDA software stack 4900 executes on hardware 4909, which may include a GPU that supports CUDA and is developed by NVIDIA Corporation of Santa Clara, CA.

In at least one embodiment, application 4901, CUDA runtime 4905, and device kernel driver 4908 may perform similar functionalities as application 4801, runtime 4805, and device kernel driver 4806, respectively, which are described above in conjunction with FIG. 48. In at least one embodiment, CUDA driver 4907 includes a library (libcuda.so) that implements a CUDA driver API 4906. Similar to a CUDA runtime API 4904 implemented by a CUDA runtime library (cudart), CUDA driver API 4906 may, without limitation, expose functions for memory management, execution control, device management, error handling, synchronization, and/or graphics interoperability, among other things, in at least one embodiment. In at least one embodiment, CUDA driver API 4906 differs from CUDA runtime API 4904 in that CUDA runtime API 4904 simplifies device code management by providing implicit initialization, context (analogous to a process) management, and module (analogous to dynamically loaded libraries) management. In contrast to high-level CUDA runtime API 4904, CUDA driver API 4906 is a low-level API providing more fine-grained control of a device, particularly with respect to contexts and module loading, in at least one embodiment. In at least one embodiment, CUDA driver API 4906 may expose functions for context management that are not exposed by CUDA runtime API 4904. In at least one embodiment, CUDA driver API 4906 is also language-independent and supports, e.g., OpenCL in addition to CUDA runtime API 4904. Further, in at least one embodiment, development libraries, including CUDA runtime 4905, may be considered as separate from driver components, including user-mode CUDA driver 4907 and kernel-mode device driver 4908 (also sometimes referred to as a "display" driver).

In at least one embodiment, CUDA libraries 4903 may include, but are not limited to, mathematical libraries, deep learning libraries, parallel algorithm libraries, and/or signal/image/video processing libraries, which parallel computing applications such as application 4901 may utilize. In at least one embodiment, CUDA libraries 4903 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 4903 may include deep learning libraries such as a cuDNN library of primitives for deep neural networks and a TensorRT platform for high-performance deep learning inference, among others.

In at least one embodiment, at least one component shown or described with respect to FIG. 49 is used to perform techniques and/or functions described in connection with FIGS. 1-13. In at least one embodiment, at least one component shown or described with respect to FIG. 49 is used to perform operations described herein, such as to detect whether one or more objects within one or more images is likely to be duplicated in an image interpolated using the one or more images. In at least one embodiment, at least one component shown or described with respect to FIG. 49 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 50:
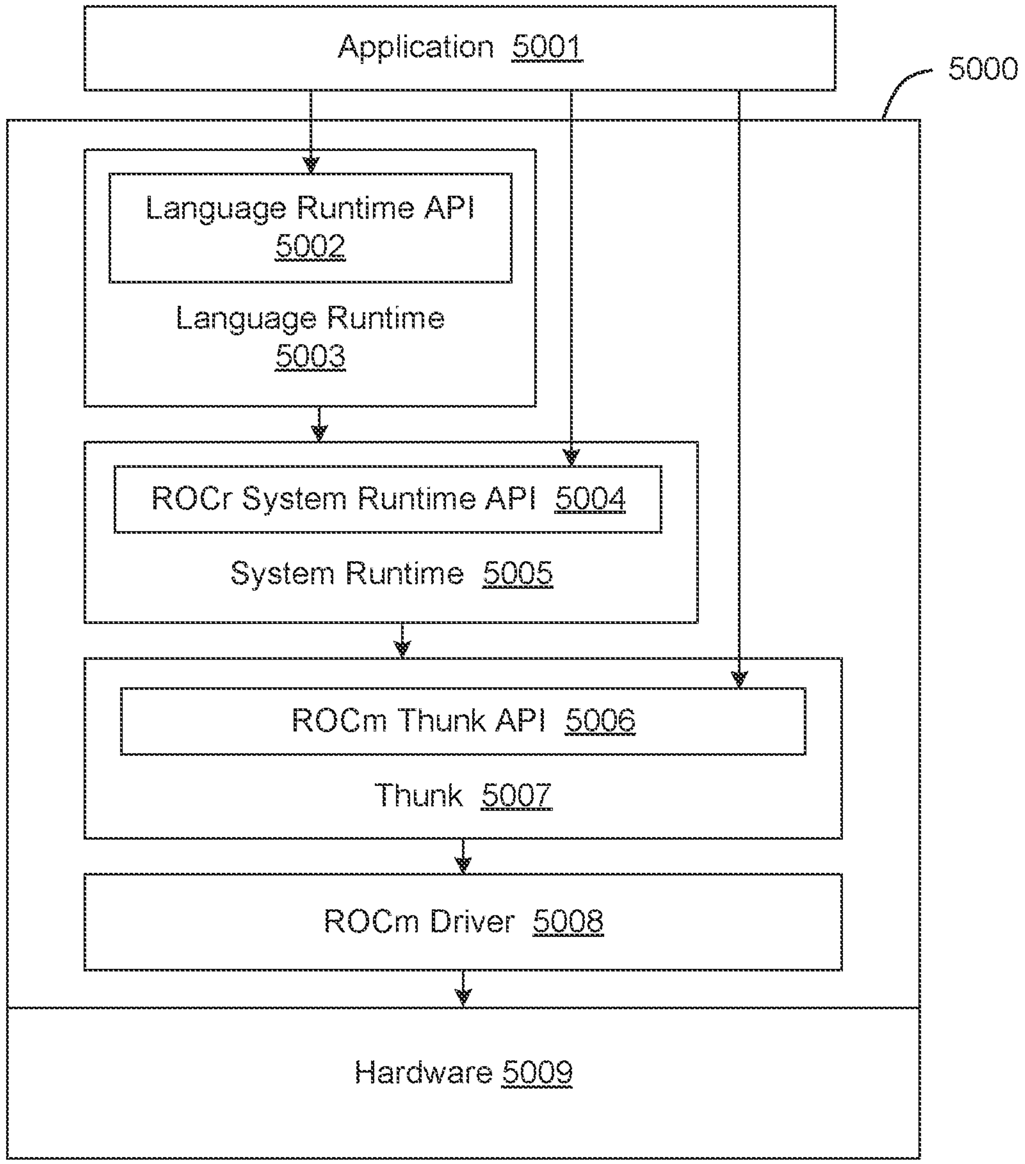
FIG. 50 illustrates a ROCm implementation of a software stack of FIG. 48, in accordance with at least one embodiment.

FIG. 50 illustrates a ROCm implementation of software stack 4800 of FIG. 48, in accordance with at least one embodiment. In at least one embodiment, a ROCm software stack 5000, on which an application 5001 may be launched, includes a language runtime 5003, a system runtime 5005, a thunk 5007, a ROCm kernel driver 5008, and a device kernel driver 5009. In at least one embodiment, ROCm software stack 5000 executes on hardware 5010, which may include a GPU that supports ROCm and is developed by AMD Corporation of Santa Clara, CA.

In at least one embodiment, application 5001 may perform similar functionalities as application 4801 discussed above in conjunction with FIG. 48. In addition, language runtime 5003 and system runtime 5005 may perform similar functionalities as runtime 4805 discussed above in conjunction with FIG. 48, in at least one embodiment. In at least one embodiment, language runtime 5003 and system runtime 5005 differ in that system runtime 5005 is a language-independent runtime that implements a ROCr system runtime API 5004 and makes use of a Heterogeneous System Architecture ("HAS") Runtime API. HAS runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 5005, language runtime 5003 is an implementation of a language-specific runtime API 5002 layered on top of ROCr system runtime API 5004, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 4904 discussed above in conjunction with FIG. 49, such as functions for memory management, execution control, device management, error handling, and synchronization, among other things.

In at least one embodiment, thunk (ROCt) 5007 is an interface that can be used to interact with underlying ROCm driver 5008. In at least one embodiment, ROCm driver 5008 is a ROCK driver, which is a combination of an AMDGPU driver and a HAS kernel driver (amdkfd). In at least one embodiment, AMDGPU driver is a device kernel driver for GPUs developed by AMD that performs similar functionalities as device kernel driver 4806 discussed above in conjunction with FIG. 48. In at least one embodiment, HAS kernel driver is a driver permitting different types of processors to share system resources more effectively via hardware features.

In at least one embodiment, various libraries (not shown) may be included in ROCm software stack 5000 above language runtime 5003 and provide functionality similarity to CUDA libraries 4903, discussed above in conjunction with FIG. 49. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

In at least one embodiment, at least one component shown or described with respect to FIG. 50 is used to perform techniques and/or functions described in connection with FIGS. 1-13. In at least one embodiment, at least one component shown or described with respect to FIG. 50 is used to perform operations described herein, such as to detect whether one or more objects within one or more images is likely to be duplicated in an image interpolated using the one or more images. In at least one embodiment, at least one component shown or described with respect to FIG. 50 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 51:
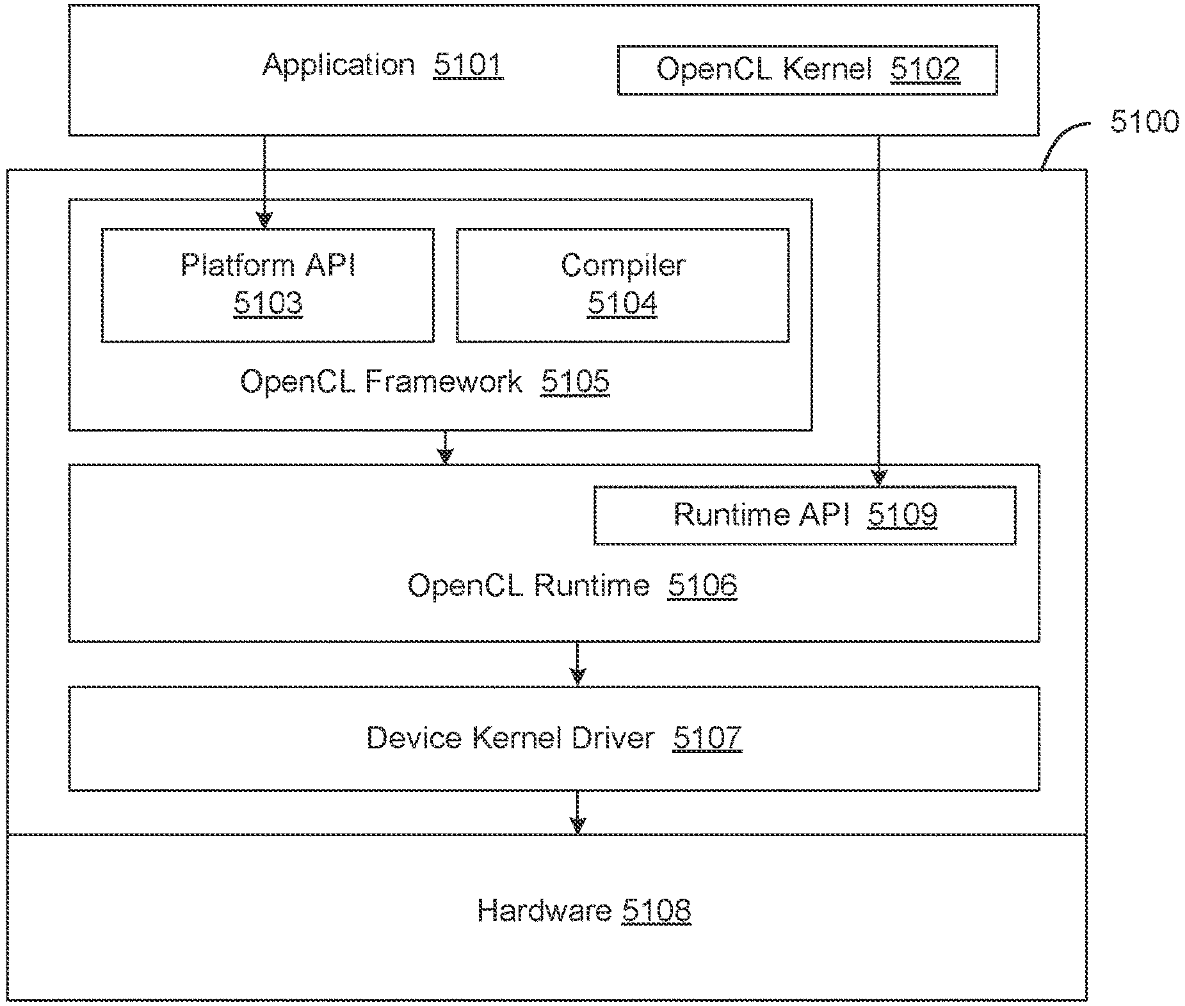
FIG. 51 illustrates an OpenCL implementation of a software stack of FIG. 48, in accordance with at least one embodiment.

FIG. 51 illustrates an OpenCL implementation of software stack 4800 of FIG. 48, in accordance with at least one embodiment. In at least one embodiment, an OpenCL software stack 5100, on which an application 5101 may be launched, includes an OpenCL framework 5105, an OpenCL runtime 5106, and a driver 5107. In at least one embodiment, OpenCL software stack 5100 executes on hardware 4909 that is not vendor-specific. As OpenCL is supported by devices developed by different vendors, specific OpenCL drivers may be required to interoperate with hardware from such vendors, in at least one embodiment.

In at least one embodiment, application 5101, OpenCL runtime 5106, device kernel driver 5107, and hardware 5108 may perform similar functionalities as application 4801, runtime 4805, device kernel driver 4806, and hardware 4807, respectively, that are discussed above in conjunction with FIG. 48. In at least one embodiment, application 5101 further includes an OpenCL kernel 5102 with code that is to be executed on a device.

In at least one embodiment, OpenCL defines a "platform" that allows a host to control devices connected to a host. In at least one embodiment, an OpenCL framework provides a platform layer API and a runtime API, shown as platform API 5103 and runtime API 5109. In at least one embodiment, runtime API 5109 uses contexts to manage execution of kernels on devices. In at least one embodiment, each identified device may be associated with a respective context, which runtime API 5109 may use to manage command queues, program objects, and kernel objects, share memory objects, among other things, for that device. In at least one embodiment, platform API 5103 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 5104 is also included in OpenCL frame-work 5105. Source code may be compiled offline prior to executing an application or online during execution of an application, in at least one embodiment. In contrast to CUDA and ROCm, OpenCL applications in at least one embodiment may be compiled online by compiler 5104, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

In at least one embodiment, at least one component shown or described with respect to FIG. 51 is used to perform techniques and/or functions described in connection with FIGS. 1-13. In at least one embodiment, at least one component shown or described with respect to FIG. 51 is used to perform operations described herein, such as to detect whether one or more objects within one or more images is likely to be duplicated in an image interpolated using the one or more images. In at least one embodiment, at least one component shown or described with respect to FIG. 51 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 52:
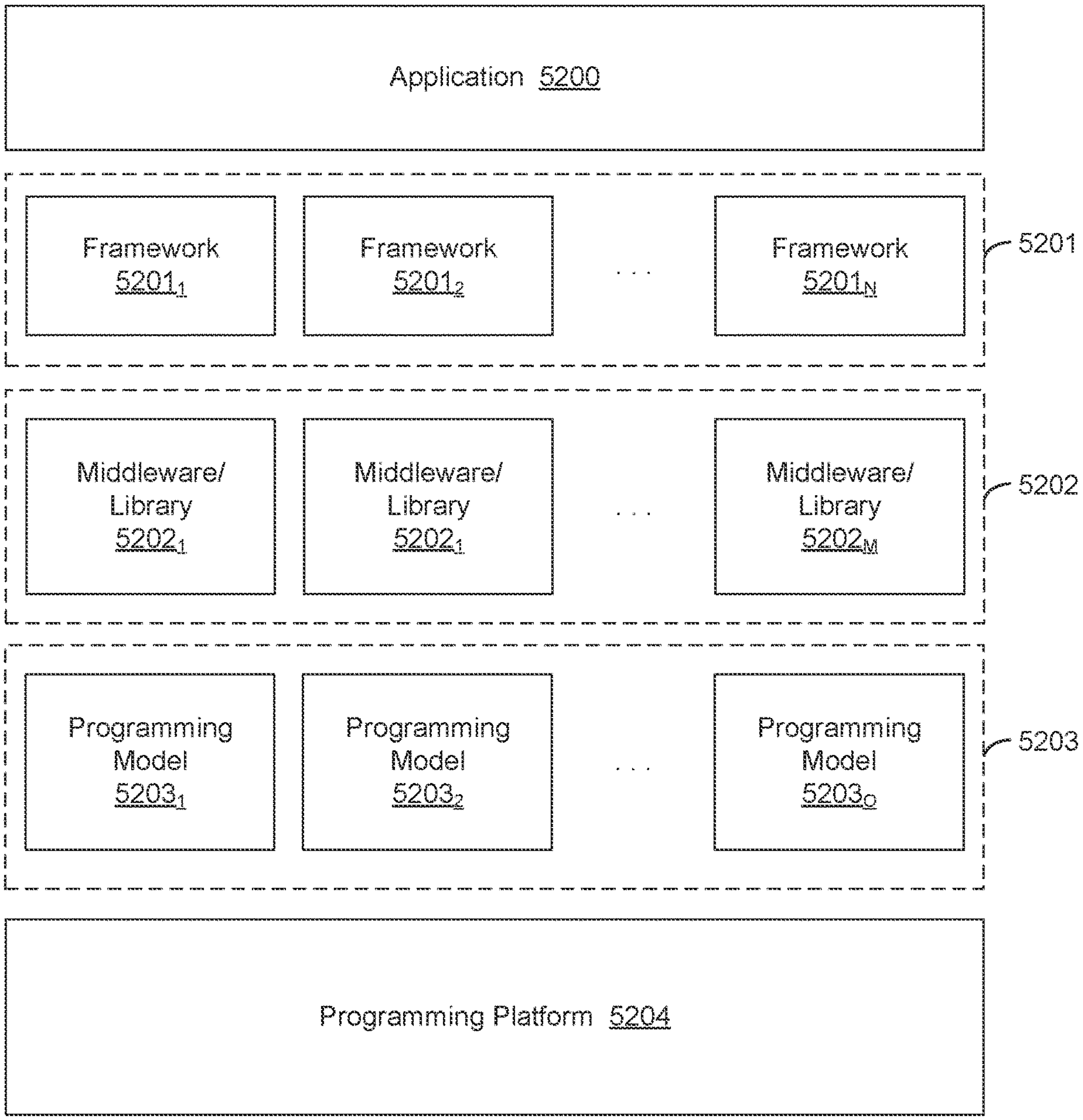
FIG. 52 illustrates software that is supported by a programming platform, in accordance with at least one embodiment.

FIG. 52 illustrates software that is supported by a programming platform, in accordance with at least one embodiment. In at least one embodiment, a programming platform 5204 is configured to support various programming models 5203, middlewares and/or libraries 5202, and frameworks 5201 that an application 5200 may rely upon. In at least one embodiment, application 5200 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 5204 may be one of a CUDA, ROCm, or OpenCL platform described above in conjunction with FIG. 49, FIG. 50, and FIG. 51, respectively. In at least one embodiment, programming platform 5204 supports multiple programming models 5203, which are abstractions of an underlying computing system permitting expressions of algorithms and data structures. Programming models 5203 may expose features of underlying hardware in order to improve performance, in at least one embodiment. In at least one embodiment, programming models 5203 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 5202 provide implementations of abstractions of programming models 5204. In at least one embodiment, such libraries include data and programming code that may be used by computer programs and leveraged during software development. In at least one embodiment, such middlewares include software that provides services to applications beyond those available from programming platform 5204. In at least one embodiment, libraries and/or middlewares 5202 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 5202 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 5201 depend on libraries and/or middlewares 5202. In at least one embodiment, each of application frameworks 5201 is a software framework used to implement a standard structure of application software. An AI/ML application may be implemented using a framework such as Caffe, Caffe2, TensorFlow, Keras, PyTorch, or MxNet deep learning frameworks, in at least one embodiment.

In at least one embodiment, at least one component shown or described with respect to FIG. 52 is used to perform techniques and/or functions described in connection with FIGS. 1-13. In at least one embodiment, at least one component shown or described with respect to FIG. 52 is used to perform operations described herein, such as to detect whether one or more objects within one or more images is likely to be duplicated in an image interpolated using the one or more images. In at least one embodiment, at least one component shown or described with respect to FIG. 52 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 53:
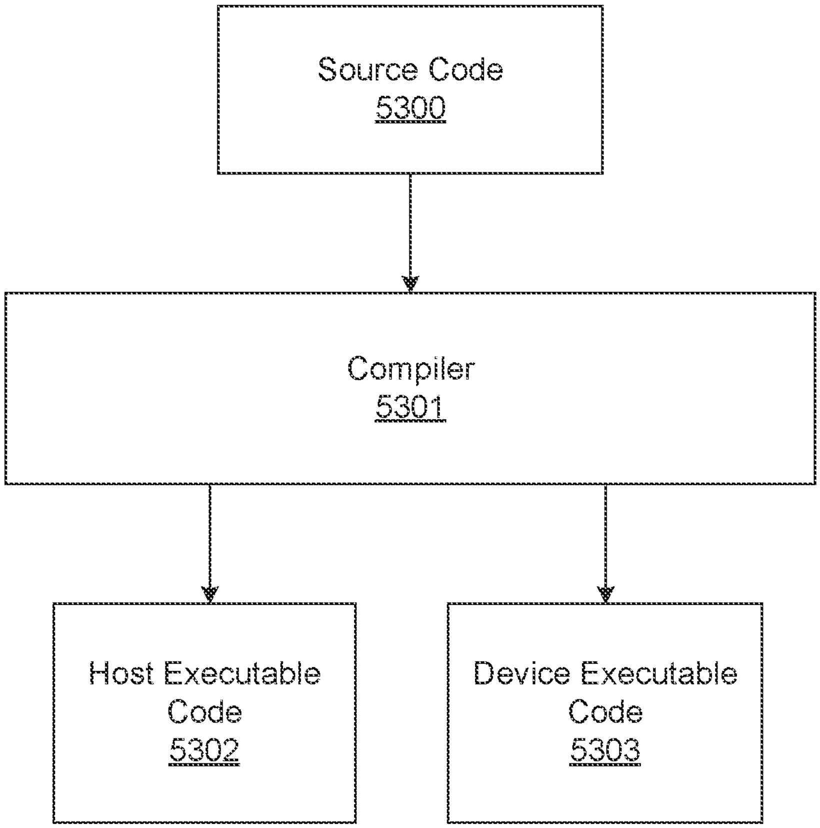
FIG. 53 illustrates compiling code to execute on programming platforms of FIGS. 48-51, in accordance with at least one embodiment.

FIG. 53 illustrates compiling code to execute on one of programming platforms of FIGS. 48-51, in accordance with at least one embodiment. In at least one embodiment, a compiler 5301 receives source code 5300 that includes both host code as well as device code. In at least one embodiment, complier 5301 is configured to convert source code 5300 into host executable code 5302 for execution on a host and device executable code 5303 for execution on a device. In at least one embodiment, source code 5300 may either be compiled offline prior to execution of an application, or online during execution of an application.

In at least one embodiment, source code 5300 may include code in any programming language supported by compiler 5301, such as C++, C, Fortran, etc. In at least one embodiment, source code 5300 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 5300 may include multiple source code files, rather than a single-source file, into which host code and device code are separated.

In at least one embodiment, compiler 5301 is configured to compile source code 5300 into host executable code 5302 for execution on a host and device executable code 5303 for execution on a device. In at least one embodiment, compiler 5301 performs operations including parsing source code 5300 into an abstract system tree (AST), performing optimizations, and generating executable code. In at least one embodiment in which source code 5300 includes a single-source file, compiler 5301 may separate device code from host code in such a single-source file, compile device code and host code into device executable code 5303 and host executable code 5302, respectively, and link device executable code 5303 and host executable code 5302 together in a single file.

In at least one embodiment, host executable code 5302 and device executable code 5303 may be in any suitable format, such as binary code and/or IR code. In a case of CUDA, host executable code 5302 may include native object code and device executable code 5303 may include code in PTX intermediate representation, in at least one embodiment. In a case of ROCm, both host executable code 5302 and device executable code 5303 may include target binary code, in at least one embodiment.

In at least one embodiment, at least one component shown or described with respect to FIG. 53 is used to perform techniques and/or functions described in connection with FIGS. 1-13. In at least one embodiment, at least one component shown or described with respect to FIG. 53 is used to perform operations described herein, such as to detect whether one or more objects within one or more images is likely to be duplicated in an image interpolated using the one or more images. In at least one embodiment, at least one component shown or described with respect to FIG. 53 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Computing Devices

Figure 54:
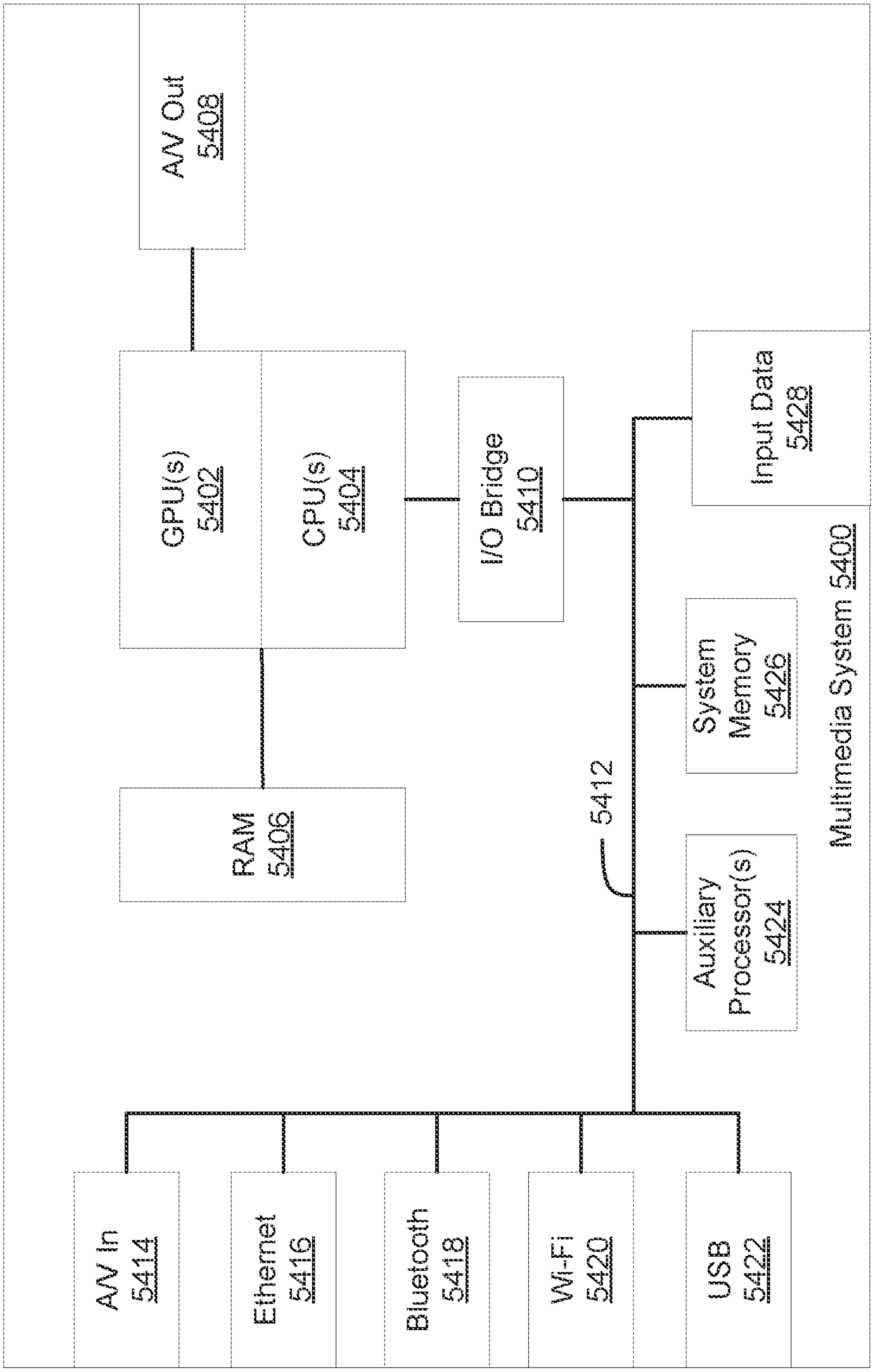
FIG. 54 illustrates a multimedia system, in accordance with at least one embodiment.

FIG. 54 illustrates a multimedia system, according to at least one embodiment. In at least one embodiment, a multimedia system is referred to as a gaming system, multimedia console, gaming console, and/or variations thereof. In at least one embodiment, FIG. 54 illustrates an overall system architecture of a computer game processing apparatus.

In at least one embodiment, multimedia system 5400 comprises graphics processing units (GPUs) 5402. In at least one embodiment, GPU(s) 5402, optionally in conjunction with CPU(s) 5404, generates video images and audio for output via audio/video (A/V) output 5408. In at least one embodiment, audio is generated in conjunction with or instead by an audio processor. In at least one embodiment, GPU(s) 5402 utilize a video encoder/video codec (e.g., coder/decoder) to form a video processing pipeline for graphics processing. In at least one embodiment, data is provided from GPU(s) 5402 to a video encoder/video codec and output to A/V output 5408 for transmission to a display. In at least one embodiment, GPU(s) 5402 is connected to one or more memory controllers to facilitate access to various types of memory, such as random access memory (RAM) 5406.

In at least one embodiment, GPU(s) 5402 is part of a processing unit comprising central processing units (CPUs) 5404. In at least one embodiment, GPU(s) 5402 and CPU(s) 5404 are part of an accelerated processing unit (APU). In at least one embodiment, CPU(s) 5404 comprise at least a level 1 cache, level 2 cache, and memory. In at least one embodiment, a level 1 cache and a level 2 cache temporarily store data and reduce a number of memory access cycles. In at least one embodiment, CPU(s) 5404 comprise at least one or more cores and one or more level caches. In at least one embodiment, memory of CPU(s) 5404 store executable code that is loaded during a boot process, such as when multimedia system 5400 is powered on.

In at least one embodiment, GPU(s) 5402 and CPU(s) 5404 communicate with bus 5412, optionally via input/output (I/O) bridge 5410, which may be a discreet component or part of GPU(s) 5402 and CPU(s) 5404. In at least one embodiment, data storage components such as system memory 5426, and input data 5428 are connected to bus 5412. In at least one embodiment, RAM 5406 also communicates with bus 5412. In at least one embodiment, auxiliary processor(s) 5424 are connected to bus 5412. In at least one embodiment, auxiliary processor(s) 5424 are provided to run or support one or more software, software applications, operating systems, and/or variations thereof executed in connection with multimedia system 5400.

In at least one embodiment, system memory 5426 stores application data that is loaded during a boot process. In at least one embodiment, input data 5428 comprises a DVD/CD drive, Blu-ray drive, hard drive, or other removable media drive. In at least one embodiment, input data 5428 is external or internal to multimedia system 5400. In at least one embodiment, application data is accessed via input data 5428 for execution, playback, and/or variations thereof. In at least one embodiment, input data 5428 is connected to I/O bridge 5410 via bus 5412.

In at least one embodiment, one or more components of multimedia system 5400 are connected via one or more buses, including serial and parallel buses, a memory bus, a peripheral bus, and a processor or local bus using various bus architectures, such as Peripheral Components Interconnects (PCI) bus, PCI-Express bus, and/or variations thereof. In at least one embodiment, multimedia system 5400 communicates with peripheral devices as appropriate via an audio/visual (A/V) input port 5414, Ethernet port 5416, Bluetooth wireless link 5418, Wi-Fi wireless link 5420, or one or more universal serial bus (USB) ports 5422. In at least one embodiment, audio and video are output via A/V output 5408, such as an HDMI port.

In at least one embodiment, video and optionally audio of multimedia system 5400 are output to one or more display devices through A/V output 5408. In at least one embodiment, display devices include devices such as a television, electronic display, computer monitor, and/or variations thereof. In at least one embodiment, video is presented in various forms, such as stereoscopic. In at least one embodiment, audio is presented through one or more audio devices in one of a number of formats such as stereo, 5.1 surround sound or 7.1 surround sound. In at least one embodiment, video and audio is presented to a head mounted display unit, such as a virtual reality device, worn by a user.

In at least one embodiment, upon boot of multimedia system 5400, application data is loaded from system memory 5426 into one or more memory and/or caches of CPU(s) 5404 and executed on CPU(s) 5404. In at least one embodiment, an application presents a graphical user interface that provides a user experience when navigating to different services available on multimedia system 5400. In at least one embodiment, applications, media, and/or variations thereof of input data 5428 are launched or played from input data 5428 to provide additional functionalities, applications, media, and/or variations thereof to multimedia system 5400. In at least one embodiment, multimedia system 5400 is configured to execute an executable program associated with a computer game in accordance with application data from system memory 5426 and input data 5428.

In at least one embodiment, at least one component shown or described with respect to FIG. 54 is used to perform techniques and/or functions described in connection with FIGS. 1-13. In at least one embodiment, at least one component shown or described with respect to FIG. 54 is used to perform operations described herein, such as to detect whether one or more objects within one or more images is likely to be duplicated in an image interpolated using the one or more images. In at least one embodiment, at least one component shown or described with respect to FIG. 54 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 55:
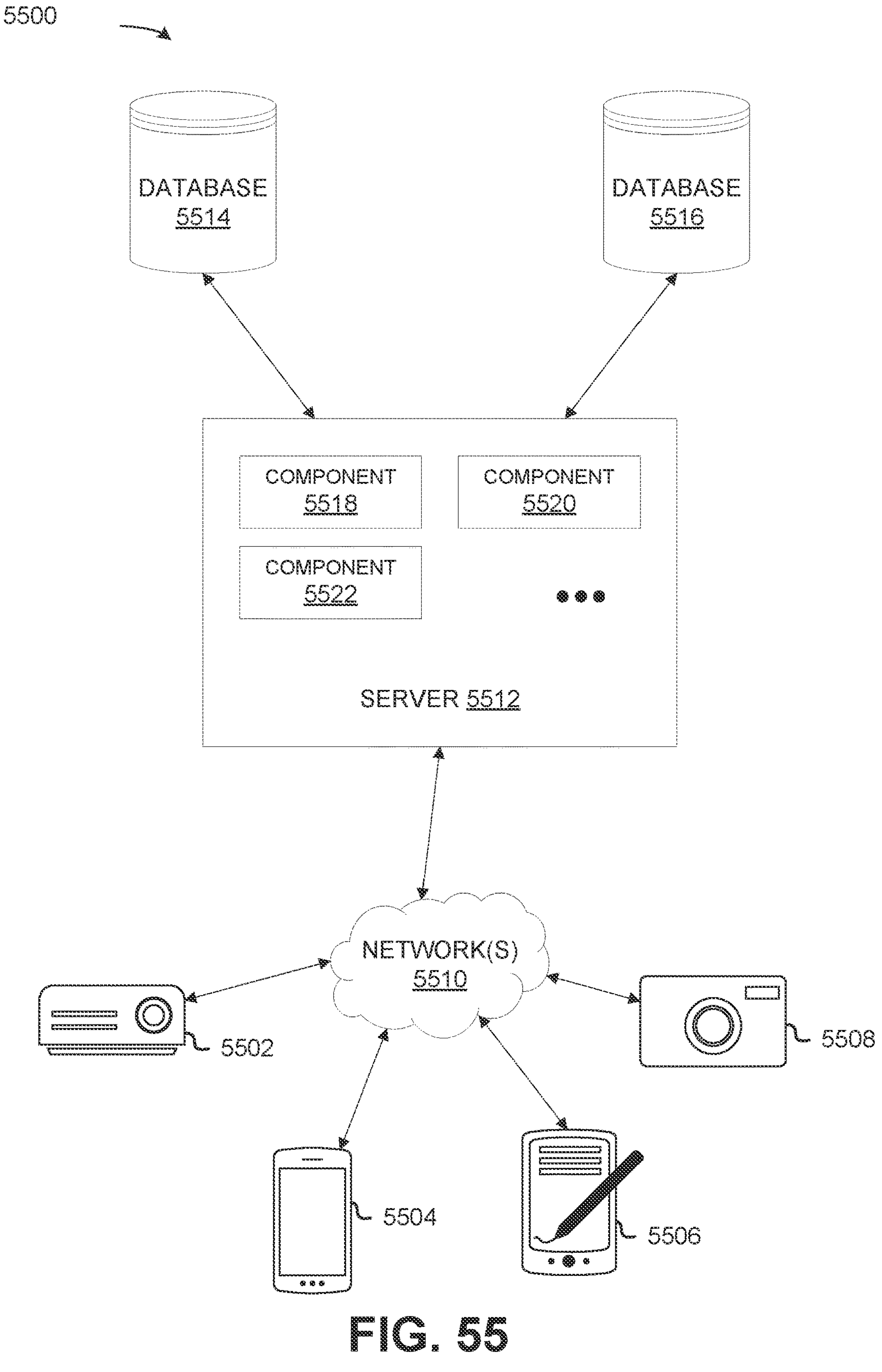
FIG. 55 illustrates a distributed system, in accordance with at least one embodiment.

FIG. 55 illustrates a distributed system 5500, in accordance with at least one embodiment. In at least one embodiment, distributed system 5500 includes one or more client computing devices 5502, 5504, 5506, and 5508, which are configured to execute and operate a client application such as a web browser, proprietary client, and/or variations thereof over one or more network(s) 5510. In at least one embodiment, server 5512 may be communicatively coupled with remote client computing devices 5502, 5504, 5506, and 5508 via network 5510.

In at least one embodiment, server 5512 may be adapted to run one or more services or software applications such as services and applications that may manage session activity of single sign-on (SSO) access across multiple data centers. In at least one embodiment, server 5512 may also provide other services or software applications can include non-virtual and virtual environments. In at least one embodiment, these services may be offered as web-based or cloud services or under a Software as a Service (SaaS) model to users of client computing devices 5502, 5504, 5506, and/or 5508. In at least one embodiment, users operating client computing devices 5502, 5504, 5506, and/or 5508 may in turn utilize one or more client applications to interact with server 5512 to utilize services provided by these components.

In at least one embodiment, software components 5518, 5520 and 5522 of system 5500 are implemented on server 5512. In at least one embodiment, one or more components of system 5500 and/or services provided by these components may also be implemented by one or more of client computing devices 5502, 5504, 5506, and/or 5508. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 5500. The embodiment shown in FIG. 55 is thus one example of a distributed system for implementing an embodiment system and is not intended to be limiting.

In at least one embodiment, client computing devices 5502, 5504, 5506, and/or 5508 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 5510. Although distributed system 5500 in FIG. 55 is shown with four client computing devices, any number of client computing devices may be supported. Other devices, such as devices with sensors, etc., may interact with server 5512.

In at least one embodiment, network(s) 5510 in distributed system 5500 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 5510 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 5512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 5512 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 5512 using software defined networking. In at least one embodiment, server 5512 may be adapted to run one or more services or software applications. In at least one embodiment, server 5512 comprises one or more hardware and/or software components that implement a neural network such as those described in connection with FIG. 56-FIG. 60. In at least one embodiment, server 5512 comprises one or more neural networks, which are referred to as deep learning super sampling networks, which generate high quality versions of input frames (e.g., rendered frames of a computer graphics program, such as a video game program).

In at least one embodiment, server 5512 may run any operating system, as well as any commercially available server operating system. In at least one embodiment, server 5512 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, exemplary database servers include without limitation those commercially available from Oracle, Microsoft, Sybase, IBM (International Business Machines), and/or variations thereof.

In at least one embodiment, server 5512 may include one or more applications to analyze and consolidate data feeds and/or event updates received from users of client computing devices 5502, 5504, 5506, and 5508. In at least one embodiment, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and/or variations thereof. In at least one embodiment, server 5512 may also include one or more applications to display data feeds and/or real-time events via one or more display devices of client computing devices 5502, 5504, 5506, and 5508.

In at least one embodiment, distributed system 5500 may also include one or more databases 5514 and 5516. In at least one embodiment, databases may provide a mechanism for storing information such as user interactions information, usage patterns information, adaptation rules information, and other information. In at least one embodiment, databases 5514 and 5516 may reside in a variety of locations. In at least one embodiment, one or more of databases 5514 and 5516 may reside on a non-transitory storage medium local to (and/or resident in) server 5512. In at least one embodiment, databases 5514 and 5516 may be remote from server 5512 and in communication with server 5512 via a network-based or dedicated connection. In at least one embodiment, databases 5514 and 5516 may reside in a storage-area network (SAN). In at least one embodiment, any necessary files for performing functions attributed to server 5512 may be stored locally on server 5512 and/or remotely, as appropriate. In at least one embodiment, databases 5514 and 5516 may include relational databases, such as databases that are adapted to store, update, and retrieve data in response to SQL-formatted commands.

In at least one embodiment, at least one component shown or described with respect to FIG. 55 is used to perform techniques and/or functions described in connection with FIGS. 1-13. In at least one embodiment, at least one component shown or described with respect to FIG. 55 is used to perform operations described herein, such as to detect whether one or more objects within one or more images is likely to be duplicated in an image interpolated using the one or more images. In at least one embodiment, at least one component shown or described with respect to FIG. 55 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Super Sampling Neural Networks

Figure 56:
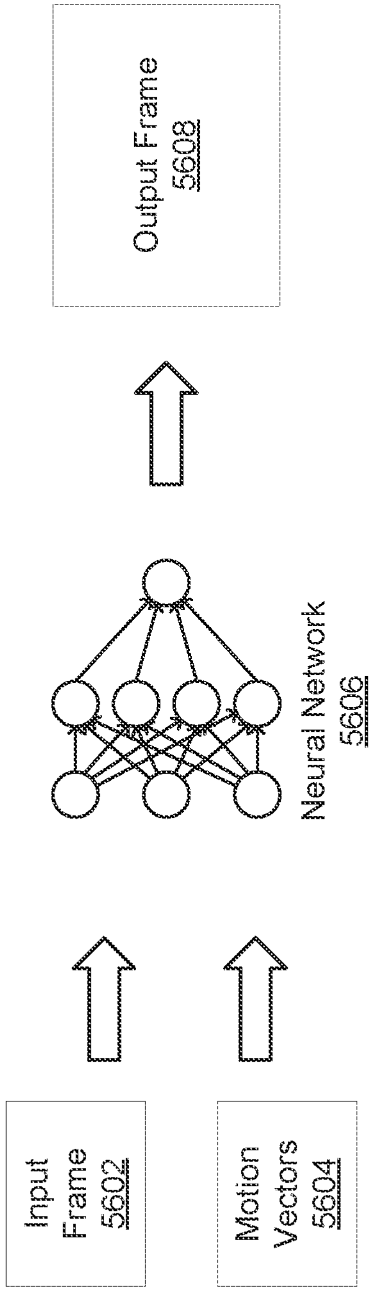
FIG. 56 illustrates a super sampling neural network, in accordance with at least one embodiment.

FIG. 56 illustrates a super sampling neural network, in accordance with at least one embodiment. In at least one embodiment, a neural network 5606 is referred to as a super sampling neural network, deep learning super sampling (DLSS) network, super sampling network, and/or variations thereof. In at least one embodiment, an input frame 5602 and motion vectors 5604 are processed by a neural network 5606 to generate an output frame 5608. In at least one embodiment, neural networks such as those described in connection with FIG. 56-FIG. 60 are DLSS networks.

In at least one embodiment, an input frame 5602 is an image. In at least one embodiment, an input frame 5602 is a computer generated image that is generated by one or more computer graphics programs or software. In at least one embodiment, an input frame 5602 is an image that is captured from one or more image capturing devices, such as a camera. In at least one embodiment, an input frame 5602 is a frame of a set of frames of a video. In at least one embodiment, an input frame 5602 is a frame of a video that is captured from one or more video capturing devices, such as a video camera. In at least one embodiment, an input frame 5602 is a frame of a computer generated video that is generated by one or more computer graphics programs or software.

In at least one embodiment, an input frame 5602 is a render of a two-dimensional (2D) model. In at least one embodiment, an input frame 5602 is a render of a three-dimensional (3D) model. In at least one embodiment, an input frame 5602 is generated by a rendering computer program, which is a computer program comprising executable instructions that, when executed, generate images based at least in part on a scene. In at least one embodiment, a scene refers to a 2D or 3D model. In at least one embodiment, a scene is defined by various characteristics, such as geometry, viewpoint, texture, lighting, shading, and/or variations thereof. In at least one embodiment, a computer program obtains a scene and generates an image of a scene through use of one or more rendering algorithms. In at least one embodiment, an input frame 5602 is an image generated through use of one or more light transport modelling techniques. In at least one embodiment, an input frame 5602 is generated through one or more rasterization techniques. In at least one embodiment, an input frame 5602 is generated through one or more ray casting techniques. In at least one embodiment, an input frame 5602 is generated through one or more ray tracing techniques.

In at least one embodiment, an input frame 5602 is a frame generated by a video game program. In at least one embodiment, a video game program is executed by one or more computing devices that comprise graphics hardware that generate real-time computer graphics. In at least one embodiment, an input frame 5602 is a frame that is generated in real-time. In at least one embodiment, an input frame 5602 is a frame that is pre-rendered. In at least one embodiment, an input frame 5602 is a frame of a video game that is displayed on one or more computer graphics display hardware, such as a video display device, mobile device, virtual reality headset, and/or variations thereof. In at least one embodiment, a video game program is executing and generates a 3D scene, in which an input frame 5602 is a render of a 3D scene. In at least one embodiment, an input frame 5602 is a frame that is rendered by a rendering device with various hardware and software constraints, such as graphics hardware limitations, memory limitations, and/or variations thereof.

In at least one embodiment, a neural network 5606 is a neural network that obtains an input frame and generates an output frame. In at least one embodiment, a neural network 5606 is a convolutional autoencoder network. In at least one embodiment, a neural network 5606 is a neural network that generates a higher quality version of an input frame. In at least one embodiment, qualities of a frame include resolution and aliasing, in which a high quality frame has a high resolution and minimal aliasing. In at least one embodiment, a neural network 5606 obtains an input frame, and generates an output frame with a higher resolution and lower aliasing than an input frame. In at least one embodiment, a neural network 5606 processes frames in near real-time. In at least one embodiment, near real-time processing refers to processing in which inputs are processed within a time interval from which inputs are generated. In at least one embodiment, a neural network 5606 processes input frames in near real-time such that input frames are processed within a time interval from which they are generated and/or rendered. In at least one embodiment, a neural network 5606 processes an input frame into an output frame within a time interval such that output frames are available from input frames with minimal latency. In at least one embodiment, minimal latency refers to latency that is at or below a defined latency time interval threshold. In at least one embodiment, output frames that are available from input frames with minimal latency are available within a defined time interval, which can be any suitable value, such as seconds, fractions of a second, and/or variations thereof. In at least one embodiment, a neural network 5606 obtains a frame of a video game and generates a high resolution, minimally aliased output frame. In at least one embodiment, a neural network 5606 is trained using various neural network training techniques such as those described in connection with FIG. 57. In at least one embodiment, output frames are generated at a rate which can be perceived as continuous motion for a human being, which may refer to frame rates over a certain threshold. In at least one embodiment, output frames are generated at a target rate at or over 20 frames per second (fps) including or not limited to 23.976 fps, 24 fps, 25 fps, 29.97 fps, 30 fps, 48 fps, 50 fps, 59.94 fps, 60 fps, 90 fps, 120 fps, 240 fps, and any other suitable target frame rate. In at least one embodiment, a computer system may lack computing resources to continuously render high quality frames at a target frame rate (e.g., 4*k* resolution at 60 fps) and instead render lower-resolution frames which are super-sampled using neural network 5606 to achieve said target frame (e.g., render 1080p resolution at 60 fps and super-sample to 4k resolution).

In at least one embodiment, a neural network 5606 obtains an input frame 5602. In at least one embodiment, a neural network 5606 obtains an input frame 5602 from a video game program executing on one or more computing devices, such as a video game console, computer, mobile device, and/or variations thereof. In at least one embodiment, a computer program, such as a video game program, computer graphics program, rendering program, and/or variations thereof, provides an input frame 5602 to a neural network 5606 through one or more interfaces, such as transmitted through one or more computer networks, transferred through one or more data transfer interfaces, and/or variations thereof. In at least one embodiment, a neural network 5606 obtains an input frame 5602, which is an image generated by a video game program. In at least one embodiment, a neural network 5606 obtains an input frame 5602 and associated motion vectors 5604, which indicate direction objects in a scene (e.g., a scene depicted in an input frame 5602) are moving. In at least one embodiment, a motion vector is a vector that represents an entity in a frame based on a position of an entity in a previous frame. In at least one embodiment, a motion vector indicates a motion or direction of movement of an entity of a frame of a scene. In at least one embodiment, motion vectors 5604 comprise a collection of one or more motion vectors that indicate motions or directions of movement of entities and/or objects of an input frame 5602. In at least one embodiment, a program such as a video game program generates both input frame 5602 and motion vectors 5604.

In at least one embodiment, a neural network 5606 obtains an input frame 5602 and motion vectors 5604, and generates an output frame 5608. In at least one embodiment, a neural network 5606 generates an output frame 5608 from an input frame 5602 and/or associated motion vectors 5604. In at least one embodiment, a neural network 5606 is trained using a high quality version of an input frame 5602, in which trained neural network 5606 generates an output frame 5608 to match a high quality version of input frame 5602. In at least one embodiment, an output frame 5608 is an upscaled/higher resolution version of an input frame 5602. In at least one embodiment, an output frame 5608 is a higher resolution version of an input frame 5602. In at least one embodiment, an output frame 5608 has a lower degree of aliasing than an input frame 5602. In at least one embodiment, an output frame 5608 is a higher quality representation of an input frame 5602. In at least one embodiment, a neural network 5606 obtains an input frame 5602, which is a real-time render of a scene of a video game, and associated motion vectors 5604, and generates an output frame 5608, which is a high quality version of an input frame 5602.

In at least one embodiment, at least one component shown or described with respect to FIG. 56 is used to perform techniques and/or functions described in connection with FIGS. 1-13. In at least one embodiment, at least one component shown or described with respect to FIG. 56 is used to perform operations described herein, such as to detect whether one or more objects within one or more images is likely to be duplicated in an image interpolated using the one or more images. In at least one embodiment, at least one component shown or described with respect to FIG. 56 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 57:
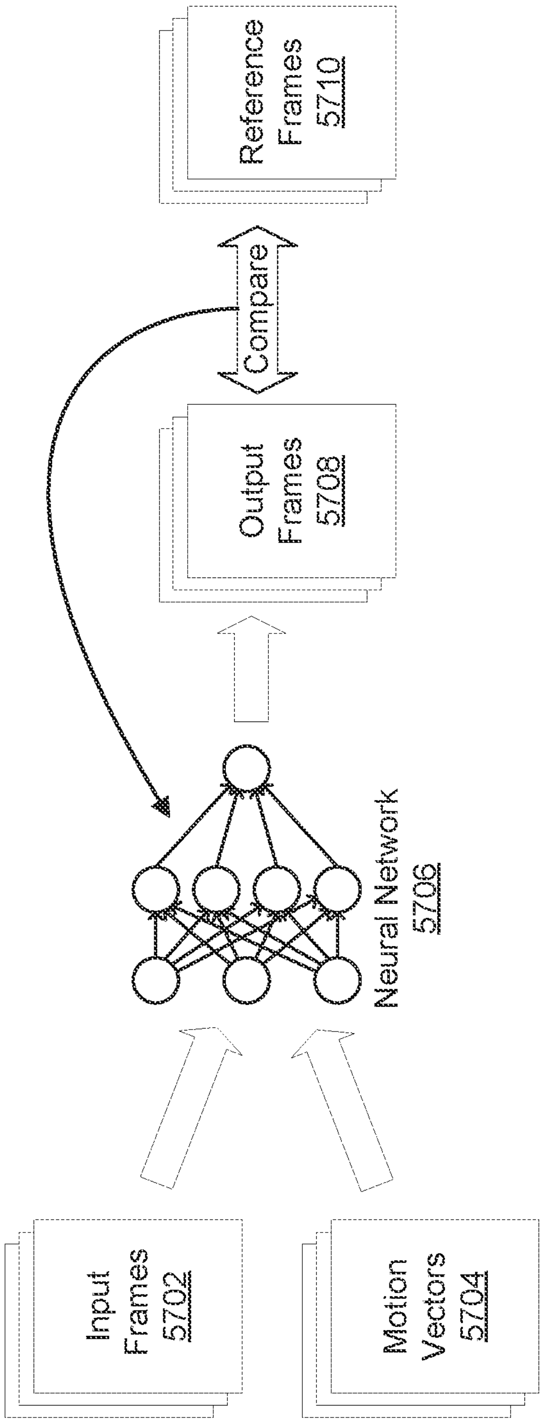
FIG. 57 illustrates an architecture of a super sampling neural network, in accordance with at least one embodiment.

FIG. 57 illustrates an architecture of a super sampling neural network, in accordance with at least one embodiment. In at least one embodiment, a neural network 5706 is referred to as a super sampling neural network, DLSS network, super sampling network, and/or variations thereof. In at least one embodiment, a neural network 5706 is trained to generate output frames 5708 from input frames 5702 and motion vectors 5704. In at least one embodiment, as part of training a neural network 5706, output frames 5708 generated by a neural network 5706 are compared with reference frames 5710 to update neural network 5706.

In at least one embodiment, input frames 5702 are input frames in accordance with those described in connection with FIG. 56. In at least one embodiment, input frames 5702 comprise one or more images, referred to as frames. In at least one embodiment, input frames 5702 comprise one or more images captured from one or more image and/or video capturing devices. In at least one embodiment, input frames 5702 comprise one or more renders of a scene. In at least one embodiment, input frames 5702 comprise frames generated by a video game program. In at least one embodiment, a video game program is executed by one or more computing devices that comprise graphics hardware that generate real-time computer graphics.

In at least one embodiment, input frames 5702 are frames that are pre-rendered. In at least one embodiment, a video game program is executing and generates a 3D scene, in which input frames 5702 comprise renders of a 3D scene. In at least one embodiment, input frames 5702 are frames that are rendered by a rendering device with various hardware and software constraints, such as graphics hardware limitations, memory limitations, and/or variations thereof. In at least one embodiment, input frames 5702 are frames that are rendered with minimal post processing techniques, such as anti-aliasing (e.g., input frames 5702 comprise frames that are rendered with a little to no degree of anti-aliasing).

In at least one embodiment, post processing techniques for rendered frames include techniques and effects such as, but not limited to: ambient occlusion (e.g., horizon based ambient occlusion (HBAO), screen space ambient occlusion (SSAO)), anti-aliasing (e.g., fast approximate anti-aliasing (FXAA), super-sample anti-aliasing (SSAA), multi-sampling anti-aliasing (MSAA), temporal anti-aliasing (TXAA)), bloom, blur (e.g., depth of field, motion blur), cel shading, chromatic aberration, color correction, gamma correction, high dynamic range rendering, particle effects, shading, shadow mapping, sharpening, un-sharpening, upscaling, texture filtering (e.g., point, linear, bilinear, trilinear, anisotropic), and/or variations thereof. In at least one embodiment, input frames 5702 are frames that are rendered with little to no post processing techniques and/or effects.

In at least one embodiment, motion vectors 5704 are a set of one or more vectors that indicate directions of movement of objects of frames of input frames 5702. In at least one embodiment, a motion vector is a vector that represents an entity in a frame based on a position of an entity in a previous frame. In at least one embodiment, a motion vector indicates a motion or direction of movement of an entity of a frame of a scene. In at least one embodiment, motion vectors 5704 are generated by a program that rendered input frames 5702 and correspond to input frames 5702, in which a first set of motion vectors of motion vectors 5704 corresponds to a first frame of input frames 5702 and indicates motion of objects and/or entities depicted in a first frame of input frames 5702. In at least one embodiment, a first set of motion vectors of motion vectors 5704 corresponds to a first frame of input frames 5702 and indicates motion of objects of a first frame of input frames 5702 (e.g., directions and/or locations of where objects of a first frame of input frames 5702 will potentially be or move to in a subsequent frame of input frames 5702). In at least one embodiment, motion vectors 5704 comprise motion vectors generated by a video game program. In at least one embodiment, a video game program is executing and generates a 3D scene, in which motion vectors 5704 comprise vectors indicating movement of objects and/or entities of a 3D scene.

In at least one embodiment, reference frames 5710 comprise one or more images, referred to as frames. In at least one embodiment, reference frames 5710 correspond to input frames 5702 (e.g., each frame of reference frames 5710 corresponds to a frame of input frames 5702). In at least one embodiment, reference frames 5710 comprise one or more renders of a scene. In at least one embodiment, reference frames 5710 comprise frames generated by a video game program. In at least one embodiment, reference frames 5710 are frames that are rendered with various post processing techniques and/or effects. In at least one embodiment, reference frames 5710 are higher quality versions of input frames 5702. In at least one embodiment, a first frame of input frames 5702 is rendered from a scene using minimal post processing techniques and/or effects, and a first frame of reference frames 5710 is rendered from a same scene using post processing techniques and/or effects. In at least one embodiment, reference frames 5710 are frames rendered using 64× super sampling (64×SS).

In at least one embodiment, reference frames 5710 are frames rendered by one or more super computing devices, such as those described in connection with FIG. 17. In at least one embodiment, input frames 5702 and reference frames 5710 are frames rendered from a same computer graphics application or program (e.g., a same video game program). In at least one embodiment, reference frames 5710 and motion vectors are generated by one or more rendering devices, in which input frames 5702 and motion vectors 5704 are obtained from generated reference frames 5710 and motion vectors through one or more processes, such as downscaling generated reference frames 5710 and/or motion vectors to obtain input frames 5702 and motion vectors 5704, removing one or more post processing techniques and/or effects from generated reference frames 5710 and/or motion vectors to obtain input frames 5702 and motion vectors 5704, and variations thereof. In at least one embodiment, one or more rendering devices generate input frames 5702, motion vectors 5704, and/or reference frames 5710 from a particular computer graphics application or program (e.g., a video game program).

In at least one embodiment, a neural network 5706 is trained to process input frames 5702 and motion vectors 5704, and generate output frames 5708 that closely approximate or match corresponding reference frames 5710. In at least one embodiment, one or more rendering devices, through one or more computer graphics applications or programs, generate and store input frames 5702, motion vectors 5704, and reference frames 5710, in which one or more systems retrieve stored input frames 5702, motion vectors 5704, and reference frames 5710 to train a neural network 5706. In at least one embodiment, a neural network 5706 is a convolutional autoencoder network. In at least one embodiment, a neural network 5706 is trained using frames and/or motion vectors from a particular computer graphics application or program (e.g., a video game program) and is usable to generate frames for a particular computer graphics application or program. In at least one embodiment, a neural network 5706 is trained to generate high quality versions of input frames 5702 (e.g., upscaled/higher resolution frames, anti-aliased frames) as output frames 5708. In at least one embodiment, a neural network 5706 is trained to upscale and anti-alias frames of input frames 5702 as output frames 5708. In at least one embodiment, a neural network 5706 utilizes motion vectors 5704 to generate output frames 5708. In at least one embodiment, a neural network 5706 generates a first output frame of output frames 5708 from input frames 5702 and motion vectors 5704, generates a second output frame of output frames 5708 from a first output frame of output frames 5708, input frames 5702, and motion vectors 5704, and so on for subsequent output frames of output frames 5708. In at least one embodiment, a neural network 5706 applies sets of motion vectors from motion vectors 5704 to frames of output frames 5708 to generate subsequent frames of output frames 5708. In at least one embodiment, a neural network 5706 utilizes motion vectors 5704 as part of one or more temporal feedback processes that apply motion vectors to output frames to generate subsequent output frames.

In at least one embodiment, output frames 5708 are higher quality versions of input frames 5702, which can refer to various qualities, such as higher resolution, higher degrees of various post processing techniques and/or effects, and/or variations thereof. In at least one embodiment, a video game program is executing in connection with one or more computer graphics hardware, in which a frame is rendered and input to a neural network 5706, in which neural network 5706 generates a corresponding higher quality frame (e.g., an upscaled and/or anti-aliased frame). In at least one embodiment, a neural network 5706 is trained to output frames (e.g., output frames 5708) with various post processing techniques and/or effects from frames (e.g., input frames 5702) with minimal post processing techniques and/or effects. In at least one embodiment, a neural network 5706 obtains a frame and corresponding motion vectors, such as a frame and motion vectors of input frames 5702 and motion vectors 5704, respectively, and generates a corresponding high quality output frame, such as a frame of output frames 5708 (e.g., a frame with various post processing techniques and/or effects, such as an upscaled frame, an anti-aliased frame, an upscaled and anti-aliased frame, and/or variations thereof). In at least one embodiment, a neural network 5706 obtains an input frame (e.g., a frame of input frames 5702), a previous output frame (e.g., a previously generated output frame of output frames 5708), and motion vectors (e.g., motion vectors of motion vectors 5704), and generates an output frame (e.g., a subsequent output frame of output frames 5708).

In at least one embodiment, a neural network 5706 is trained and/or updated by comparing generated output frames 5708 with reference frames 5710. In at least one embodiment, a neural network 5706 is trained and used in connection with FIG. 56. In at least one embodiment, a neural network 5706 is trained or otherwise updated by one or more systems using a training framework such as a PyTorch, TensorFlow, Boost, Caffe, Microsoft Cognitive Toolkit/CNTK, MXNet, Chainer, Keras, Deeplearning4j, or any suitable training framework. In at least one embodiment, a neural network 5706 is trained by comparing output frames 5708 with reference frames 5710, determining differences between output frames 5708 and reference frames 5710, and utilizing determined differences to update weights and other components of neural network 5706 such that differences between output frames 5708 and reference frames 5710 are minimized.

In at least one embodiment, training is performed at least in a supervised, partially supervised, and/or unsupervised manner. In at least one embodiment, a neural network 5706 is trained to match input frames 5702 to reference frames 5710. In at least one embodiment, a neural network 5706 is trained by one or more systems that cause neural network 5706 to produce an output frame of output frames 5708 from a frame of input frames 5702, and measure a difference between an output frame of output frames 5708 and a corresponding frame of reference frames 5710. In at least one embodiment, a neural network 5706 is trained by one or more systems that cause neural network 5706 to obtain a frame of input frames 5702 and perform one or more neural network image processing/generation/rendering operations (e.g., generate new pixels, modify existing pixels) to generate an output frame of output frames 5708, compare an output frame of output frames 5708 with a corresponding frame of reference frames 5710, and adjust weights of neural network 5706 based at least in part on a comparison of an output frame of output frames 5708 with a corresponding frame of reference frames 5710. In at least one embodiment, a frame of output frames 5708 is compared with a frame of reference frames 5710 by comparing pixels of both frames with each other. In at least one embodiment, frames are compared by comparing pixel characteristics of frames (e.g., pixel intensity, pixel brightness, pixel color, pixel contrast) and measuring differences in pixel characteristics (e.g., differences in pixel intensity, pixel brightness, pixel color, pixel contrast between pixels of frames). In at least one embodiment, a neural network 5706 is trained using one or more back propagation processes in connection with one or more loss functions. In at least one embodiment, a neural network 5706 is trained using various techniques described herein such as those described in connection with FIG. 15.

In at least one embodiment, at least one component shown or described with respect to FIG. 57 is used to perform techniques and/or functions described in connection with FIGS. 1-13. In at least one embodiment, at least one component shown or described with respect to FIG. 57 is used to perform operations described herein, such as to detect whether one or more objects within one or more images is likely to be duplicated in an image interpolated using the one or more images. In at least one embodiment, at least one component shown or described with respect to FIG. 57 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 58:
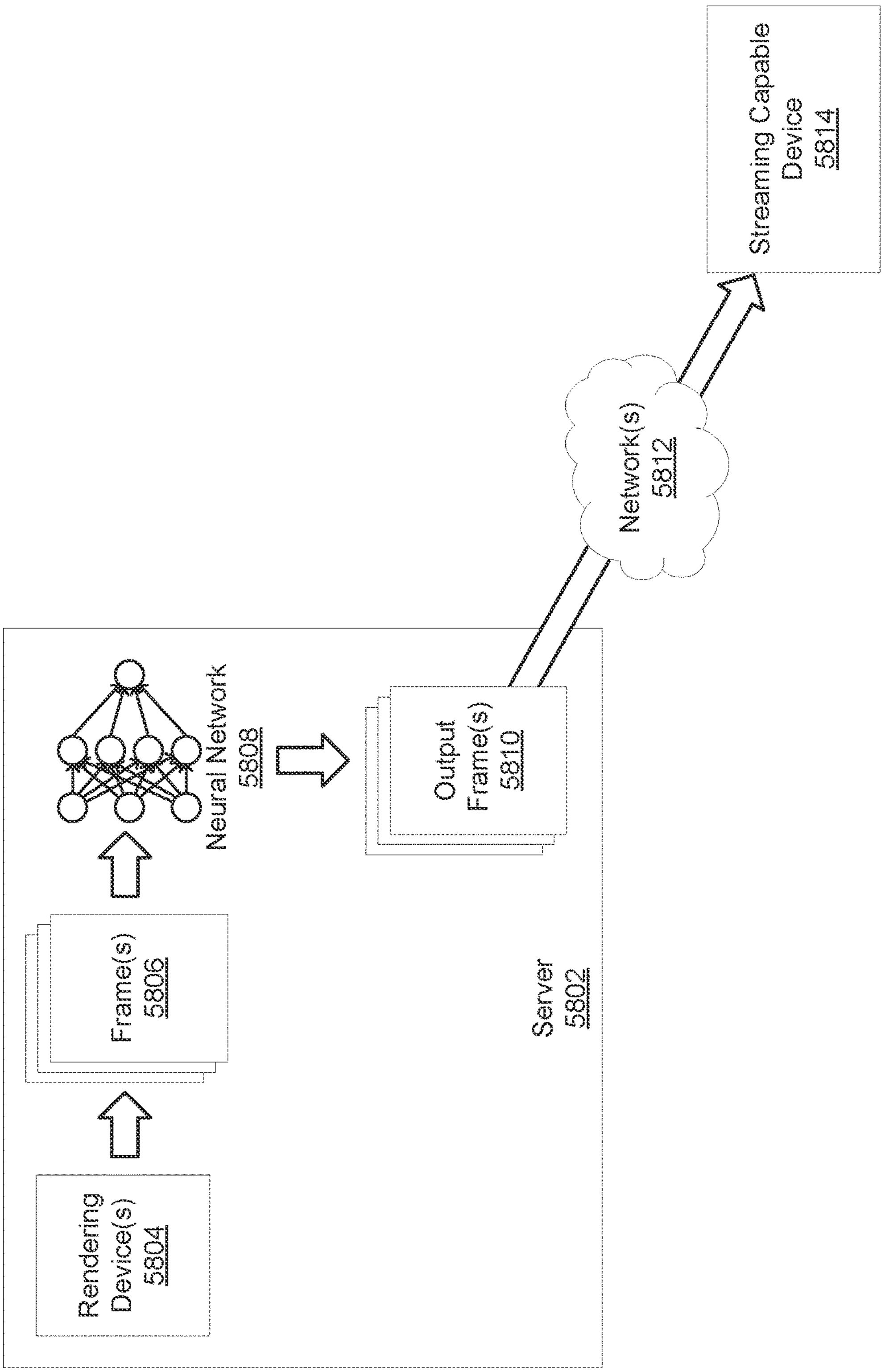
FIG. 58 illustrates an example of streaming using a super sampling neural network, in accordance with at least one embodiment.

FIG. 58 illustrates an example of streaming using a super sampling neural network, in accordance with at least one embodiment. In at least one embodiment, a neural network 5808 processes frame(s) 5806 generated by rendering device(s) 5804 to generate output frame(s) 5810, which are streamed via network(s) 5812 to a streaming capable device 5814. In at least one embodiment, a neural network 5808 is referred to as a DLSS network, super sampling neural network, super sampling network, and/or variations thereof. In at least one embodiment, a neural network 5808 is trained using techniques such as those described in connection with FIG. 57.

In at least one embodiment, a server 5802 is a collection of one or more computer hardware and/or software components. In at least one embodiment, a server 5802 provides various functionalities to other programs or devices, referred to as clients. In at least one embodiment, a server 5802 provides streaming services. In at least one embodiment, streaming services refer to services that provide streaming media to a user. In at least one embodiment, streaming media refers to multimedia (e.g., video, audio) that is constantly received by and presented to a user while being delivered by a provider. In at least one embodiment, a server 5802 provides video game streaming services. In at least one embodiment, a server 5802 provides services in which frames of a video game are constantly received by and presented to a user while being delivered/generated by a server 5802. In at least one embodiment, a server 5802 comprises rendering device(s) 5804. In at least one embodiment, a server 5802 comprises one or more hardware and/or software components that implement a neural network 5808. In at least one embodiment, a server 5802 comprises one or more data storage components (e.g., hard drives) that provide storage and processing of frame(s) 5806 and output frame(s) 5810.

In at least one embodiment, rendering device(s) 5804 comprise one or more computer graphics rendering hardware and/or software components. In at least one embodiment, rendering device(s) 5804 comprise one or more graphics processing units. In at least one embodiment, rendering device(s) 5804 comprise one or more computing devices that generate and/or render graphics. In at least one embodiment, rendering device(s) 5804 comprise one or more computing devices that generate renders from a video game. In at least one embodiment, rendering device(s) 5804 render frames of a video game or other computer graphics program. In at least one embodiment, rendering device(s) 5804, using input data from a computer graphics program (e.g., a video game program), renders frame(s) 5806.

In at least one embodiment, frame(s) 5806 are frames rendered by rendering device(s) 5804. In at least one embodiment, frame(s) 5806 are associated with motion vectors that indicate directions of movement of objects of frame(s) 5806. In at least one embodiment, frame(s) 5806 and associated motion vectors are generated by rendering device(s) 5804. In at least one embodiment, frame(s) 5806 comprise frames generated by a particular video game program. In at least one embodiment, a video game program is executed by one or more computing devices that comprise graphics hardware (e.g., rendering device(s) 5804) that generate real-time computer graphics. In at least one embodiment, a video game program is executing and generates a 3D scene, in which frame(s) 5806 comprise renders of a 3D scene. In at least one embodiment, frame(s) 5806 are frames that are rendered by a rendering device with various hardware and software constraints, such as graphics hardware limitations, memory limitations, and/or variations thereof. In at least one embodiment, frame(s) 5806 are frames that are rendered with minimal post processing techniques, such as anti-aliasing (e.g., frame(s) 5806 comprise frames that are rendered with a little to no degree of anti-aliasing).

In at least one embodiment, a neural network 5808 comprises one or more neural networks that generate high quality frames from input frames. In at least one embodiment, a neural network 5808 is trained using frames from a particular computer graphics application or program (e.g., a video game program) and is usable to generate frames for a particular computer graphics application or program. In at least one embodiment, a neural network 5808 is trained to generate high quality versions of frame(s) 5806 (e.g., upscaled/higher resolution frames, anti-aliased frames). In at least one embodiment, a neural network 5808 is trained to upscale and anti-alias frames of frame(s) 5806. In at least one embodiment, a video game program is executing in connection with one or more computer graphics hardware, in which a frame is rendered and input to a neural network 5808 (e.g., frame(s) 5806 are rendered by rendering device(s) 5804 and input to neural network 5808), in which neural network 5808 generates a corresponding higher quality frame (e.g., an upscaled and/or anti-aliased frame). In at least one embodiment, a neural network 5808 is trained to output frames with various post processing techniques and/or effects from frames with minimal post processing techniques and/or effects. In at least one embodiment, a neural network 5808 obtains a frame and corresponding motion vectors, and generates a corresponding high quality output frame (e.g., a frame with various post processing techniques and/or effects, such as an upscaled frame, an anti-aliased frame, an upscaled and anti-aliased frame, and/or variations thereof). In at least one embodiment, a neural network 5808 obtains frame(s) 5806 and motion vectors and generates output frame(s) 5810. In at least one embodiment, a neural network 5808 utilizes one or more temporal feedback processes that process output frames of output frame(s) 5810 in connection with frame(s) 5806 and associated motion vectors to generate subsequent frames of output frame(s) 5810.

In at least one embodiment, output frame(s) 5810 correspond to frame(s) 5806 (e.g., each frame of output frame(s) 5810 corresponds to a frame of frame(s) 5806). In at least one embodiment, output frame(s) 5810 are frames that are generated with various post processing techniques and/or effects. In at least one embodiment, output frame(s) 5810 are higher quality versions of frame(s) 5806. In at least one embodiment, output frame(s) 5810 comprise upscaled (e.g., higher resolution) and/or anti-aliased versions of frame(s) 5806.

In at least one embodiment, network(s) 5812 comprise any suitable computer communication network, such as Internet. In at least one embodiment, network(s) 5812 are cryptographically protected, encrypted, or otherwise secured. In at least one embodiment, network(s) 5812 comprise one or more computer network communication channels in which data is transmitted and received. In at least one embodiment, network(s) 5812 provide methods of communication between a server 5802 and a streaming capable device 5814. In at least one embodiment, output frame(s) 5810 are transmitted from a server 5802 via network(s) 5812 to a streaming capable device 5814.

In at least one embodiment, a streaming capable device 5814 is a computing device that is capable of receiving multimedia through one or more networks. In at least one embodiment, a streaming capable device 5814 is a device with limited graphics rendering capabilities that is unable to render frames such as output frame(s) 5810, but is able to access a server 5802 via network(s) 5812 to obtain output frame(s) 5810. In at least one embodiment, a streaming capable device 5814 is a streaming capable computing device such that streaming capable device 5814 comprises various hardware and/or software components that constantly receive and/or obtain multimedia from one or more networks. In at least one embodiment, a streaming capable device 5814 is a computing device such as a mobile phone, laptop, computer, gaming console, tablet, and/or variations thereof. In at least one embodiment, a streaming capable device 5814 comprises one or more computer networking components, such as various receivers, transmitters, and/or transceivers, which obtain and process multimedia transmitted through one or more networks. In at least one embodiment, a streaming capable device 5814 is operable by one or more users. In at least one embodiment, a streaming capable device 5814 receives output frame(s) 5810 through network(s) 5812. In at least one embodiment, a streaming capable device 5814 receives output frame(s) 5810 in connection with one or more programs executing on streaming capable device 5814 that display and/or process output frame(s) 5810.

In at least one embodiment, a streaming capable device 5814 comprises one or more software programs and/or applications that processes obtained output frame(s) 5810 and provides output frame(s) 5810 to be viewed (e.g., via an electronic visual display of streaming capable device 5814) and/or interacted with (e.g., via various user input hardware of streaming capable device 5814) by one or more users. In at least one embodiment, a streaming capable device 5814 comprises one or more electronic visual display hardware, such as a liquid crystal display (LCD), light-emitting diode (LED) display, and/or variations thereof, and one or more user input hardware, such as computer mouse, keyboard, gaming controller, and/or variations thereof, in which users utilize to interact with one or more software programs and/or applications executing on streaming capable device 5814. In at least one embodiment, a streaming capable device 5814 provides indications of user input to a server 5802 via network(s) 5812, in which frame(s) 5806 are generated by rendering device(s) 5804 based at least in part on user input.

In at least one embodiment, a video game program is executing on a server 5802, where frame(s) 5806 are frames of a video game program, in which frame(s) 5806 are rendered by rendering device(s) 5804, and processed and transmitted as output frame(s) 5810 to a streaming capable device 5814, in which a user interacts with streaming capable device 5814 in connection with output frame(s) 5810 (e.g., output frame(s) 5810 are frames of a video game program requiring interaction, in which a user inputs interaction to streaming capable device 5814), in which user interactions are transmitted to server 5802 to a video game program to determine how subsequent frames of a video game program are to be rendered by rendering device(s) 5804. In at least one embodiment, frame(s) 5806 are rendered based at least in part on input from a user in connection with a streaming capable device 5814, and processed by a neural network 5808 to generate output frame(s) 5810, in which output frame(s) 5810 are transmitted to streaming capable device 5814, in which further user input is received by streaming capable device 5814 and transmitted to server 5802 to generate subsequent frames, which are then processed by neural network 5808 and transmitted to streaming capable device 5814, and so on for subsequent frames and subsequent user input.

In at least one embodiment, at least one component shown or described with respect to FIG. 58 is used to perform techniques and/or functions described in connection with FIGS. 1-13. In at least one embodiment, at least one component shown or described with respect to FIG. 58 is used to perform operations described herein, such as to detect whether one or more objects within one or more images is likely to be duplicated in an image interpolated using the one or more images. In at least one embodiment, at least one component shown or described with respect to FIG. 58 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 59:
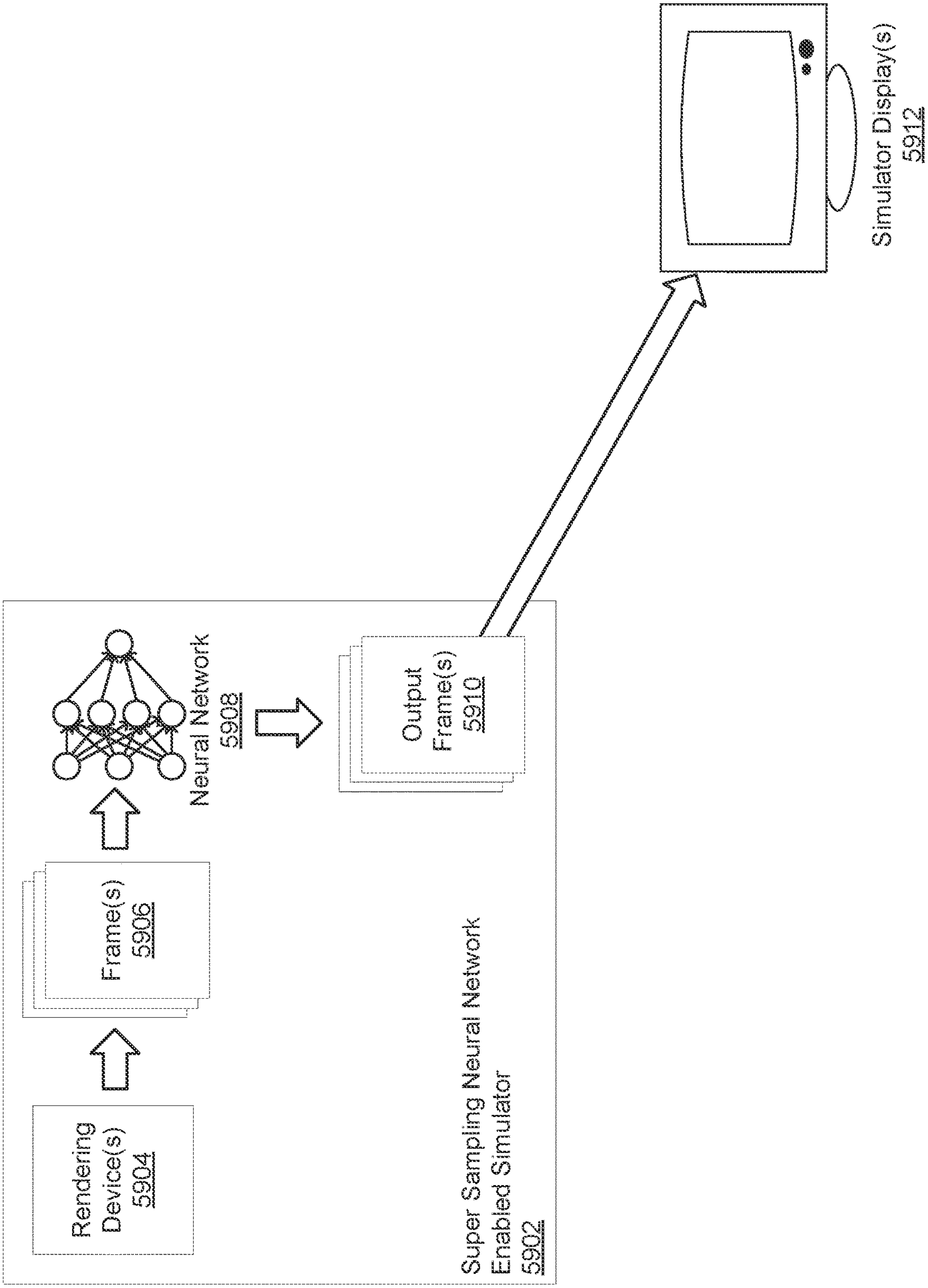
FIG. 59 illustrates an example of simulation using a super sampling neural network, in accordance with at least one embodiment.

FIG. 59 illustrates an example of simulation using a super sampling neural network, in accordance with at least one embodiment. In at least one embodiment, a neural network 5908 processes frame(s) 5906 generated by rendering device(s) 5904 to generate output frame(s) 5910, which are output to simulator display(s) 5912. In at least one embodiment, a neural network 5908 is referred to as a DLSS network, super sampling neural network, super sampling network, and/or variations thereof. In at least one embodiment, a neural network 5908 is trained using techniques such as those described in connection with FIG. 57.

In at least one embodiment, a super sampling neural network enabled simulator 5902 is a collection of one or more computer hardware and/or software components. In at least one embodiment, a super sampling neural network enabled simulator 5902 comprises rendering device(s) 5904. In at least one embodiment, a super sampling neural network enabled simulator 5902 comprises one or more hardware and/or software components that implement a neural network 5908. In at least one embodiment, a super sampling neural network enabled simulator 5902 comprises one or more data storage components (e.g., hard drives) that provide storage and processing of frame(s) 5906 and output frame(s) 5910.

In at least one embodiment, a super sampling neural network enabled simulator 5902 is a simulator device, such as a flight simulator, driving simulator, and/or variations thereof, that executes various simulator programs, such as flight simulator programs, driving simulator programs, and/or variations thereof. In at least one embodiment, a flight simulator is a device that artificially re-creates aircraft flight and an environment in which it flies. In at least one embodiment, a flight simulator, through execution of a flight simulator program, simulates various aspects of flight, such as physics of how aircraft fly, how aircraft react to applications of various flight controls, effects of other aircraft systems, and effects of factors such as turbulence, air density, wind shear, cloud, precipitation, weather, and/or variations thereof, on aircraft. In at least one embodiment, a flight simulator (e.g., a super sampling neural network enabled simulator 5902) comprises one or more hardware components that simulate an aircraft, such as hardware of a cockpit of an aircraft, that allow user interaction with a flight simulator (e.g., hardware components comprise various user input devices, such as a steering wheel, controller, joystick, buttons, switches, levers, and/or variations thereof). In at least one embodiment, a flight simulator comprises one or more displays (e.g., simulator display(s) 5912) that users interact with in connection with hardware of a flight simulator to simulate various aspects of flight. In at least one embodiment, a driving simulator is a device that artificially recreates motor vehicle movement and an environment in which it moves. In at least one embodiment, a driving simulator, through execution of a driving simulator program, simulates various aspects of operation of a motor vehicle, such as physics of a motor vehicle, how a motor vehicle reacts to applications of various motor vehicle controls, effects of other motor vehicle systems, and effects of factors such as environmental changes, wind, weather, and/or variations thereof, on motor vehicles. In at least one embodiment, a driving simulator (e.g., a super sampling neural network enabled simulator 5902) comprises one or more hardware components that simulate a motor vehicle, such as hardware of a driver seat of a motor vehicle, that allow user interaction with a driving simulator (e.g., hardware components comprise various user input devices, such as a steering wheel, pedals, controller, joystick, buttons, switches, levers, and/or variations thereof). In at least one embodiment, a driving simulator comprises one or more displays (e.g., simulator display(s) 5912) that users interact with in connection with hardware of a driving simulator to simulate various aspects of driving or other motor vehicle operation. In at least one embodiment, simulator display(s) 5912 are displays of a super sampling neural network enabled simulator 5902.

In at least one embodiment, rendering device(s) 5904 comprise one or more computer graphics rendering hardware and/or software components. In at least one embodiment, rendering device(s) 5904 comprise one or more graphics processing units. In at least one embodiment, rendering device(s) 5904 comprise one or more computing devices that generate and/or render graphics. In at least one embodiment, rendering device(s) 5904 comprise one or more computing devices that generate renders from a computer graphics program, such as a video game, simulation program, simulation video game, and/or variations thereof. In at least one embodiment, rendering device(s) 5904, using input data from a computer graphics program (e.g., a simulation program), renders frame(s) 5906.

In at least one embodiment, frame(s) 5906 are frames rendered by rendering device(s) 5904. In at least one embodiment, frame(s) 5906 are associated with motion vectors that indicate directions of movement of objects of frame(s) 5906. In at least one embodiment, frame(s) 5906 and associated motion vectors are generated by rendering device(s) 5904. In at least one embodiment, frame(s) 5906 comprise frames generated by a particular simulation program, such as a flight simulator program, driving simulator program, and/or variations thereof. In at least one embodiment, a simulation program is executed by one or more computing devices that comprise graphics hardware (e.g., rendering device(s) 5904) that generate real-time computer graphics. In at least one embodiment, a simulation program is executing and generates a 3D scene, in which frame(s) 5906 comprise renders of a 3D scene. In at least one embodiment, frame(s) 5906 are frames that are rendered with minimal post processing techniques, such as anti-aliasing (e.g., frame(s) 5906 comprise frames that are rendered with a little to no degree of anti-aliasing).

In at least one embodiment, a neural network 5908 comprises one or more neural networks that generate high quality frames from input frames. In at least one embodiment, a neural network 5908 is trained using frames from a particular computer graphics application or program (e.g., a simulation program) and is usable to generate frames for a particular computer graphics application or program. In at least one embodiment, a neural network 5908 is trained to generate high quality versions of frame(s) 5906 (e.g., upscaled/higher resolution frames, anti-aliased frames). In at least one embodiment, a simulation program is executing in connection with one or more computer graphics hardware, in which a frame is rendered and input to a neural network 5908 (e.g., frame(s) 5906 are rendered by rendering device(s) 5904 and input to neural network 5908), in which neural network 5908 generates a corresponding higher quality frame (e.g., an upscaled and/or anti-aliased frame). In at least one embodiment, a neural network 5908 is trained to output frames with various post processing techniques and/or effects from frames with minimal post processing techniques and/or effects. In at least one embodiment, a neural network 5908 obtains a frame and corresponding motion vectors, and generates a corresponding high quality output frame (e.g., a frame with various post processing techniques and/or effects, such as an upscaled/higher resolution frame, an anti-aliased frame, an upscaled and anti-aliased frame, and/or variations thereof). In at least one embodiment, a neural network 5908 obtains frame(s) 5906 and/or motion vectors and generates output frame(s) 5910. In at least one embodiment, a neural network 5908 utilizes one or more temporal feedback processes that process output frames of output frame(s) 5910 in connection with frame(s) 5906 and associated motion vectors to generate subsequent frames of output frame(s) 5910.

In at least one embodiment, output frame(s) 5910 correspond to frame(s) 5906 (e.g., each frame of output frame(s) 5910 corresponds to a frame of frame(s) 5906). In at least one embodiment, output frame(s) 5910 are frames that are generated with various post processing techniques and/or effects. In at least one embodiment, output frame(s) 5910 are higher quality versions of frame(s) 5906. In at least one embodiment, output frame(s) 5910 comprise upscaled and/or anti-aliased versions of frame(s) 5906. In at least one embodiment, output frame(s) 5910 are displayed on simulator display(s) 5912 as part of operation of one or more simulators (e.g., super sampling neural network enabled simulator 5902), such as a flight simulator that executes a flight simulator program, a driving simulator that executes a driving simulator program, and/or variations thereof. In at least one embodiment, a user is operating a super sampling neural network enabled simulator 5902 and performs one or more actions, through one or more user input devices, based at least in part on output frame(s) 5910 displayed on simulator display(s) 5912.

In at least one embodiment, at least one component shown or described with respect to FIG. 59 is used to perform techniques and/or functions described in connection with FIGS. 1-13. In at least one embodiment, at least one component shown or described with respect to FIG. 59 is used to perform operations described herein, such as to detect whether one or more objects within one or more images is likely to be duplicated in an image interpolated using the one or more images. In at least one embodiment, at least one component shown or described with respect to FIG. 59 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

Figure 60:
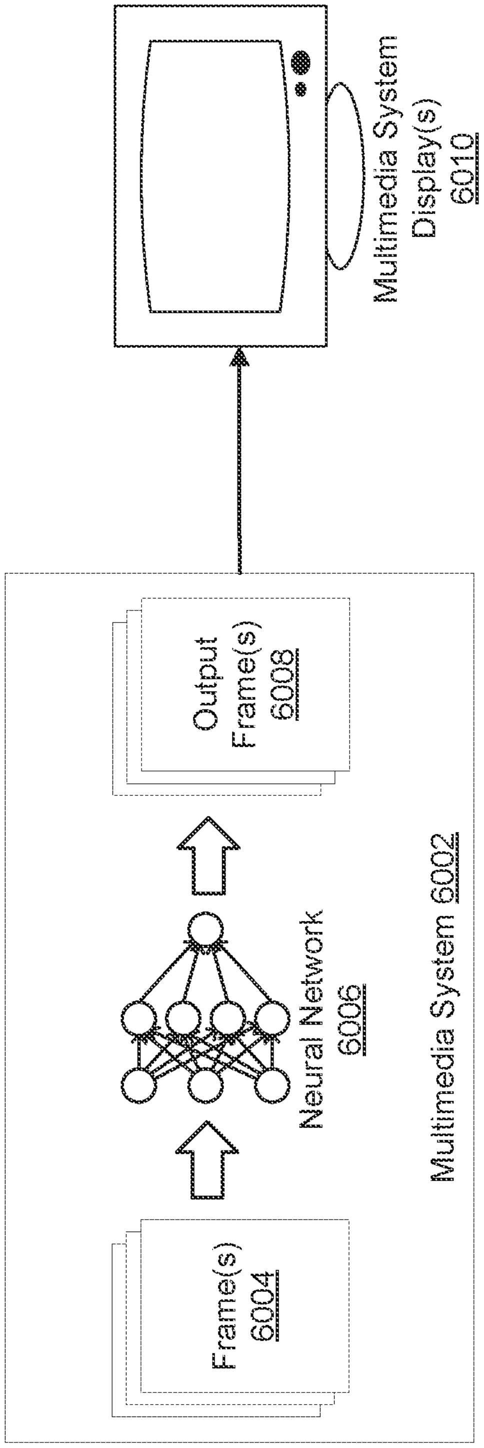
FIG. 60 illustrates an example of a device using a super sampling neural network, in accordance with at least one embodiment.

FIG. 60 illustrates an example of a device using a super sampling neural network, in accordance with at least one embodiment. In at least one embodiment, a neural network 6006 processes frame(s) 6004 generated by a multimedia system 6002 to generate output frame(s) 6008, which are output to multimedia system display(s) 6010. In at least one embodiment, a neural network 6006 is referred to as a DLSS network, super sampling neural network, super sampling network, and/or variations thereof. In at least one embodiment, a neural network 6006 is trained using techniques such as those described in connection with FIG. 57.

In at least one embodiment, a multimedia system 6002 is a collection of one or more computer hardware and/or software components. In at least one embodiment, a multimedia system 6002 comprises one or more rendering devices. In at least one embodiment, a multimedia system 6002 comprises one or more hardware and/or software components that implement a neural network 6006. In at least one embodiment, a multimedia system 6002 comprises one or more data storage components (e.g., hard drives) that provide storage and processing of frame(s) 6004 and output frame(s) 6008. In at least one embodiment, a multimedia system 6002 is a gaming console, such as those described in accordance with FIG. 54. In at least one embodiment, a multimedia system 6002 is any suitable computing device that processes multimedia, such as a computer, tablet, gaming device, gaming console, mobile device, and/or variations thereof. In at least one embodiment, multimedia system display(s) 6010 are one or more electronic visual display hardware that display data (e.g., multimedia, video games) from a multimedia system 6002. In at least one embodiment, multimedia system display(s) 6010 are displays of a multimedia system 6002.

In at least one embodiment, a multimedia system 6002 comprises one or more computer graphics rendering hardware and/or software components. In at least one embodiment, a multimedia system 6002 comprises one or more graphics processing units. In at least one embodiment, a multimedia system 6002 comprises one or more computing devices that generate and/or render graphics. In at least one embodiment, a multimedia system 6002 comprises one or more processors that execute various programs, such as video game programs, software applications, software programs, and/or variations thereof. In at least one embodiment, a multimedia system 6002 comprises one or more computing devices that generate renders from a computer graphics program, such as a video game. In at least one embodiment, a multimedia system 6002, using input data from a computer graphics program executing on multimedia system 6002 (e.g., a video game program), renders frame(s) 6004. In at least one embodiment, a multimedia system 6002 comprises one or more hardware components that allow user interaction with a multimedia system 6002 (e.g., hardware components comprise various user input devices, such as controllers, joysticks, buttons, switches, levers, and/or variations thereof). In at least one embodiment, a multimedia system 6002 is connected to one or more user input devices that allow users to interact with various programs executing on a multimedia system 6002 (e.g., video game programs).

In at least one embodiment, frame(s) 6004 are frames rendered by a multimedia system 6002. In at least one embodiment, frame(s) 6004 are associated with motion vectors that indicate directions of movement of objects of frame(s) 6004. In at least one embodiment, frame(s) 6004 and associated motion vectors are generated by a multimedia system 6002. In at least one embodiment, frame(s) 6004 comprise frames generated by a particular video game program. In at least one embodiment, a video game program is executed by one or more computing devices that comprise graphics hardware (e.g., a multimedia system 6002) that generate real-time computer graphics. In at least one embodiment, a video game program is executing and generates a 3D scene, in which frame(s) 6004 comprise renders of a 3D scene. In at least one embodiment, frame(s) 6004 are frames that are rendered with minimal post processing techniques, such as anti-aliasing (e.g., frame(s) 6004 comprise frames that are rendered with a little to no degree of anti-aliasing).

In at least one embodiment, a neural network 6006 comprises one or more neural networks that generate high quality frames from input frames. In at least one embodiment, a neural network 6006 is trained using frames from a particular computer graphics application or program (e.g., a video game program) and is usable to generate frames for a particular computer graphics application or program. In at least one embodiment, a neural network 6006 is trained to generate high quality versions of frame(s) 6004 (e.g., upscaled/higher resolution frames, anti-aliased frames). In at least one embodiment, a video game program is executing in connection with one or more computer graphics hardware, in which a frame is rendered and input to a neural network 6006 (e.g., frame(s) 6004 are rendered by a multimedia system 6002 and input to neural network 6006), in which neural network 6006 generates a corresponding higher quality frame (e.g., an upscaled/higher resolution and/or anti-aliased frame). In at least one embodiment, a neural network 6006 is trained to output frames with various post processing techniques and/or effects from frames with minimal post processing techniques and/or effects. In at least one embodiment, a neural network 6006 obtains a frame and corresponding motion vectors, and generates a corresponding high quality output frame (e.g., a frame with various post processing techniques and/or effects, such as an upscaled/higher resolution frame, an anti-aliased frame, an upscaled and anti-aliased frame, and/or variations thereof). In at least one embodiment, a neural network 6006 obtains frame(s) 6004 and/or motion vectors and generates output frame(s) 6008. In at least one embodiment, a neural network 6006 utilizes one or more temporal feedback processes that process output frames of output frame(s) 6008 in connection with frame(s) 6004 and associated motion vectors to generate subsequent frames of output frame(s) 6008.

In at least one embodiment, output frame(s) 6008 correspond to frame(s) 6004 (e.g., each frame of output frame(s) 6008 corresponds to a frame of frame(s) 6004). In at least one embodiment, output frame(s) 6008 are frames that are generated with various post processing techniques and/or effects. In at least one embodiment, output frame(s) 6008 are higher quality versions of frame(s) 6004. In at least one embodiment, output frame(s) 6008 comprise upscaled and/or anti-aliased versions of frame(s) 6004. In at least one embodiment, a neural network 6006 constantly generates output frames of output frame(s) 6008 as frames of frame(s) 6004 are rendered by a multimedia system 6002. In at least one embodiment, output frame(s) 6008 are displayed on multimedia display(s) 6010 as part of operation of one or more video game programs. In at least one embodiment, a user is operating a multimedia system 6002 and performs one or more actions, through one or more user input devices, based at least in part on output frame(s) 6008 displayed on multimedia display(s) 6010.

In at least one embodiment, one or more components of systems and/or processors disclosed above in any embodiment can include software modules to be performed by a processor such as an upscaler or upsampler to upscale an image or frame, an image blender or image blender to blend, mix, or add images together, a sampler to sample an image (e.g., as part of a DSP). In at least one embodiment, one or more components of systems and/or processors disclosed above include a neural network circuit or circuitry to perform an upscaler to upscale an image (e.g., from a low resolution image to a high resolution image such as 1080p to 4K).

In at least one embodiment, one or more components of systems and/or processors disclosed above in any embodiment can communicate with one or more CPUs, cores, processor cores, ASICs, GPUs, FPGAs, or other hardware, circuitry, or integrated circuit components to use a neural network, perform operations of a neural network, or perform a neural network to upscale a lower resolution (LR) image (e.g., 1080p) to a high resolution (HR) image (e.g., 4K), which can be referred to as a "super-resolution (SR)" image because it has a higher resolution than said LR image. In at least one embodiment, any embodiment from above can be used to upscale an image or frame from a low or lower-resolution to a target (e.g., desired) resolution that is higher than said low or lower-resolution image or frame. For example, a SoC including CPU and an accelerator (e.g., GPU) can perform upscaling of a lower-resolution or low resolution frame or image to generate a high resolution image, where said CPU can offload some neural network operations to upscale said image or frame to an accelerator (e.g., GPU). In at least one embodiment, one or more components of systems and/or processors disclosed above in any embodiment can communicate with one or more CPUs, ASICs, GPUs, FPGAs, or other hardware, circuitry, or integrated circuit components to use a neural network or perform operations of a neural network to render videos of frame sequences in HR.

In at least one embodiment, one or more components of systems and/or processors disclosed above in any embodiment can communicate with one or more CPUs, ASICs, GPUs, FPGAs, or other hardware, circuitry, or integrated circuit components to perform temporal anti-aliasing prior to or when upsampling or upscaling an image or frame, e.g., a CPU and/or GPU performing anti-aliasing operations is integrated into an image rendering pipeline. In at least one embodiment, one or more components of systems and/or processors disclosed above in any embodiment perform an API that is provided by VULKAN and used in an image rendering process. In at least one embodiment, one or more components of systems and/or processors disclosed above in any embodiment perform tone mapping of a lower-resolution image or frame prior to upscaling said image or frame using a neural network.

In at least one embodiment, one or more components of systems and/or processors disclosed above in any embodiment include one or more matrix engines (e.g., software performed by a processor or core) to compute or perform matrix operations such as matrix multiplication as part of neural network operations to upscale or upsample an image. In at least one embodiment, one or more components of systems and/or processors disclosed above in any embodiment include one or more vector engines (e.g., software performed by a processor or core) to compute or perform vector operations such as vector multiplication or vector addition. In at least one embodiment, matrix engines and vector engines can be part of a core of a processor or rendering slice, and wherein each core is electronically coupled to an instruction cache, an L1 cache, and a load and store unit (also referred to as a "load/store").

In at least one embodiment, one or more components of systems and/or processors disclosed above in any embodiment perform operations to add effects to an upsampled or upscaled image. In at least one embodiment, effects can include introducing noise, reducing noise, applying chromatic effects, applying aberration effects, applying shading effects, and/or applying other effects to alter an upsampled frame or image.

In at least one embodiment, at least one component shown or described with respect to FIG. 60 is used to perform techniques and/or functions described in connection with FIGS. 1-13. In at least one embodiment, at least one component shown or described with respect to FIG. 60 is used to perform operations described herein, such as to detect whether one or more objects within one or more images is likely to be duplicated in an image interpolated using the one or more images. In at least one embodiment, at least one component shown or described with respect to FIG. 60 is used to perform at least one aspect described with respect to example diagram 100, example diagram 200, example process 300, example diagram 400, example diagram 500, example diagram 600, example diagram 700, example diagram 800, example diagram 900, example process 1000, example diagram 1100, example diagram 1200, example process 1300, and/or other systems, methods, or operations described herein.

At least one embodiment of the disclosure can be described in view of the following clauses:

1. A processor comprising:
one or more circuits to detect whether one or more objects within one or more images is likely to be duplicated in an image interpolated using the one or more images.
2. The processor of clause 1, wherein the one or more circuits are to detect whether the one or more objects is likely to be duplicated by at least tracing, from a start location to an end location, two or more vectors of different motion types to a source image and back and determining whether classifications of the start location and end location match.
3. The processor of clause 1 or 2, wherein the one or more circuits are to detect whether the one or more objects within the one or more images is likely to be duplicated by at least determining whether a pixel location corresponding to an object is to be generated by sampling from pixels classified differently according to motion type.
4. The processor of any of clauses 1-3, wherein the one or more circuits are to detect whether the one or more objects is likely to be duplicated by at least determining whether differently classified pixels are to contribute to generation of a pixel value.
5. The processor of any of clauses 1-4, wherein the one or more circuits are to detect whether the one or more objects is likely to be duplicated by at least determining whether a pixel of the one or more objects corresponds to blending factors that fail to match one another.
6. The processor of any of clauses 1-5, wherein the one or more circuits are to prevent duplication of one or more pixels of the one or more objects in the image to be interpolated.
7. The processor of any of clauses 1-6, wherein the one or more images comprise two or more images and at least one of the one or more objects is represented by different pixel locations in two or more images.
8. A computer-implemented method comprising:
detecting whether one or more objects within one or more images is likely to be duplicated in an image interpolated using the one or more images.
9. The computer-implemented method of clause 8, wherein detecting whether the one or more objects is likely to be duplicated by at least tracing, from a start location to an end location, two or more vectors of different motion types to a source image and back and determining whether classifications of the start location and end location match.

10. The computer-implemented method of clause 8 or 9, wherein detecting whether the one or more objects within the one or more images is likely to be duplicated by at least determining whether a pixel location corresponding to an object is to be generated by sampling from pixels classified differently according to motion type.

11. The computer-implemented method of any of clauses 8-10, wherein detecting whether the one or more objects is likely to be duplicated by at least determining whether differently classified pixels are to contribute to generation of a pixel value in the interpolated image.

12. The computer-implemented method of any of clauses 8-11, wherein the one or more images comprise a plurality of intermediate images generated based, at least in part by motion warping another image.

13. The computer-implemented method of any of clauses 8-12, wherein the one or more images are video frames.

14. The computer-implemented method of any of clauses 8-13, wherein the image interpolated using the one or more images is a video frame.

15. A computer system comprising:

one or more processors and memory storing executable instructions that, if performed by the one or more processors are to cause the computer system to detect whether one or more objects within one or more images is likely to be duplicated in an image interpolated using the one or more images.

16. The computer system of clause 15, wherein the instructions are to cause the computer system to detect whether the one or more objects is likely to be duplicated by at least determining whether two or more motion types contribute to at least one pixel.

17. The computer system of clause 15 or 16, wherein the instructions are to cause the computer system to detect whether the one or more objects is likely to be duplicated by at least determining if a first pixel of said one or more objects corresponds to different blending factors.

18. The computer system of any of clauses 15-17, wherein the instructions are to cause the computer system to detect whether the one or more objects is likely to be duplicated by at least determining whether at least two blending factors are to be used to generate one or more pixels of the one or more objects.

19. The computer system of any of clauses 15-18, wherein the instructions are to further cause the computer system to increase a framerate of a video of which the one or more images are a part.

20. The computer system of any of clauses 15-19, wherein the instructions are further to cause the computer system to prevent pixels of the one or more objects from being duplicated in the interpolated frame.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 20, computer programs in form of machine-readable executable code or computer control logic algorithms are stored in main memory 2004 and/or secondary storage. Computer programs, if executed by one or more processors, enable system 2000 to perform various functions in accordance with at least one embodiment. In at least one embodiment, memory 2004, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 2002, parallel processing system 2012, an integrated circuit capable of at least a portion of capabilities of both CPU 2002, parallel processing system 2012, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 2000 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 2012 includes, without limitation, a plurality of parallel processing units ("PPUs") 2014 and associated memories 2016. In at least one embodiment, PPUs 2014 are connected to a host processor or other peripheral devices via an interconnect 2018 and a switch 2020 or multiplexer. In at least one embodiment, parallel processing system 2012 distributes computational tasks across PPUs 2014 which can be parallelizable—for example, as part of distribution of computational tasks across multiple graphics processing unit ("GPU") thread blocks. In at least one embodiment, memory is shared and accessible (e.g., for read and/or write access) across some or all of PPUs 2014, although such shared memory may incur performance penalties relative to use of local memory and registers resident to a PPU 2014. In at least one embodiment, operation of PPUs 2014 is synchronized through use of a command such as _syncthreads( ), wherein all threads in a block (e.g., executed across multiple PPUs 2014) to reach a certain point of execution of code before proceeding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. One or more processors, comprising:

circuitry to:

detect whether one or more objects within a first image and a second image are to appear two or more times in an image interpolated using the first image and the second image, based at least in part on whether pixels corresponding to the one or more objects are differently classified according to motion type between the first image and the second image, based at least in part on a forward motion vector of the first image and a backward motion vector of the second image; and in response to detecting that the one or more objects are to appear two or more times, prevent one of the forward motion vector and the backward motion vector from being used to generate the interpolated image at a pixel location corresponding to the one or more objects by reducing to zero, for the pixel location, a blending weight corresponding to one of the different motion types.

2. The one or more processors of claim 1, wherein the circuitry is to detect whether the one or more objects are to appear two or more times by at least tracing, from a start location to an end location, two or more vectors corresponding to different motion types to a source image and back and determining whether classifications of the start location and end location match.

3. The one or more processors of claim 1, wherein the circuitry is to detect whether the one or more objects within the first image and the second image are to appear two or more times by at least determining whether a pixel location corresponding to an object is to be generated by sampling from pixels classified differently according to motion type.

4. The one or more processors of claim 1, wherein the circuitry is to detect whether the one or more objects are to appear two or more times by at least determining whether differently classified pixels are to contribute to generation of a pixel value.

5. The one or more processors of claim 1, wherein the circuitry is to detect whether the one or more objects are to appear two or more times by at least determining whether a pixel of the one or more objects corresponds to blending factors that fail to match one another.

6. The one or more processors of claim 1, wherein the circuitry is to prevent one or more pixels of the one or more objects from appearing two or more times in the interpolated image.

7. The one or more processors of claim 1, wherein at least one of the one or more objects is represented by different pixel locations in two or more images.

8. A computer-implemented method comprising:

detecting whether one or more objects within a first image and a second image are to appear two or more times in an image interpolated using the first image and the second image, based at least in part on whether pixels corresponding to the one or more objects are differently classified according to motion type between the first image and the second image, based at least in part on a forward motion vector of the first image and a backward motion vector of the second image; and in response to detecting that the one or more objects are to appear two or more times, preventing one of the forward motion vector and the backward motion vector from being used to generate the interpolated image at a pixel location corresponding to the one or more objects by reducing to zero, for the pixel location, a blending weight corresponding to one of the different motion types.

9. The computer-implemented method of claim 8, wherein detecting whether the one or more objects are to appear two or more times includes at least tracing, from a start location to an end location, two or more vectors corresponding to different motion types to a source image and back and determining whether classifications of the start location and end location match.

10. The computer-implemented method of claim 8, wherein detecting whether the one or more objects within the first image and the second image are to appear two or more times includes at least determining whether a pixel location corresponding to an object is to be generated by sampling from pixels classified differently according to motion type.

11. The computer-implemented method of claim 8, wherein detecting whether the one or more objects are to appear two or more times includes at least determining whether differently classified pixels are to contribute to generation of a pixel value in the interpolated image.

12. The computer-implemented method of claim 8, wherein the first image and the second image are part of images comprising a plurality of intermediate images generated based, at least in part, by motion warping another image.

13. The computer-implemented method of claim 8, wherein the first image and the second image are video frames.

14. The computer-implemented method of claim 8, wherein the image interpolated using the first image and the second image is a video frame.

15. A computer system comprising:

one or more processors and memory storing executable instructions that, if performed by the one or more processors, are to cause the computer system to:

detect whether one or more objects within a first image and a second image are to appear two or more times in an image interpolated using the first image and the second image, based at least in part on whether pixels corresponding to the one or more objects are differently classified according to motion type between the first image and the second image, based at least in part on a forward motion vector of the first image and a backward motion vector of the second image; and in response to detecting that the one or more objects are to appear two or more times, prevent one of the forward motion vector and the backward motion vector from being used to generate the interpolated image at a pixel location corresponding to the one or more objects by reducing to zero, for the pixel location, a blending weight corresponding to one of the different motion types.

16. The computer system of claim 15, wherein the executable instructions are to cause the computer system to detect whether the one or more objects are to appear two or more times by at least determining whether two or more motion types contribute to at least one pixel.

17. The computer system of claim 15, wherein the executable instructions are to cause the computer system to detect whether the one or more objects are to appear two or more times by at least determining if a first pixel of said one or more objects corresponds to different blending factors.

18. The computer system of claim 15, wherein the executable instructions are to cause the computer system to detect whether the one or more objects are to appear two or more times by at least determining whether at least two blending factors are to be used to generate one or more pixels of the one or more objects.

19. The computer system of claim 15, wherein the executable instructions are to further cause the computer system to increase a framerate of a video of which the first image and the second image are a part.

20. The computer system of claim 15, wherein the executable instructions are further to cause the computer system to prevent pixels of the one or more objects from appearing two or more times in the interpolated image.

* * * * *